(12) United States Patent
Glaser

(10) Patent No.: US 11,593,776 B2
(45) Date of Patent: Feb. 28, 2023

(54) COMMUNICATION DEVICE TO SENSE ONE OR MORE BIOMETRIC CHARACTERISTICS OF A USER

(71) Applicant: Lawrence F. Glaser, Needles, CA (US)

(72) Inventor: Lawrence F. Glaser, Needles, CA (US)

(73) Assignees: Studebaker & Brackett PC, Tysons, VA (US); Lawrence F. Glaser, Needles, CA (US)

( * ) Notice: Subject to any disclaimer, the term of this patent is extended or adjusted under 35 U.S.C. 154(b) by 0 days.

(21) Appl. No.: 17/816,672

(22) Filed: Aug. 1, 2022

(65) Prior Publication Data

US 2022/0391867 A1 Dec. 8, 2022

Related U.S. Application Data

(63) Continuation of application No. 16/928,377, filed on Jul. 14, 2020, now Pat. No. 11,403,608, which is a
(Continued)

(51) Int. Cl.
*G06K 19/06* (2006.01)
*G06Q 20/10* (2012.01)
(Continued)

(52) U.S. Cl.
CPC ....... *G06Q 20/1085* (2013.01); *G06F 3/0346* (2013.01); *G06F 21/32* (2013.01);
(Continued)

(58) Field of Classification Search
CPC ......... G06K 19/07749; G06K 19/0775; G06K 9/00671; G02B 27/0172; G02B 27/017
(Continued)

(56) References Cited

U.S. PATENT DOCUMENTS 5,299,046 A 3/1994 Spaeth et al.
5,805,098 A 9/1998 McCorkle
(Continued)

FOREIGN PATENT DOCUMENTS

JP H02-291089 A 11/1990
JP 2002-527012 A 8/2002
(Continued)

OTHER PUBLICATIONS

DeCanne, Trends in Capacitive Touch Panels, Electronic Design, Feb. 7, 2013, https://www.electronicdesign.com/technologies/displays/article/21796248/trends-in-capacitive-touch-panels, pp. 1-15, retrieved Feb. 14, 2022.
(Continued)

*Primary Examiner* — Daniel St Cyr
(74) *Attorney, Agent, or Firm* — Studebaker & Brackett PC

(57) ABSTRACT

A communication device for sensing one or more biometric characteristics of a user. The device includes a cover structure, a layer of output pixel elements, a layer of biometric input pixel elements, and a processor. The cover structure includes an exterior surface. The layer of output pixel elements is positioned below the exterior surface and configured to provide an output through the exterior surface toward the user. The output pixel elements being at least one of light emitting pixel elements and piezoelectric-out pixel elements. The layer of biometric input pixel elements is positioned below the exterior surface to receive a reflected biometric input passing from the user through the exterior surface. The biometric input pixel elements being at least one of light detecting and piezoelectric-in pixel elements. The processor is connected to the biometric input pixel elements to process the reflected biometric input.

17 Claims, 42 Drawing Sheets

Related U.S. Application Data continuation of application No. 16/042,396, filed on Jul. 23, 2018, now Pat. No. 10,713,631, which is a continuation of application No. 15/345,090, filed on Nov. 7, 2016, now Pat. No. 10,032,148, which is a continuation of application No. 14/827,820, filed on Aug. 17, 2015, now Pat. No. 9,489,609, which is a continuation of application No. 14/201,823, filed on Mar. 8, 2014, now Pat. No. 9,122,966, which is a continuation-in-part of application No. 14/021,772, filed on Sep. 9, 2013, now Pat. No. 9,065,893.

(60) Provisional application No. 61/698,529, filed on Sep. 7, 2012.

(51) Int. Cl.

| | | |
|---|---|---|
| *G06K 19/077* | (2006.01) | |
| *H04L 9/40* | (2022.01) | |
| *G06F 3/0346* | (2013.01) | |
| *G06F 21/35* | (2013.01) | |
| *G06F 21/32* | (2013.01) | |
| *G06Q 20/34* | (2012.01) | |
| *G06V 40/40* | (2022.01) | |
| *G06V 40/70* | (2022.01) | |
| *G06K 7/08* | (2006.01) | |

(52) U.S. Cl.
CPC .............. *G06F 21/35* (2013.01); *G06K 7/087* (2013.01); *G06K 19/07701* (2013.01); *G06Q 20/34* (2013.01); *G06Q 20/341* (2013.01); *G06V 40/45* (2022.01); *G06V 40/70* (2022.01); *H04L 63/0861* (2013.01)

(58) Field of Classification Search
USPC ........................................ 235/492, 487, 385
See application file for complete search history.

(56) References Cited

U.S. PATENT DOCUMENTS

| | | | |
|---|---|---|---|
| 6,394,343 B1 | 5/2002 | Berg et al. | |
| 6,828,556 B2 | 12/2004 | Pobanz et al. | |
| 7,375,634 B2 | 5/2008 | Sprague | |
| 7,386,150 B2 | 6/2008 | Fleisher | |
| 7,443,295 B2 | 10/2008 | Brice et al. | |
| 7,606,530 B1 | 10/2009 | Anderson et al. | |
| 8,159,329 B1 | 4/2012 | Killian et al. | |
| 8,204,703 B2 | 6/2012 | Govil et al. | |
| 8,931,703 B1 | 1/2015 | Mullen et al. | |
| 9,001,251 B2 | 4/2015 | Smith et al. | |
| 9,065,893 B2 | 6/2015 | Glaser | |
| 9,122,966 B2 | 9/2015 | Glaser | |
| 9,184,198 B1 | 11/2015 | Miao et al. | |
| 9,264,639 B2 | 2/2016 | Guidash et al. | |
| 9,310,559 B2 | 4/2016 | Macnamara | |
| 9,489,609 B2 | 11/2016 | Glaser | |
| 10,032,148 B2 | 7/2018 | Glaser | |
| 10,095,970 B1* | 10/2018 | Mullen | G06K 19/0702 |
| 10,713,608 B2* | 7/2020 | Goja | G06Q 10/0633 |
| 10,713,631 B2 | 7/2020 | Glaser | |
| 11,403,608 B2* | 8/2022 | Glaser | G06V 40/45 |
| 2003/0120745 A1 | 6/2003 | Katagishi et al. | |
| 2005/0065884 A1* | 3/2005 | Capurso | G06K 19/07703 705/41 |
| 2006/0145365 A1 | 7/2006 | Halls et al. | |
| 2007/0014916 A1 | 1/2007 | Daniels | |
| 2007/0175983 A1 | 8/2007 | Klug | |
| 2007/0207744 A1 | 9/2007 | Rofougaran et al. | |
| 2008/0173717 A1 | 7/2008 | Antebi et al. | |
| 2008/0198092 A1 | 8/2008 | Lin | |
| 2008/0248191 A1 | 10/2008 | Daniels | |
| 2009/0152445 A1 | 6/2009 | Gardner, Jr. | |
| 2010/0012817 A1 | 1/2010 | Vogel et al. | |
| 2010/0053118 A1 | 3/2010 | Chen | |
| 2010/0201275 A1 | 8/2010 | Cok et al. | |
| 2010/0225600 A1 | 9/2010 | Dai et al. | |
| 2011/0007048 A1 | 1/2011 | Fratti et al. | |
| 2011/0033074 A1 | 2/2011 | Chang et al. | |
| 2011/0140841 A1 | 6/2011 | Bona et al. | |
| 2011/0261021 A1 | 10/2011 | Modarres et al. | |
| 2012/0162584 A1 | 6/2012 | Chang et al. | |
| 2012/0256089 A1 | 10/2012 | Kanda et al. | |
| 2012/0274599 A1 | 11/2012 | Schediwy | |
| 2013/0094126 A1 | 4/2013 | Rappoport et al. | |
| 2013/0176283 A1 | 7/2013 | Nakata | |
| 2013/0181949 A1 | 7/2013 | Setlak | |
| 2013/0200999 A1 | 8/2013 | Spodak et al. | |
| 2013/0222333 A1 | 8/2013 | Miles et al. | |
| 2013/0284578 A1 | 10/2013 | Foerster et al. | |
| 2013/0346302 A1 | 12/2013 | Purves et al. | |
| 2014/0001269 A1 | 1/2014 | Hartwick et al. | |
| 2014/0010549 A1 | 1/2014 | Kang | |
| 2014/0183258 A1 | 7/2014 | DiMuro | |
| 2014/0244494 A1 | 8/2014 | Davis et al. | |
| 2014/0263627 A1 | 9/2014 | Wyatt | |
| 2014/0354596 A1 | 12/2014 | Djordjev et al. | |
| 2014/0354905 A1 | 12/2014 | Kitchens et al. | |
| 2015/0177884 A1 | 6/2015 | Han | |
| 2016/0110025 A1 | 4/2016 | Hossu | |
| 2016/0277843 A1 | 9/2016 | Babayoff et al. | |
| 2017/0090644 A1 | 3/2017 | Yao et al. | |

FOREIGN PATENT DOCUMENTS

| | | |
|---|---|---|
| WO | 2009/082760 A2 | 7/2009 |
| WO | 2010/114499 A2 | 10/2010 |
| WO | 2013/039395 A1 | 3/2013 |

OTHER PUBLICATIONS

Hachman, Synaptics: We can do iPhone-like fingerprint sensors but better, PCWorld, Feb. 18, 2014, https://www.pcworld.com/article/443617/synaptics-we-can-do-iphone-like-fingerprint-sensors-but-better.html, pp. 1-7 retrieved on Feb. 14, 2022.

Notification of Transmittal of the International Search Report and the Written Opinion of the International Searching Authority, or the Declaration; PCT/US2014/022190; dated Sep. 16, 2014.

International Search Report and the Written Opinion of the International Searching Authority; PCT/US2013/058653; dated Feb. 10, 2014.

* cited by examiner

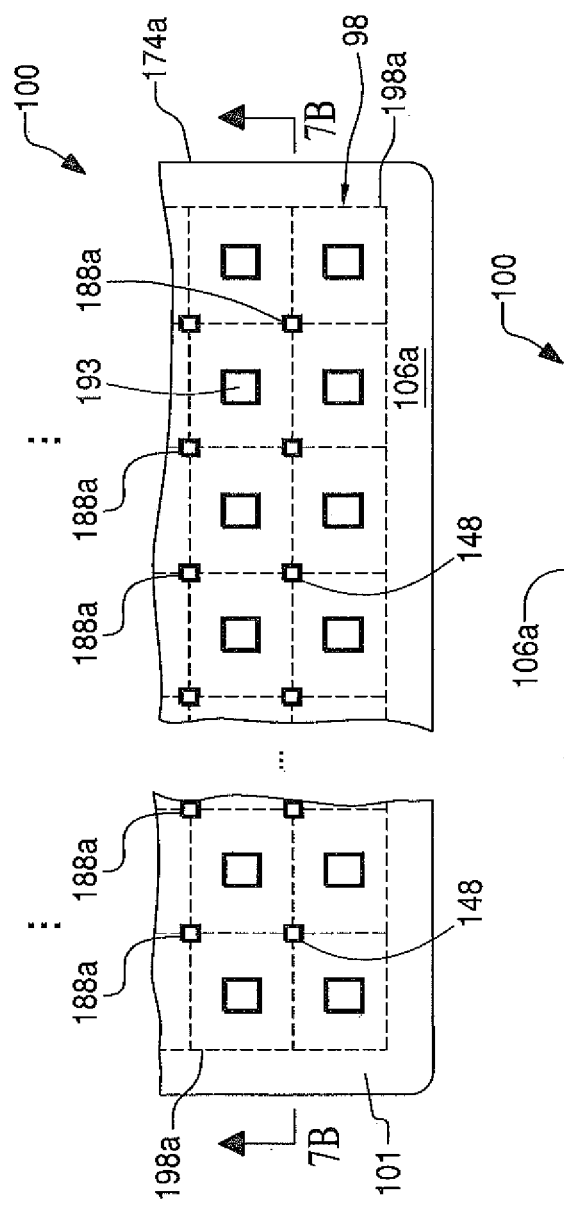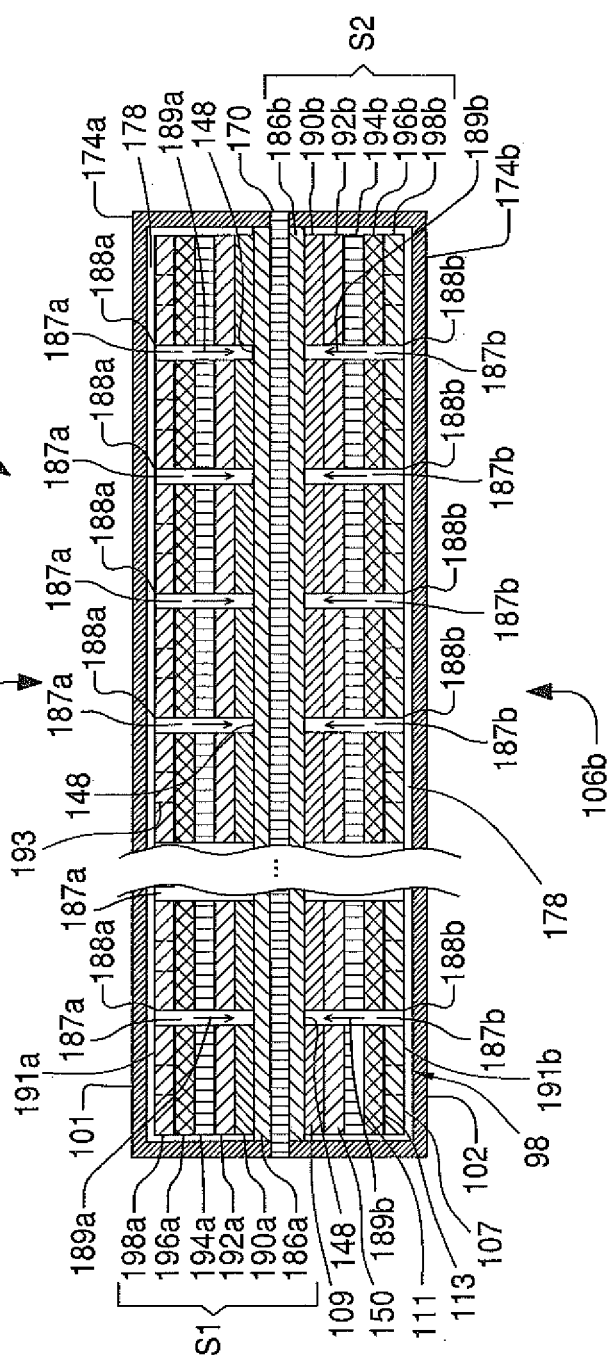

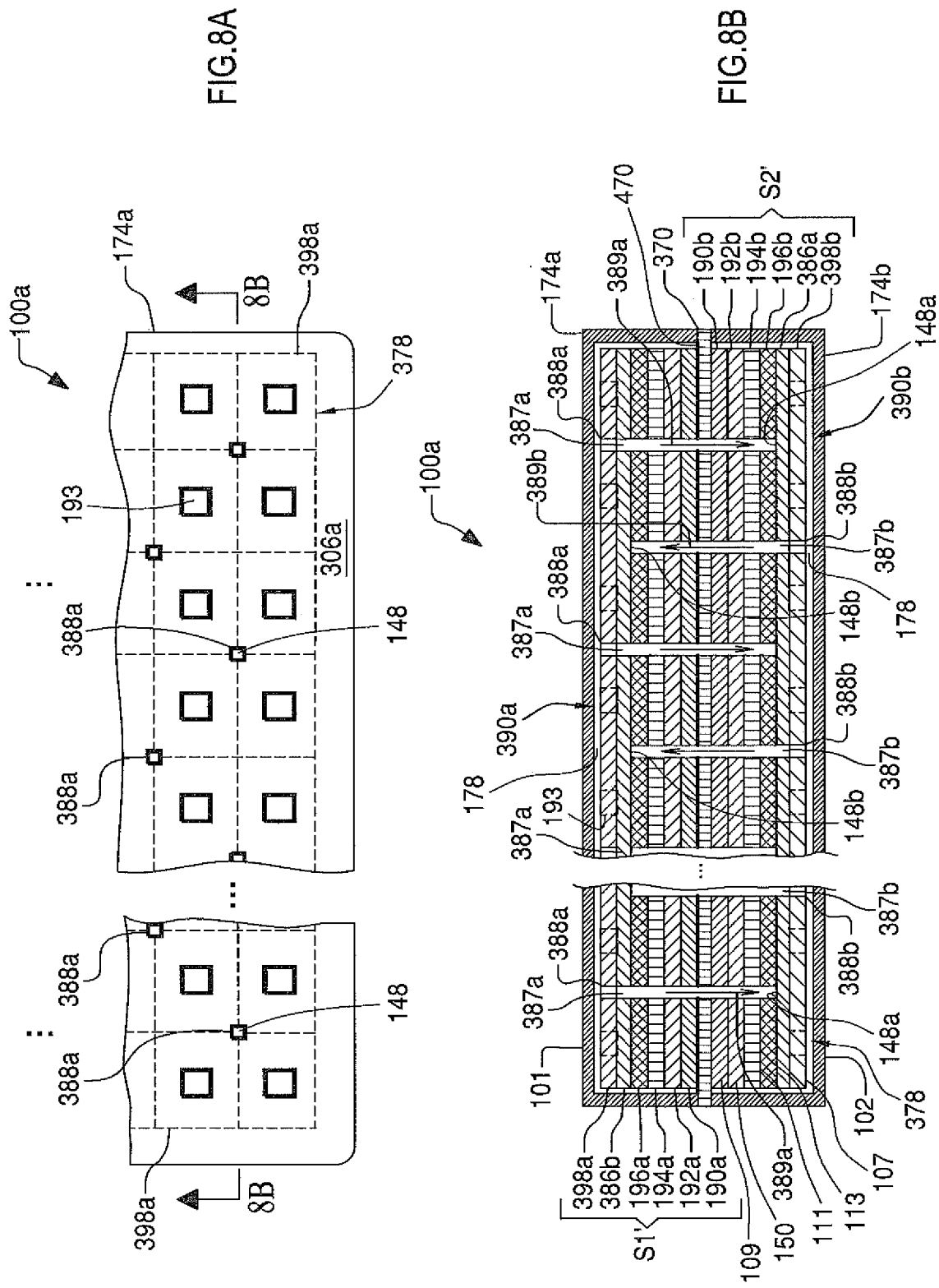

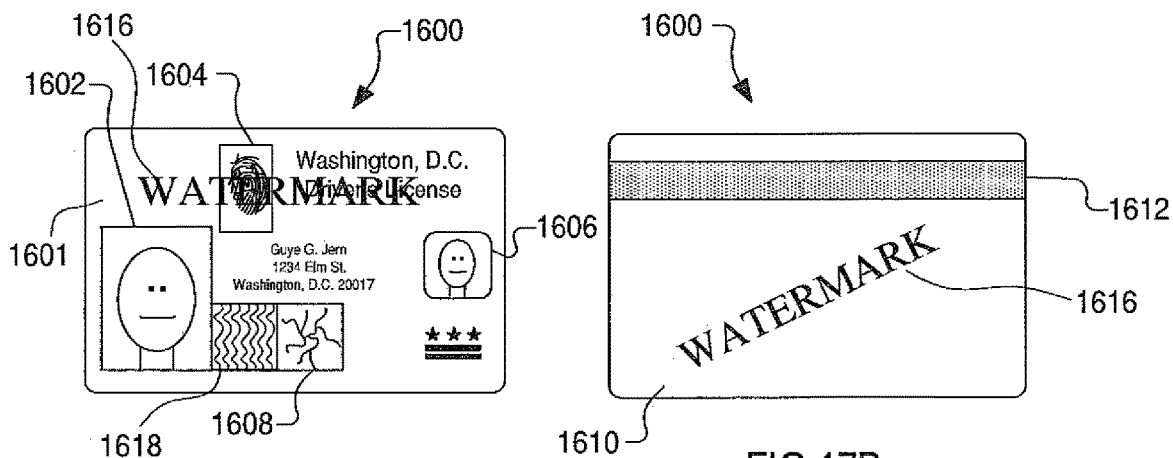
FIG.17A
PRIOR ART
FIG.17B
PRIOR ART
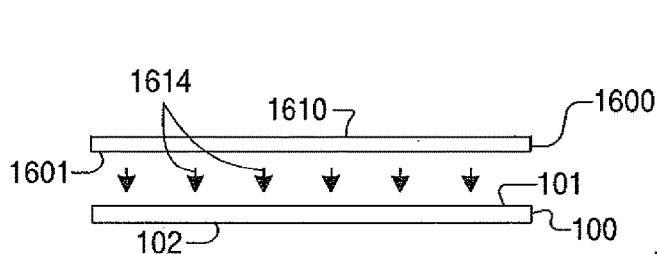
FIG.17C
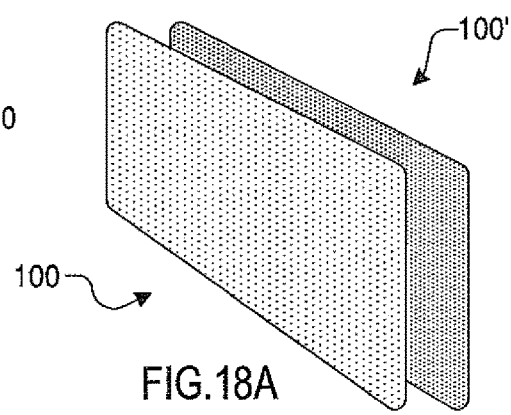
FIG.18A
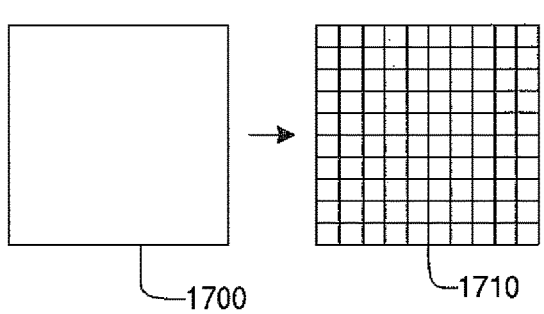
FIG.18B
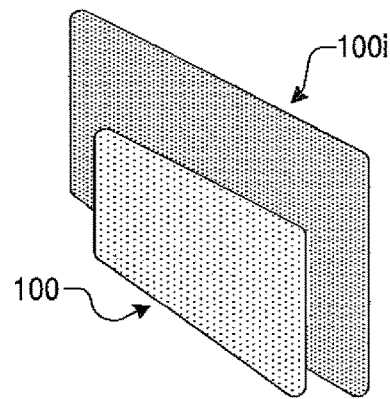
FIG.18C

COMMUNICATION DEVICE TO SENSE ONE OR MORE BIOMETRIC CHARACTERISTICS OF A USER

CROSS-REFERENCE TO RELATED APPLICATIONS

This application claims the benefit of U.S. patent application Ser. No. 16/928,377, filed on Jul. 14, 2020, which is a continuation of Ser. No. 16/042,396, filed on Jul. 23, 2018, now U.S. Pat. No. 10,713,631, which is a continuation of Ser. No. 15/345,090, filed on Nov. 7, 2016, now U.S. Pat. No. 10,032,148, which is a continuation of U.S. patent application Ser. No. 14/827,820, filed on Aug. 17, 2015, now U.S. Pat. No. 9,489,609, which is a continuation of U.S. patent application Ser. No. 14/201,823, filed on Mar. 8, 2014, now U.S. Pat. No. 9,122,966, which is a continuation-in-part of U.S. patent application Ser. No. 14/021,772 filed on Sep. 9, 2013, now U.S. Pat. No. 9,065,893, which claims the benefit of Provisional Application No. 61/698,529, filed Sep. 7, 2012. The contents of each patent application identified above are incorporated herein by reference in their entirety.

TECHNICAL FIELD

The technical field relates to electronic devices, and more specifically to portable electronic devices that can identify one or more routes to one or more radio frequency identification (RFID) tags. The portable electronic device can use a near field communication device to locate the RFID tag after following the route to the RFID tag.

BACKGROUND

Magnetic cards have many purposes. Examples include credit cards, debit cards, medical and insurance cards, drug payment cards, health care service cards, stored value cards, identification cards, access entry cards, and the like. Many of these cards have information stored in a magnetic stripe, for provision to communicate with a POS (Point of Sale) system.

At the same time, portable user devices such as smart mobile phones and wireless computers, offer a wide variety of information and communication capabilities to the user. Some portable user devices augment the use of magnetic cards by allowing, for example, the modification of information in the magnetic strip of the cards. There are also mobile devices which interface to magnetic stripe readers through the use of a card slot. Additionally, there are card readers that are completely internal to a secure facade, such as that typically found at an ATM (automated teller machine).

SUMMARY

This disclosure provides communication device configured to sense one or more biometric characteristics of a user. The communication device comprises a cover structure, a layer of display light emitting output pixel elements, a plurality of biometric output pixel elements, a plurality of biometric input pixel elements, a processor. The cover structure includes an exterior surface. The layer of display light emitting output pixel elements is positioned below the exterior surface to display images through the exterior surface. The plurality of biometric output pixel elements is configured to provide an output in a direction through the exterior surface toward the user. The plurality of biometric output pixel elements is positioned below the exterior surface and overlapping with the display light emitting input pixel elements in a direction perpendicular to the exterior surface. The plurality of biometric output pixel elements being at least one of light emitting pixel elements and piezoelectric-out pixel elements. The plurality of biometric input pixel elements is positioned below the exterior surface and overlapping with the display light emitting input pixel elements and the plurality of biometric output pixel elements in a direction perpendicular to the exterior display surface. The plurality of biometric input pixel elements being at least one of light detecting pixel elements and piezoelectric-in pixel elements. At least a portion of the plurality of the biometric input pixel elements is positioned and configured to receive a reflected biometric input passing from the user through the exterior surface. The processor is connected to the biometric input pixel elements to process the reflected biometric input.

This disclosure also provides a communication device configured to sense one or more biometric characteristics of a user. The communication device comprises a cover structure, a layer of output pixel elements, a layer of biometric input pixel elements, and a processor. The cover structure includes an exterior surface. The layer of output pixel elements is positioned below the exterior surface and configured to provide an output through the exterior surface toward the user. The output pixel elements being at least one of light emitting pixel elements and piezoelectric-out pixel elements. The layer of biometric input pixel elements is positioned below the exterior surface to receive a reflected biometric input passing from the user through the exterior surface. The biometric input pixel elements being at least one of light detecting pixel elements and piezoelectric-in pixel elements. The processor is connected to the layer of biometric input pixel elements to process the reflected biometric input.

Advantages and features of the embodiments of this disclosure will become more apparent from the following detailed description of exemplary embodiments when viewed in conjunction with the accompanying drawings.

BRIEF DESCRIPTION OF THE DRAWINGS

FIGS. 7A and 7B are diagrams of portions of a card in accordance with an exemplary embodiment of the present disclosure. FIG. 7A is a plan view of a portion of the card and FIG. 7B is a cross section view of a portion of the card taken along lines 7B-7B of FIG. 7A.

FIGS. 8A and 8B are diagrams of portions of a card in accordance with an exemplary embodiment of the present disclosure. FIG. 8A is a plan view of a portion of the card and FIG. 8B is a cross section view of a portion of the card taken along 8B-8B of FIG. 8A.

FIG. 10A is a plan view of a card including embedded magnetic elements. FIG. 10B is a side view of first and second cards, where the second card is magnetically levitating over the first card. FIG. 10C is a side view of the first and second cards of FIG. 10B illustrating the first card controlling a position of the second card.

FIG. 16A is a diagram shows a tether connected to a communication device;

FIG. 16B is a side view diagram showing details of the tether shown in FIG. 16A; FIG. 16C is a front view diagram of the head of the tether shown in FIGS. 16A and 16B; FIG. 16D is a side view diagram of another tether in accordance with an exemplary embodiment of the present disclosure; and FIG. 16E is a front or rear view diagram of a tether head according to another exemplary embodiment of the present disclosure.

FIGS. 17A and 17B are diagrams showing a conventional or legacy card. FIG. 17C is a diagram showing a conventional or legacy card being cloned on to a card according to an exemplary embodiment of the present disclosure.

FIG. 18A is a diagram showing two cards with different pixel densities. FIG. 18B is a diagram illustrating a pixel assignment to maintain compatible communications backwards through iterations of card design. FIG. 18C is a diagram showing overlapping different sized cards according to an exemplary embodiment of the present disclosure.

DETAILED DESCRIPTION

Figure 1:
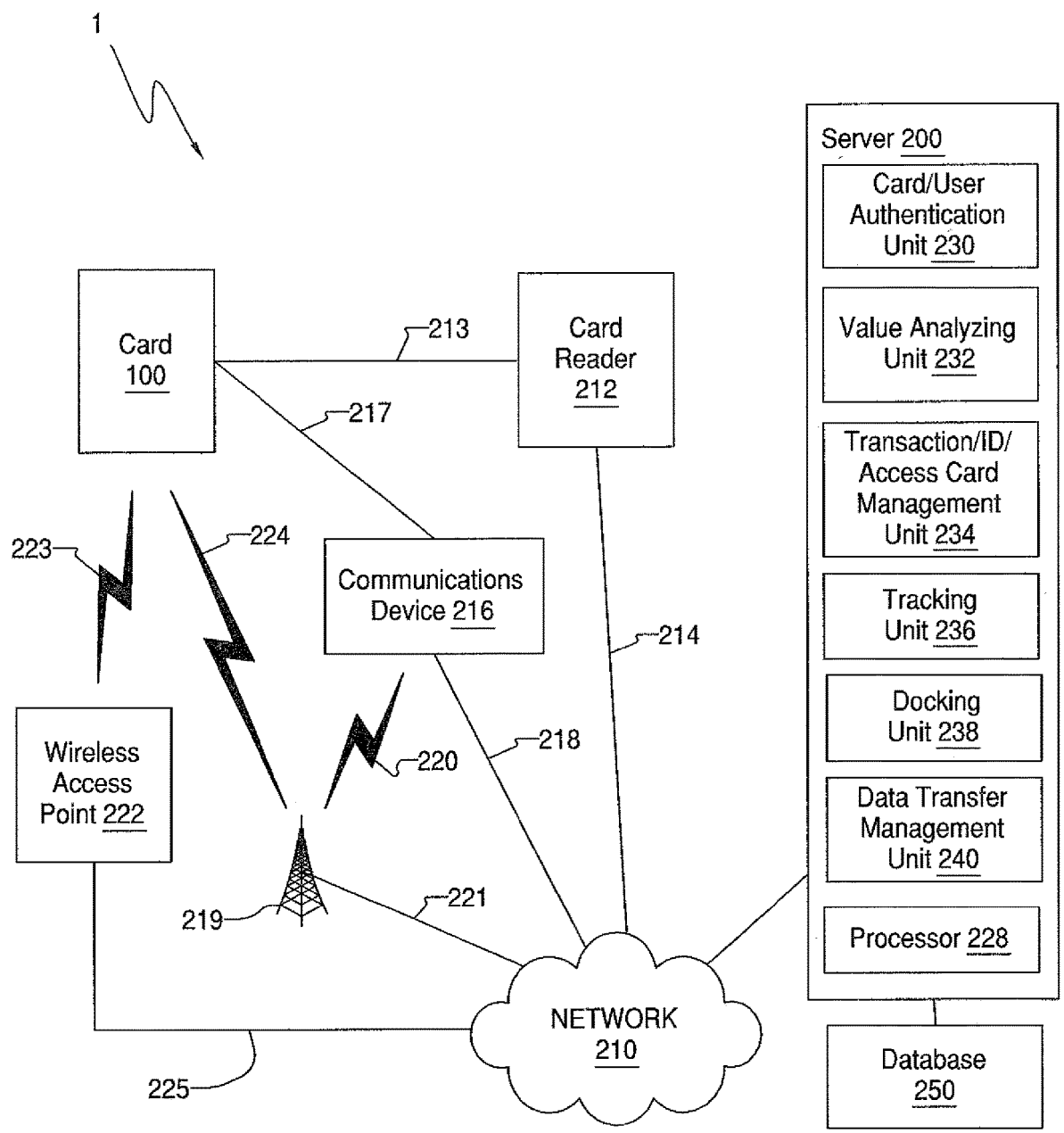
FIG. 1 is a diagram of a communication system according to an exemplary embodiment of the present disclosure.

Applicant realized that many capabilities of portable user devices such as smart mobile phones and wireless computers, which offer a wide variety of information and communication capabilities, can be closely related to activities which also involve user devices, such as magnetic or smart cards, and magnetic readers.

In an embodiment according to the present disclosure, a system is disclosed that includes a seamless combination of card and mobile platforms to provide a user with a network-connected secure, truly portable device that can provide authenticated information and interact with the market-place and its associated environment.

The present disclosure provides a mobile computerized platform that can conduct secure transactions by emulating a standard credit card or bank card in a manner that can transact with the embedded legacy readers, such as those used at a POS or inside physically secure machines, such as an ATM. Thus, applications of a card according to the present disclosure can include legacy card readers and readers provided internally in an ATM machine, just as a bank card would be processed.

Electronic devices come with the cost of reduced resistance to environmental factors, such as impact and moisture. Conventional plastic cards having a magnetic stripe exhibit sensitivity to their exposed magnetic stripe material by way of direct damage or magnetic inducted damage. By contrast, an embodiment of the present disclosure provides a card having selected capabilities of electronic devices and conventional plastic cards while having robust resistance to such environmental factors.

A card according to the present disclosure can emit light, sense light, and collect information related to the sensed light across at least substantially the entire major planar surfaces of the card; that is, a substantial portion of the major surfaces throughout their entire extent. In the context of this disclosure, the phrase "at least substantially" may, in one embodiment, mean the entire first major surface, with an edge margin limited by manufacturing capability, or in another embodiment may mean a significant portion of the first major surface, such as at least 90% of the major surface. In yet another embodiment, the term "at least substantially" may also include going from a first edge to a second edge in one direction, limited only by manufacturing capability, and a spaced distance away from a third edge and a fourth edge in a second direction that is perpendicular to the one direction, while encompassing most of the first major surface, for example, at least 90% of the first major surface. Thus, the term "at least substantially" should be read without limitation as some applications may make use of the teachings of the present disclosure over a portion of a surface rather than an entire surface. Sound can be provided as an energy source, which can be emitted and/or collected across at least one surface of the card. In some embodiments, one or more entire major surfaces of a card can emit and sense an energy source, such as one or more of light, sound, tactile energy sources, and feedback (e.g., haptic). By combining magnetic, optic, and/or aural output and input, across the major surfaces of the card, with magnetic-in and magnetic-out capability across these same surface(s) acting protected and invisibly from behind the optic and aural components, a card according to the present disclosure can scan and interact with the real world dynamically, and hence allow for a very broad set of new functionalities and security for individual users, groups of users, institutions, and governments. These new functionalities will find great utility and acceptance as developers create application databases, ecommerce and network applications.

A card as a user device according to the present disclosure incorporates the functionality of other electronic devices already carried by a user in the interest of reducing the total number of such devices, which is desirable to gain a foothold in all possible domains including but not limited to the domain of proof of identity and POS use. For instance, the card of the present disclosure permits environmental and weight savings with the added benefit to the user of leaving, for example, a cell phone, portable computing device, vehicle smart key, or PDA/tablet, behind, so as to be efficient in carrying only one convenient, secure, and multifunctional item.

The present disclosure further includes application of the features of the aforementioned card's surface to larger surfaces, displays, or mats. Such mats may emulate an array of devices and may be activated with or without touch, i.e., touchlessly, through gestures or proximity of an object, such as a finger or stylus.

A card in accordance with an exemplary embodiment of the present disclosure can include an RFID device or array that permits using the card for a variety of new functions. Included in these functions is the ability to track and locate items or objects configured with an RFID tag, and the ability to create automated lists using RFID tags. A card having the ability to read RFID tags in accordance with an exemplary embodiment of the present disclosure can also serve as an interface between an RFID tag and a legacy card reader. An array of RFID sensors can track real time movement of an RFID tagged item or object, expanding the applications of the card and the data that may be gathered by the card.

An exemplary embodiment of a card user device in accordance with the present disclosure will now be described with reference to the figures. Unless indicated otherwise, descriptions of elements having the same reference numbers may not be repeated for the sake of brevity.

FIG. 1 is a diagram of an exemplary system 1 in which a user device or card 100 communicates with a server computer 200, which includes a plurality of units and memory for performing the various functions of the system, via a network 210, which can be a wide area network (WAN) such as the internet, an ad hoc network, a local area network (LAN), a metropolitan network (MAN), a cellular network, a wireless wide area network (WWAN), a wireless personal area network (WPAN), a public switched telephone network (PSTN), a terrestrial wireless network, another network, or combinations thereof. Card 100 can connect to network 210 via a card reader 212, such as a credit card reader located at a POS, an ATM, a secure entry device etc., via a wireless connection (e.g., magnetic, electromagnetic) or wired connection 213, and from card reader 212 to network 210 through a wireless or wired communication channel 214. Card 100 can communicate with server 200 via a communications device 216, such as a cell phone, PDA, electronic tablet, laptop computer, desktop computer through one or more wireless or wired communication channels 217, and via a communication connection 218 between communications device 216 and network 210. In an exemplary embodiment, communications device 216 can connect to network 210 and server 200 through a wireless connection 220 to an antenna 219 of a wireless network base station (e.g., Node B or eNodeB) communicating with network 210 via a communications connection 221. In an exemplary embodiment, with additional energy expenditure, card 100 can connect to server 200 through base station antenna 219 through a wireless connection 224 without any intermediary communications device 216, or through one or more wireless repeaters. In an embodiment, card 100 can connect to server 200 via a wireless access point 222 utilizing a Wi-Fi or other wireless protocol 223, a communications connection 225, and network 210.

Figure 2:
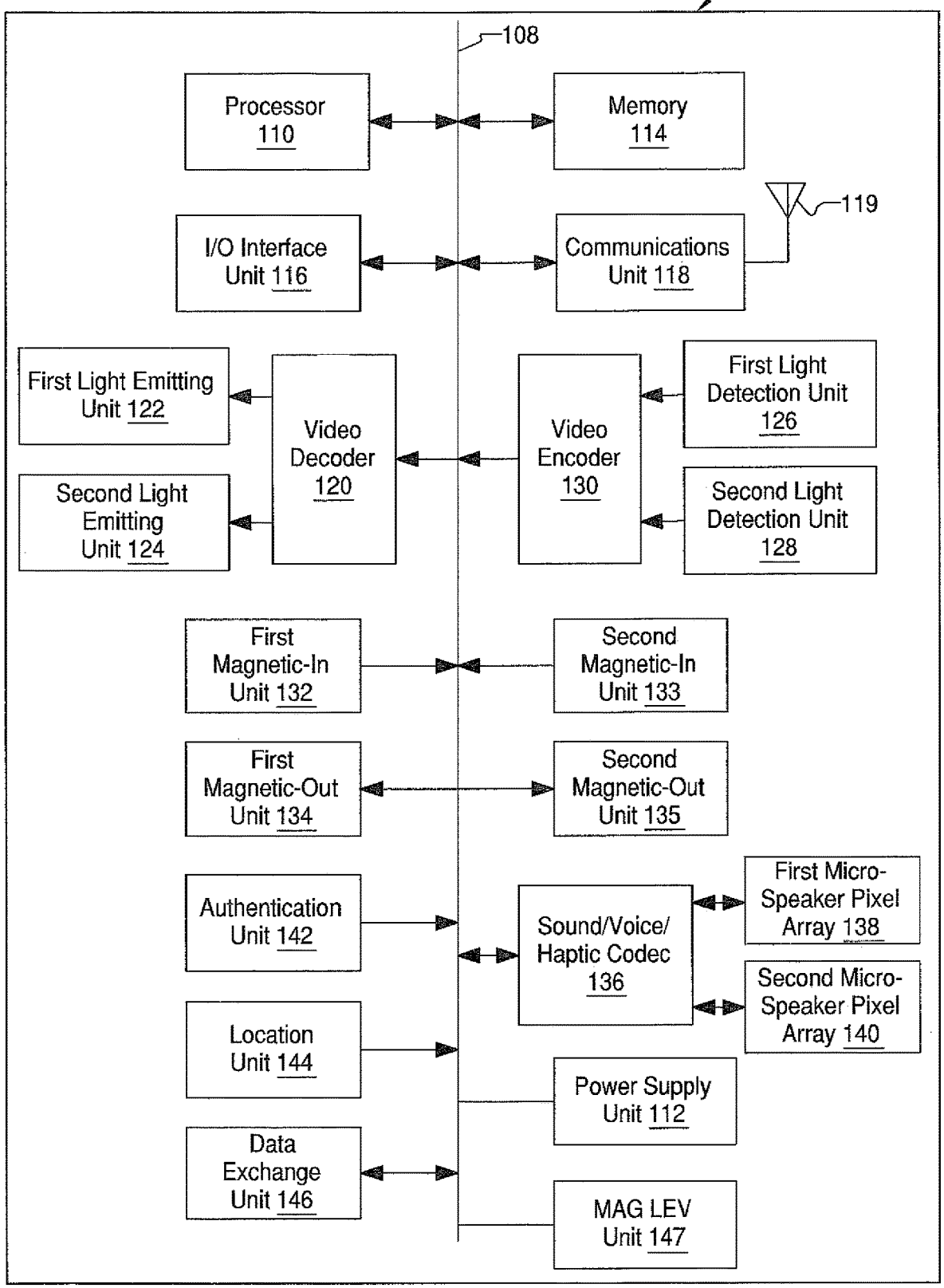
FIG. 2 is a diagram of a card system according to an exemplary embodiment of the present disclosure.

FIG. 2 is a diagram of an exemplary embodiment system elements of card 100 in accordance with the present disclosure. As shown in FIG. 2, card 100 includes an address/data bus 108 through which system components communicate with a processor or controller 110 (e.g., CPU) and are powered by a power supply unit or power supply 112. System components of card 100 include a memory 114, such as volatile and nonvolatile memory; an input/output (I/O) interface unit 116; a communications unit 118 and an antenna 119; a video decoder 120 that decodes video data for display by a first light emitting unit 122 communicatively coupled to video decoder 120, and that decodes video data for display by a second light emitting unit 124 communicatively coupled to video decoder 120; a first light detection unit 126 and a second light detection unit 128 communicatively coupled to a video encoder 130 that encodes video data generated in first and second light detection units 126 and 128; a first magnetic-in unit 132 and a second magnetic-in unit 133 that detect magnetic fields at respective first and second major surfaces of card 100; a first magnetic-out unit 134 and a second magnetic-out unit 135 that generate magnetic fields at respective first major and second major surfaces of card 100; sound/voice/haptic encoder/decoder (codec) 136 that receives and encodes a signal including aural information generated by a first or second microphone/speaker (micro-speaker) pixel array 138, 140 and provides the encoded signal to bus 108, and decodes coded data received from bus 108 and generates a decoded signal including sound, voice, or haptic information, and provides the decoded signal to the first or second micro-speaker pixel array 138, 140 to thereby produce sound, reproduce voice, or provide haptic feedback; an authentication unit 142; a location unit 144; a data exchange unit 146, and a levitation/positioning controller unit, or Mag Lev unit 147. The term "display" when used with respect to card 100 may have a plurality of meanings in the context of this disclosure. One usage of the term display is in reference to the light emitted from a plurality of light emitting pixels elements 107 (e.g., FIGS. 4A-4D) of first light emitting unit 122 or second light emitting unit 124. The light emitted by light emitting pixel elements 107 of first light emitting unit 122 or second light emitting unit 124 forms an image that may be called or described as a display when used in conjunction with card 100 and variations of card 100, unless otherwise noted.

Processor 110 of card 100 can include one or more processors such as at least one microprocessor, microcontroller, a central processing unit (CPU), application specific integrated circuits (ASICs), digital signal processors (DSPs), digital signal processing devices (DSPDs), programmable logic devices (PLDs), field programmable gate arrays (FPGAs), and other devices designed to perform the functions described herein, and/or by a combination of any of the above.

In an embodiment providing true N+1 redundancy, elements of the hardware design, would be provided in duplicity and cross interfaced such that the failure of any one of these elements will not result in the failure of card 100. These elements can include and are not limited to; processors, memory, power, busses, pixels, etc. The user will not experience any interruption of service when a redundant element fails. Card 100 will attempt to reboot its down element(s) and report the results of hardware fault recovery, resynchronize and then report the overall success or failure to the user and to the servers and operators of the overall system. With a completely redundant solution, each processor representing an independent survivable processor can be controlled with an additional element, such as a redundancy control processor, that exists to synchronize each processor to the next. Even the element which does synchronization to achieve redundancy can be duplicated and suffer a failure without disruption of service to the user. For example, in an exemplary embodiment a first processor (not shown) can control mainly elements on one side of card 100, while a second processor (not shown) can control mainly elements on the opposing side of card 100. In the event either processor fails, both sides of card 100 can continue to function using the remaining processor with all services offered and uninterrupted.

As noted hereinabove, memory 114 is a non-transitory machine-readable medium such as a storage medium or other storage(s) and stores instructions related to programs, routines, and other code executable by processor 110 and data structures such as encrypted user personal and financial information. Memory 114 can include random access memory (RAM), read-only memory (ROM), erasable programmable read-only memory (e.g., EPROM, EEPROM, or Flash memory), or any other tangible medium capable of storing information and combinations of the above. Memory can also include buffer memory that holds data to be transmitted by the transmitter of communications unit 118 until the data is transmitted, and/or data received by the receiver of the communications unit 118 until the received data can be processed. Although FIG. 2 shows memory 114 as separate or external to processor or controller 110, memory may be implemented within processor or controller 110 or within another processing unit. Depending on the permissible thickness of card 100, at least a portion of memory 114 may be in the form of a micro hard drive or a nano-hard drive.

Many capabilities and other aspects of card 100 and system 1 are described herein in terms of processes and sequences of processes. It is to be understood that these processes and sequences of processes can be performed by processor or controller 110 carrying out programmed instructions, although some processes can be carried out using other hardware capable of executing programmed instructions. For example, embodiments can be implemented in hardware, software, firmware, middleware, microcode, or any combination thereof. The programmed instructions can be program code or code segments that perform necessary tasks and can be stored in memory 114. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or contents of memory 114.

Input/output (I/O) interface unit 116 can connect other devices to card 100 either directly or through intervening I/O controllers (not shown). In an embodiment, I/O interface unit 116 allows communication between card 100 and other devices using optical, wireless (e.g., RF or magnetic), or wired/tethered channels. For example, an I/O interface can include a portion of the first or second light detection units 126, 128 and a respective corresponding portion of one of the first and second light emitting units 122, 124 present on the same side of card 100, and a tether including optical communication paths can be magnetically attached to the portions to exchange data via optical signals. In another embodiment, I/O interface unit 116 can include physical ports, such as HDMI, VGA/SVGA, 100BASE-T, 1000BASE-T, IEEE 1394 (FireWire™), and/or USB type ports.

Communications unit 118 includes a transmitter and receiver that can communicate with a wireless network element via transmitting and receiving radio waves (cellular, RFID, etc.) via antenna 119.

Communications unit 118 and antenna 119 are configured to modulate a data signal, up-convert the modulated data signal to an RF frequency, and transmit a signal containing data information received from processor 110 via bus 108 from the antenna 119 as a radio wave over a wireless network to a remote device. Communications unit 118 and an antenna 119 are also configured to receive a radio wave containing modulated signal information transmitted from a remote device over a wireless network, down-convert the received radio wave and demodulate the down-converted modulated signal and provide the output as reproduced data transmitted from the remote device to bus 108 and processor 110.

A wireless network element can include, for example, an access point (e.g., a Wi-Fi access point), a femtocell, a cellular phone or personal communication or data device, a desktop computer, an RFID device, a portable computing device such as a laptop, a tablet, etc., and may allow wireless communication devices to connect to a wireless network using Wi-Fi, Bluetooth, an element such as a base station using a cellular communication technology such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA), or another wireless technology and/or standard. A wireless network can utilize one or more technologies, for example, technologies such as Universal Mobile Telecommunications System (UTMS), Long Term Evolution (LTE), Evolution-Data Optimized or Evolution-Data only (EV-DO), Global System for Mobile communications (GSM), Worldwide Interoperability for Microwave Access (WiMAX), Code division multiple access (CDMA)-2000, or Time Division Synchronous Code Division Multiple Access (TD-SCDMA).

Figure 3A:
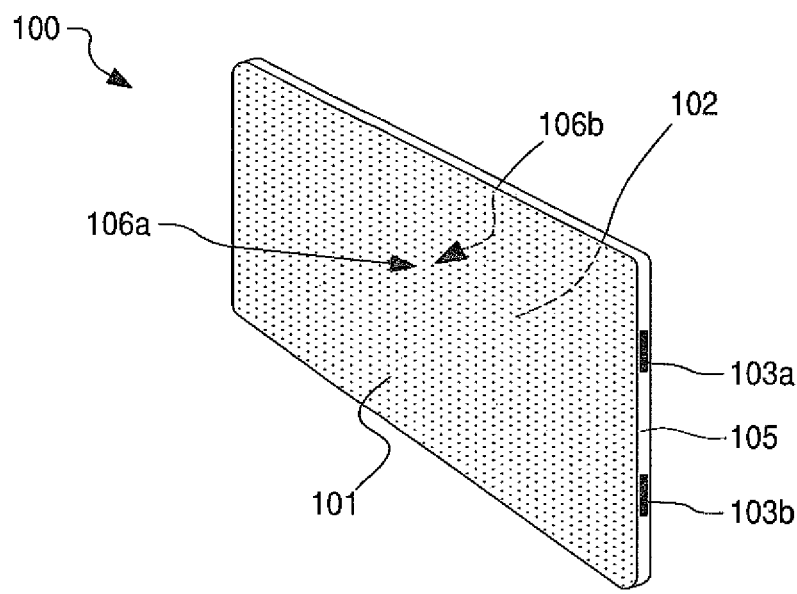
FIGS. 3A-3C respectively show perspective, plan, and side views of a card according to an exemplary embodiment of the present disclosure.
Figure 3B:
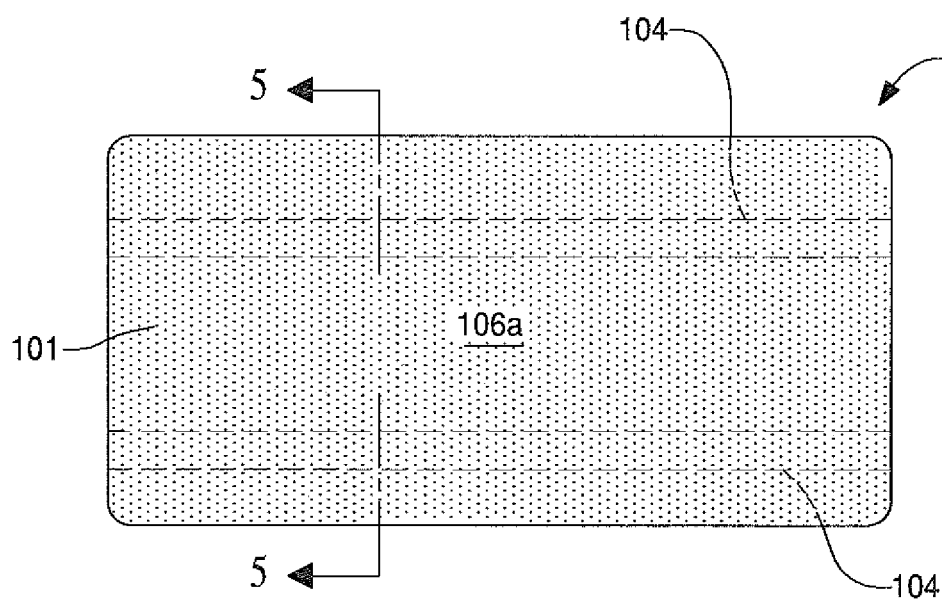
Figure 3C:
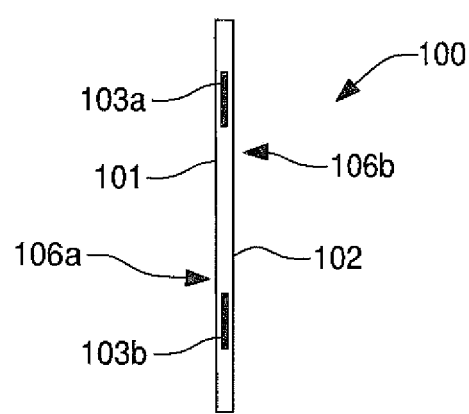
Figure 4A:
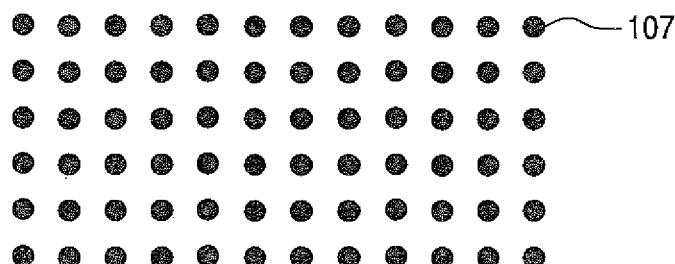
FIGS. 4A to 4D are diagrams showing exemplary pixel arrays and pixel elements.
Figure 4B:
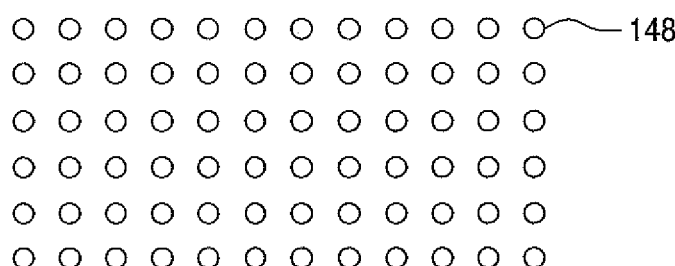
Figure 4C:
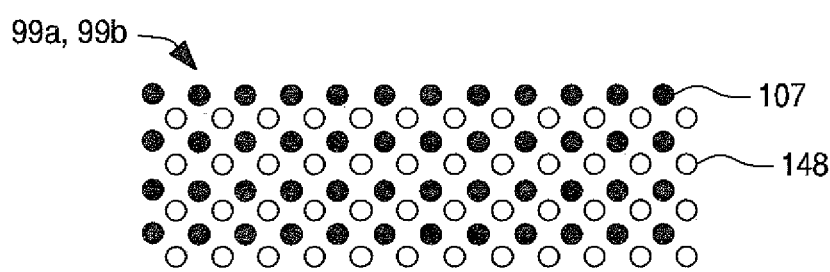

Each of the first light emitting unit 122 and the second light emitting unit 124 of card 100 include a plurality of light emitting devices, such as semiconductor light emitting diodes (LEDs), organic light emitting diodes (OLEDs), monochrome LCDs (LCM), a multi-mode display capable of both monochrome and color display modes, thin film transistor (TFT) controlled backlit or edge-lit liquid crystal display (LCD) devices, or a combination of these display pixels, that are arrayed across respective major sides or surfaces of card 100 (see FIGS. 3A, 3C, and 4C). These light emitting arrays of card 100 allow for not only a display to display images on the major sides or surfaces of card 100, but also to function as a light source, such that the light emitting arrays can illuminate any object within its power limitations, and do so with any frequency of light card 100 has been equipped to emit, which may include one or more frequencies from infra-red to ultra violet. As can be seen from FIG. 2, video decoder 120 receives a coded signal provided on bus 108 from processor 110, decodes the signal, and first light emitting unit 122 and/or second light emitting unit 124 control light emissions according to the decoded signal.

First light emitting unit 122 and/or second light emitting unit 124 can each serve as a display such as a cell phone display or to present identification, either for a POS operator (or anyone asking for it) or for scanning. Display features can be provided, such as magnification of an image on the display, with a control to do so. Because card 100 includes a display, boundaries associated with conventional cards become "unbounded." For example, it becomes unnecessary to display an entire credit card number since card 100 can communicate directly with a POS or other interface. If necessary, a user may display a portion of a credit card number, for example, perhaps the last four digits only. If a user selects a function of card 100, he can see all of the information normally present on card 100, if and when needed, as a guard or protection against inadvertent disclosure of sensitive card information. In an exemplary embodiment, card 100 can emulate plural hard cards a user may carry, front and back, first through scanning face to face, then, by way of the display.

Watermarks, (e.g., see FIG. 16) could be visible on at least one of the major surfaces of card 100, but infra-red and ultraviolet light watermarks, which are invisible or not visible to the naked eye, can be used for greater security. Use of various visible light frequencies and not visible light frequencies for display also keeps a public enemy from a data transference connection, face-to-face card communication, or card in a POS system connection because it is more difficult to capture signals when using many wavelengths, particularly when those wavelengths are separated into visible and non-visible portions.

The expanded display provided by the first and second light emitting units 122, 124 in the familiar form factor of a credit card can conserve space because it can serve several functions. For example, card 100 can replace a Social Security card, a license (e.g., driver's license), a security/access card, an EZ pass, credit card, debit and bank cards, keys, and it can provide emergency medical condition information related to the user or user's immediate family, just to name a few. That is, while exemplary embodiments are described herein, the extent of applications of card 100 and system 1 is far reaching and thus not limited to the specific examples described herein as will be apparent to those skilled in the art.

Each of first light detection unit 126 and second light detection unit 128 includes a light detecting array or imaging device, such as a charge-coupled device (CCD) including plural semiconductor MOS diodes arrayed across respective major sides or surfaces of card 100 (see FIGS. 3A, 3C and 4B), each of which can represent a pixel of an image. Light detection units 122, 124 can digitize an imaging signal output from the imaging device, can perform various kinds of correction processing, such as gamma correction, on the imaging signal, and output the result to video encoder 130 to perform encoding processing on the imaging signal and to output the result to processor or controller 110.

Additionally, first and second light detection units 126, 128 of card 100 can be equipped to detect the light created by card 100, or the ambient light available in a given setting, or both. Because of the energy required to emit light from light emitting pixel elements 107 of first light emitting unit 122 and/or second light emitting unit 124, ambient light is typically the preferred light source for first and second light detection units 126 and 128. Through emission of specific light wavelengths and patterns, from specific portions of the surface of card 100, distance to an object can be determined from detection of this emission and can allow card 100 to use parallax to determine velocity, acceleration, and deceleration of a given target object for display or storage. A snap shot or video of the event can mesh the image data with the movement data for real time or later use.

Through spectral analysis of received visible and invisible light, applications to read temperature, substance presence, such as sugar (blood sugar), atmospheric gases, and blood gases, could be provided by applications developers. As card 100 advances and spectral analysis improves, card 100 can be configured to perform real-time forensic scanning of a given object, substance, or surface, such as to identify all substances in a given target as done in a blood serum analysis. These functions allow for many possible applications for card 100 and for developers who write applications for card 100 to create an enhanced man-machine interface independent of a physical touch on card 100.

The first and second light detection units 126, 128 of card 100 can form an image of objects facing respective major surfaces of card 100, and thus card 100 can operate as a camera. However, one embodiment of card 100 does not include a lens or lens set as would a typical camera assembly, the optical axis of which is typically laid out perpendicular to the imaging surface. Even if some other orientation is chosen, minimization of the image or object angle with respect to the optical axis of light transmitting passages (described hereinbelow) is dependent on minimum lens thickness and maximum refractive index of the materials used in the lens, if such lenses are present, which quantifies their ability to bend light and may require great expense or may simply become impossible beyond a certain limit. As is known to opticians, glass typically provides an index of about 1.5 whereas one may achieve an index of 2.42 by employing lenses of pure diamond. As the refractive index is a ratio which relates the sine of incident light angle prior to lens to incident angle after the lens, (and which sines may be substituted by their respective actual angles if close to the optical axis, according to the well-known small-angle approximation) the length of the optical axis will always be some multiple of the lens thickness. Furthermore, optical axes are always perpendicular to the two dimensions of a planar lens that, as is known to the arts of optics, also cannot be reduced below a certain multiple of the lens thickness due to the so-called "thin lens approximation." Thus, lensing requirements place minimum constraints on 3 orthogonal dimensions and, as one of these in the form factor of card 100 substantially corresponds to the thickness of a credit card, card 100 uses an optical configuration different from typical optical assemblies. In an embodiment, card 100 uses a combination of micro-lensing, pinhole lens techniques and image processing software or simple collection of light by CMOS or CCD, hereinafter sometimes collectively referred to in this document simply as "CCD" pixels, in sufficient density to form a functional image. As will be described in more detail below, since card 100 has no analog optics (such as a traditional lens) and since further, it may be required to display detailed and at times secure images on the major sides, surfaces, or faces of card 100, the total amount of display and capture area can be a significant factor for proper functioning according to some embodiments. To provide a wider viewing angle it is possible to emulate an analog lens by varying the substrate supporting the light receiving pixels in order to position the pin hole apertures on the surface of a repeating convex or concave substrate pattern for example, as one would view a golf ball surface or the complex lens of an eye of an insect, such as a dragon fly.

As can be seen, the imaging and display capabilities of card 100 can leverage or use the "invisible" or buried (hidden) magnetic layers, which can be controlled to behave as stripes as found on a legacy credit card. When the multiple sensing elements or sensing element species (e.g., a CCD or light detecting layer and a magnetic-in or read layer) detect a shape or pattern, and modules and processing software located in the modules match the information received by various layers, such as the CCD (visual input) layer and the magnetic-in (magnetic read) layer, card 100 provides a significant improvement in data transmission. Card 100 provides this significant improvement by collating a plurality of sensor inputs or multiple sensor inputs in a pixel stack A pixel stack is a plurality of pixel elements overlapping in a direction perpendicular to a substrate (z direction), wherein the plurality of pixel elements includes at least one pixel element having an output or transmission function, and at least one pixel element having an input or receiving function; i.e., pixel elements of different species. The pixel stack is positioned on the substrate, e.g., see FIGS. 9A-9E, in a location having x and y coordinates. A pixel layer contains pixel elements, each of which may be part of a pixel stack, arrayed across a plane in x and y directions. The pixel layer plane is spaced a distance from a substrate plane extending through the substrate. The substrate plane is positioned at a core or center of card 100, such as a substrate 170 shown in FIG. 7B. In an exemplary embodiment, all the pixel elements in a pixel layer may provide the same function, or in another embodiment, they may provide different functions. The pixel stacks are functional portions of adjacent layers overlapping in a transverse direction to the substrate plane, or the z axis, but each pixel stack can be described as an individual unit for clarity of explanation. Each pixel element of a pixel stack can function individually. Operation of each pixel layer can be across the entire pixel layer or in a portion of the pixel layer. An advantage of positioning the pixel elements in a stack configuration includes the reduction of communications and power connections in terms of quantity, length, and material consumption, which reduces costs, i.e., manufacturing costs and material costs.

In the exemplary embodiments described herein, pixel layers that are "adjacent" each other may directly contact each other; i.e., each layer may physically contact each other.

As described herein, a pixel stack appears at the same longitudinal and transverse, or "x" and "y" location when viewing card 100 in a plan view (see FIG. 3B). Such collation of inputs may be performed either simultaneously or separately by timing or clocking of the various inputs. For example, card 100 may receive optical data that correlates to specific magnetic data, so that card 100 is capable of receiving complementary data from each sensor source (e.g., the light detecting layer and the magnetic-in or read layer). In one exemplary embodiment, the multiple sensor inputs may serve as a type of electronic watermark that enables card 100 to recognize the legitimacy of the source data. In yet another exemplary embodiment, one sensor source may provide information regarding how to interpret data from a second sensor source. For example, optical data received by the light detecting layer may provide decoding information for the magnetic-in layer. If the data received by both layers is not properly complementary or properly decoded, then card 100 can recognize a spoof or attempted scam and prevent any further actions. Card 100 may also be capable of independently communicating via wireless or wired communication that an attempt was made to spoof, scam, or hack card 100, enabling a financial entity or other responsible entity or individual to shut down card 100 remotely. In addition to the enhanced security provided by the multiple sensor or input layers in card 100, output elements, such as magnetic-out and display, can be managed according to what sensors detect, as explained in greater detail below. In an exemplary embodiment, when ambient conditions require additional illumination, the LEDs can emit light, which can include infra-red or ultraviolet, and the CCD can detect it. The CCD can also judge day from night and adjust emission of light emitting pixel elements 107 (e.g., FIGS. 4A-4D) to provide for additional light in view of lighting conditions. In order to provide light for detection by a plurality of light receiving/detecting pixel elements 148, light emitting pixel elements 107 can be clocked to provide some overlap with the operation of light receiving/detecting pixel elements 148. First light detection unit 126, second light detection unit 128, video encoder 130, or processor 110, or another processor can monitor the saturation levels of light detecting pixel elements 148 and provide this information to processor 110 or video decoder 120 to dynamically and automatically adjust the time of operation and/or the output intensity of light emitting pixel elements 107 to prevent or reduce oversaturation or blooming of light detecting pixel elements 148.

Each of first magnetic-in unit 132 and second magnetic-in unit 133 can detect a magnetic field local, proximate, near, or adjacent to the corresponding major side or face of card 100. Magnetic-in detection can be provided with micro-miniature layer deposit techniques. For example, a stressed material, e.g., doped silica or doped quartz, adjacent to a non-stressed material, e.g., lead zirconate titanate, laid out in an array, where the stressed material will change its electrical value when the non-stressed material is subjected to a magnetic field. In another example, magnetically sensitive piezoelectric crystals, which permit significant transmission of light therethrough, and which vary resistance or current in response to a magnetic field, can be etched or deposited on the surface of card 100 in an array. The varying resistance or current generates a signal that can be processed, e.g., digitally, to provide specific information about the magnetic field received, including any data embedded in the magnetic field.

Each of first magnetic-out unit 134 and second magnetic-out unit 135 can be configured as arrays of magnetic-out pixels distributed over one or more major surfaces of card 100 that can be controlled to generate localized fields to transfer data, for example, between a card 100 major surface and magnetic sensors of a tether I/O device or another user device. "Major surfaces" herein are the outermost substantially planar surfaces of card 100 that face in opposite, or opposed directions. Because of the relatively thin nature of card 100, the terms side and surface can be used synonymously, except as otherwise noted, with side, surface and face representing areas where the various sensor layers and pixels stacks are arrayed. In an embodiment described later in detail, first magnetic-out unit 134 and/or second magnetic-out unit 135 can be controlled such that they create a magnetic pattern similar to the magnetic stripe of a card without being constrained to any specific position on a major surface of card 100. Accordingly, first magnetic-out unit 134 or second magnetic-out unit 135 can be used to create magnetic data readable by legacy and future card readers. This feature is described in more detail hereinbelow.

Because the arrays of pixels of first magnetic-out unit 134 and second magnetic-out unit 135 can occupy an area coinciding in plan view with at least substantially an entire major surface of card 100, stripe positions can be pre-programmed or created as needed based on sensed activity. For example, a magnetic stripe can be increased to extend across substantially the entire major surface of card 100, front and back, and still remain invisible on the surface since the layer on which the magnetic elements are positioned is under other layers that are unaffected by the generated magnetic fields. If legacy equipment is used, such as a legacy magnetic strip reader, card 100 can adapt and communicate stripe data, which can be auto-located at any position and orientation on less than a substantial portion of a surface or side of card 100 that enables reading by a magnetic read head of the reader. For example, a stripe could be positioned along one side of card 100, in a manner that is similar to or mimics a conventional credit or debit card. The reader can be a legacy POS card reader or another card 100 functioning as a POS system. In an embodiment, a card-to-card POS system can communicate magnetic stripe data based on handshake of the display-to-display according to a pattern established by the first display handshake for the fixed in place point of sale system. Hence, anyone carrying card 100 can use it as a portable POS system.

In the context of this disclosure, the term handshake describes recognizing the proximity of device or card 100, determining that device or card 100 is functional and transmitting data, and authorizing the reception of the data and, if appropriate, the transmission of data. The handshake function may extend to communication with near field communication (NFC) devices, such as RFID and magnetic data emitters, communication with Wi-Fi, communication by way of properly coded or encoded aural or sound emissions, optical communication at both visible and invisible wavelengths, quantum entangled devices (QED's), and through other systems to establish a communication link, and combinations of two or more systems and methods. In an exemplary embodiment, handshake between card 100 and another, separate card 100 or another device or system may initially require a data inquiry from separate card 100 or another device or system. Card 100 then advises the user that the inquiry has been received. The user may then speak to card 100, providing a specific phrase or code word that tells card 100 the nature of the handshake and communication link, providing limits to the link, such as the types of data permissible to be transmitted from card 100 to another card 100 or another device or system.

Card 100 can include a sound/voice/haptic codec 136 configured to receive a sound or voice signal from either first micro-speaker pixel array 138 or second micro-speaker array 140 (e.g., piezoelectric arrays), encode the signal, and provide the encoded voice/sound signal to processor 110 via bus 108. Sound/voice/haptic codec 136 receives coded sound, voice, or haptic data from processor 110 via bus 108, decodes the data, and generates a signal to micro-speaker pixel array 138 or micro-speaker pixel array 140. Hence, micro-speaker pixel arrays 138, 140 can provide, at least to some minimal extent, functions of a microphone, a speaker, or haptic feedback device.

Authentication unit 142 of card 100 gathers identification information about card 100 and the user, which in an embodiment can be transmitted to a card/user authentication unit 230 of server 200, described in more detail hereinbelow, for authentication of card 100 and/or the card user. In another embodiment, card 100 can store biometric data for login authentication to the extent permissible by a security scheme, card processing power, and/or card memory capacity. As will be described later in detail, plural physical characteristics such as fingerprints, capillary patterns, pulse and micro-pulse patterns, voice prints, retinal or iris prints, etc. can be used for identification purposes, for example, at login or during a transaction. Also, an account number, expiration date, PIN number, password and other card information and indicia can be transmitted in encrypted form from authentication unit 142 of card 100 to card/user authentication unit 230 of server 200 for authenticating card 100.

Location unit 144 is a location determining unit, such as a global positioning system (GPS) receiver. Location unit 144 may be positioned in substrate 170 of card 100, on substrate 170 between substrate 170 and a light detecting pixel layer or light detecting layer 186a or 186b, or in other locations where location unit 144 will permit operation of the other portions of card 100. Location information determined by location unit 144 is transmitted to server 200, where it can be utilized by one or more system applications, such as a value analyzing unit 232 and a tracking unit 236, which are described in detail later in this disclosure. Alternatively, location of card 100 can be derived in other ways, such as by using multilateration of radio signals, such as those received from cellular networks, manual entry by user, or through integration to other electronic devices that know their respective location and can share the location data.

Power supply 112 delivers power to system elements of card 100, for example the system elements shown in FIG. 2. Power supply 112 can supply power from any of a number of sources. For example, aside from known RFID powering mechanisms, there is a known method pioneered by Intel in which movable inductors pass wireless power to fixed inductors provided within card 100, power transfer via capacitive coupling, etc. Of course, card 100 can also be equipped with its own battery as a battery "layer," for example, a thin film or ultrathin film rechargeable lithium ion or lithium polymer battery will fit within the proposed form factor or any larger form factor along a central core of card 100, e.g., substrate 170.

Power supply 112 of card 100 can include a power management unit to manage, generate, and conserve power, although a power management unit can be included as a unit separate from and communicatively connected to power supply 112. For example, an embodiment can include a power saving mode in which the display operates in a power-saving monochrome only mode. An embodiment can include elements for determining whether to turn off one, both, or portions of first or second light emitting units 122, 124 (i.e., the dual display units). Indeed, while the major surfaces have the capability of emitting light, in many cases emitting light from both surfaces is unnecessary, and processor 110 includes the capability to identify when only a single surface needs to emit light, thus card 100 is adaptive with respect to the need to expend energize. For example, an embodiment of card 100 can include a tilt sensor, such as a microelectromechanical or MEM accelerometer, and/or recognition software that can identify features or level of luminance in an image sensed by the first and second light detection units 126, 128, and control power can be provided according to the detected orientation, recognized features, or detected luminance. For example, card 100 can include an application that auto-orients any display or runs an application in a specific orientation, using tilt and/or accelerometer data. Applications for orientation can also be sensitive to what processor 110 of card 100 determines it is recognizing from its light collecting input (e.g., light detection at a CCD of the light detection units 126 and/or 128).

In an embodiment, magnetic stripes are provided in card 100. In an embodiment, magnetic stripes are positioned between major surfaces of card 100, such that the magnetic stripes are "buried" and not visible on the major surfaces of card 100. One or more magnetic stripes positioned on card 100 can be programmed, for example, according to ISO/IEC 7811, ISO/IEC 7813, and ISO/IEC 4909 standards or otherwise described herein, to include information such as account information, identifying information (e.g., driver's license, credit card, identification card, secure access card), monetary value (e.g., fare cards, gift cards, virtual money), etc. that can be read/written by card readers/programmers. The magnetic stripes can be generated in four positions (see FIGS. 3B and 5) to allow haphazard insertion of card 100 into a swipe or slot type reader in any card orientation relative to the reader (e.g., the slot of a reader), and getting a single action to "take" every time regardless of the orientation of card 100 while swiping or insertion into the reader. Card 100 can be backwards compatible to the older technology of magnetic swipe such that anything "magnetic swipe" or slot insertion type is instantly compatible. Behind the magnetic stripe material can be micro-miniaturized magnetic write heads which will erase and re-write the data found on the stripe under the control of system 1.

In the exemplary embodiment of FIG. 2, card 100 includes a plurality of processors, such as processor or controller 110, video encoder 120, video encoder 130, and codec 130. However, the arrangement of processors may be different from the description herein in that all processors may be combined into a single processor or controller performing the functions of processor 110 and the other processors of card 100, or card 100 may include additional processors or controllers, depending on the speed needed to perform various functions, the cost of processors or controllers, etc.

The configuration of card 100 as described herein provides a compact, relatively thin, flat multifunction computer that includes at least one sensor input, at least one emitter or transmitter, and a display function. The compact nature of card 100 and the ability to form layers of pixel elements permits card 100 to be a relatively inexpensive, lightweight alternative to other electronic devices.

FIGS. 3A to 3C are diagrams of an exemplary embodiment of card 100. FIG. 3A is a perspective view, FIG. 3B is a plan view, and FIG. 3c is a side view of card 100. As shown in FIGS. 3A-3C, card 100 includes a first major side, face, or surface 101, a second major side, face, surface 102, a first physical port 103a, a second physical port 103b, and plural magnetic stripes 104.

FIG. 3A is a perspective view of card 100, which shows first major surface 101, second major surface 102, and a side, or edge surface 105 that extends from first major side, face or surface 101 to second side, face, or surface 102, and which includes physical ports 103a and 103b. First major surface 101 includes or covers an intermixed array 106a and second major surface 102 includes or covers an intermixed array 106b. An intermixed array includes at least two different array units, including but not limited to a light emitting unit, light detection unit, magnetic-in unit, magnetic-out unit, and micro-speaker array. Intermixed arrays may be configured as planar arrays, or as stacked or vertically-extending arrays. Each array unit includes plural independently controlled pixels.

In the FIG. 3B plan view, each magnetic stripe 104 is shown in phantom because they are positioned below the outer obverse and reverse (major) surfaces of card 100 (i.e., first and second major surfaces 101, 102), and thus are "invisible." The magnetic stripes 104 are programmable strip regions shown as separate strips, but in another embodiment the magnetic layer could extend over a greater or smaller amount within an area defined by the periphery of the major surfaces 101, 102 of card 100 in the plan view, in which case the strip regions are virtual regions that can be programmed and deprogrammed, as needed, when needed. In addition to being able to program magnetic-out pixels to emulate a magnetic stripe 104, the magnetic-out pixels may be operated to provide directionality to magnetic-out data, increasing the adaptability of card 100 to interface with magnetic readers.

FIG. 3C is a side view of an exemplary card 100 including first physical port 103a and second physical port 103b. In an embodiment, physical port 103a and physical port 103b have different configurations from each other, for example, an IEEE 1394 interface, a USB (universal serial bus) port, or another interface type physical port. Physical ports can be excluded to the greatest extent possible, or entirely in some embodiments in the interest of improved weatherability, better conformity to the credit card form factor, and resistance to dirt, liquid water, or water vapor that may cause degradation of the internal components of card 100.

Figure 4D:
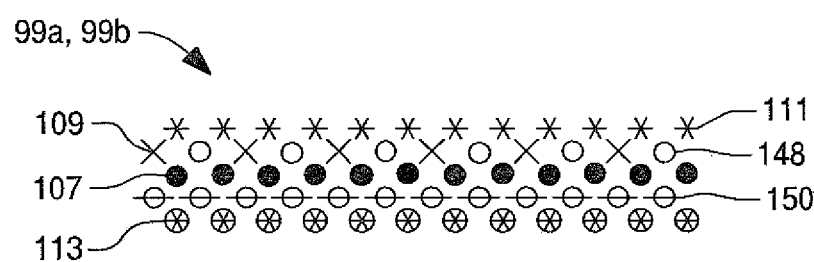

FIGS. 4A to 4D are figures showing plan views of pixel elements that can be used in intermixed arrays of card 100. FIG. 4A shows an exemplary arrangement of arrayed light emitting pixels 107, or display pixels of the first and second light emitting units 122, 124. FIG. 4B shows an exemplary arrangement of arrayed light detecting elements or pixels (e.g., a CCD MOS diode) of first and second light detection units 126 128. FIGS. 4C and 4D show portions of an intermixed planar array 99a and an intermixed planar array 99b that, in an exemplary embodiment, are provided on a substrate, such as substrate 170 shown in FIG. 5. FIG. 4C is a diagram of a portion a portion of a major surface 101, 102 of card 100 showing an exemplary embodiment of intermixed planar arrays 99a, 99b including both light emitting elements 107 and light detecting elements 148 arrayed on the depicted portion. FIG. 4D shows exemplary intermixed arrays 99a, 99b including additional types of array (pixel) elements including but not limited to a plurality of magnetic-out pixels 109, magnetic-in pixels 150, piezoelectric-in pixels 111, and piezoelectric-out pixels 113. Each of the additional pixel elements are arrayed along each side of substrate 170 along with light emitting pixel elements 107 and light detecting pixel elements 148. It is to be understood that the intermixed arrangement depicted in FIG. 4D is exemplary and that different types of arrayed pixel elements, more types of arrayed pixel elements, or less types of arrayed pixel elements may be provided having densities different from those depicted and different from one another. It is to be understood that each light emitting pixel element 107 can include more than one component, such as plural light emitters for color light emission (e.g., using green, blue and red sub-pixels, but also operable in a monochromatic mode) and the different types of pixels of the intermixed array can be arranged having densities that are the same or different from one another.

Figure 5:
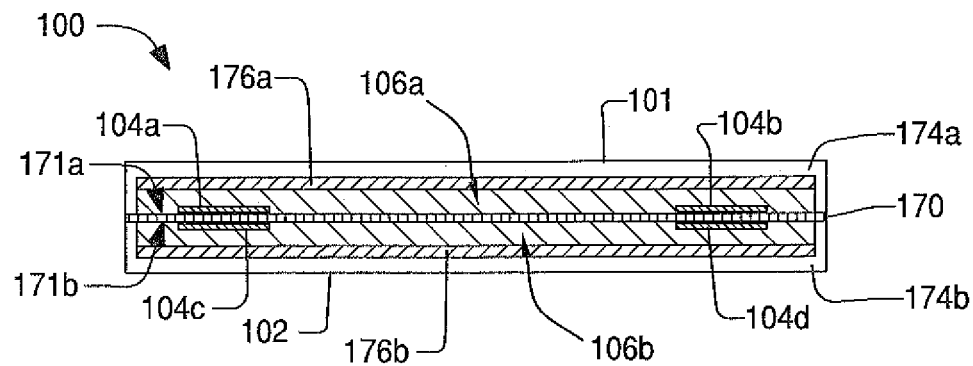
FIG. 5 is a cross section of the card shown in FIG. 3B taken along the lines 5-5.

FIG. 5 is a cross sectional view diagram taken across lines 5-5 of FIG. 3B and shows details of an embodiment of card 100. As shown in FIG. 5, card 100 includes a substrate 170, which includes electronic elements of card 100. The above-described intermixed arrays are positioned or stacked on a first major surface 171a and a second major surface 171b of substrate 170 in first and second stacking directions, which respectively run in directions normal to surfaces 171a and 171b, i.e., in the vertical directions in FIG. 5. First intermixed array 106a is provided adjacent to first major surface 171a in the first stacking direction; second intermixed array 106b is provided adjacent to second major surface 171b in the second stacking direction opposite to the first stacking direction.

A first cover structure 174a and a second structure 174b are provided so as to cover and seal against respective major surfaces 171a and 171b to provide a water-free and dust-free environment for first and second intermixed array portions 106a and 106b. First cover structure 174a and second cover structure 174b also set, establish, provide, or position a distance, space, or gap of the closest possible object to first and second intermixed arrays 106a and 106b, that being the thickness of either first cover structure 174a or second cover structure 174b and the distance from an interior of either first cover structure 174a or second cover structure 174b to the outermost layers of first intermixed array 106a or second intermixed array 106b, respectively. In an exemplary embodiment, the thickness of first cover structure 174a and second cover structure 174b is approximately identical. Additionally, in an exemplary embodiment a small gap 178 is provided between the interior surfaces of first cover structure 174a and second cover structure 174b and intermixed arrays 106a and 106b, respectively, to permit light emitted from light emitting pixel elements 107 to be reflected from objects external to first cover structure 174a and second cover structure 174b to be received by light detecting pixel elements 148. For example, card 100 is capable of detecting fingerprints by way of one or more sensor elements, e.g., light detecting pixel elements 148. Fingerprints can be detected at a distance from first cover structure 174a or second cover structure 174b, or directly on first cover structure 174a or second cover structure 174b.

In the embodiment depicted in FIG. 5, cover structures 174a and 174b are each a bezel-less molded single film covering and sealing the respective first and second intermixed array portions 106a, 106b, although in an exemplary embodiment a card cover structure such as cover structures 174a and 174b can be a bezel type covering structure and can include additional supporting elements, for example, at edges of card 100, and may include alignment/supporting structures to assist in aligning and supporting cover structures. Cover structures 174a, 174b include transparent portions allowing transmission of light from light emitting elements of the first and second light emitting units 122, 124, and transmission of light from outside card 100 to light detecting elements of the first and second light detecting units 126, 128. Cover structures 174a and 174b may also include a conductive portion that may be formed by, for example, embedding conductive materials in one or both of cover structures 174a and 174b. These conductive portions provide an electrical connection from an exterior portion of cover structures 174a and/or 174b to an interior portion of cover structures 174a and/or 174b. These electrical connections may be for a charging connection, such as from a dock or charging device, for a data connection, or for other purposes. By providing an embedded connection, either in the form of a metal portion with a minimal portion exposed to an exterior of cover structure 174a or 174b, and providing a connection to internal wires, components, or layers of card 100, corrosion can be minimized or eliminated, depending on the type of material used for the conductive portion(s).

In the embodiment shown in FIG. 5, magnetic stripes 104a, 104b are provided inside cover structure 174a, preferably on or near major surface 171a of substrate 170; and magnetic stripes 104c, 104d are provided inside cover structure 174b, preferably on or near major surface of substrate 171b. In another embodiment, no magnetic stripes in the form of a film are provided because the function of one or more magnetic strips can be performed using magnetic pixels of first and second magnetic-out units 134 and 135 that can be programmed to produce any field associated with any type card. Another embodiment can include both one or more magnetic-out units and a magnetic stripe for a level of redundancy.

Figure 6:
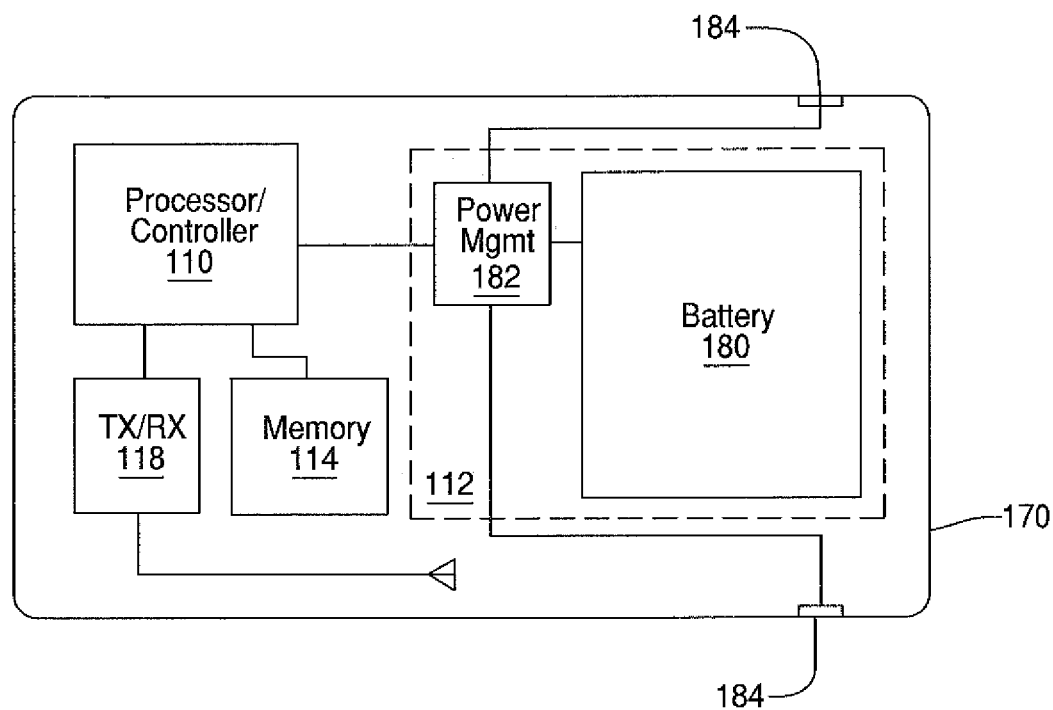
FIG. 6 is a schematic diagram of a substrate of the card shown in FIG. 5 according to an exemplary embodiment of the present disclosure.

FIG. 6 is a schematic diagram of an embodiment of substrate 170, which includes plural electronic devices used to operate card 100 and can serve to provide strength and an acceptable amount of stiffness to card 100. In an embodiment, substrate 170 includes processor 110; power supply 112 including a battery 180, such as a thin/ultrathin film lithium ion or lithium polymer battery, and a power management device 182; memory 114; communication unit 118; antenna; and other devices such as a tilt sensor, an accelerometer (not shown), and/or other electronic elements. While not shown in FIG. 6, substrate 170 can include at least one serial interface or physical port (see FIGS. 3A and 3C) (e.g., USB, IEEE 1394 etc.), although embodiments of card 100 may forgo inclusion of any physical ports. The electronic devices included with substrate 170 can be embedded in substrate 170, included in recessed areas, or surface mounted on substrate 170. Substrate 170 can include wire traces, multi-layered wiring, and through holes to interconnect electronic devices with substrate 170 and adjacent first and second intermixed array portions 106*a*, 106*b*.

FIG. 6 shows a pair of charge receiving contacts or charging electrodes 184 for charging battery 180 of card 100. Charge receiving contacts 184 can be included as in typical smartcard contacts conforming to ISO standards, but are preferably positioned along card 100 sides to not interrupt display area, and can also be used to transfer data to and from the device, although charging contacts 184 can be arranged in another manner, for example, somewhere else at the periphery of card 100. Power management device 182 receives voltage/current applied to charge receiving contacts 184 and controls the charging function for battery 180 and/or conditioning of the power signal used to operate card 100. For example, card 100 can be placed into a charging stand (not shown) including a pair of charge transmission electrodes such that each receiving electrode contacts a respective charging electrode to charge the battery. Alternatively, card 100 can include a "contactless" type battery charging subsystem including a coil or capacitive charging plate such that card 100 can be placed on a charging surface including a complementary charging coil or capacitor electrode.

FIGS. 7A and 7B show more details of card 100 in accordance with an exemplary embodiment of the present disclosure, where FIG. 7A shows a plan view of a portion of first major surface 101 and FIG. 7B shows a sectional view taken along lines 7B-7B of FIG. 7A. As shown in FIG. 7B, card 100 includes substantially identical intermixed arrays 106*a* and 106*b* provided in respective multilayer stacks S1 and S2 on opposite faces or sides of substrate 170. In an embodiment, each multilayer stack S1 and S2 includes plural layered arrays. Multilayer stack S1 includes, starting from the layer closest to substrate 170 and extending "vertically" away from substrate 170 in the "z" direction, light detecting layer 186*a*, a magnetic-out pixel layer or magnetic-out layer 190*a*, a magnetic-in pixel layer or magnetic-in layer 192*a*, a piezoelectric-in pixel layer or a piezoelectric-in layer 194*a*, a piezoelectric-out pixel layer or a piezoelectric-out layer 196*a*, and a light emitting pixel layer or a light emitting layer 198*a*. Light emitting layer 198 may include a plurality of LED's 193 as a light source. Multilayer stack S2 includes, starting from the layer closest to substrate 170, light detecting layer 186*b*, a magnetic-out layer 190*b*, a magnetic-in layer 192*b*, a piezoelectric-in layer 194*b*, a piezoelectric-out layer 196*b*, and a light emitting layer 198*b*. It is to be understood that the substrate 170 and various layers of stacks S1 and S2 are not drawn to scale for the sake of explaining the layered structure.

Light detecting layer 186*a* of multilayer stack S1 includes an array of light receiving/detecting pixels of light sensitive material and is part of the first light detecting unit 126 described hereinabove. Light detecting layer 186*b* of multilayer stack S2 includes arrayed light receiving/detecting pixels of light sensitive material and is part of the second light detecting unit 128 described hereinabove. In an embodiment, the first and second light detecting layers 186*a* and 186*b* are CCDs, although another light array technology such as CMOS (complementary metal oxide semiconductor) chips, photodiode array (PDA) etc. can be used as a light detecting layer. Light receiving/detecting pixels 148 are arrayed on the surfaces of light detecting layer 186*a*, 186*b* facing away from substrate 170 in correspondence with a plurality of respective pinhole or light transmitting passages 187*a* and 187*b*.

With reference to FIGS. 7A and 7B, each light transmitting passage 187*a* extends between a light receiving/detecting pixel 148 of the light detecting layer 186*a* and a hole or pinhole opening 188*a* in the upper surface of the multilayer stack. Each light transmitting passage 187*a* and 187*b* extends from an exterior surface of the pixel stack to light detecting layer 186*a* and 186*b*, respectively. In the exemplary embodiment of FIG. 7B, each light transmitting passage 187*a* extends from an exterior surface 191*a* into the plurality of pixel layers to terminate at light detecting layer 186*a*. Each pinhole opening 188*a* and each associated light transmitting passage 187*a* are positioned at "intersections" or corners of pixel stacks, as shown in FIG. 7A. Thus, each light transmitting passage 187*a* is positioned at a periphery of one or more pixel stacks, rather than extending through a pixel stack. This arrangement is similar for pinhole opening 188*b* and light transmitting passage 187*b*. Because of the position, arrangement, and orientation of light transmitting passages 187*a* and 187*b*, in the exemplary embodiment of FIG. 7B, light transmitting passages 187*a* are formed in, and extend through, light emitting layer 198*a*, piezoelectric-out layer 196*a*, piezoelectric-in layer 194*a*, magnetic-in layer 192*a*, and magnetic-out layer 190*a*, extending from an exterior of first intermixed array 106*a* to terminate or end at a position that is adjacent, on, or next to light detecting layer 186*a*. Thus, pinhole passages 187*a* and 187*b* extend a spaced distance or depth from exterior surface 191*a* through at least one pixel layer to light detecting layer 186*a*. Pinhole 188*b* and pinhole passage 187*b* are similarly formed on the second side 102 of card 100.

In operation, light incident on surface 101 of transparent first cover structure 174*a* transmits through first cover structure 174*a* to each hole 188*a*, which serves as pinhole type orifice allowing the light to enter light transmitting passages 187*a*, and the transmitted light travels in a direction of arrows 189*a* to light receiving/detecting pixel 148 of light detecting layer 186*a*. Similarly, light incident on surface 102 of transparent second cover structure 174*b* transmits through second cover structure 174*b* to each hole 188*b*, which serves as pinhole type orifice that allows the light to enter light transmitting passages 187*b*, and the transmitted light travels in a direction of arrows 189*b* to light receiving/detecting pixels 148 of light detecting layer 186*b*. For each pixel 148 of first light detection layer 186*a* and second light detection layer 186*b*, no material is provided in holes 188*a*, 188*b* and corresponding light transmitting passages 187*a*, 187*b*, although other transmission media between first cover structure 174a and first light detection layer 186a and between second cover structure 174b and second light detection layer 186b can be used.

It should be apparent from the foregoing discussion that the exemplary embodiment of FIG. 7B that the various pixel layers, and consequently the various pixels of the pixel layers, are positioned or located to provide the benefit of unimpeded operation. Light emitting pixel layers 198a and 198b are the outermost layers, and light detecting pixel layers 186a and 186b are the deepest or innermost pixel layers and are thus spaced a transverse distance from light emitting pixel layers 198a and 198b, respectively, meaning that light emitting pixel layers 198a and 198b are positioned further from a plane extending through substrate 170 than are light detecting pixel layers 186a and 186b. In the exemplary embodiment of FIG. 7B, a plurality of additional pixel layers is positioned between light emitting pixel layers 198a and 198b and light detecting pixel layers 186a and 186b. For example, magnetic-out pixel layer 190a, magnetic-in pixel layer 192a, piezoelectric-in pixel layer 194a, and piezoelectric-out pixel layer 196a are positioned between light detecting pixel layer 186a and light emitting pixel layer 198a. Furthermore, in the exemplary embodiment of FIG. 7B, piezoelectric-out pixel layer 196a is positioned between piezoelectric-in pixel layer 194a and light emitting layer 198a, and magnetic-in pixel layer 192a is positioned between magnetic-out pixel layer 190a and light emitting pixel layer 198a. Additionally, piezoelectric-in pixel layer 194a and piezoelectric-out pixel layer 196a are positioned between magnetic-out pixel layer 190a and light emitting layer 198a.

The light incident upon each light receiving/detecting pixel 148 is converted to an electrical value by light receiving/detecting pixel 148, representing a gray scale value, i.e., a monochrome input, a color value, e.g., red, green, or blue, or an infrared or ultraviolet value. Processor 110 or other image processor positioned in card 100 reads each light receiving/detecting pixel 148 and assembles an image from the individual pixels. The image may then be processed to remove noise or through other analysis techniques to improve the clarity of the image or for other benefits, such as contrast improvement, color balance, etc. Card 100 may also restrict acquisition of optical data to a specific wavelength, depending on application and user-defined settings. Once the image has been processed, the image may be analyzed in processor 110 to evaluate the content of the image. For example, the image may present a fingerprint, a Kirlian image, a gesture, or a facial expression. In an exemplary embodiment, a user may move card 100 about an object so that card 100 may scan the object and process the received images to form a three dimensional representation of the object. In another exemplary embodiment, card 100 may be positioned in a lens or lens assembly to provide a larger field of view to holes 188a and/or 188b, enabling gathering of more visual information in a manner similar to digital cameras with one or more analog lenses.

Magnetic-out layer 190a and magnetic-out layer 190b respectively form parts of the first magnetic-in unit 132 and the second magnetic-in unit 133, and are magnetic field generators that include addressable pixel arrays that can be used to form magnetic fields in patterns, such as those found on a card magnetic stripe, or to form part of a magnetic transmitter that can communicate with a reading device, such as a card reader or another card. As described hereinabove, the pixels of the first magnetic-out unit 134 and second magnetic-out unit 135 can occupy or be arrayed over an area coinciding in plan view with at least substantially the entire respective major side, face, or surface 101 and 102, and can be programmable from which virtual stripes can be derived. Such programmability means that any portion of magnetic-out pixels 109 can be programmed, forming shapes other than stripes in any location available on card 100. For security, an embodiment allows for these virtual stripes to be programmed (activated) "just in time" when the user is present at a POS reader and deprogrammed and deactivated "just after use." In an embodiment, virtual stripes can be created based on gestural or other information associated with movement of card 100. For example, when swiping card 100 through a POS or other reader, the user can be holding card 100 in such a way that it is at an angle unreadable by the reader. Card 100 can learn and determine patterns associated with swiping and determine the orientation of card 100 when swiping is initiated. Card 100 can be configured to use preferences to match the magnetic stripe data to the virtual card displayed. For example, user can select a specific virtual card from among plural virtual cards for use and the magnetic data out is automatically matched with the account associated with the selected virtual card. Before advancing through the sensors of the reader, card 100 can create, "just in time," a stripe at a location across the portion of the surface of card 100 that is readable by the reader, and then deprogram the strip (or reposition to the standard location), "just after use." In this way, the reader will encounter less unsuccessful card swipes and the user less complications with card 100 use.

Card 100 may also include the ability to automatically increase power levels during a swipe to increase the assurance of magnetic data communication. For example, during a single swipe operation, which may be a static swipe or a dynamic swipe (i.e., a fixed location with data programmed just in time or moving card 100 through a reader), card 100 may provide a plurality of power levels for magnetic-out data provided by magnetic-out pixels 109. Such data may also be provided bi-directionally so that any orientation of card 100 may be used to interface with a magnetic reader. The value of having a plurality of magnetic-out power levels is to interface with legacy card readers having varying levels of sensitivity. Magnetic read heads vary in their ability to read magnetic data. Some read heads are relatively sensitive and others, particularly read heads that have been in long use, are relatively insensitive, and the varying power levels provide an improved opportunity to assure data transmission.

Magnetic-in layer 192a and magnetic-in layer 192b respectively form parts of the first magnetic-in unit 132 and the second magnetic-in unit 133, and include addressable pixel arrays that can be used to sense a magnetic field to which the corresponding card major surface 101, 102 is subjected to. Magnetic-in layer 192a and magnetic-in layer 192b can be formed from any suitable magnetic sensitive layer that can be formed as a thin film, such as a composite magnetostrictive and piezoelectric material exhibiting a magnetoelectric effect. Such materials include silicon or silicon dioxide crystals, including doped silicon crystals, and titanium dioxide crystals.

In the exemplary embodiment of FIG. 7B, various pixels, which may be referred to as pixel elements, are arranged and configured in a vertically extending pixel stack 98, which in the exemplary embodiment of FIG. 7B is directly overlapping, which means that the position of the pixel elements in pixel stack 98 are substantially coinciding in an x-direction and a y-direction in a plan view of pixel stack 98. In the exemplary embodiment of FIG. 7B, each pixel stack 98 includes, from the outermost or shallowest pixel element to the deepest or innermost pixel element, light emitting pixel element 107, piezoelectric-out pixel element 113, piezoelectric-in pixel element 111, magnetic-in pixel element 150, magnetic-out pixel element 109, and light detecting pixel element 148. Each pixel element is selectively and independently controllable, having at least an on or active state or mode and an off or inactive state or mode. Some pixel elements, such as piezoelectric-out pixel element 113, have a controllable intensity. Some pixel elements, such as light detecting pixel elements 148, may have a controllable sensitivity.

Piezoelectric-in layer 194a and piezoelectric-out layer 196a form parts of first micro-speaker pixel array 138, and piezoelectric-in layer 194b and piezoelectric-out layer 196b form parts of second micro-speaker pixel array 140. By using different materials for the microphone and speaker, the speaker and microphone can each be biased differently and operated in full duplex mode (simultaneously) using digital signal processing techniques such as echo and noise cancellation. Further, algorithms for the pixel arrays of piezoelectric-in layers 194a, 194b allow for virtual microphones that can steer individual lobes of the microphone's virtual polar patterns towards a particular source, for example, a source location identified via light receiving/detecting pixels 148 of light detecting layer 186a or 186b. In another embodiment, a single layer of piezoelectric material can form piezoelectric-in/out pixels 111/113, providing the function of the microphone and the speaker in half-duplex mode. In another embodiment, the pixels of piezoelectric-out layers 196a and 196b can provide haptic feedback to specific areas of card 100 in response to a corresponding manipulation of card 100 by the user or to otherwise alert the user to an event, communication, end of some processing etc.

In embodiments of card 100 having piezoelectric pixels or devices on one or both major surfaces of card 100, card 100 can act as a microphone and as a speaker throughout one or both surfaces of card 100. This specific capability can provide a variety of sound emission and collection applications, such as emulating a cell phone for purpose of calling or receiving a call, creating sound, collecting voice for use as a biometric element (such as logging with voice recognition), and sounding alerts or alarms. However, with the conformation of a card, the power and fidelity of the emissions and collection can be limited in its use to some extent due to power limitations and the flatness of the surface. Placement of two cards 100 in stable, close proximity can still use sound as one of the means of handshake and data passage. Due to the piezoelectric devices being disbursed as pixels 111 and 113, just as light emitting pixel elements 107 (e.g., LEDs) and light receiving/detection elements 148 (e.g., CCD elements) are distributed, the sound emitted and collected by piezoelectric-in pixels 111 and piezoelectric-out pixels 113 can include many sounds, emissions, and collections that can act as Trojan communications, safely guarding the one or few emissions and collections that provide real or actual communications. As used herein, "Trojan" means false and not used at the receiving end. This dynamic forms a data transfer method that, while relatively slow, can emulate a conventional audio modem function and can add a dynamic for communication between two cards 100, a plurality of cards 100, or one card 100 communicating with another machine equipped with card 100 or equipped with elements of card 100 as an integrated element of the machine. Further, as with light emitter pixels 107 (e.g., LED) and light receiving/detection pixels 148 (e.g., CCD elements), piezoelectric pixel elements 111 and 113 can be controlled as an array, such as a phase array allowing for directivity.

The pixels of piezoelectric-in layer 194a and piezoelectric-in layer 194b can also be configured to sense biometric data, such as pressure fluctuations indicative of a pulse (heart rate) from a finger touching a major surface of card 100.

Light emitting layer 198a and light emitting layer 198b respectively form parts of first light emitting unit 122 and second light emitting unit 124 and include independently addressable light emitting elements or pixels 107 (e.g., LED, OLED, LCD etc.). While not shown, first light emitting unit 122 and second light emitting unit 124 can include one or more controllers, image processors, and driver modules that process decoded video data from video decoder 120 and display the decoded and processed data on the first and/or second major sides, faces, or surfaces of card 100.

While not shown in FIGS. 7A and 7B, and in other embodiments described herein, each of the pixels of magnetic-out layer 190a, magnetic-out layer 190b, magnetic-in layer 192a, magnetic-in layer 192b, piezoelectric-in layer 194a, piezoelectric-in layer 194b, and piezoelectric-out layer 196a, piezoelectric-out layer 196b, light emitting layer 198a, and light emitting layer 198b includes electrode pairs, each electrode connected to row and column electrodes that can individually and/or independently, address or control a particular pixel and/or pixel species for sensing and/or emission. Such control can include a pixel address or position in the array of independent pixel elements, an on state, an off state, a sensitivity, an intensity or level of emission or output, time of operation, etc. Other individual pixel elements described herein, such as RFID antennas or receivers, are similarly addressable and controllable. The electrodes of pixel elements can be transparent, for example, indium tin oxide (ITO) or thin layers of metals such as silver, to allow light transmission therethrough. Additionally, while the figures do not show interlayer insulators, such layers would be present between layers of the stack where needed for electrical insulation and isolation, for example between adjacently stacked column/row lines in the stacks S1 and S2. Because the various pixel elements described herein are produced of materials that provide minimal attenuation of light and/or are sufficiently thin that they provide minimal attenuation of light, and therefore are substantially transparent, light emitting and/or detecting pixel elements may be positioned behind or below other pixel elements in the z-direction with minimal effect on performance. If light attenuation through a stack of pixel elements, which permit light to pass therethrough, is unacceptably high, a light emitting pixel and/or a light receiving pixel element may be moved or positioned higher in a pixel stack, i.e., further from the substrate in the z-direction transverse to a plane of the pixel layer. Alternatively, pinhole passages may provide a path for light to reach deeper pixel elements that are closer to the substrate.

FIGS. 7A and 7B illustrate one advantage of the stacking of pixel elements along a z-direction to form the pixel stack. The embodiments of the present disclosure provide the highest possible density of detecting and transmitting elements per unit surface area, much higher than previously known technology. In one embodiment disclosed herein, because each side or face of card 100 includes pixel stacks and pixel layers, fourteen functions, which include a plurality of technologies, exist in a single plan view location in card 100, i.e., a location defined by an x-position and a y-position, with seven functions per side; e.g., see FIG. 9D and FIG. 9E.

FIGS. 8A and 8B are diagrams of an embodiment of a card 100*a*. FIG. 8A shows a plan view of a portion of first major surface 101 and FIG. 8B shows a sectional view taken along 8B-8B of FIG. 8A. Differences between card 100*a* and card 100 shown include a plurality of light transmitting or pinhole passages 387*a* and 387*b*, provided by way of a plurality of respective perforations or holes 388*a* and 388*b* formed into an array in a first light emitting layer 398*a* and a second light emitting layer 398*b*. Light transmitting passages 387*a* and 387*b* have a length or depth that is greater than the length or depth of light transmitting passages 188*a* and 88*b* because of the position of first light emitting layer 398*a* and second light emitting layer 398*b* in a first intermixed array 390*a* and a second intermixed array 390*b*. Additionally, because a first light detecting layer 386*a* is formed at a level in a stack S2' closer to second cover structure 174*b* and on a side of a second light detection unit 386*b* facing a substrate 370, and second light detecting layer 386*b* is formed at a level in a stack S1' closer to the first cover structure 174*a* and on a side of second light detection unit 386*a* facing substrate 370, the density of light receiving/detecting pixels 148 on each face of substrate 370 is less than the embodiment of FIGS. 7A and 7B. Also, the positions or arrangements of holes 388*a* and 388*b* formed in light emitting layers 398*a* and 398*b*, respectively, are different from the hole positions/arrangements of light emitting layer 198*a* and light emitting layer 198*b* of card 100 shown in FIGS. 7A and 7B.

In operation, light incident on surface 101 of transparent first cover structure 174*a* transmits through first cover structure 174*a* to each hole 388*a*, which serves as a pinhole type orifice allowing the light to enter light transmitting passages 387*a*, and the transmitted light travels in a direction of arrows 389*a* to a light receiving/detecting pixel 148 of first light detecting layer 386*a*. Similarly, light incident on surface 102 of transparent second cover structure 174*b* transmits through second cover structure 174*b* to each hole 388*b*, which serves as a pinhole type orifice that allows the light to enter light transmitting passages 387*b*, and the transmitted light travels in a direction of arrows 389*b* to a light receiving/detecting pixel 148 of light detecting layer 386*b*. The interior of each light transmitting passage 387*a* and 387*b*, as well as light transmitting passage 187*a* and 187*b* and other light transmitting or pinhole passages described herein, may be coated with a suitable material to reduce or eliminate reflections from the walls of light transmitting passage 387*a* and 387*b*, which can lead to blurry imaging due to off-axis light incident on each hole, opening, or aperture 388*a* and 388*b*.

Light transmitting passages 387*a*, 387*b* through substrate 370 require distributing the elements of the plurality of electronic components and devices used to operate card 100*a* in a manner so as to accommodate the array of perforations or holes 388*a* and 388*b*. Some or all elements can be distributed between perforations 388*a* and 388*b* and/or the various electronic devices can be designed to include the passages. Light transmitting passages 387*a* and 387*b* enable a novel capability in the credit card form factor. Because perforations 388*a* and 388*b* are dense on first major surface 101 and second major surface 102, and because of the presence of light transmitting passages 387*a* and 387*b*, which effectively become pinhole passages, light detecting pixel elements 148 are able to be positioned behind other elements that are either partially or completely opaque, while providing imaging capability to card 100. In the embodiment of FIG. 7B, light detecting pixel elements 148, which form light detecting layer 186, are "behind" a stack of pixels formed at row and column intersections that are co-positioned to overlap or overlay each other in plan view. More specifically, the stack of overlapping and overlaid pixels, which may also be described as being at least partially transversely and longitudinally co-located, co-positioned, or superimposed in a plan view, can include light emitting pixel element 107 of light emitting layer 198*a* or 198*b*, piezoelectric-out pixel 113 of piezoelectric-out layer 196*a* or 196*b*, piezoelectric-in pixel 111 of piezoelectric-in layer 194*a* or 194*b*, magnetic-in pixel 150 of magnetic-in layer 192, and magnetic-out pixel 109 of magnetic-out layer 190*a* or 190*b*, in the order described, from the outermost or furthest layer from light detecting layer 186*a* or 186*b* to the innermost or closest layer to light detecting layer 186*a* or 186*b*.

While overlapping appears when in a direction that is perpendicular to first major surface 101 and second major surface 102, i.e., in a plan view to first major surface 101 and second major surface 102, each pixel need not completely cover a pixel "below" it, or a pixel that is further from substrate 170 than another pixel in the same column or stack need not completely cover a pixel that is closer to substrate 170. Furthermore, in an exemplary embodiment each pixel in an upper layer may be somewhat offset, staggered, or skewed from a pixel below or nearer to substrate 170 the pixel in the upper layer. Such offsets may be due to manufacturing accuracy, or to provide a more direct path from a particular pixel to either first cover structure 174*a* or second cover structure 174*b*. In an exemplary embodiment, a stack of adjacent pixels may appear as a pyramid when viewed from a side or edge of card 100, with each pixel outward from substrate 170 being smaller than a pixel closer to substrate 170. In another exemplary embodiment, each adjacent pixel is approximately the same size, and the stack of pixels appears to form a tower as the pixel stack extends outwardly from substrate 170. In yet another embodiment, each adjacent pixel in a stack or column increases in size with distance from substrate 170, appearing to have a slightly inverted pyramidal shape. In a further exemplary embodiment, the width and length of a pixel stack in the x-direction and the y-direction is defined by the largest pixel element in the pixel stack. It should be apparent that the pixel stack extends in a direction that is perpendicular to substrate 170, and thus the pixel stacks extend "vertically" away from substrate 170 to form a three-dimensional pixel array, with pixels forming rows and columns, i.e., a two dimensional pixel array when viewed in a plan view with respect to card 100, and pixel stacks 98 extend away from card 100.

In the exemplary embodiment of FIGS. 8A and 8B, various pixels and/or pixel elements are arranged and configured in a vertically extending pixel stack 378. In the exemplary embodiment of FIG. 8B, each pixel stack 378 includes, from the outermost or shallowest pixel element to the deepest or innermost pixel element, light emitting pixel element 107, light detecting pixel element 148 for the opposite surface, piezoelectric-out pixel element 113, piezoelectric-in pixel element 111, magnetic-in pixel element 150, magnetic-out pixel element 109, followed by substrate 370. The light detecting pixel element 148 for a pixel stack is located on the opposite side, face or surface of card 100*a* for any particular pixel stack 378. Using "a" and "b" for the various pixel elements of FIG. 8*b*, the configuration of pixel stacks 378 on opposite sides of substrate 378 are as follows:

Light Emitting Pixel Element 107*a*
Light Detecting Pixel Element 148*b*
Piezoelectric-Out Pixel Element 113*a*
Piezoelectric-In Pixel Element 111*a*
Magnetic-In Pixel Element 150*a*
Magnetic-Out Pixel element 109*a*
Substrate-Substrate-Substrate (370)
Magnetic-Out Pixel element 109*b*
Magnetic-Out Pixel element 109*b*
Piezoelectric-In Pixel Element 111*b*
Piezoelectric-Out Pixel Element 113*b*
Light Detecting Pixel Element 148*a*
Light Emitting Pixel Element 107*b*

Light transmitting or pinhole passages 387*a*, for example, then extends through each pixel element of a first pixel stack 378, through substrate 370, and then through a second pixel stack 378 positioned on the opposite side of substrate 370 from the first pixel stack 378. Thus, light transmitting or pinhole passages 387*a* and 387*b*, because they traverse or extend through more pixel elements or pixel layers as compared with the embodiment of FIG. 7B, provides improved collimation of light, and reduced blur or defocus because light transmitting passages 387*a* and 387*b* are much longer than light transmitting passages 87*a* and 87*b*. As described herein, each pixel element of pixel stack 378 is selectively and independently controllable, having at least an on or active state or mode and an off or inactive state or mode, and contains all controllability features of pixel stack 98.

It is to be understood that the ordering of the layers of each stack S1, S2, S1', and S2' can be different than what is depicted in FIGS. 7A to 8B. Further, embodiments according to the present disclosure may include more or less layers on each side of substrates 170, 370 than what is depicted, but at least include a light receiving/detecting layer and a light emitting layer on each side of substrate 170, 370. Furthermore, the light emitting and light receiving/detecting units can be positioned on a same layer or level in each stack S1, S2, S1', and S2', but in such an embodiment it is preferable to multiplex the light emitting and detection functions to reduce noise/interference among the light detecting elements. In an exemplary embodiment, light emitting pixel elements 107 are operated during a first time interval. During the first time interval, light detecting pixel elements 148 are turned off to prevent noise and interference from the light being emitted by light emitting pixel elements 107. As light emitting pixel elements 107 are turned off, light detecting pixel elements 148 may be operated to gather light without the interference of light emitting pixel elements 107. Such multiplexing, timing, or clocking of light emitting pixel elements 107 and light detecting pixel elements 148 reduces or prevents blooming or saturation of light detecting pixel elements 148. More generally, card 100 is designed to avoid crosstalk or interference between various pixel elements, both by physical position, described herein, and by multiplexing, clocking, or timing. For example, magnetic-out pixels 109 are timed to operate to avoid interference with magnetic-in pixels 150.

In some embodiments, the piezoelectric-in and piezoelectric-out layers benefit from being positioned "higher" in a pixel stack; i.e., further from the substrate and close to an exterior surface of the pixel stack, because piezoelectric elements receive and transmit movement, sound, and/or vibrations, making it easier for a user to detect the movement, sound, and vibrations as well as making it easier for the piezoelectric elements to receive the movement, sound, and vibrations. The deeper piezoelectric pixel elements are positioned in a pixel stack, the more signals traveling to and from the piezoelectric pixel elements are attenuated as the signals pass through intervening layers or pixel elements. Pinhole passages can alleviate some of the signal attenuation by providing a more direct path from an exterior of an intermixed array to piezoelectric elements that are deeper in a pixel stack than other pixel elements.

Magnetic-in and magnetic-out pixel elements are minimally affected by intervening pixel layers or pixel elements. Because such pixel elements have little or no effect on other pixel elements in the pixel stack, magnetic-related pixel elements can be positioned deeper in a pixel stack; i.e., magnetic-in and magnetic-out pixel elements can be positioned closer to the substrate than other pixel elements, if beneficial to the overall design of a pixel stack.

In yet another exemplary embodiment each light detecting pixel element 148 and each light emitting pixel element 107 may be operated as a single semiconductor junction that can both collect and emit light, depending on the voltage and polarity of the voltage applied to the semiconductor junction. Thus, in an exemplary embodiment both the light emitting layer and the light detecting layer may be the same layer. Of course, when the same semiconductor junction is operated in two different modes, the ability to provide light in a first, light emitting mode for detection in a second, light receiving mode is more challenging than when each layer is separately configured and operated.

The multiplexing, clocking, or timing of the operation of the various individual pixels of card 100 can be conducted in a way that permits mixed mode operation of the pixels. For example, in a data communication, card 100 via a module and/or a processor, such as processor 110, may initially operate light emitting pixel elements 107, followed by magnetic-out pixels 109, then light emitting pixel elements 107, followed by piezoelectric-out pixels 113. Of course, any combination of operations are possible, and if a receiving device "knows" a particular data sequence is associated with a particular user, via a password, biometric entry, voice recognition, or the like, then security of data transmission from card 100 to a receiver is enhanced with a reduced likelihood of interception.

Additionally, FIGS. 7A to 8B show exemplary diagrams indicating only the order of elements, not necessarily the sizing or shape and not intending to be limiting as to that which one of skill in laying out and designing, for example, in very, very, large scale integration (VVLSI), could permutate in accordance with the features and other descriptions of the present disclosure. Also, it is to be noted that use of the thickness of card 100 for development of depth for light collecting elements, allowing for pin hole lens effects limits light to that which approaches card 100 at a near perfect right angle, limiting detected light to light that is directly in front of the hole, and to light that is reflected from an object into the hole (possibly sourced to the LED output of card 100, providing self-illumination of an object).

FIGS. 9A-9E illustrate pixel stack arrangements or configurations in accordance with exemplary embodiments of the present disclosure.

Figure 9A:
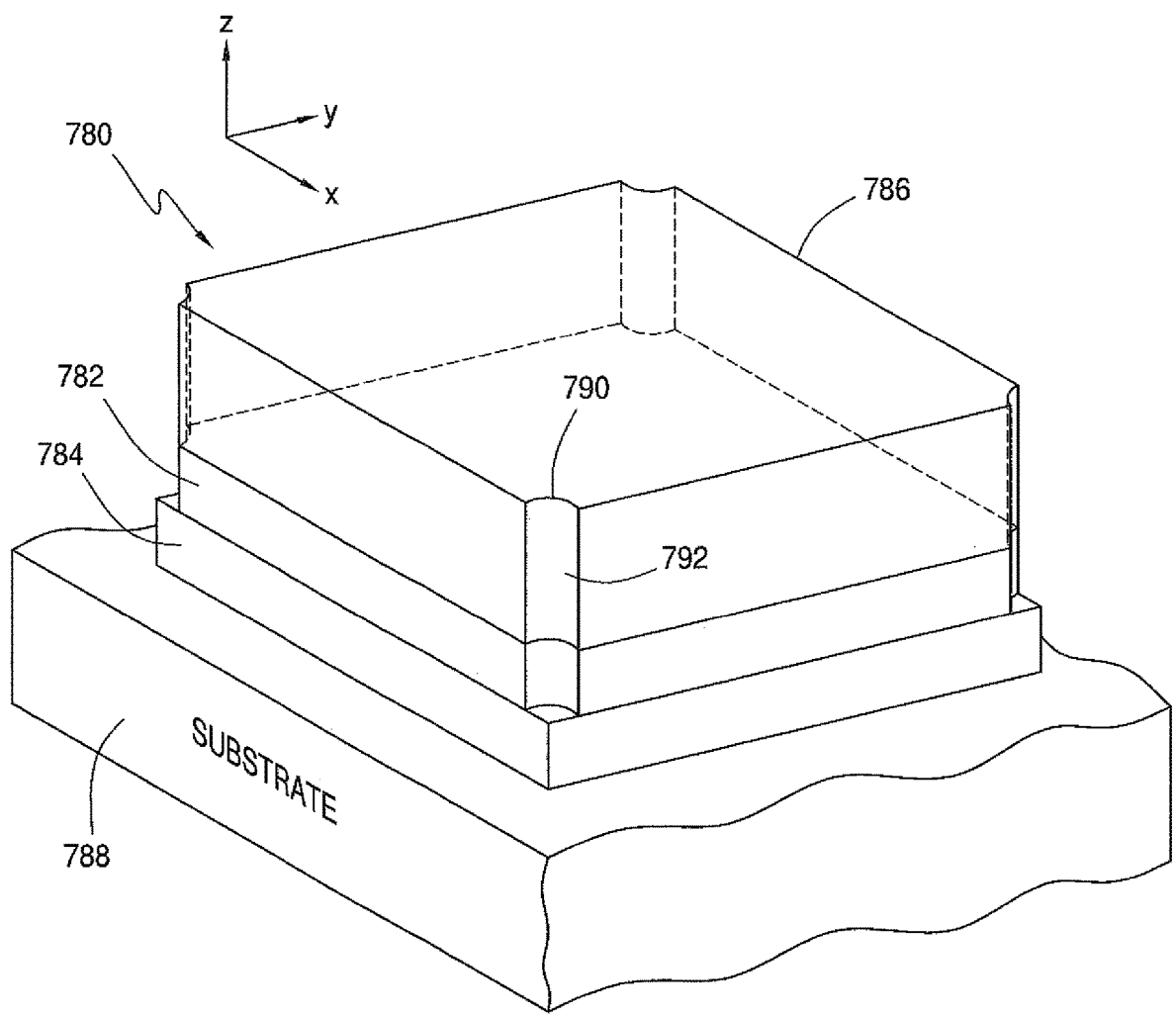
FIGS. 9A to 9E are diagrams illustrating perspective views of pixel stacks in accordance with exemplary embodiments of the present disclosure.

FIG. 9A illustrates a perspective view of a pixel stack 780 including an output or transmission pixel element 782 and an input or receiving pixel element 784 positioned on a substrate 788. A benefit to the pixel stack configuration is the ability to configure an output pixel element 782 in an overlapping configuration in a direction that is away from or perpendicular to substrate 788, providing emission and detection functions in a compact arrangement or configuration. Pixel stack 780 may be covered by a film or cover layer 786, and film or cover layer 786 may include a plurality of pinhole openings 790, each of which opens on a pinhole passage 792. In the embodiment of pixel stack 780 shown in FIG. 9A, each pinhole passage 792 is formed partially in film or cover layer 786 and partially in output or transmission pixel element 782, and extends in the z-direction. In another embodiment, pinhole openings 790 and associated pinhole passages 792, which are shown formed in a corner of pixel stack 780, may be positioned away from a periphery of pixel stack 780, and may be positioned at or near a center of pixel stack 780 when viewed in a plan view along the z-direction. In another embodiment, a single pinhole opening and passage may be positioned at or near the center of a pixel stack, as shown in, for example, FIGS. 9D. The advantage to this configuration is the ability to collimate received light through each pinhole passage 792, which improves the ability to create images from the light received by a plurality of pinhole passages 792.

Figure 9B:
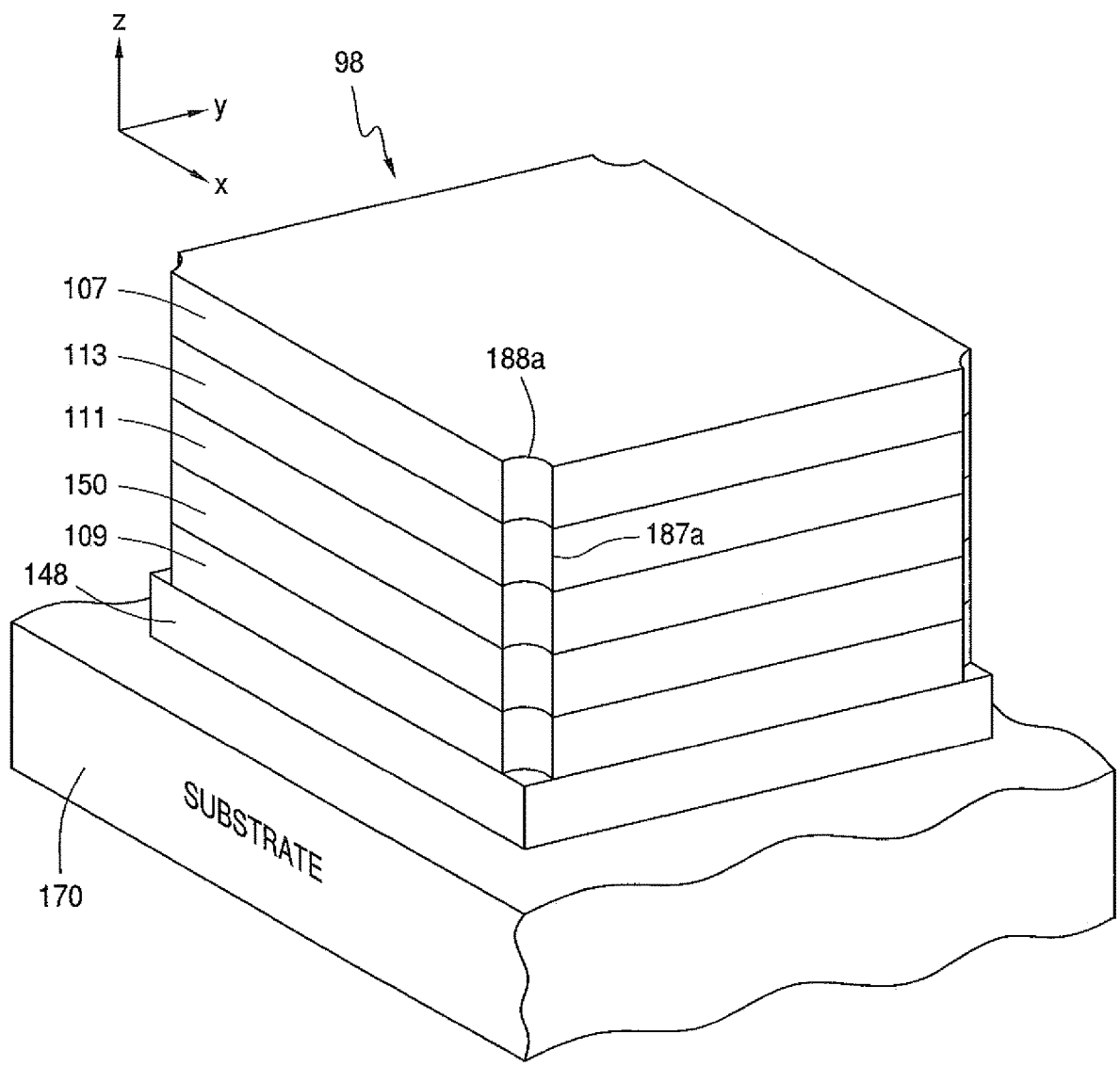

Additional pixel elements can be added to pixel stack 780 of FIG. 9A. For example, FIG. 9B illustrates a perspective view of pixel stack 98 of FIGS. 7A and 7B. As described herein, pixel stack 98 includes a plurality of pixel elements formed or positioned on substrate 170. Pixel elements can include light detecting pixel element 148 positioned adjacent to substrate 170. Positioned a spaced distance away from light detecting pixel element 148 is light emitting pixel element 107. Positioned between light detecting pixel element 148 and light emitting pixel element 107 are a plurality of pixel elements. In the exemplary embodiment of FIG. 7B, the plurality of pixel elements includes magnetic-out pixel element 109, magnetic-in pixel element 150, piezoelectric-in pixel element 111, and piezoelectric-out pixel element 113. In the exemplary embodiment of FIG. 7B, the plurality of pixel elements is positioned to create a stack that extends outwardly away from substrate 170, which is in a z-direction, in the order described. All the pixel elements in pixel stack 98 are in an overlapping arrangement in the z-direction. Pinhole opening 188a is formed in light emitting pixel element 197 in a corner of light emitting pixel element 107, and pinhole passage 187a is formed in a corner of magnetic-out pixel element 109, magnetic-in pixel element 150, piezoelectric-in pixel element 111, and piezoelectric-out pixel element 113, extending in the z-direction. Pinhole passage 188a provides a path for light to reach light detecting pixel element 148 without traversing outer pixel elements of pixel stack 98. In an exemplary embodiment, a light-blocking layer (not shown) may be positioned between an outer surface of light emitting pixel element 107 and an upper surface of light detecting pixel element 148 to limit light received by light detecting pixel element to light that travels through pinhole opening 188a and pinhole passage 187a, which improves collimation of light and provides an improvement in an image created from a plurality of light detecting pixel elements 148. In an alternative embodiment, an intervening pixel layer may be configured to block light instead of having a separate layer block light. In an exemplary embodiment, pinhole passage 187a may be coated with a material that reduces reflection to decrease off-axis light rays from reaching light detecting pixel element 148.

Figure 9C:
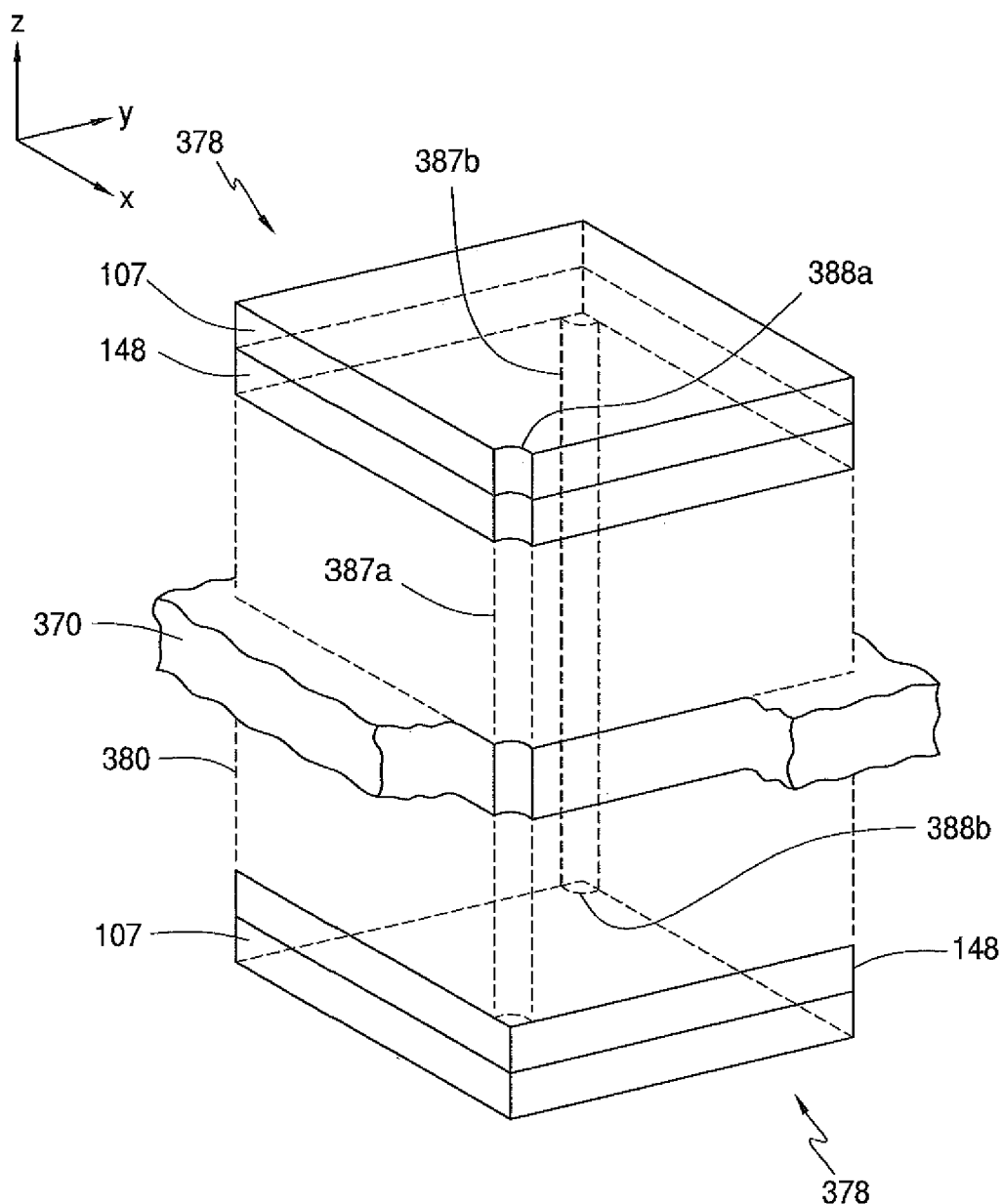

FIG. 9C illustrates a perspective view of pixel stack 378 of FIGS. 8A and 8B. As described herein, pixel stack 378 includes a plurality of pixel elements formed or positioned on substrate 370 in an overlapping arrangement or configuration that extends in the z-direction. Pixel elements include light emitting pixel element 107 positioned a spaced distance from substrate 370, and light detecting pixel element 148 positioned between light emitting pixel element 107 and substrate 370, also a spaced distance from substrate 370. Each pixel stack further includes a plurality of pixel elements 380 positioned between light detecting pixel element 148 and substrate 370. In the embodiment of FIG. 9c, identical pixel stacks 378 are positioned on opposite sides of substrate 370, such that pinhole passage 387a, which is positioned in a corner of pixel stack 378, extends through all the pixel elements of pixel stack 378 on an upper or top side of substrate 370, through substrate 370, and extends through pixel element 380 of pixel stack 378 on a lower or bottom side of substrate 370, terminating at light detecting pixel element 148. Similarly, pinhole passage 387b, which is positioned in an opposite corner of pixel stack 378 from pinhole passage 387a, extends through all the pixel elements of pixel stack 378 on the lower or bottom side of substrate 370, through substrate 370, and extends through pixel element 380 of pixel stack 378 on the upper or top side of substrate 370, terminating at light detecting pixel element 148. The plurality of pixel elements 380 may include the pixel elements described in FIG. 8B, or may include other pixel elements, as long as the operation of the various pixel elements do not interfere with each other. The advantage to pixel stack 378 is that the length of pinhole passage 388a and pinhole passage 38b is relatively long as compared to other pinhole passages described herein, which improves image quality through the plurality of pinholes 388a.

Figure 9D:
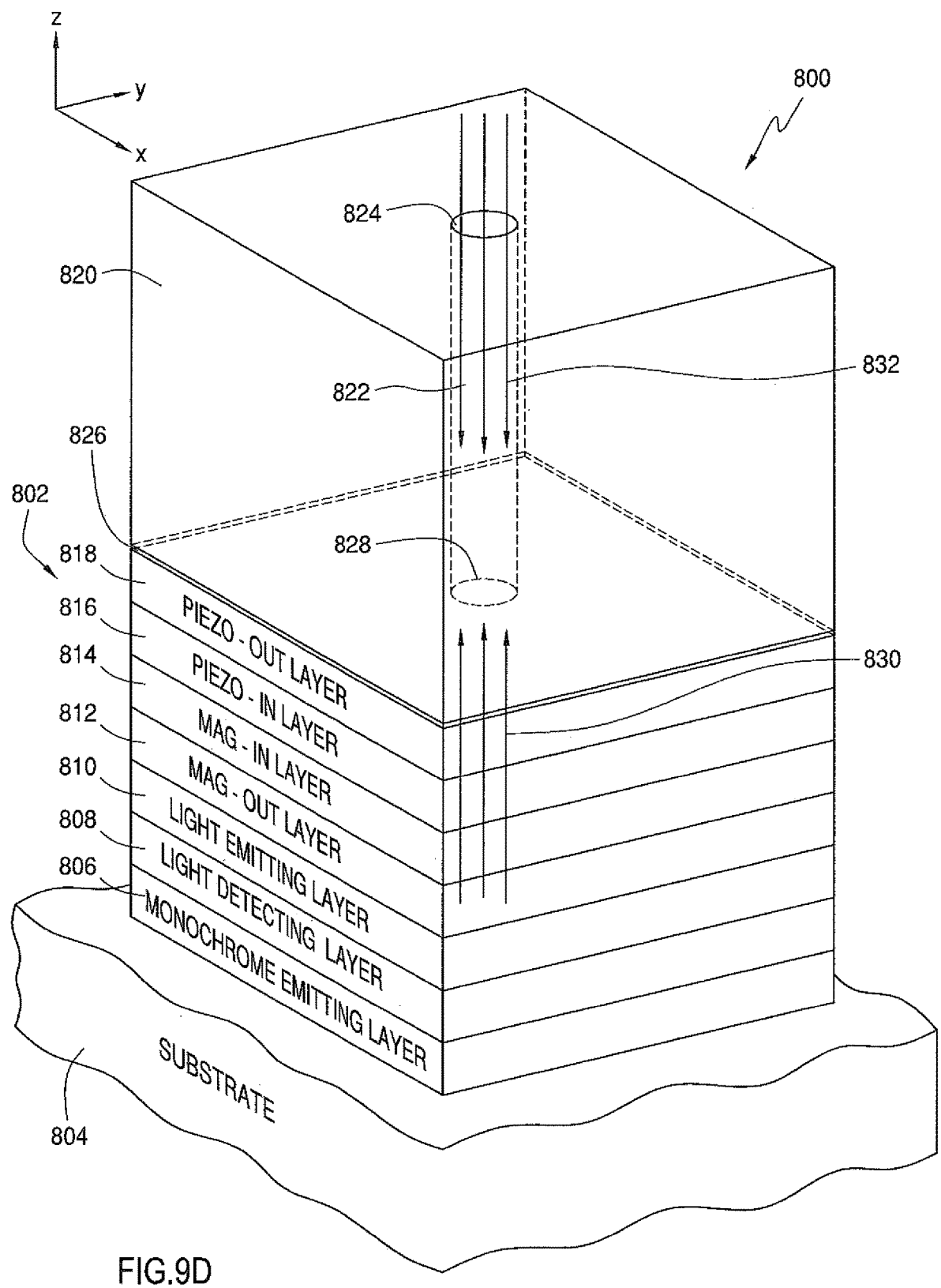

FIG. 9D shows a pixel stack or column in accordance with an exemplary embodiment of the present disclosure, generally indicated at 800, which is different from the pixel stack and pixel layer configurations of FIGS. 7A, 7B, 8A, and 8B. A plurality of pixel stacks 800 are formed and arrayed on a substrate 804 and may be arrayed on a first side and a second opposite side of substrate 804, and includes a plurality of pixel element layers 802. Beginning with the pixel closest to substrate 804, layers 802 includes a monochrome light source or emitter pixel element 806, a light detection pixel element 808, a primary light emitting pixel element 810, which may include red, blue and green elements, a magnetic-out pixel element 812, a magnetic-in pixel element 814, a piezoelectric-in pixel element 816, a piezoelectric-out pixel element 818, and a flexible polymer layer 820. Polymer layer 820 may be transparent in an exemplary embodiment, or it may block and/or absorb light in another exemplary embodiment, depending on whether light needs to be received or transmitted through polymer layer 820. Polymer layer 820 includes a vertically-extending pinhole passage 822, i.e., pinhole passage 822 extends perpendicularly or orthogonally to substrate 804, that opens on an exterior surface of polymer layer 820 as a pinhole opening 824.

Pinhole opening 824 and pinhole passage 822 are positioned away from an edge of pixel stack 800, and may be centrally located in pixel stack 800. A layer of resist material 826 is positioned between polymer layer 820 and piezoelectric-out layer 818 to block light transmission except through an opening or gap 828 in resist material 826 that permits the transmission of light from monochrome pixel element 806 and/or primary light emitting pixel element 808, shown by arrows 830, or for the reception of light, shown by arrows 832. Received light transmits through transparent pixel elements 818, 816, 814, 812, and 810 to be received by light detecting pixel element 808. Opening or space 828 is positioned to align with and, in the exemplary embodiment, is sized to match, pinhole passage 822 and/or pinhole opening 824. In an alternative embodiment, pinhole passage 822 may extend through at least pixel elements 818, 816, 814, and 812 to open at light emitting layer 810. In an exemplary embodiment, the sound generated by piezoelectric-out pixel element 818 may transmit through pinhole passage 822. However, it may exit additional pinholes (not shown) arranged to provide additional locations for sound to exit card 100 to increase the amplitude of sound energy emitted by card 100. The configuration of FIG. 9D provides the ability to generate either monochrome light or multi-frequency, e.g., color, from pixel stack 800. In an exemplary embodiment, primary light emitting pixel element 810 may be eliminated, and pixel stack 800 may emit monochrome light only. The light emitted by monochrome light source 806 is highly coherent, which is an attribute of lasers, and this coherent light may be used to benefit in certain applications. Thus, pixel stack 800, which may form the pixel stacks or columns on card 100, provides advantages over the pixel layers and configurations previously described. While not shown in FIG. 9D, substrate 804 may be reflective to direct light emitted by light emitting pixel 806 in a downward direction toward substrate 804 to be reflected upwardly away from substrate 804. Alternatively, a reflective layer may be positioned between substrate 804 and light emitting pixel element 806.

Figure 9E:
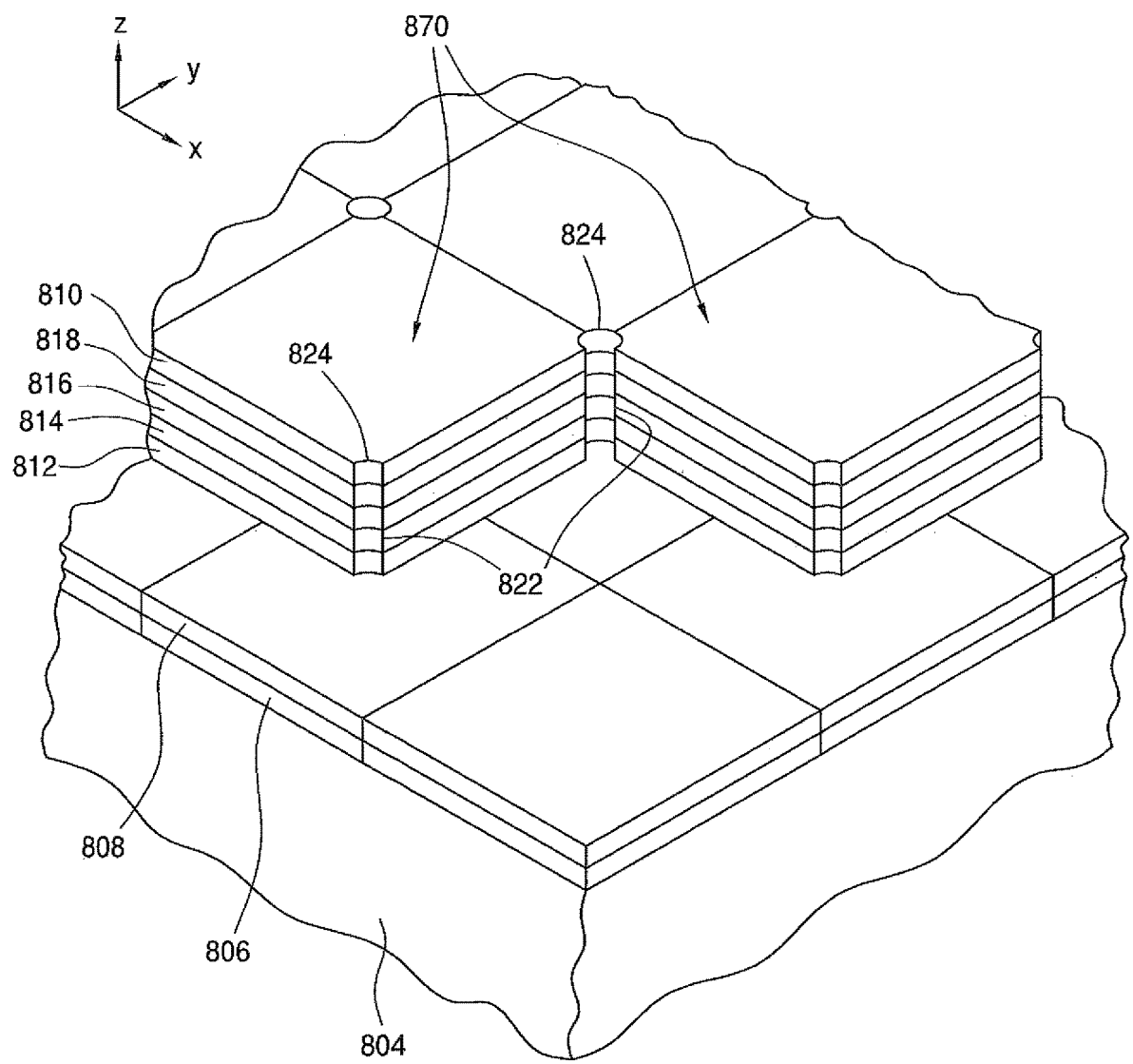

FIG. 9E shows a plurality of pixel stacks 870 including a plurality of pixel elements in an overlapping relationship extending in the z-direction. Each pixel stack includes at least one transmission pixel element or receiving pixel element, and at least one receiving pixel element or transmission pixel element that is offset, staggered, or skewed in at least one of an x-direction and a y-direction from the at least one transmission pixel element. Such an orientation of pixel elements may be described as a staggered overlap, or stagger overlapping. For example, in the exemplary embodiment of FIG. 9E, monochrome light emitting pixel element 806 is offset in the x-direction and the y-direction from light emitting pixel element 810. Furthermore, in the exemplary embodiment of FIG. 9E, light emitting pixel element 806 and light detection pixel element 808 are offset in an x-direction and a y-direction from the other pixel elements of pixel stack 870, which includes magnetic-out pixel element 812, magnetic-in pixel element 814, piezoelectric-in pixel element 816, piezoelectric-out pixel element 818, and light emitting pixel element 810. The advantage to the configuration of FIG. 9E is that the position of pinhole passages 822 is in the corners of pixel elements 810, 818, 816, 814, and 812, minimizing interference with those pixel elements. Each pinhole passage 822 opens on light detecting pixel element 808, and provides a path for light transmission and reception for light emitting pixel element 806 and light detecting pixel element 808, respectively, providing improved collimation of light detected by light detecting pixel element 808 and provides for collimated light from light emitting pixel element 806. While not shown in FIG. 9E, substrate 804 may be reflective to direct light emitted by light emitting pixel 806 in a downward direction toward substrate 804 to be reflected upwardly away from substrate 804, or a reflective layer may be positioned between substrate 804 and light emitting pixel element 806.

The above description of layouts of components of card 100 is not to be taken as limiting. The idea is to lay out light emission components (which are near the major surfaces and only covered with clear film or other clear surfaces allowing light to escape and to be received), light collection components that require line of sight to the external portion of card 100, pinhole or tunnel structures, etc. that, if light absorbing, assure the light collecting pixels receive light that comes substantially perpendicular to the surface and limiting the light that can enter so memory gathers light data collected from the array which can form a reliable image of what is up close to card 100. Magnetic and piezoelectric elements for magnetic-in and magnetic-out functionality and aural functionality are strategically placed for maximum effect. The sound producing and sound receiving piezoelectric elements may need line of sight access to the surface. The magnetic elements do not need line of sight access to the surface and can be buried by components and nonmagnetic layers.

For embodiments including a pinhole passage to access pixel layers or pixel elements deeper than other pixel layers and elements, e.g., FIG. 7B, and FIG. 8B, and FIG. 9E, the location where the pinhole terminates, forms a light detecting pixel element, a portion of which is shown in, for example, FIGS. 9A-9C. In the embodiment of FIG. 9E, pinhole passage 822 extends through a plurality of pixel elements, terminating at light detecting pixel element 808. The patterns of the pixel elements through which pinhole passage 822 extends, which are adjacent to pinhole passage 822 in the embodiment of FIG. 9E, for example, light emitting pixel element 810, piezoelectric-out pixel element 818, piezoelectric-in pixel element 816, magnetic-in pixel element 814, and magnetic-out pixel element 812, are patterned and arranged with respect to pinhole passage 822 to provide for optimal operation of each of the pixel elements. Additionally, controllable active areas, control electrode patterns or geometry that define activated or actuated areas of pixel elements described herein can be staggered, offset, or skewed, i.e., positioned in an x-direction and a y-direction, with respect to the pinhole passages described herein to provide for optimal configurations and arrangements, i.e., the geometry, of the controllable active areas. Regardless of the positions of the various portions of a pixel element, any layer that includes a portion of a pinhole passage will have the controllable active areas or control electrode patterns geometrically arranged relative to the position of the pinhole passage, if such a passage exists.

Other components can be added, which emit energy or collect energy, e.g., solar or quantum dots or wells, such that the surface design becomes more and more dynamic over time. Quantum dots emit coherent light and function as solar cells by collecting light. Some types of energy must have line of sight for reliable reception, and other energy can be buried in the substructure. Burying in the layers any and all electronics that are layered at present can include, but is not limited to power distribution, data distribution, signal lines, ground, battery, processing, memory, adaptors such as network adaptors, and essentially any and all electronics which can be cognizably embedded into a credit card form factor. For form factors other than the credit card, presuming they are larger in any dimension, particularly in thickness, possibilities expand as to what will fit within the form factor's power and size limitations. For any form factor that is smaller, particularly in thickness, some considerations change; however, the concepts of the disclosure remain. It is anticipated that the hereinabove described pixels are likely to evolve with time and such evolution can provide further reduction in the size of the pixels to minimize stack dimensions, which potentially provides more space for either a higher density of pixels, or for other types of pixels, such as quantum or solar wells or dots.

Electrically, each layer of card 100 may either be insulated from adjacent layers by addition of an insulating layer (not shown), which are optically transparent, or adjacent layers of card 100 may share electrical connections. For example, two adjacent layers may share a single ground plane and/or two adjacent layers may share a voltage source. These configurations reduce the cost of producing card 100. Other electrical connection configurations may also be provided to supply voltage and to provide a ground to each of the pixels of card 100. For example, electrical connections may extend in a direction that is perpendicular to substrate 170.

The sensitivity of the pixels described in this disclosure may also vary, based on cost, availability of power, size, etc. Pixels having high sensitivity, such as magnetic-in pixels 150, enable higher resolution of imaging, and higher sensitivity can improve other capabilities, such as accuracy of tracking calculations. While higher resolution once equated to higher power, new technologies, for example LED's, enable high resolution displays while using lower power than many competing technologies. Card 100 is configured to make use of currently available technologies as well as being adaptable to newer technologies that provide improved efficiency, lower cost, and require less energy to operate.

Embodiments of card 100 according to the present disclosure allow for sharing or swapping of data by way of stacking cards in a holder or stacking cards 100 directly on top of one another (e.g., during a swap mode function of cards 100). The ability to stack cards 100 directly on top of each other with no or zero clearance between cards 100 is possible because of the stacked or columnar nature of the various pixel layers such that transmission pixels and reception pixels can be sufficiently aligned for reliable data transmission between various emitting or out pixels and various receiving pixels. Because of this ability, any data a "master" card 100 (i.e., the card sending data) wishes to share can be distributed to stacked "slave" receiving cards 100. Plural cards 100 can thus be loaded with data, such as instructions, plans, social net contents, entertainment items or essentially any data the master card 100 in a given transaction wishes to share. Applications development for data sharing in this mode will very likely make the process of data movement more secure and less time consuming. Card 100 can transfer data more rapidly from its surfaces than through its network connections because each emitting pixel, such as light emitting pixel element 107, can transmit data to a respective light detecting pixel element 148, providing a plurality of data transmission and reception paths. For example, card-to-card data transfer configurations can transfer in the 1,000 GBPS speed, or 10 to 100 times greater than this speed, while networks cannot, at present, transfer at this massive rate of speed.

The dual-side function of card 100 allows stacking cards in any manner because cards 100 can be configured to recognize which major face 101 or 102 of stacked cards 100 are facing one another, handshake or establish communication, and begin inter-card communication. A dual-side function of card 100 can include a mode for performing data transfer among plural stacked cards 100. For example, one or more cards 100 in a card stack could translate data, and thus assure compatible data is received by all cards 100 in a stack data transfer. In a method of encrypting and decrypting data reliably, cards 100 could each share a portion of data, wherein, only when the right cards 100 are stacked (even limited to the right moment in time) will they combine their data contents and yield a functional data set, representing the decrypted data intended to be transferred. By using data stored in servers, and carrying pointers to the data, the amount of data that can be reliably moved by card 100 using this method becomes unlimited and security becomes exponentially superior to any other method of data transfer known to the Applicant.

In a levitation embodiment, card 100 can include magnetic elements that levitate and position a first card stacked over a second card. These cards operate independently of a physical dock. For instance, passive fixed magnets can be embedded in the core area of card 100, for example, in substrate 170 or 370 described hereinabove, at positions that will stably levitate two cards 100 and not interfere with a card reader's ability to read stripe data. While in a levitated state, at least one pixel of one of first or second light emitting units 122, 124 on a first card 100 are aligned with facing pixels of one of first and second light detection units 126, 128 on a second card 100, and at least one pixel of one of first and second light detection units 126, 128 on first card 100 are aligned with facing pixels of one of first and second light emitting units 122, 124 on second card 100. In an exemplary embodiment, the alignment of the above-described facing light receiving/detecting pixels 148 and light emitting pixels 107 can be carried out in a predetermined and secure way.

Figure 10A:
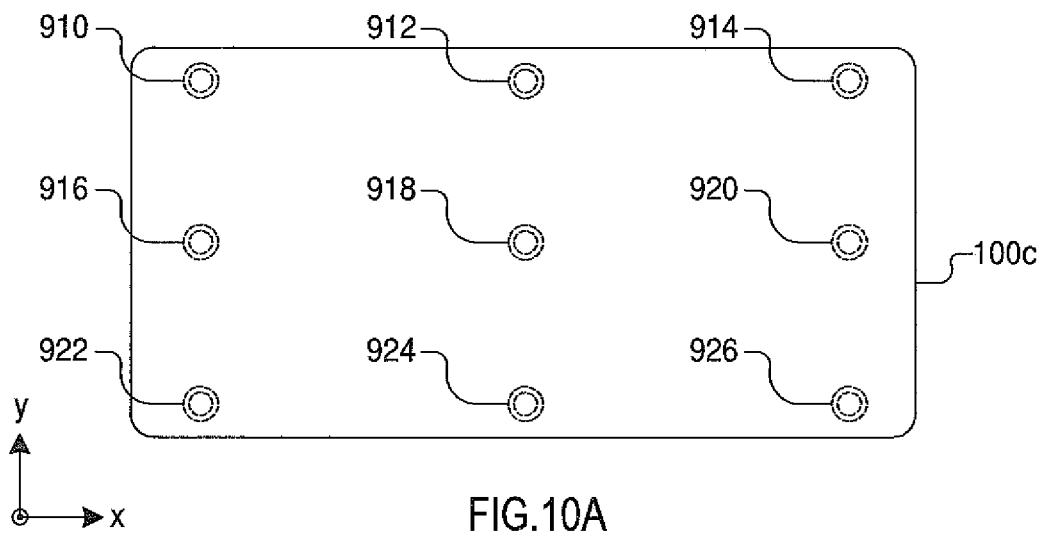
FIGS. 10A to 10C are diagrams illustrating an exemplary embodiment of cards including a configuration allowing one card to levitate over another card via magnetic elements.
Figure 10B:
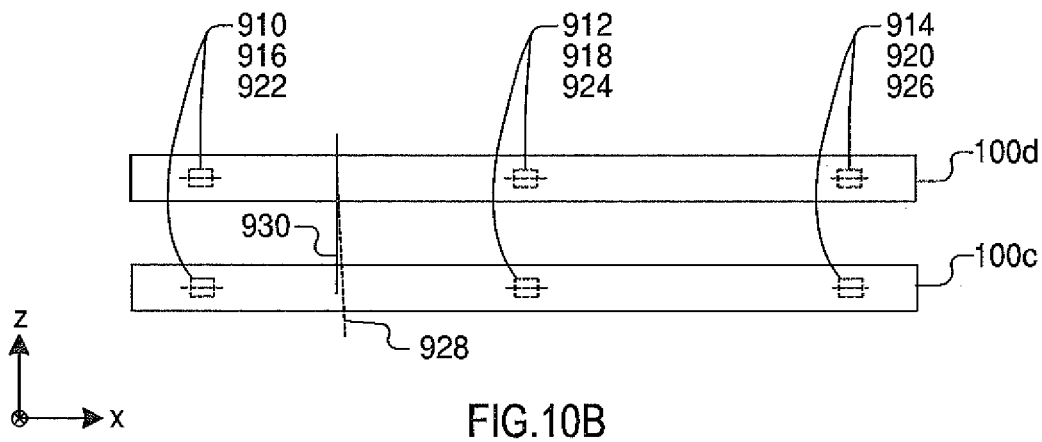

In an exemplary embodiment, card 100 can include plural current controlled electromagnets (not shown) and the levitation/positioning controller unit, or Mag Lev unit 147 can be configured to set current for each of the electromagnets to allow other similarly equipped cards to levitate over one another. Mag Lev unit 147 may be controlled by a dedicated Mag Lev controller (not shown), by processor 110, or by a processor that is integral to Mag Lev unit 147. FIGS. 10A-10B show an example of a card 100c including the levitation function, and which can otherwise have any of the card structure disclosed herein. As shown in FIG. 10A, card 100c has a plurality of individual electromagnets 910-926 embedded in a central area or core of card 100c, for example, embedded in substrate 170 or 370 described hereinabove. Each electromagnet 910-926 includes a coil in which current can be controlled, for example, by Mag Lev unit 147, to emit a magnetic field strength corresponding to the controlled current value. Some or all electromagnets 910-926 can be reversible-pole electromagnets such that a polarity of the electromagnet changes according to whether a positive or negative current is applied to the coil of the electromagnet.

Each electromagnet 910-926 is electrically connected to a levitation control circuit (not shown), which can be part of data exchange unit 146 shown in FIG. 2, and which can be integrated into card processor 110. FIG. 10B shows card 100c and another similarly equipped card 100d magnetically levitating in the depicted z-axis or vertical direction above card 100c. For stability, at least one of electromagnets 910-926 in card 100d, for example, electromagnets 916 and 920 of card 100d are polarized to attract to electromagnets 916 and 920 of card 100c, and a feedback loop can be utilized by the levitation control circuit (e.g., a PID controller) to continuously adjust one or more electromagnets to maintain relative position between cards 100c and 100d.

While not shown, each card 100c and 100d can include electromagnets provided at predetermined angles to provide precise control of magnetic fields that can move card 100d and hold it precisely in any of the three depicted dimensions, for example, translating card 100d in the x-axis, y-axis and/or z-axis directions and/or rotate card 100d about the x-axis, y-axis and/or z-axis with high accuracy using electromagnetic variability. In an exemplary embodiment, card 100c can assume master status and overlying card 100d can assume slave status, such that master card 100c controls the positioning of card 100d. The distances between various points of cards 100c and 100d can be determined via one or more pixels of first or second light emitting unit 122, 124 and one or more pixels of first or second light detection units 126, 128 of card 100c (or card 100d) at different localized positions on the face of card 100 via emission of specific light wavelengths and patterns from specific portions of the major surface of card 100c (or card 100d) that faces the opposite card 100d (or 100c). The distance between cards 100c and 100d could be determined, for example, by emitting a known visual image or magnetic image of known size on one card, allowing the other card to view the image of known size, and then using parallax to determine a distance between cards.

Figure 10C:
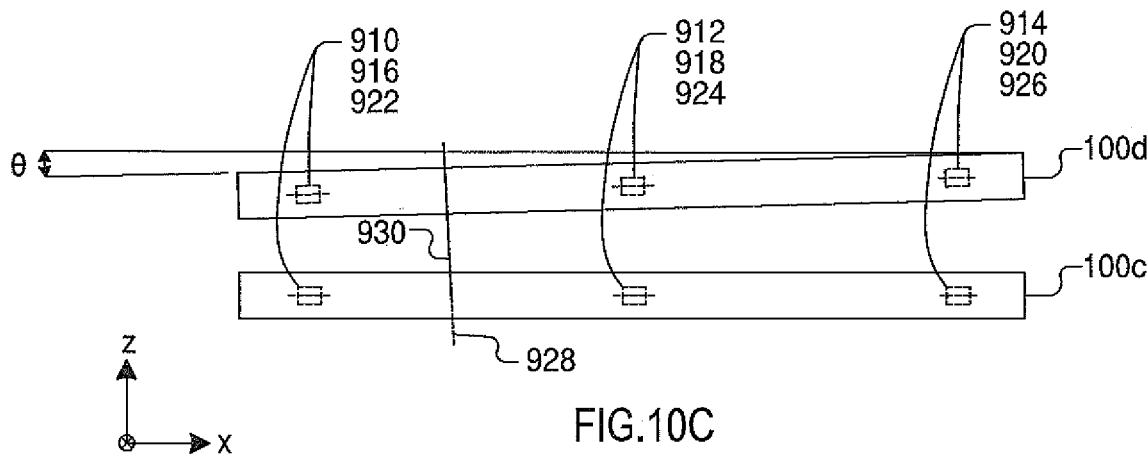

FIG. 10C shows a result of the levitation control circuit levitating card 100d by card 100c such that card 100d pivots about an axis in the y-axis direction through electromagnets 914, 920, and 926 to move the negative x-axis side of card 100d through an angle θ in the negative z-axis direction. In an embodiment, cards 100c and 100d can include one or more light emitters and complementary light receiving/detecting elements (not shown) that align to produce a detected signal, for example, above a predetermined power/duration threshold level, only if aligned when cards 100 are positioned relative to one another in a predetermined way at least for the initial handshake. For example, FIGS. 10B and 10C shows a dotted line 928 representing a direction in which a light receiving pixel in card 100c can receive and detect light, and a solid line 930 representing a direction in which a light emitting pixel of card 100d can emit light. As can be seen in FIG. 10B, the light receiving pixel of card 100c does not receive and detect a photon stream emitted from the light emitting pixel of card 100d, but FIG. 10C shows directions 928 and 930 align in three dimensions after the adjustment via magnetic levitation control. While FIGS. 10B and 10C illustrate one pair of light emitting and receiving pixels, plural light receiving and light emitting pixel pairs can be set at various relative positions to one other than perpendicular to the surfaces of the cards, for example, at plural acute angles relative to the facing major surfaces of cards 100c and 100d. In an embodiment, communication between cards 100c and 100d can include a form of encryption where the relative position of cards 100c and 100d changes periodically in some prescribed way such that communication correspondingly switches between different subsets of light emitting pixels 107 and light receiving/detecting pixels 148. In this way, cards 100c and 100d can optically communicate with one another very securely.

It is to be appreciated that cards 100d and 100c as shown in FIGS. 10A-10C can pertain to a situation in which one belongs to a buyer and the other belongs to a seller, the buyer displays a credit card image, the seller displays a barcode in which both parties may be required to provide biometric identification (ID) and both parties also use the same platform for usual browsing, shopping, and so on. Because card 100 provides two-sided communication capability, cards 100 may also provide a conduit through an intermediary, for example, a lawyer or title company. Thus, a buyer's card 100 may include coded information providing a "cashier's check" from the buyer's bank. The intermediary automatically receives the "cashier's check" data and automatically transfers coded information to the seller's card 100 that represents the net proceeds of a sale. Such intermediary transactions may also include auction situations, contingent sales, and other situations where three or more parties are involved in a transaction.

The ability to place a plurality of cards 100 side-by-side in a stack leads to another feature of card 100, which is to provide dynamic, ad hoc memory. While each individual card 100 includes a finite amount of memory 114 (see FIGS. 2 and 6), each individual card 100 will generally have at least a portion of its memory 114 available. By placing a plurality of cards 100 side-by-side and enabling a memory sharing mode with one card being a controlling or master card, the available memory of each card 100 in a stack of cards 100 can assist in functions requiring more memory than is available to one card 100. While such memory needs would typically be temporary, with the high-speed communication capabilities of card 100, stacks of cards 100 could provide low-cost expandable memory in a plurality of environments, including environmentally adverse environments. Because such ad hoc memory is flexible, expandable, and shared across a plurality of real locations, the ad hoc memory of a plurality of cards 100 forms an ad hoc cloud memory.

Figures 11A, 11B:
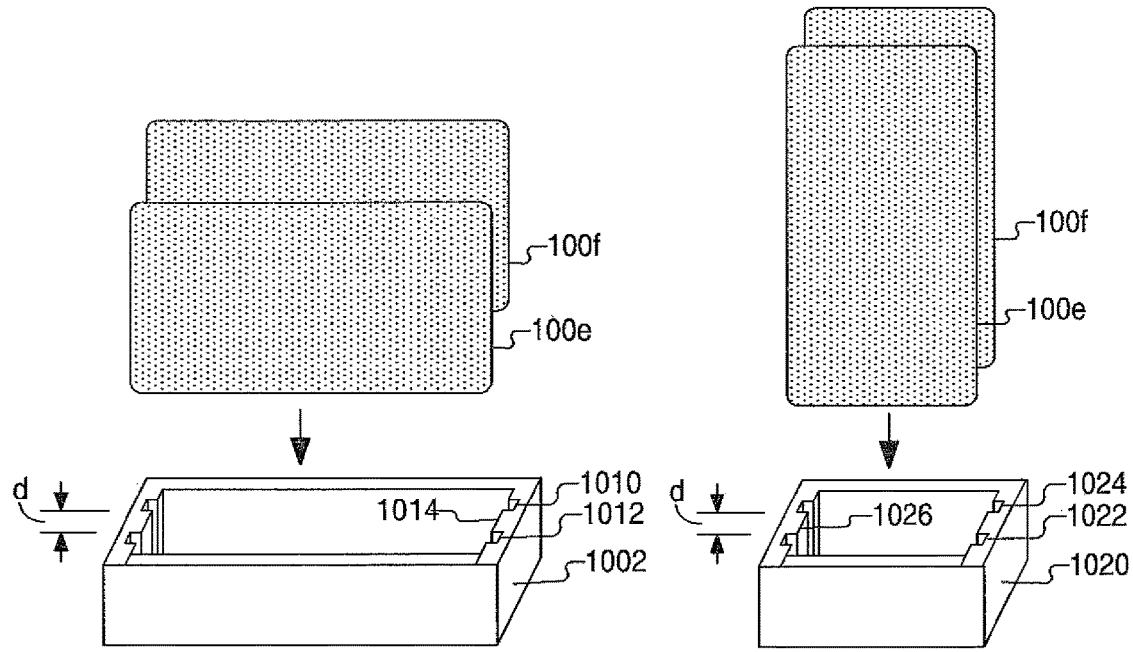
FIGS. 11A and 11B are diagrams of exemplary embodiments of card holding brackets of the present disclosure, where FIG. 11A holds plural horizontally oriented cards and FIG. 11B holds plural vertically oriented cards.

FIG. 11A is a diagram of a bracket, or mechanical dock 1002 that can be used to provide a measured space, gap, or distance between a plurality of cards 100e and 100f configured according to the present disclosure. Dock 1002 includes a plurality of slots 1010 and 1012 separated by a land 1014 and configured to hold cards 100e and 100f a predetermined spaced distance d from each other. The predetermined spaced distance d is established by the ability of cards 100e and 100f to transmit and receive information between the layers and pixels described hereinabove. In an exemplary embodiment, spaced distance d may be in the range of 1 mm to 2 mm. While dock 1002 is configured for horizontally oriented cards, FIG. 10B shows an embodiment of a vertical dock 1020. Vertical dock 120 includes a plurality of slots 1022 and 1024 separated by a land 1026 and configured to hold cards 100e and 100d a spaced distance d from each other. In another exemplary embodiment (not shown), a dock may hold cards 100e and 100f directly adjacent or side-by-side to each other in a single slot, with minimal or no distance between adjacent surfaces of cards 100e and 100f, i.e., adjacent surfaces of cards 100e and 100f contact each other.

Physical docks such as docks 1002 and 1020 can be used for any card-to-card data transfer, particularly long duration data transfers between cards. Transfers can also be accomplished by holding two cards together while aligning the cards to substantially overlap each other. While having two cards perfectly overlapped provides the most optimal alignment of transmitting and receiving pixels, a module and/or processor 110 of each card 100 is capable of analyzing all available pixels to determine which pixels are receiving data, and ignoring any pixels that are misaligned and/or otherwise not receiving data. The magnetic levitation techniques described hereinabove can also be used for data transfer of short or long periods. Magnetic levitation techniques may improve the security of data transfer by maintaining two cards in extremely close proximity, such as within 1 mm of each other, or in contact with each other, which minimizes data transmission emissions beyond the edges of either of the two cards.

Docks 1002 and 1020 also can include a charging function provided by spring loaded or flexible detents (not shown) that engage charging electrodes of cards 100e and 100f, such as charging electrodes 184 shown in FIG. 6. Additionally, while the height of docks 1002 and 1020 can be set to cover cards 100e and 100f, the embodiments depicted in FIGS. 11A and 11B allow for use of exposed portions of cards 100e and 100f, for, in an example, user input and control to major surfaces 101 and 102 of cards 100e and 100f, to display an image while charging or transferring data to alert the user when transfer is complete or when a problem is encountered, or to provide other information to the user. It is to be understood that the number of slots can be of any practical number to enable communication between more than two cards. Further, only one slot can be provided for a charging and or communication dock that can connect to another device via a serial communication and charging line, such as a USB cable.

Two or more cards 100 can be placed in a holder (not shown) which aligns the cards very accurately therein, and the holder can provide external magnetism or physical forces within tolerance so as not to damage the cards, while serving to align the cards with no appreciable air space, gap, or distance between cards. For this purpose, pins and guides could be provided as surface features, or, slight notches or grooves on the edges which have no effect on the expected functions of the card 100, but serve to align one card 100 with another card 100, e.g., card 100e with card 100f, or one card to a device fully integrated with the same or compatible technology (e.g., a display on a PC having a portion fashioned as card 100 is fashioned, and fully integrated to the PC so as to enable all functions using the PC's processor, software and network attachments).

Figures 12A, 12B, 12C:
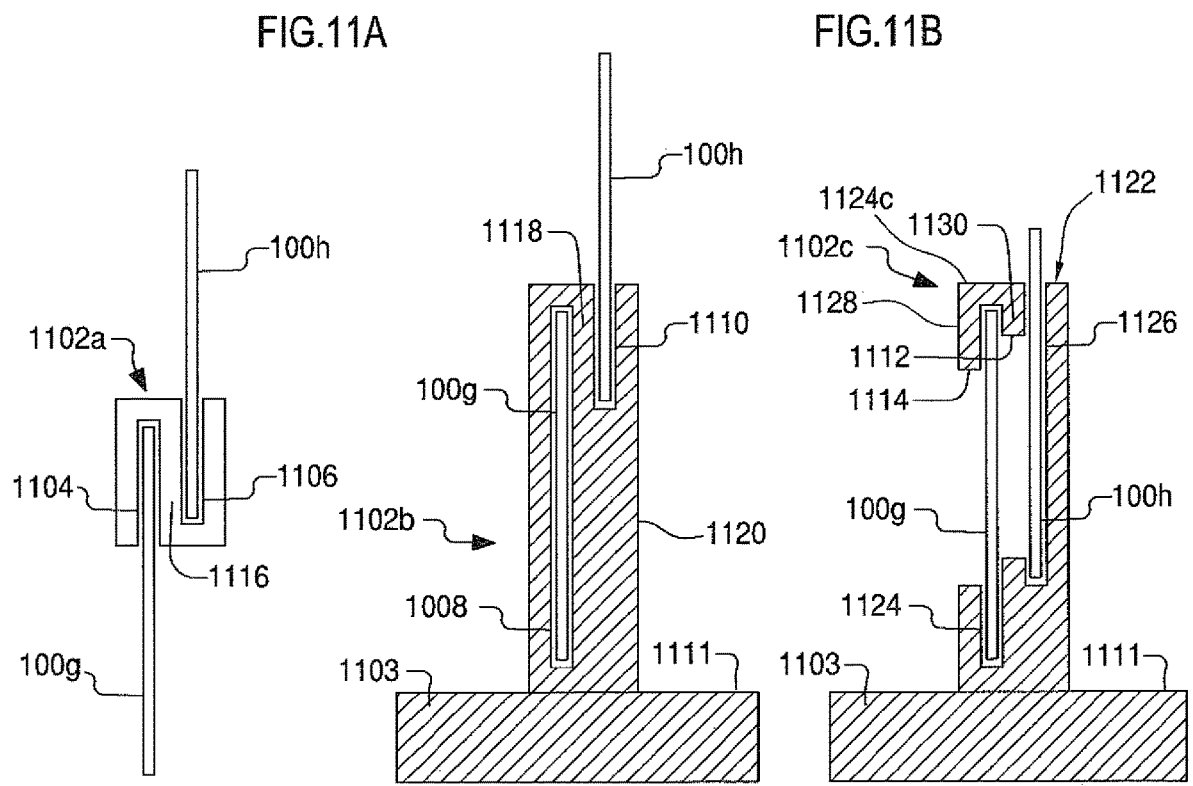
FIGS. 12A to 12C are portable card swipe brackets according to exemplary embodiments of the present disclosure.

FIGS. 12A-12C are diagrams of exemplary swipe brackets that can be used as portable POS card readers, for example, to perform transactions at professional offices, conferences, flea markets, festivals, fairs, swap meets, food trucks, between individuals, etc., as well as at traditional retail and wholesale environments. These brackets can be used as a docking, lock, and swipe bracket, and can be adjusted for two different orientations of docking, e.g., horizontal or vertical.

FIG. 12A is a side view of a portable swipe bracket 1102a according to an exemplary embodiment, in which the card user can insert a card 100g and then swipe another card 100h either horizontally or vertically such that card 100g can read the virtual or physical magnetic strip on card 100h. At least card 100g is an embodiment of a card according to the present disclosure, and card 100h can be a card according to the present disclosure or a "legacy" type card that includes a physical magnetic stripe. Swipe bracket 1102a includes a first slot 1104 and a second slot 1106 between which is a section 1116, which respectively accommodate cards 100g and 100h. Section 1116 has a thickness allowing magnetic field lines from a magnetic strip, such as magnetic strip 104 described hereinabove, to penetrate and be detected by a magnetic-in layer of card 100g, such as magnetic-in layers 192a and 192b described hereinabove. While not shown, card 100g can be securely provided in first slot 1104 by frictional engagement, enclosed in a variation of first slot 1104 that is part of an enclosure (not shown), or simply held in place while completing a transaction. In an embodiment, first slot 1104 and/or second slot 1106 can extend to overlap card 100g and/or card 100h to a further or lesser extent than depicted in FIG. 12A. In an exemplary embodiment, swipe bracket 1102a can be hand-held or attached to another object, for example, by an adhesive or a clamping structure.

FIG. 12B is a sectional view of an exemplary embodiment of a swipe bracket 1102b that can be used as a table-top or counter type swiping apparatus. Swipe bracket 1102b includes an upper bracket portion 1120 and a base 1103 either attached to upper bracket portion 1120 or formed integrally as part of upper bracket portion 120 that provides support and stability for upper bracket portion 1120. Base 1103 further includes a base upper surface 1111. Note that "upper surface" is so denoted for convenience and surface 1111 may be oriented in a plurality of orientations that may not necessarily be described as "upper." Swipe bracket 1102b further includes a first slot 1108 positioned or formed in upper bracket portion 1120 that forms part of an enclosure that houses card 100g, a second slot 1110 positioned or formed in upper bracket portion 1120 that accommodates card 100h to be swiped, and a section 1118 positioned between slots 1108 and 1110. In another embodiment, base 1103 is not provided and bracket portion 1120 can be hand-held or placed on a surface. Upper bracket portion 1120 can be oriented in any orientation, for example, an orientation in which slots 1108 and 1110 extend in a direction that is parallel with base upper surface 1111, and in other orientations.

A slot opening (not shown) is positioned at one end of swipe bracket 1102c to permit inserting card 100g into swipe bracket 1102c. FIG. 12C shows a sectional view of a swipe bracket 1102c, which is a modification of the embodiment shown in FIG. 12B that allows for increased operational features when swiping legacy cards or cards in accordance with the present disclosure. As shown in FIG. 12C, swipe bracket 1102c includes an upper bracket portion 1122 and may include a base such as base 1103. Upper bracket portion 1122 includes a first slot 1124, a second slot 1126, a section 1130 positioned between first slot 1124 and second slot 1126, and a first opening or window 1112 formed in section 1130 and positioned between first slot 1124 and second slot 1126 to allow card 100g to optically communicate with a card swiped through slot 1126. Upper bracket portion 1122 further includes a second opening or window 1114 positioned between slot 1124 and an outer surface 1128 of bracket 1102c to allow viewing and/or user input to card 100g. While not shown, at least one opening/window 1112, 1114 includes side portions to support the portion of bracket 1102c forming an upper portion 1124a of slot 1124. With first opening or window 1112, swipe bracket 1102c can also function as a data transfer bracket to transfer data between cards 100g and 100h.

It is to be understood that an embodiment of a portable swipe bracket according to the present disclosure can include a power supply to operate card 100g and/or card 100h, charge card 100g, and/or allow for extended use of card 100g while in the swipe bracket. In an embodiment, the brackets can be communicatively coupled or docked to another device, such as a cell phone, laptop computer via serial bus or Bluetooth™, electronic tablet, or a Wi-Fi access node. Additionally, any embodiment of a swipe bracket can include one or more openings or windows of optically transparent material allowing for optical communication between cards and/or to allow for user input to first major surface 101 or second major surface 102 of card 100g and/or card 100h. Also, an embodiment of the swipe bracket can include operational elements (not shown), such as hard keys on the bracket portion or the base, to allow for one or both card users to interface with card 100g, card 100h, and system 1 (see FIG. 1).

Figure 13:
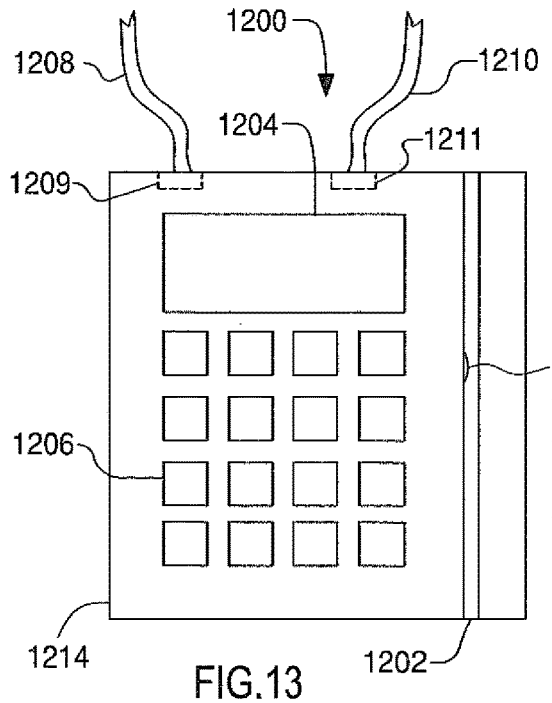
FIG. 13 is a diagram of a conventional or legacy card reader, or credit/debit card processor.

FIG. 13 is a diagram of a conventional, or legacy magnetic swipe POS reader 1200, which may be described as a card reader or credit/debit card processor 1200. Reader 1200 includes a conventional magnetic read head 1212, a slot 1202 for guiding a card adjacent to magnetic read head 1212, a display 1204 such as an LCD touch panel display, and a set of operational hard keys 1206, although some readers do not include operational hard keys. Reader 1200 also includes a power feed line 1208 that supplies power to reader 1200, a data feed line 1210 that allows reader 1200 to communicate with a remote verification server (not shown), and a housing 1214. Power feed line 1208 connects to a power connector 1209 positioned at the back side of housing 1214 of reader 1200 and data feed line 1210 connects to a data connector 1211 at the back of the housing of reader 1200.

Figure 14:
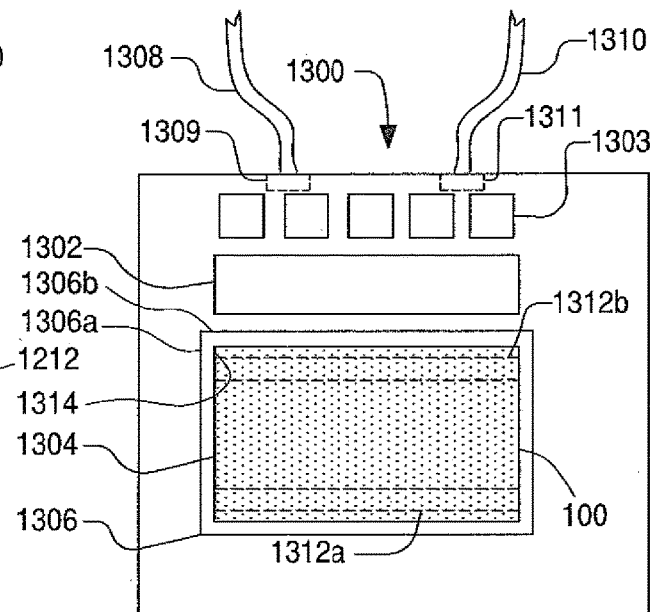
FIG. 14 is a diagram of a point of sale (POS) card reader according to an exemplary embodiment of the present disclosure.

FIG. 14 shows an exemplary POS card reader 1300 according to the present disclosure. Unlike legacy card reader 1200, card reader 1300 does not include a slot for swiping a card and instead reads and writes in a flatbed manner. As shown in FIG. 14, reader 1300 includes a reader body 1301, an auxiliary display 1302, and operational hard keys 1303, although another embodiment may not include one or both of an auxiliary display and operational hard keys. Card reader 1300 further includes a communication display 1304 and a frame 1306 surrounding communication display 1304. Card reader 1300 includes a power feed line 1308 and a power connector 1309 to provide a connection between power feed line 1308 between power feed line 1308 and reader body 1301. Card reader 1300 also includes a data feed line 1310 and a data connector 1311 to provide a connection between data feed line 1310 and reader body 1301.

Frame 1306 around communication display 1304 can be configured, i.e., shaped and positioned, to position card 100 in parallel to and in proximity to communication display 1304. For example, frame 1306 can include only a first side 1306a and an adjacent second side 1306b raised above, higher, or away from an outer or exterior surface of communication display 1304, and first side 1306a and second side 1306b can include an interior corner 1314 to assist a user in placing card 100 on communication display 1304 and to allow the user to slide card 100 off in a direction away from first side 1306a and second side 1306b. In another embodiment, the entire frame 1306 is raised above the outer or exterior surface of communication display 1304 and ejectors (not shown) having, for example, a plastic (soft) bottom on left and right side, cock or tilt card 100 up so the user can grab edge 105 to get card 100 back or to pick card 100 from reader body 1301 without difficulty. In an embodiment, the magnetic levitation function of card 100 can also be present in a more modern version of the terminal-based point of sale system that allows the point of sale system to levitate card 100, which eliminates touch or contact to move card 100 away from communication display 1304. The ability to move card 100 away from communication display 1304 to enable easy removal of card 100 from reader body 1301 can help prevent the spread of contagious disease by decreasing contact with reader body 1301 and can help protect card 100 card from wear and tear.

Communication display 1304 can include elements of card 100 of the present disclosure and can at least include light emitters and light receivers/detectors, such as those described hereinabove with respect to first/second light emitting units 122, 124 and first/second light detection units 126, 128, and a magnetic stripe reader/writer along at least areas 1312a and 1312b. In this way, reader 1300 can optically communicate with card 100 according to the present disclosure and can read magnetic stripes of both legacy cards and cards 100 configured according to the present disclosure.

While legacy readers can be replaced with a reader according to the present disclosure, such as reader 1300 described hereinabove, there may be a need to communicate through a legacy type card reader (i.e., a swiper box) because the POS system will not run if it does not see its conventional swiper box. In such a situation, the conventional swiper box can be emulated using a fast and easy configuration that converts a legacy magnetic swipe POS assembly to a form more suited to advantageous use of the card features disclosed herein, particularly the optical features, such as light detecting pixels 148 and light emitting pixels 107, including flatbed read and write, without removing the legacy swiper. As shown in FIG. 15-15C, a vendor may simply affix an optical display/reader emulating card 100 of this disclosure to the legacy reader or swiper box (or a new display/reader much like card 100 of this disclosure), using a simplified attaching mechanism, such as industrial 2 sided tape and a cover designed with rubberized gaskets so as to dock solidly with the legacy reader. It may also be necessary to load software into the POS system of the kind which is known in the art or readily configurable to manage proper operation of the elements described herein.

Figure 15A:
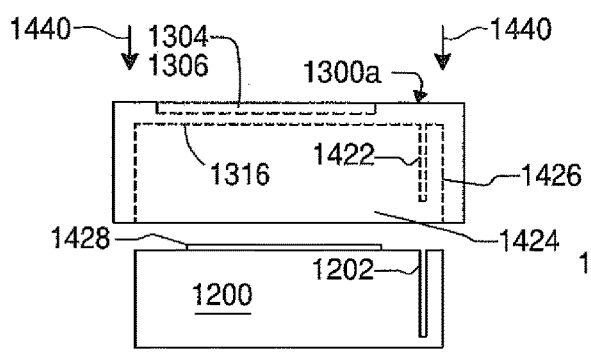
FIGS. 15A to 15C are diagrams illustrating a card reader configured with a legacy card reader using exemplary conversion techniques.
Figure 15B:
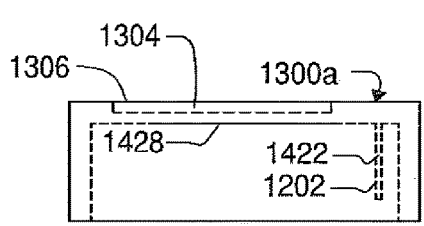
Figure 15C:
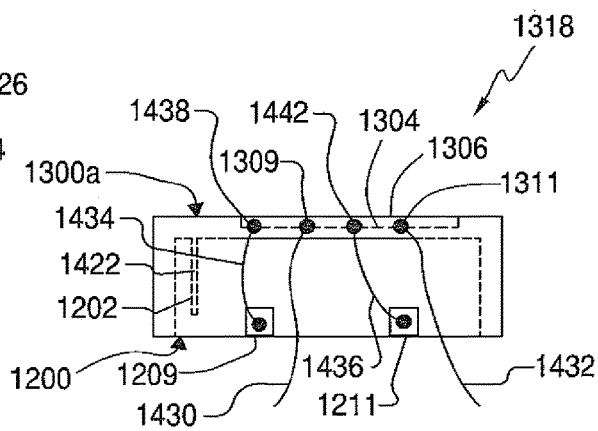

FIG. 15A is a front view diagram of legacy card reader 1200 and a reader 1300a, which is a conversion modification of reader 1300 described hereinabove. Reader 1300a includes a member 1422 that extends or protrudes from an interior surface 1316 of reader 1300a, a front panel 1424, and a plurality of sidewalls 1426. In an exemplary embodiment, protruding member 1422 extends perpendicularly away from interior surface 1316. Member 1422 is insertable into slot 1202 of legacy card reader 1200. Member 1422 and sidewalls 1426, which are shown in phantom behind front panel 1424 and guide reader 1300a to cover legacy reader 1200, although another embodiment may not include extension 1422 and/or sidewalls 1426. An adhesive 1428 may be positioned between legacy reader 1200 and reader 1300a to secure reader 1300a to legacy reader 1200. Reader 1300a and legacy reader 1200 may also be secured by fasteners, heat staking, and other securing systems. Reader 1300a is positioned into sliding engagement with legacy reader 1200, as shown by arrows 1440; i.e., reader 1300a is slid over legacy reader 1200 while protrusion or member 1422 is slide into slot 1202. Once reader 1300a and legacy reader 1200 are positioned as shown in FIG. 15B, reader 1300a and legacy reader 1200 form a combined reader assembly 1318. FIG. 15B is a front view diagram of combined reader assembly 1318.

FIG. 15C is a rear view diagram of combined reader assembly 1318 showing a wiring configuration for connecting power and data lines between legacy reader 1200 and reader 1300a. Reader 1300 includes a power out connector 1438, a data connector 1442, and reader assembly 1318 includes an external power line or connection 1430, an external data line or connection 1432, an interconnecting power line or connection 1434, and an interconnecting data line 1436. External power line or connection 1430 provides a function similar to power feed line 1208 of magnetic swipe or legacy reader 1200, and external data line or connection 1432 provides a function similar to data feed line 1210 of magnetic swipe or legacy reader 1200. External power line 1430 provides power to reader assembly 1318 through power connector 1309, and external data line 1432 provides external communications, for example, from a server, processor, or other functional or operational device, to reader assembly 1318 through data connector 1311. Interconnecting power line 1434 extends between power out connector 1438 and power connector 1209 and interconnecting data line 1436 extends between data connector 1211 positioned on of magnetic swipe or legacy reader 1200 and data connector 1442 positioned on reader 1300a, and provide power and data tie-ins, respectively, between of magnetic swipe or legacy reader 1200 and reader 1300a. Line 1434 connects between a power-out connector 1438 of reader 1300 and power-in connector 1209 of legacy reader 1200 to provide a power tie-in, connection, or link between the readers 1200 and 1300a, and line 1436 connects between the a data-out connector 1430 and the data-in connector 1211 to provide a data tie-in, connection, or link between the readers 1200 and 1300a.

Figure 16A:
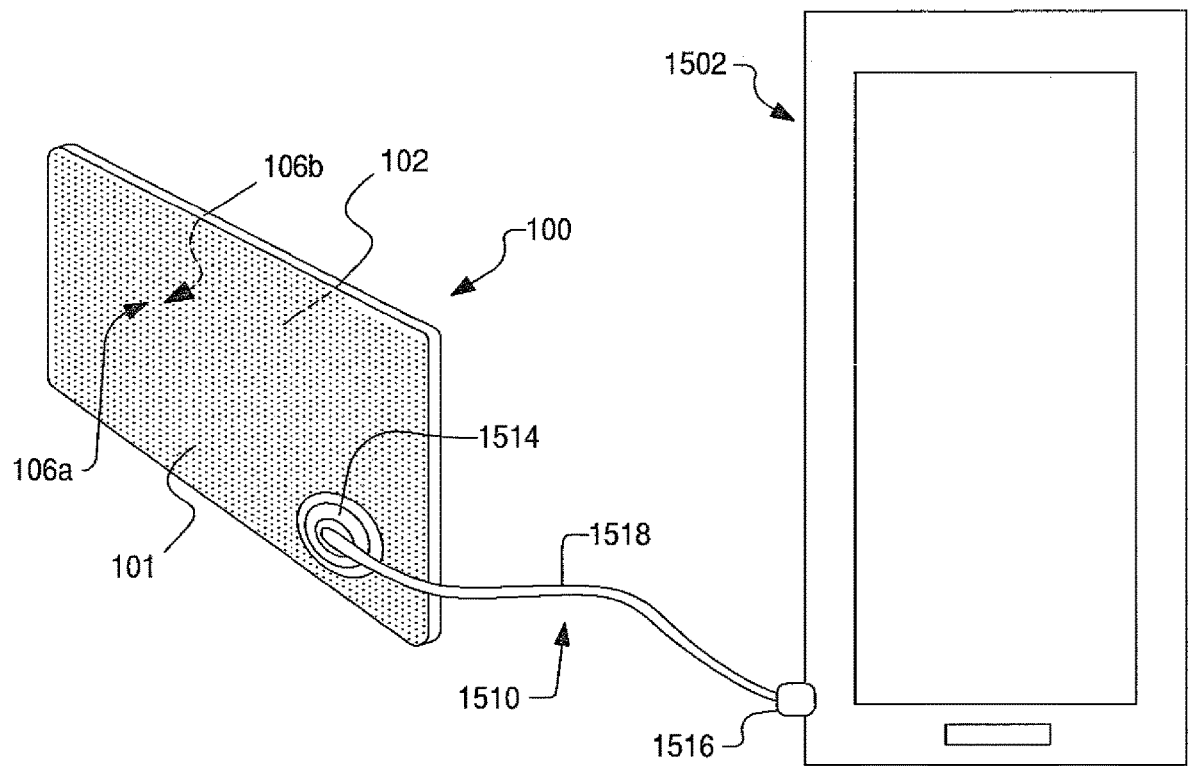
FIGS. 16A to 16E are diagrams of tethers in accordance with an exemplary embodiment of the present disclosure.

FIG. 16A is a diagram of a tethered version of user card 100 according to an exemplary embodiment, although embodiments of card 100 can be configured as tethered or non-tethered versions. A tether device or patch cord device 1510 can connect to another device 1502, which includes a head end 1514 that interfaces with card 100 and a tail end 1516 that connects to device 1502 through an interface such as a serial port of device 1502, and a cord 1518, including wiring and/or optical fiber, configured to connect and to attach head end 1514 to tail end 1516. Tether device 1510 communicates with one or more layers of card 100, e.g., the layers described hereinabove. Thus, tether or tether device 1510 may communicate optically, magnetically, aurally, or through other methods.

Tether device 1510 can be used to gather data from card 100 and to pass data to another device, such as device 1502. In addition to tether 1510 is configured to pass data and/or power to card 100 from device 1502. Tether 1510 can also be used to configure and/or reset card 100. Device 1502 can include, for example, a cell phone, a smart phone, an electronic tablet, a laptop computer, a transformer device providing transformed power, a vehicle having a compatible or adaptable interface, and other devices. Contemporary versions of many devices 1502 may include one or more ports, such as FireWire™, USB, HDMI, 100faseT, or some other type of serial or parallel port, which would serve as the interface for tail end 1516 of tether device 1510.

While FIG. 16A shows an embodiment in which tether device 1510 is magnetically attached to major surface 101, tether device 1510 can be secured to or provided adjacent to major surface 101 or major surface 102 of card 100 in a number of ways. Such attachments include providing a suction cup type attachment, a magnetic attachment, or both on tether head end 1514 to attach to card surface 101 or card surface 102, including or utilizing a physical bracket or clamp holding a surface of tether 1510, such as head surface 1522a or 1522b, described in more detail hereinbelow, to surface 101 or surface 102 of card 100, including or utilizing a clip that holds a head surface to either surface 101 or surface 102, or some other mechanism that maintains relative positioning between card 100 and tether 1510. In another exemplary embodiment, a tether may include a plurality of tether head ends and each of the tether head ends are configured to be positioned adjacent to either surface 101, surface 102, though the tether head ends may individually be attached to either surface so that communication via surface 101 and surface 102 may occur simultaneously. In yet another exemplary embodiment, a portion of tether 1510 can be hand held against card surface 101 or card surface 102. In a further embodiment, tether device 1510 can be part of a dual sided tether allowing for redundancy or higher data transfer speeds, and a clip, clamp, or bracket can hold the plural surfaces of such a tether to each side of card 100 at the same time so that communication occurs simultaneously through card surface 101 and card surface 102. A clip could attach to head end 1514 of tether 1510 and become immobilized through magnetics to allow for rapid and simplified disconnection of head end 1514 from card 100.

Figure 16B:
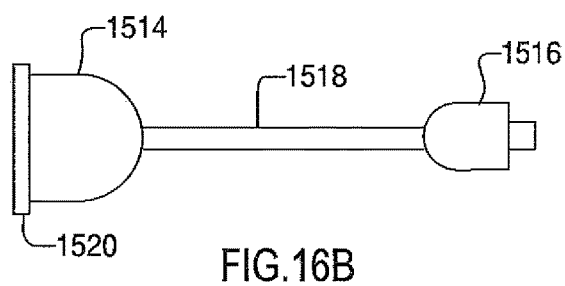

FIG. 16B shows a side view diagram of an exemplary embodiment of tether 1510. Tether device 1510 can have an angled configuration (e.g., right angled) where head 1514 meets cord 1518 or no angle at all such as an in-line configuration. The tether shown in FIG. 16B is an in-line tether including portion 1520 including a magnetic element, which can be a permanent magnet or electromagnet, or ferromagnetic material that is attracted to a complementary ferromagnetic material, or a permanent magnet or electromagnet can provided in card 100. These complementary magnetic materials are formed of a shape and positioned such that tether head 1514 attaches to a predetermined area of major surface 101 or 102. In another exemplary embodiment, magnetic-out pixels 109 may generate an attractive magnetic field that may be detected by moving head end 1514 in a region proximate to card surface 101 or card surface 102.

In an embodiment, light receiving detecting units 126 or 128 working with processor 110 can recognize the approaching tether using either image recognition or optical communication between card major surface and tether head surface and accordingly illuminate, e.g., by emissions from light emitting pixel elements 107, or otherwise indicate on the approached major surface 101 of card 100 an area of card 100 including the magnetic portion to which to attach tether head 1514. The tethered version of card 100 can draw power from host device 1502 to allow card 100 to extend operation of power intensive elements, such as display-related elements. For example, tether head 1514 can house a wireless power delivery mechanism, such as a solenoid in the tip of the tether that interacts with a coil (not shown) embedded in card 100 to provide a charging current. The tether can be modular. In an embodiment with tethering enabled, server 200 (FIG. 1) can determine whether card 100 is in proximity to a designated cell-phone or mobile device. For example, card 100 is more likely to be legitimately used by an authorized user if one or both designated devices are in proximity, and card 100 can be disabled if not in proximity to another authorized and associated device.

Figure 16C:
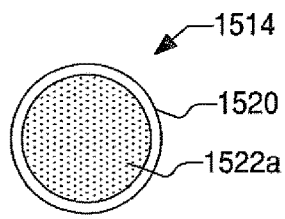

FIG. 16C is a front view diagram of tether 1510 showing head surface 1522a of head 1514. In an exemplary embodiment, head surface 1522a can include optical elements and/or magnetic elements, such as intermixed arrays of light emitting pixels, light receiving/detection pixels, magnetic-in pixels and magnetic-out pixels similar to magnetic and optical elements present below major surfaces 101 and 102 of card 100, as described hereinabove. Tether head 1514 includes conversion circuitry (e.g., microelectronics) that can convert a serial or parallel data stream received from a serial port in tail end 1516 to data that is transmitted over optical and/or magnetic based channels established between card 100 and tether 1518. Tether head 1514 is also able to convert received optical and/or magnetic data from card 100 to a serial or parallel data stream to be transmitted to the interface at tail end 1516 of tether 1510. When attached to major surface 101 or major surface 102, card 100 and tether 1510 perform a magnetic and/or optical handshake in which tether 1510 passes card 100 identification information and optically and magnetically communicates with connected device 1502. Hence, tether 1510 can deliver industry standard communications formats at the tail end 1516 through conversion electronics powered in and housed in tether 1510, for example, in head 1514. It is to be understood that head surface 1522a may include any subset of intermixed pixel arrays, for example, only light emitting pixels and light receiving/detection pixels. Tail ends of tethers, such as tail end 1516 shown in FIG. 16B, can include such common devices as ear buds, headsets, speakers, etc., for example, instead of a serial or parallel interface.

Figure 16D:
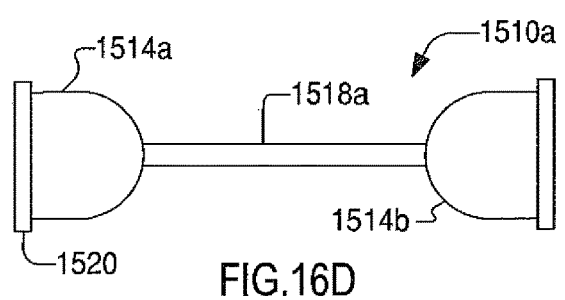

FIG. 16D is a side view diagram of a tether 1510a that includes heads 1514a and 1514b at respective ends thereof, connected by a cord 1518a. Each of heads 1514a and 1514b are substantially identical and can be the same or similar to head 1514 described hereinabove. The present embodiment can be used to provide an optical connection between card 100 and one head end 1514a of tether 1510a, and an optical connection between the other head end 1514*b* of tether 1510*a* and another optical and/or magnetic interface. For example, tether 1510*a* can be used to transfer optically transmitted data from card 100 to a cell phone or a computer display including an intermixed array (not shown) similar to card 100. In an exemplary embodiment, each head end 1514*a* and head end 1514*b* includes conversion circuitry (e.g. microelectronics). For example, one or more CCD pixels provided at one tether head end 1514*a* can receive one or more photon streams received from card 100 and convert the received photon stream to an electrical signal, which in turn is converted back to a photon stream by conversion circuitry at the other tether head end 1514*b*. A similar conversion can be made in the opposite direction from tether head end 1514*b* to tether head end 1514*a*.

Figure 16E:
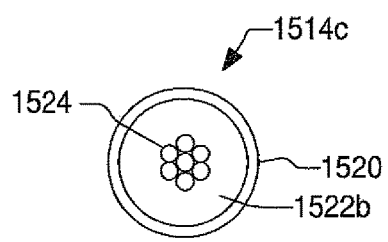

In another embodiment, tether 1510*a* can include optical channels through the entire length of cord 1518*a* such that the conversion circuitry described hereinabove is not needed. FIG. 16E is a front or rear side view of a head 1514*c*, where a surface 1522*b* of head 1514*c* includes at least one optical fiber 1524. While FIG. 16E shows a bundle of 7 individual optical fibers, head 1514*c* can include more or less fibers.

In an embodiment, card 100 and system 1 allow for cloning cards. Card-to-card cloning can be appreciated by considering the cards shown in FIGS. 10B-10C, for example, in which card 100*d* is the card to be cloned, or "original" card, and card 100*c* is a destination card in accordance with the present disclosure. FIGS. 17A and 17B illustrate an exemplary legacy card 1600 that can be cloned using card 100. As shown in FIG. 17A, a first major surface 1601 of legacy card 1600 includes an indication that it is a driver's license, an image of the licensee 1602, an image of the licensee's fingerprint 1604, a smaller image of the licensee 1606, a retinal scan 1608, and other information and images such as identification information, an expiration date, a watermark 1616, and/or a hologram 1618. FIG. 17B illustrates a second major surface 1610 of legacy card 1600, which can include a magnetic stripe 1612, a bar code (not shown), a watermark 1616, and other information typically found on the reverse side of a license. Of course, FIGS. 17A and 17B show but one type of the plurality or seemingly endless variety of cards that can be cloned using card 100 and system 1 according to the present disclosure. The types of "clone-able" cards include other cards 100, credit cards, bank cards, business cards, brokerage cards, secure identification cards, entry cards, and others. As another example, a Social Security card could be among the items stored in card 100 or accessible to card 100 so that card 100 and system 1 can serve as secure storage and displayer of official single- or multi-identification cards or displayable information.

Each clone operation is tracked by both the transmitting or providing card 100 and the receiving card 100 so that a clone "trail" may be detected to help assure only authorized cloning is performed. Parents, relatives, friends, partners, etc. may wish to clone a limited portion of their card for use by another. Because card 100 includes the capability of acquiring biometric information from the users of card 100, card 100 may require biometric information from an authorized holder of card 100 to permit cloning. This biometric data will be included as part of the clone "trail" so that authorizations are recorded for traceability. The order of cloning is also tracked as part of the clone "trail" so that each parent card 100 is known by a child card 100. In an exemplary embodiment, each card 100 has its own unique identifier for traceability. As can be seen, card 100 and system 1 can provide positive, certain, reliable, and encrypted information, such as identification information, for the user.

FIG. 17C is a diagram illustrating the cloning operation being performed between card 100 and legacy card 1600. Card 100, being in full size credit card conformation, is capable of capturing all art, text, graphics, images, holograms etc. present on first major surface 1601 of card 1600 using first light detection unit 126 or second light detection unit 128 below major surface 101 or major surface 102, respectively, of card 100 facing first major surface 1601, as indicated by a plurality of arrows 1614 between the cards. After capturing the information of first major surface 1601, card 1600 is flipped and the process is repeated to capture information of second major surface 1610. The captured information of card 1600 can be stored in card 100 and/or server 200 (see FIG. 1), for example, in memory 114 of card 100 or in a database 250 accessible by transaction/ID/access card management unit 234. When selected, the captured images of major faces 1601 and 1610 of card 1600 can be displayed with mirror-image correction and can be displayed simultaneously with the mirror-image correction so that the result is a digital clone of analog legacy card 1600. It is to be understood that some legacy cards may require capture of only a single side of the card. In this situation, an embodiment of card 100 can be configured to display the captured card single side image on only one major surface 101 or 102 of card 100, or both major surfaces 101 and 102 of card 100 can display the same single side captured image.

Magnetic stripe (or magnetic layer) used to communicate or handshake while cloning helps keeps counterfeit devices out of the stack. In other words, the combination of an optical image in close proximity to card 100 and magnetic stripe makes it very hard for public enemy to get into the mix, without making a complete counterfeit device. Without the proprietary encryption combinations disclosed herein, when the counterfeit is asked to handshake and set up its magnetic stripe or magnetic image using portions of the whole surface, for the second stage handshake, it will fail. Additionally, there are typical standards in data processing, including encryption during transmission and reception. Card 100 and system 1 disclosed herein, in some embodiments, emphasizes initialization of a connection and just the primal or initial handshake. These steps can also incorporate the aural embodiments described throughout this specification, with respect to piezoelectric elements included in card 100, adding the aural tertiary function of sound out and in, across the entire surface on both sides of card 100.

In another embodiment, a card pertaining to medical insurance or other medical products services can be emulated or cloned using card 100 and system 1. In this case, the medical card may well not have any magnetic stripe, but instead includes a bar code, Qr code, or the like in the place where a magnetic stripe may be, perhaps on the back of the card. It is possible that an emulation of such a card will not be properly displayed, especially if both sides are required to be imaged. Typically, such cards are read by medical support personnel who may be in a hospital environment or small office where magnetic stripe equipment may not be available, but optical capture of essential images may nevertheless take place.

Such medical-related cards are further often required to be cloned. In the United States, for example, health insurance is often linked to employment so that in any given household, though one person may primarily be the owner of the card, many others may be required to carry them.

Benefits to secure transactions in the case of medical cards may not only include verifying that the card user is authorized, but also in the case of avoiding medical mistakes. In accordance with an exemplary embodiment, a certain procedure or diagnosis may be securely associated with a certain person, even if the person is unconscious or unresponsive, as in the case of an anaesthetized person scheduled for surgery or an accident victim who has a known condition. In such a case, the person's biometrics can easily be made available, for example, a fingerprint. Thus, biometric and other identification information may be verified on the way to the operating room such that corrective surgery to the right limb of the right person, for example, is being applied. The same card may still continue to contain all of the information pertaining to diagnosis, provision of secondary medical treatment such as physiotherapy, allergies, prescriptions, and so on. A person thus securely tracked could potentially even be moved last-minute to a different facility without fear of losing track of information. Naturally the same virtual card, complete with other stored cards, could also be used by an enterprising user to negotiate treatment rates and other details while still in a medical waiting room or simply arrange to pay wirelessly for continued parking while the procedure is ongoing, or make appropriate purchases. Since the device can, as mentioned elsewhere, serve purposes of value to a hospital, an incentive exists for the same hospital to allow patients to use the device in such a way as to not overly interfere in the way known to cell phones in such environments. The hospital may have power to restrict use of the device, if desired or necessary, by limiting access to local wireless and wired networks, or by restricting the types of communication conducted over local wireless and wired networks.

As technology advancements evolve, card 100 will have more pixel density (light emitting, light receiving, magnetic-out, magnetic-in, piezoelectric-in, piezoelectric-out, etc.) per unit of measure (e.g., square inch). As such, newer versions of cards 100 can always receive data from older versions of cards 100. Compatibility for basic card-to-card communications (i.e., face-to-face) is assured, since increased pixel density requires only a knowledge of how to align to prevent misalignment, as may be appreciated by considering card 100 and a card 100', shown in FIG. 18A, in which the pixel densities of the two cards is unequal. As shown in FIG. 18B, an older card 100 in accordance with the present disclosure can have a pixel density of X by Y and a newer, "next generation" card 100' can have a pixel density, for example, of 10X x 10Y, as illustrated by the relatively darker shading of card 100'. Newer card 100' can auto-program for compatible data transfer by array assignment in blocks. For example, as shown in FIG. 18B, one pixel 1700 of card 100 can translate to 100 pixels 1710 of card 100'.

In an embodiment in which two cards 100 or a card 100 and other device including technology similar to card 100 have different sized major surfaces, data can spread across the entire surface of the smallest of the bidirectional displays, i.e., the larger display automatically down-sizes operation of pixels for communication or display to meet the smaller bidirectional display up to pixel-for-pixel in a better aligned situation, or a less number of pixels present in the overlapping areas, by self-sizing and auto-sizing the larger bidirectional display to the smaller bidirectional display as illustrated in FIG. 18C. As shown in FIG. 18C, smaller card 100 is placed in an overlapping manner against a larger surface 100i including display technology similar to card 100. The transfer of data can use a maximum number of available communicative pixels based on the least common denominator of available communicative pixels, alignment, etc.

In this way, the present disclosure provides a device that, while keeping all the POS and internet marketing capabilities, gives the user an incentive to adopt this specific form factor with maximal two-way display in place of other solutions.

The aforementioned example represents perhaps one of the only technologies that allows the form factor of the card to increase its throughput 100 fold as technology evolves, while readily enabling communication with older cards. The architecture of data transmission and reception means does not have to change, only the density changes (until such time as it is desired to change the individual pixel emission or individual light detection (e.g., CCD) collection algorithm and even then, the older methods can still be automatically supported by including an algorithm to translate or change the communication of an older card 100 to a form understood by a newer card, such as card 100'). As densities grow ever higher across the surface of card 100, it becomes more and more possible to increase the presence of invisible water marks, pixels which do not detract from an image, as the human eye cannot detect them. However, advanced software can detect invisible emissions from pixels intended to provide a unique identifier for the image and, authentication methodologies, such as water marking. One way to accomplish this method is to use frequencies which are highly specific for the pixels which represent the water mark. Another method is to know, when the image is properly rasterized, which pixels are intended for human viewing and which ones are to be interpreted as more than the image, forming the water mark.

Returning now to FIG. 1, the functions carried out by server 200 are now described in more detail. Server 200 includes a processor 228, a plurality of functional units, and database 250 for carrying out various functions of system 1. The functional units include card/user authentication unit 230, value analyzing unit 232, transaction/ID/access card management unit 234, tracking unit 236 that tracks card usage, patterns and other historical information related to card 100 and the user, a docking unit 238 that manages docking of card 100 with various devices, and a data transfer management unit 240 that manages data exchange functions not handled by card 100, although embodiments of server 200 can include additional or fewer functional units.

The card/user authentication unit 230 handles processes related to identification, login, logout, and related security features. In an exemplary embodiment, card/user authentication unit 230 can require a "hard login" by the user that includes taking a series of biometric readings from the card user via authentication unit 142 of card 100, which can be as numerous as necessary and available, and can be performed in a given sequence, to uniquely identify the user with essentially perfect certainty and log the identified user into card 100 and the services supporting card 100. As a user desires or as a system requirement, which could or would be periodic, for example, as a once a day event, while further use of card 100 (each actual use) still may require a minimum contingent biometric login, i.e., a "soft login" as compared to a hard login, so as to add to the security aspect of card 100. Should the user drop card 100 or lose it, based on time elapsed from that event, proximity (distance) from card 100 as detected by other docked elements the user carries, or a predetermined number of unsuccessful soft login attempts, card 100 may partially or fully log out and go into a fully secure mode requiring the maximum amount of login steps to recover the functionality of card 100.

In an exemplary embodiment, card 100 login can migrate into computer and electronic device screens where, once the user has hard logged into card 100, logging into machines during the hard log period (e.g., one day thereafter) may be accomplished with a swipe or holding card 100 to another computer or other electronic device's screen, when and where designated (e.g., the larger screen of a computer or other device can tell a user where to place card 100 for logging or other data transfer). As such, the assurance from card 100 and the assurance from the service supporting card 100 that the user is identified, passes in a simple step rather than a complex and time consuming series of steps. The user takes the complex logging steps perhaps once each day, and sets how long these complex logging steps hold until again required, or for what size or type transaction the user wishes card 100 and an associated service to demand the complex logging steps, versus a shorter form of logging (less biometric verification). Thereafter, logging to services through a machine, such as that presented as one traverses a network, can be accomplished with the hard and soft logging functions of card 100, even to the extent of satisfying and replacing login tests such as the CAPCHA™ (Completely Automated Public Turing test to tell Computers and Humans Apart), as obsolete. In an exemplary embodiment, card/user authentication unit 230 can have card 100 take at least one, and preferably two or more forms of biometric readings from users via authentication unit 142 of card 100 as card 100 is used for any transaction, essentially in near real time or real time, and can shut card 100 down and halt a transaction if the affirmed (confirmed) biometric data is not present within a preset minimum of time, such as within a few seconds of the card read or write, to guard the user from identity theft or any other form of fraud. The level or hierarchy of biometrics required for a transaction can be set by system 1 and/or as a preference of the card user, or a combination of both system 1 and card user. For example, a user can set a hierarchy requiring at least one more biometric type reading than a hierarchy of biometric reading(s) set by system 1. Furthermore, a user can set a first transaction level, which may be access to card information, the ability to clone certain card information, a financial transaction, etc., that requires a single biometric and a password. A higher level access to card information, the ability to clone more card 100 information, a higher value financial transaction, etc., may require a more detailed login procedure involving two biometric inputs and a more complex password. Each level of access to card 100 requires an increased level of identification and the risk to an unauthorized user of being caught and reported automatically by card 100.

As can be seen, card 100 and system 1 disclosed herein allow highly secure use of card 100 and all of its capabilities through the heavy, extensive, or multi-step login procedure performed less frequently and the lighter, less-extensive login procedure performed more frequently, for example, as frequently as with each transaction. The heavy login procedure, although time consuming, thereafter, leverages the fact that the device will not fully log off from system 1 unless the user does not again use card 100 card with the lighter login procedure within a given amount of time, or unless proximity alarms or any other alarm (such as a tamper alarm) are tripped, forcing the heavy login procedure to be undertaken again. Because all procedures can be encrypted and are complex, such as a high definition read of a finger print, the heavy login procedure being perpetuated throughout the day under these specific conditions provides a considerably greater degree of protection to the user compared with merely requiring the lighter login procedure per transaction, without the existence of the heavier login procedure.

In another exemplary embodiment, Kirlian examination of an object can be added to the biometric login function handled by authentication unit 142 of card 100 and/or card/user authentication unit 230 of server 200. In this embodiment, card 100 can provide charged coupled device (CCD) or light reading elements and magnetic read elements, which together with authentication unit 142 and/or card/user authentication unit 230, can closely examine the spectrum of an object, such as a finger, to the extent of mapping with a video and with still images, the Kirlian field of an object, or the magnetic field of an object, or both. That is, by close examination of still shots, i.e., comparatively analyzing shots taken in the order and time differential the shots were taken, and video frames of the object's Kirlian field, or magnetic field, or both, authentication unit 142 or card/user authentication unit 230 can draw conclusions about that object. One such determination is the presence of a pulse, by way of the action of capillaries and heartbeat of a living mammal. Another determination is analyzing a fingerprint or the Kirlian field of the user's finger. Another determination is the micro-pulse placement within a capillary system which is unique per individual just like a fingerprint, and the overlaying maps of micro-pulse, capillary, and fingerprint are equally unique, per individual. By combining these types of data with other metrics, such as capillary pattern, the login function can take this combination of data and process it to decide if the threshold for pass (or fail/deny), has been met. It should be noted that these same features provide card 100 with the ability to detect the presence of the user of card 100 in a "are you still there" mode. If the user has placed card 100 in a pocket, wallet, or other location where biometric information is no longer available, card 100 may assume that the user is no longer actively using card 100, and card 100 may then enter a standby or shutdown mode while automatically locking card 100 against use until appropriate biometrics are available.

The value analyzing unit 232 can carry out tasks normally associated with the user, such as having to cut, carry, or even scan coupons and other discount codes, and automatically determine whether offers are locally available. In an exemplary embodiment, when the user is in a given location, value analyzing unit 232 can utilize location information generated by location unit 144 of card 100 and search network 210 to determine local or nearby stores that have deals or other offers and generate and communicate a message to card 100 to alert the user to such other opportunities pertinent to the transaction at hand or a transaction the user has indicated as being one in which he/she is about to undertake. Accordingly, the user can be kept aware of details relating to any deals that are available in the surrounding area while the user is in the process of shopping and purchasing goods and services. In an embodiment, value analyzing unit 232 can notify the user of offers or opportunities related to a transaction in the process of being made, but not yet finalized, which are not necessarily local to the user's geographic location or in a brick and mortar venue.

In an exemplary embodiment, value analyzing unit 232 or alternatively, a service within card 100 can provide numerous filters or prerequisites or preferences that a user can set to indicate willingness to accept certain information provided by sellers or brokers while filtering out a wide variety of what would be considered unwanted advertisement(s) as part of the service supporting card 100.

Disclosed card 100 and system 1 allow for simple and wide-ranging agreements that personalize the content of user-desired information. For example, when a card user creates a want list, or hears from system 1 that an item on a shopping or want list is more than 80 percent off, the user can be warned via card 100 that an object which meets with his/her criteria is available and within reasonable proximity, proximity being yet another factor the user can set as a filter which may be distance to the item in question. In another embodiment, when a card 100 user finds a specific offer for a specific item, card 100 can provide automatic notification to the user of companies participating in the offer, depending on whether the participating companies have signed onto the offer and provide such information via the internet or a wireless network.

Transaction/ID/access card management unit 234 of server 200 carries out credit card functions (e.g., management of credit card functions) for card 100. In an exemplary embodiment, card 100 can have an overall conformation that is compatible with credit card and other legacy embedded card swipe or read mechanisms. Card 100 can thus access older technology of magnetic swipe such that anything "magnetic swipe" or any legacy slot type insert magnetic reader is instantly compatible. Because there is a display, a lot of boundaries become "unbounded." It becomes unnecessary to display the credit card number, for example, and the display function of card 100 may be set to display, for example, the last 4 digits only. If a user selects a function of card 100, the user can see all available information, if and when needed. Bear in mind, one use of card 100 is to emulate all hard cards, front and back, first through scanning face to face, then, by way of the display.

FIGS. 20-23 show an exemplary embodiment of a card 100*j* that interfaces with a legacy reader while in a fixed position. As described hereinabove with respect to card 100 and previously discussed variations of card 100, card 100*j* includes light detecting pixel elements 148 and magnetic-out pixels 113. By implementing a legacy stripe emulation module and a legacy stripe emulation process, card 100*j* is able to interface with a legacy card reader while remaining in a fixed position. Because card 100*j* is able to obtain data from many sources, such as RFID, optical, magnetic, piezo-electric, etc., card 100*j* is able to prepare and/or convert this data to a form that can be read by a legacy card reader 212.

Figure 22:
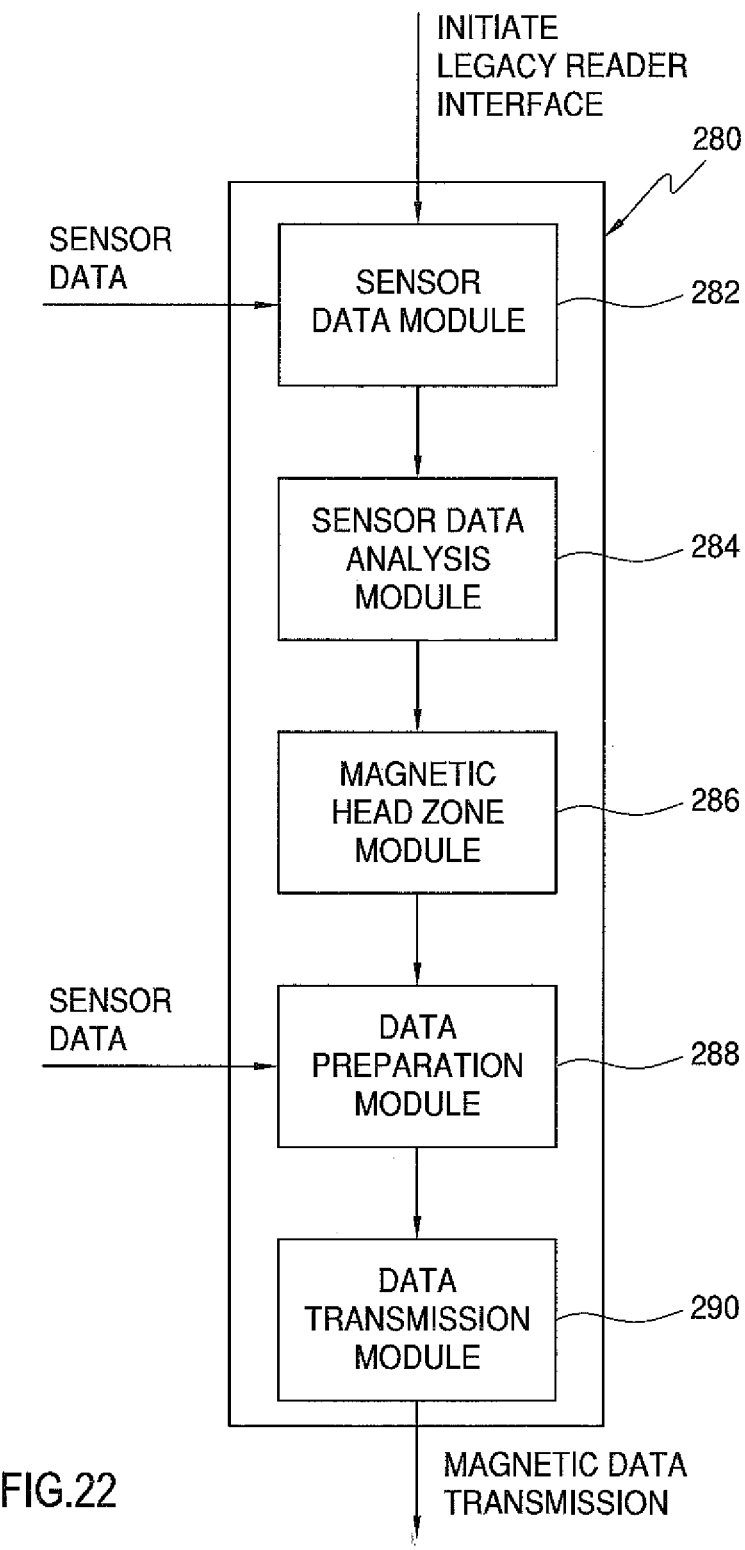
FIG. 22 is a legacy stripe module for controlling the card of FIG. 20 to enable the card to interface with a legacy card reader in accordance with an exemplary embodiment of the present disclosure.

Referring to FIG. 22, a legacy stripe emulation module is shown and indicated generally at 280, which is compatible with the card readers shown in FIGS. 13-15. Legacy stripe emulation module 280 includes a sensor data module 282, a sensor data analysis module 284, a magnetic head zone module 286, a data preparation module 288, and a data transmission module 290. Legacy stripe emulation module 280 may be partially positioned or located in processor 110, magnetic-out layer 190*a* and/or 190*b*, or other suitable places in card 100. Legacy stripe emulation module 280 may receive an initiate legacy reader interface signal, causing sensor data module 282 to begin operating. The initiate legacy reader interface signal may be a signal from a module (not shown) in processor 110 that periodically causes legacy stripe emulation module 280 to function and seek out or recognize a legacy card reader such as legacy card reader 1200, or a user may select a legacy card reader function of card 100, which then transmits the initiate legacy reader interface signal to sensor data module 282.

Once sensor data module 282 receives the initiate legacy reader interface signal, sensor data module 282 begins accepting data from the various sensor pixel element types positioned in card 100, for example light detecting pixel elements 148 shown in, e.g., FIG. 7B, though other sensor inputs may also be used. Data received from one or more pixel element types is configured to be analyzed, and then transmitted to sensor data analysis module 284. Sensor data analysis module 284 analyzes the data received from sensor data module 282, seeking a magnetic read head, such as magnetic read head 1212. Sensor data analysis module 284 continues seeking the magnetic read head either until the user of card 100 stops operation of legacy stripe emulation module 280, until a predetermined time interval has passed without finding the magnetic read head, or until the magnetic read head is located. Once the magnetic read head is identified from received sensor data, the location of the magnetic read head, which may be in terms of coordinates with respect to various pixel elements on card 100, is transmitted to magnetic head zone module 286. Magnetic head zone module 286 uses the location information provided by sensor data analysis module 284 to define a zone of magnetic-out pixel layer 190*a* or 190*b* of card 100 to be an interface location or pixel actuation zone for communication between card 100 and the magnetic read head. Once the interface location or pixel actuation zone is defined, magnetic head zone module 286 transmits a signal to data preparation module 288 that sensor data to be transmitted to the legacy card reader may be received. Data preparation module 288 receives sensor data from one or more sensors on card 100, such as RFID data, optical data from light detecting pixel layer 186*a* or 186*b*, aural data from piezo-electric-in pixel layer 194*a* or 194*b*, etc., and translates or prepares the received data to be transmitted to magnetic-out pixels 109 located in the interface location or pixel actuation zone. The data to be transmitted to the magnetic read head is then passed to data transmission module 290, where the data is converted to magnetic data for transmission to the magnetic read head.

Figure 21:
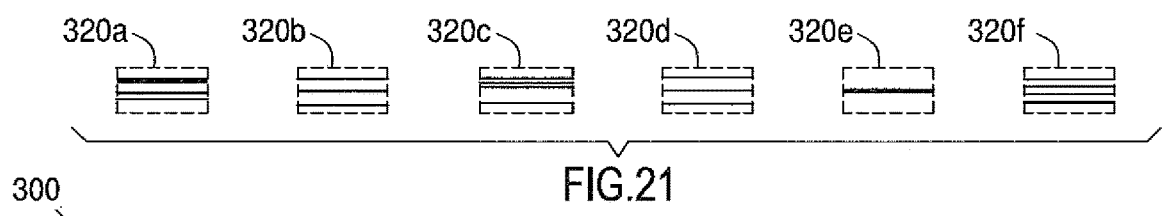
FIG. 21 is a stylized view of a pixel actuation zone of the card of FIG. 20, showing the progression of a data stream in the pixel actuation zone in accordance with an exemplary embodiment of the present disclosure.
Figure 23:
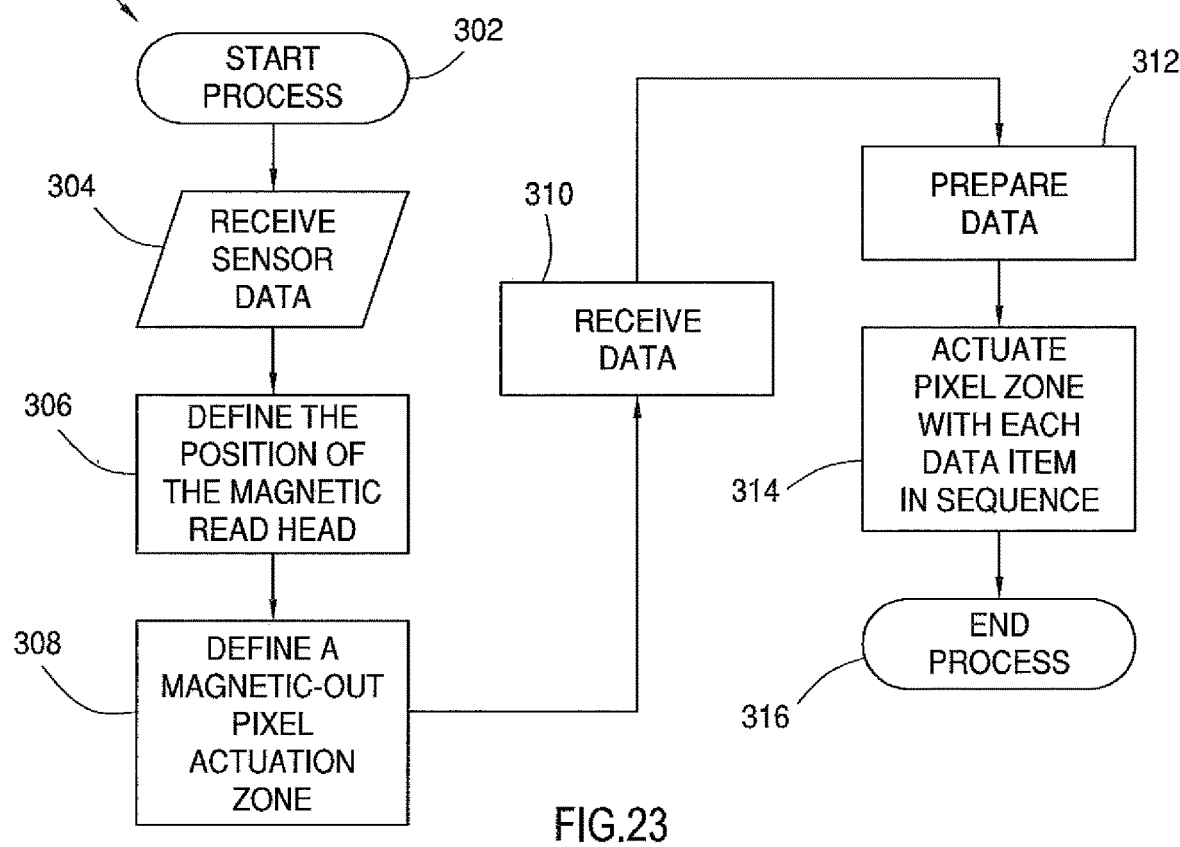
FIG. 23 is a process of the legacy stripe module of FIG. 22 for controlling the card of FIG. 20 in accordance with an exemplary embodiment of the present disclosure.

Referring to FIG. 23, a legacy stripe emulation process is shown and generally indicated at 300. Legacy stripe emulation process 300 may be located in one or more portions of card 100 shown in FIG. 2, and may be distributed at least partially in one or more of the modules of legacy stripe emulation module 280 shown in FIG. 22. Legacy stripe emulation process 300 begins with a start process 302, where processor 110 sets any required values and registers for the remainder of process 300. Process 300 then moves from start process 302 to a receive sensor data process 304. In process 304, optical data from first light detection unit 126 and second light detection unit 128 is provided to sensor data module 282, which may include a processor of card 100, such as processor 110. Process 300 then moves from receive sensor data process 304 to a magnetic read head definition process 306. In magnetic read head process 306, sensor data analysis module 284, which may include processor 110, uses the information acquired during process 304 to define or find the position of a magnetic read head of the legacy card reader. Once the position of the magnetic read head has been identified, process 300 moves from magnetic read head definition process 306 to a define pixel actuation zone process 308. In process 308, using the position of the magnetic read head, magnetic head zone module, including processor 110, defines a magnetic-out pixel actuation zone 320. Process 300 then moves from define pixel actuation zone process 308 to a receive data process 310. In receive data process, one or more sensor layers receive or acquire data from one or more sources, such as an RFID source, an optical source, or other source that card 100*j* has the sensors to detect. Once data is received, legacy strip emulation process 300 passes control from receive data process 310 to a prepare data process 312, where data to be sent to the magnetic read head is prepared for transmission by data preparation module 288. From prepare data process 312, process 300 moves to an actuate pixel zone process 314, where each item of data is transmitted to magnetic-out pixel actuation zone 320, programming zone 320 for each data item, which is performed by data transmission module 290. FIG. 21 shows a stylized sequence of magnetic-out pixel actuation zone 320, with 320*a*, 320*b*, 320*c*, 320*d*, 320*e*, and 320*f* representing programming of magnetic-out pixel actuation zone 320 with sequential data elements or items that can represent numbers, letters, characters, etc. Because of the speed of actuation of pixel actuation zone 320, which is in a fixed or static location on card 100*j*, a legacy reader treats card 100*j* as though it is moving, though it is positioned in a fixed relationship with the legacy card reader in this embodiment. Once all the data has been transmitted through pixel actuation zone 320, process 300 moves from actuate pixel zone process 314 to an end process 316, which represents the end of data transmission through actuate pixel zone process 314. Because of the strength of the magnetic read head of a legacy card reader, card 100 can be positioned to detect a feedback from the legacy card reader with respect to whether the transmission was properly received by the legacy card reader. If the signal was not received, or an error occurred, processor 110, by using the pixel layers described herein, can be configured to automatically transmit the same data stream again automatically without intervention by an operator, or processor 110 can prompt the operator through a visual or aural output, such as from light emitting pixel layer 198 or piezoelectric-out pixel layer 196*a* or 196*b*, that the transmission failed so that the operator can authorize a re-transmission or other action. As noted hereinabove, such transmission of magnetic data may also be automatic at a plurality of levels, such as low, medium, and high with respect to the intensity expected by the magnetic read head, and the information may be repeated in a first direction and a second direction. As noted hereinabove, the value of such a process is to accommodate variations between magnetic read heads, including wear and tear on the magnetic read head.

An embodiment of card 100 and system 1 allows for automated access to the contents of servers on networks by way of mining data related to an item (e.g., goods, services, rentals, or other item associated with a financial transaction) in a pending purchase of or an item the user may be considering in the process of purchasing, via communications unit 118 and network 210, and rather than only taking information from server 200, can provide information to server 200 to be added to previous information, redirect the information to another end point on network 210, or just redirect information from one place to another with the assistance of server 200. The ability to access data, as well as provide data, dynamically serves to allow the user to traverse one or more venues over time, shop for items and scan them in, updating server 200 so the processing of transactions and gathering of any perks, discounts, and coupons can happen automatically, just as the tabulation of the bill of sale and payment methods are being processed in server 200, such that when the user arrives at the venue exit for final checkout, the preprocessed bill of sale and all transactions intended as one master transaction can be presented as completed. The tabulation can occur with no perceived delay for the user, or other patrons waiting in a cue (e.g., in a line behind the user). Although card 100 itself may only have memory capacity of x, this method permits capacities far greater than x, even to the extent of 1 million times x and exponentially greater still, to be accessed, directed, and controlled by the card 100. In a sense, card 100 can serve as a highly advanced memory stick with an almost unlimited storage capacity, i.e., limited only by storage capacity available to card 100 at server 200, for example, in database 250 and service backing card 100.

With the permission of the user of card 100, card 100 also provides data mining capabilities for venues, producers, etc. This information, which is limited to specific information selectable by a user, such as shopping patterns, use of offers, specific items purchased, venues visited, shopping-related research, etc., can be sold or provided to participating venues, producers, etc., in exchange for a consumer benefit, such as points, coupons, special sales, advanced notification of sales, additional discounts, etc.

Card 100 also provides payment options based on venue. For example, if the user of card 100 typically uses a particular form of payment in a particular venue, then card 100 may consider that form of payment the default, though card 100 can provide the user the opportunity to accept the implied default card prior to performing the payment. The user of card 100 can also pre-identify forms of payment for a particular venue. For example, the user can establish payment method 1 for venue A, payment method 2 for venue B, a combination of payment method 3 and payment method 4 for venue C with a ratio between payment method 3 and payment method 4, etc. In another example, the user can establish payment method 1 for all food related purchases, payment method 2 for household items, payment method 3 for office supplies, etc. These examples present but two of the unlimited possibilities for establishing relationships between payment methods and venues, and such relationships can be established to be automatic so that payment is presented without further action by the user at checkout, or the user may be queried by card 100 to verify that the established form of payment is the desired form of payment.

In an exemplary transaction application, card 100 is used to scan an item, to identify the item, and to communicate with server 200. The value analyzing unit 232 of server 200 can: (1) alert the user that an online venue has a better price or other better value for the item compared with the current venue and can facilitate a purchase at the online venue; (2) alert the user that the item is available at a lower price at another location, for example, a location near the user's location using location information from location unit 144; or (3) determine whether the item price is an acceptable price, as determined by value analyzing unit 232, and the user decides to keep the item or to put back on shelf (a second scan or other action on the card can update the "put back" status). This process can be repeated for every item the user considers using card 100, and items scanned and not "put back" remain in the user's cart (which can be a real or virtual cart). Card 100 keeps a list of each kept item (i.e., in the cart) and card 100 forwards the list to server 200 via value analyzing unit 232. Until checkout, value analyzing unit 232 can continue to search for all available perks related to each kept item. At checkout, card 100 passes the list of kept items to the venue's POS system electronically, although server 200 can pass all items in the cart to the POS system via network 210. In an automated embodiment, server 200 forwards the list and all gathered related perks to the POS system, and the POS system resolves the perks with the prices and charges the users account. In another embodiment, the POS system can handle some or all the functions carried out by server 200. In a legacy system or system that does not participate in the automatic checkout and resolution of perks, card 100 can present images to the user of bar codes for coupons or similar items that the user can redeem at the POS system. At the time of payment or prior to that time, value analyzing unit 232 or transaction/ID/access card management unit 234 can automatically select a payment method card stored within card 100, which the user can select via display gesture recognition, described in more detail hereinbelow, and thereafter card 100 card displays the selected payment card, or the last used payment card can be displayed (for example, according to preferences), and card 100 also displays magnetic out data related to the selected payment method.

The user can close, or complete the transaction card by swiping card 100 having the selected and displayed payment method and providing a signature. As a part of finishing the transaction, a receipt may be stored on card 100 for later reference or archiving in server 200, a personal computer, personal external storage, the cloud, or other suitable storage locations. Other information may be associated with finishing the transaction, such as store date and time of the transaction, whether there is an associated price protection or guaranteed low price, etc.

Post-transaction, value analyzing unit 232 can have selected, for, example, XXXCreditCorp, which agreed to terms associated with use of card 100. Server 200 can, post-transaction, re-address the transaction to: re-pay for each item differently or even pay for one individual item with multiple payment methods based on the information in transaction/ID/access card management unit 234 related to the cards stored therein; apply coupons or other perks used to a limited date as a price protection guarantee; apply for rebates; provide information related to, and secure extended warranty; and other post-transaction conditions included with the agreement. Post-transaction actions can be preference-based, or preset by system 1. "Best value" herein is used to indicate, but is not limited to, discounts from coupons, reduction in prices from specials, promotions, giveaways, etc. "Best value" my be defined by the user of card 100 and can further include other factors, such as buy-one get-one (BOGO), free shipping, extended warranties, rebates, frequent flyer miles, discounts on future purchases, gas points, etc.

Many capabilities and other aspects of user card 100 and system 1 of the present disclosure are described in terms of sequences of actions to be performed by a processor or controller, which can be elements of a computer system or other hardware capable of executing programmed instructions, for example, a general purpose computer, a personal computer (PC), a special purpose computer, a workstation, a personal communications system (PCS), a mobile (cellular) telephone, a mobile telephone with data processing capability, an RFID receiver, a gaming console, an electronic notepad, a laptop computer, a global positioning system (GPS) receiver, or other programmable data processing apparatus. It will be recognized that in each of the embodiments, the various actions could be performed by specialized circuits (e.g., discrete logic gates interconnected to perform a specialized function), by program instructions (software), such as logical blocks, program modules etc. being executed by one or more processors (e.g., one or more microprocessor, micro-controllers, a central processing unit (CPU), application specific integrated circuits (ASICs), digital signal processors (DSPs), digital signal processing devices (DSPDs), programmable logic devices (PLDs), field programmable gate arrays (FPGAs), and other devices designed to perform the functions described herein, and/or by a combination of any of the above. For example, embodiments can be implemented in hardware, software, firmware, middleware, microcode, or any combination thereof. The instructions can be program code or code segments that perform necessary tasks and can be stored in a non-transitory machine-readable medium such as a storage medium or other storage(s). A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

Circuitry and other hardware of communications unit 118 of card 100, such as a transmitter, receiver, transmitting unit, receiving unit, transceiver etc. can provide functionality, for example, through the use of various wireless communication networks such as a WWAN, a WLAN, a WPAN, and so on. The terms network and system are often used interchangeably herein. A WWAN may be a CDMA network, a TDMA network, a FDMA network, an OFDMA network, a SC-FDMA network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement GSM, Digital Advanced Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). A WLAN may be an IEEE 802.11x network, a WPAN may be a Bluetooth network, an IEEE 802.15x, or some other type of network, the CDMA may be implemented as a radio technology such as universal terrestrial radio access (UTRA) or CDMA2000, the TDMA may be implemented as a radio technology such as a GSM/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. The techniques may also be used for any combination of WWAN, WLAN and/or WPAN. The techniques may be implemented for use with an Ultra Mobile Broadband (UMB) network, a High Rate Packet Data (HRPD) network, a CDMA2000 1× network, GSM, Long-Term Evolution (LTE), and/or the like.

In an exemplary embodiment, QED (Quantum Entanglement Device) can be introduced to intermix quantum computing and quantum communications within system 1 and card 100, which adds to the security of system 1 and card 100. At some point, it will be feasible to equip one side of card 100, both sides of card 100, and/or all surfaces of card 100 with QED generating and detecting pixels. At the point where point of sale systems incorporate QED capabilities and when a public quantum entanglement network is established, all of the various methods and capabilities of system 1 and card 100 will be enhanced to the extent that communications will become utterly secure. In an exemplary embodiment, items to be scanned, which can include tangible items such as another card 100 or an item in a store or intangibles, such as a service agreement or web site, can include quantum entangled particles which can be photons, electrons, or other particles which are mated to a known entangled particle stored in a quantum entangled trap. With this evolution an item marked with a quantum entangled particle can be identified as to its authenticity, its history, and down to the unique instance of that item.

As used herein, the term "memory" refers to any type of non-transitory machine-readable medium, whether long term, short term, volatile, nonvolatile, or other memory and is not to be limited to any particular type of memory or number of memories, or type of media upon which memory is stored. Memory described herein, such as system memory 114 and database 250, can additionally be considered to be embodied within any tangible form of computer readable carrier, such as solid-state memory, magnetic disk, and optical disk containing an appropriate set of computer instructions, such as program modules, and data structures that would cause a processor to carry out the processes described herein. A computer-readable medium may include the following: an electrical connection having one or more wires, magnetic disk storage, magnetic cassettes, magnetic tape or other magnetic and optical storage devices (e.g., compact disc (CD), laser disc, digital versatile disc (DVD), floppy disk and Blu-Ray™ disc), a portable computer diskette, a random access memory (RAM), a read-only memory (ROM), an erasable programmable read-only memory (e.g., EPROM, EEPROM, or Flash memory), or any other tangible medium capable of storing information and combinations of the above. Memory can also include buffer memory that holds transmission data to be transmitted by the transmitter of communications unit 118 until the data is transmitted and/or data received by the receiver of the communications unit 118 until the received data can be processed. Although FIG. 2 shows memory 114 as separate or external to processor or controller 110, memory may be implemented within processor or controller 110 or another processing unit.

In an exemplary embodiment, card 100 has a credit card form factor, size, shape and thickness of a standard swipe card and processor 110 is preferably a microprocessor or microcontroller chip that manages files stored in memory 114 assigned to the card applications via a card operating system (COS), and memory for carrying out these functions is preferably a combination of nonvolatile (e.g., EEPROM or flash) and volatile (e.g., ROM) solid state devices, each of which is configured to be non-transitory. In an exemplary embodiment, the type of COS used in card 100 is a dynamic application card operating system that enables developers to build, test, and deploy a variety of card applications securely. Card memory also includes at least one programmable magnetic stripe that stores information magnetically.

It should be noted that the system of the present disclosure is illustrated and discussed herein as having various modules and/or units which perform particular functions. It should be understood that these modules and units are merely schematically illustrated based on their function for clarity purposes, and do not necessarily represent specific hardware and/or software. In this regard, these modules, units and other components may be hardware and/or software implemented to substantially perform their particular functions explained herein. The various functions of the different components can be combined or segregated as hardware and/or software modules in any manner, and can be useful separately or in combination. Thus, the various aspects of the disclosure may be embodied in many different forms, and all such forms are contemplated to be within the scope of the disclosure.

Figure 19:
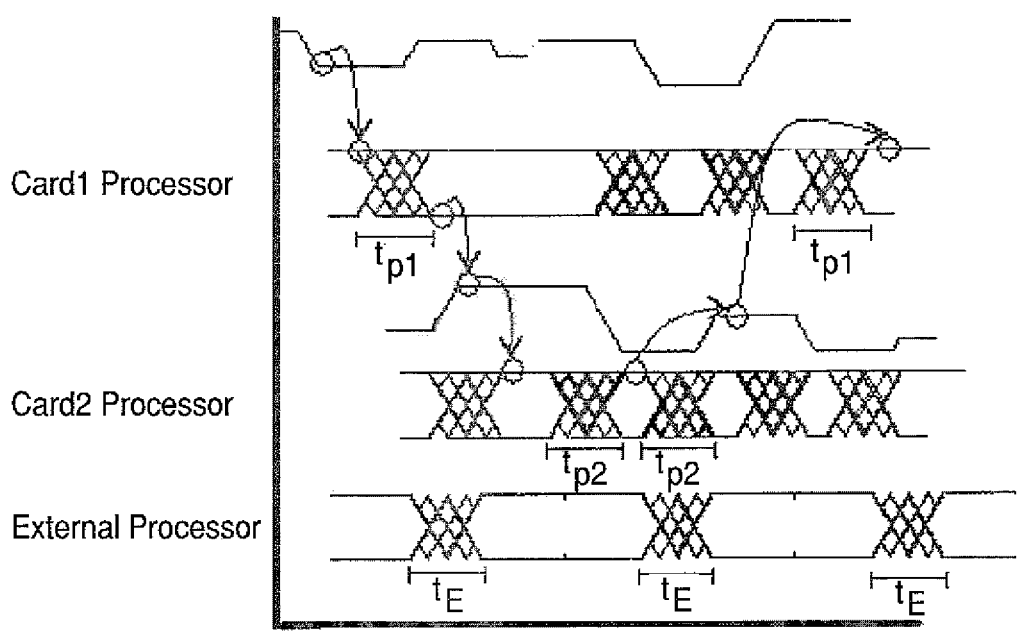
FIG. 19 is a timing diagram showing transference of data between cards in a docked stack, or involving an external POS device.
Figure 20:
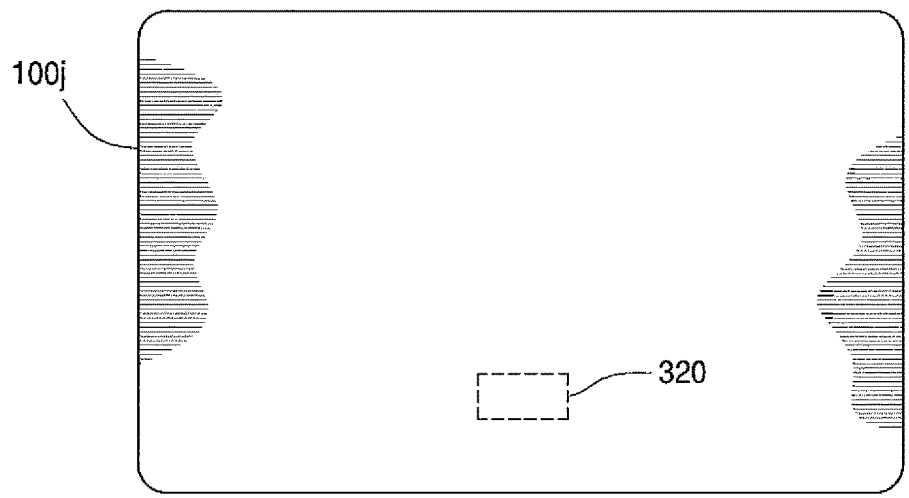
FIG. 20 is a plan view of a card in accordance with an exemplary embodiment of the present disclosure.

FIG. 19 is a timing diagram showing timing and synchronization between two or more devices where at least one device is a venue processor and another device is similar to card 100. In the exemplary embodiment of FIG. 19 having two cards a Card1 and a Card2, at least some data must be relayed through the processor of an intermediate card, such as a Card2 processor, and acknowledgement, timing, or other data may also pass in a direction at times opposite the direction of data transfer. Card2 may belong to, for example, a cashier, manager, or other individual associated with a transaction, and Card1 may belong to an end user purchasing a product or service. The external processor documents the transaction and the net amount due to the venue or from the venue to or from a user and/or an intermediate party. Processor latencies are approximately illustrated for a system which may include multiple cards and/or an external processor. The latency and processing time for the POS is reduced, as may be appreciated by considering the timing diagram shown in FIG. 19 in which p1 and p2 are data from Card1 and Card2, and E is available processor time for data collection. The external processor provides timing or clocking information to the processors of Card1 and Card2, which change their clocking from a free-running mode to a synchronization mode, where data is transferred from the memory or processors of Card1 and Card2 when the external processor is ready to receive data, decreasing the time for data to transfer from Card1 or Card2 since data transfer is provided at the moment that the external processor is ready to receive data. Though a plurality of cards is shown in FIG. 19, the external processor may also interface with a single card or more than two cards.

Figure 24:
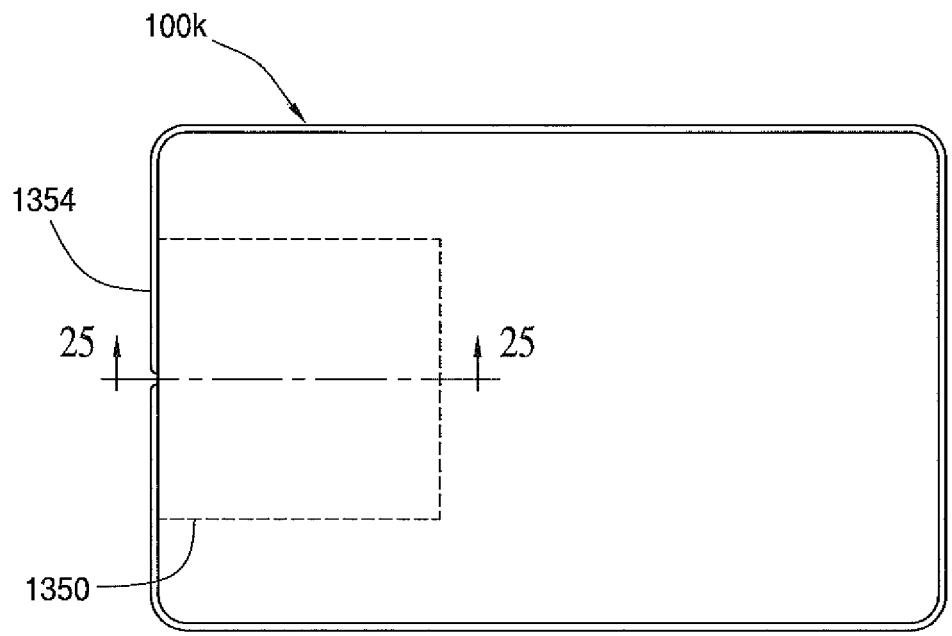
FIG. 24 is a plan view of a card in accordance with an exemplary embodiment of the present disclosure, showing an RFID module in phantom lines.
Figure 25:
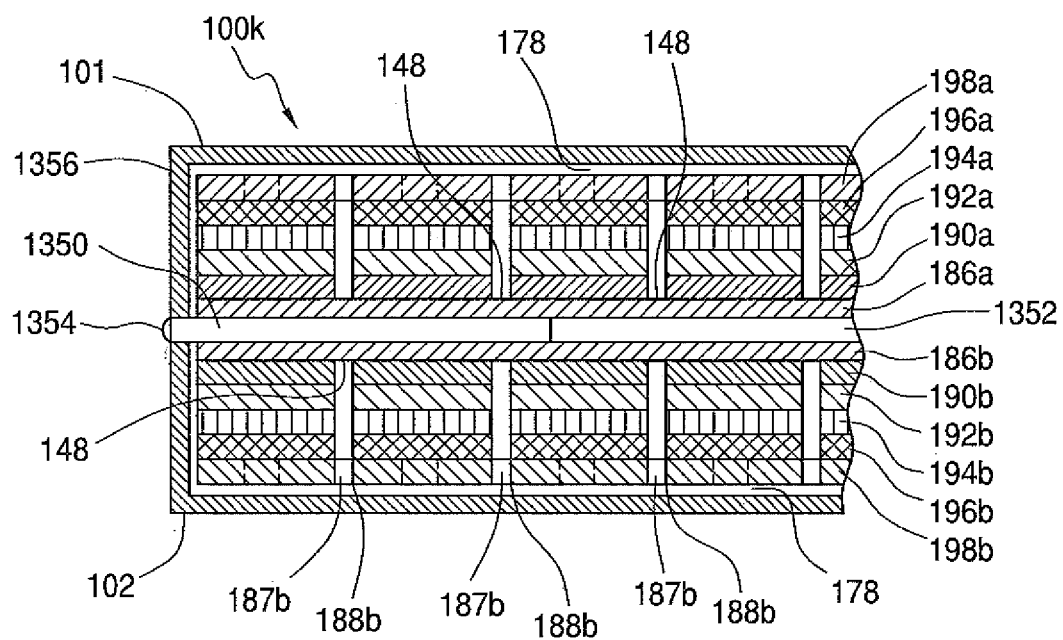
FIG. 25 is a sectional view of a portion of the card of FIG. 24 along the lines 25-25.

As noted hereinabove, card 100 may include an RFID, or Radio Frequency IDentification, receiver. Referring to FIGS. 24 and 25, a card 100k includes an RFID receiver module or assembly 1350, which in the exemplary embodiment shown in FIGS. 24 and 25 is positioned at the same depth or level as a card substrate 1352. The various layers of card 100k adjacent to RFID receiver module 1350 and substrate 1352 may be similar to the layers shown in, for example, FIG. 7B or 8B. In contrast to FIG. 7B, light detecting layers 186A and 186B may be positioned, placed, or deposited on both substrate 1352 and RFID receiver module 1350. An intermediate layer (not shown) may also be placed or positioned between RFID receiver module 1350 and light detecting layer 186A and between RFID receiver module 1350 and light detecting layer 186B. While the exemplary embodiment shows an RFID module or assembly 1350 positioned alongside, next to, adjacent to, or coplanar with substrate 1352, in other embodiments the components of an RFID receiver may be placed in or on substrate 1352 or other equivalent substrates.

Card 100k further includes at least one RFID antenna 1354 connected to RFID receiver 1350, and positioned on, or adjacent to a peripheral surface or edge 1356 of card 100k positioned between first major surface 101 and second major surface 102 of card 100k. Edge 1356 may include an end portion of cover structures or covers 174a and 174b, an end portion of RFID receiver module 1350, and/or a peripheral surface of card substrate 1352. In the exemplary embodiment of FIGS. 24 and 25, RFID antenna 1354 extends alongside peripheral surface 1356 in parallel to first major surface 101 and second major surface 102, and may extend entirely around edge 1356 (as shown in the exemplary embodiment of FIG. 24), generally in parallel to first major surface 101 and second major surface 102, though RFID antenna 1354 can be positioned elsewhere on card 100k. For example, because antenna 1354 is relatively thin, antenna 1354 may extend across first major surface 101 and/or second major surface 102. RFID antenna 1354 may be positioned in other available locations in card 100k, limited only by the proximity to pixels or elements of card 100k that might interfere with the ability of antenna 1354 to receive RF energy.

Figure 26:
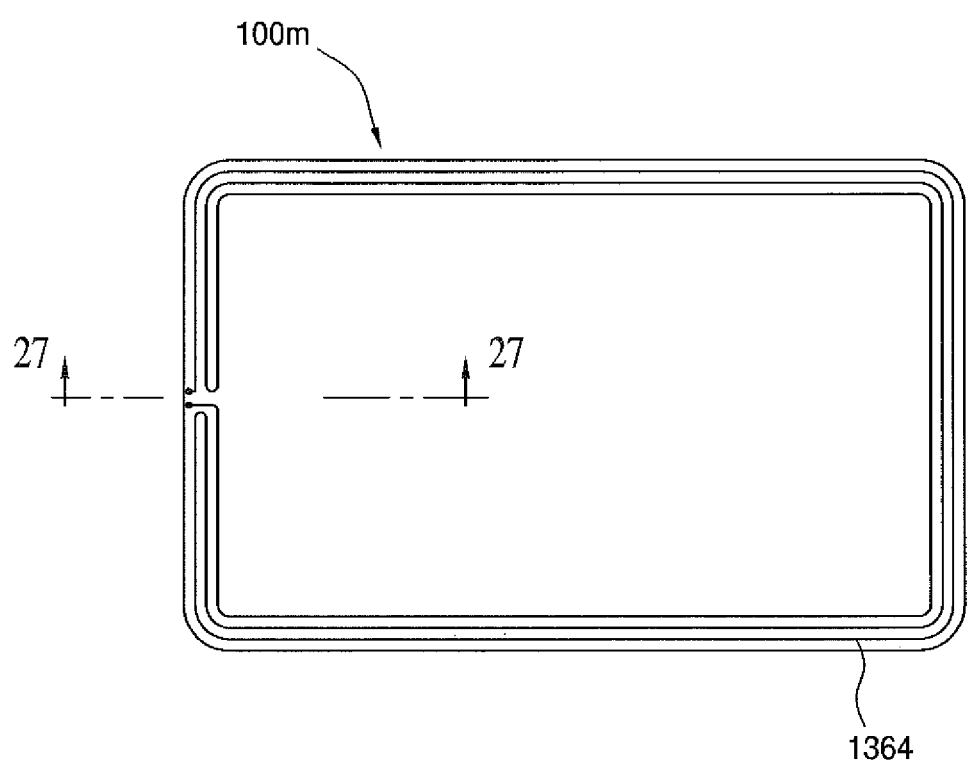
FIG. 26 is a plan view of a card in accordance with an exemplary embodiment of the present disclosure having the components of an RFID module positioned on a substrate of the card.
Figure 27:
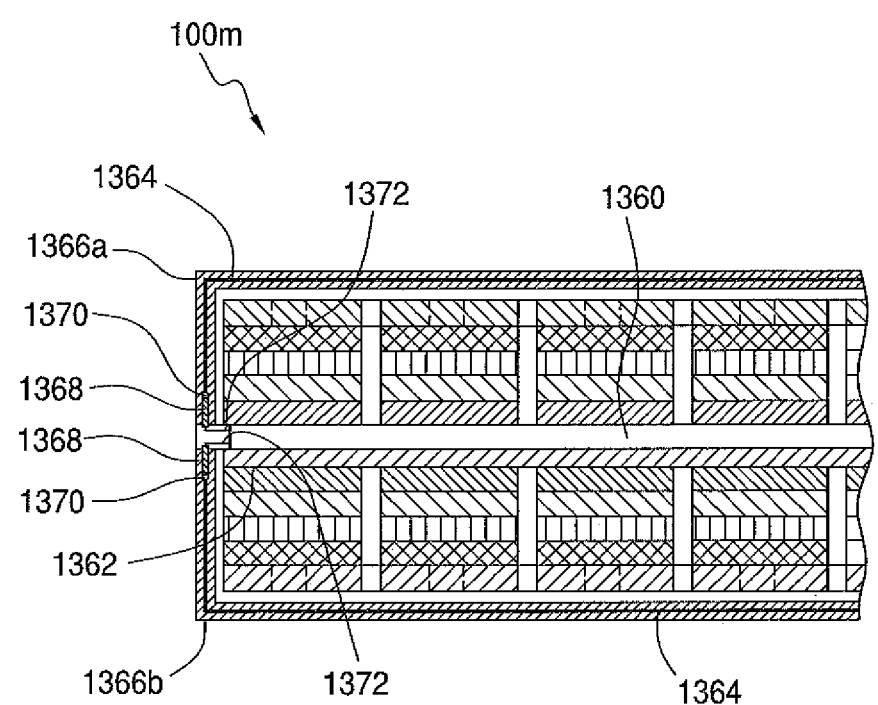
FIG. 27 is a sectional view of a portion of the card of FIG. 26 along the lines 27-27.

Referring to FIGS. 26 and 27, a card 100m includes an RFID receiver 1360 positioned on a card substrate 1362. Card 100m further includes an RFID antenna 1364 positioned as on or in a first cover structure 1366a and a second cover structure 1366b. Card substrate 1362 may include one or more connector pins 1368 embedded in card substrate 1362 and extending perpendicularly first major surface 101 and second major surface 102 to connect RFID receiver 1360 and RFID antenna 1364 to each other. First cover structure 1366a and/or second cover structure 1366b includes a connector receptacle 1370 electrically connected to RFID antenna 1364 and configured to receive connector pin 1368. An RFID connecting line 1372 extends from RFID receiver 1360 to each connector pin 1368. To read an RFID tag using internal energy of card 100m, RFID receiver 1360 transmits a signal into RFID connecting line 1372. The energy travels into connector pin 1368 and then into connector receptacle 1370. From connector receptacle 1370, the energy travels into RFID antenna 1364, where the RF energy is transmitted from card 100m. The RF energy activates any nearby RFID tags, which then emit RF energy containing information about an item on which the RFID tag is placed, or about a location of the RFID tag. The amount of information provided by an RFID tag can be sufficient to provide a unique identification of the product on which the tag is placed or located, including the packaging of the product. The energy transmitted by the RFID tag is received by RFID antenna 1364, which is directed into connector receptacle 1370 and then into connector pin 1368. The energy then travels along RFID connecting line 1372 to RFID receiver 1360, which decodes the received energy and transmits the decoded information to processor 110. Processor 110 then uses the RFID information to provide the user of card 100m with information. The operation of RFID receiver module 1350 is similar to the operation of RFID receiver 1360.

While operation of RFID receiver 1360 and RFID receiver module 1350 may use internal power to activate a near field communication RFID tag, a venue containing such tags may also provide a network of transmitters that constantly actuate RFID tags positioned in the venue, causing the RFID tags to constantly emit digital RF signals, which card 100m is able to receive. The benefit of such a system is that the venue can use the information transmitted from the RFID tags for inventory, mapping, and other purposes, while the holder or user of card 100m is able to use the information to locate products, determine whether an item is in stock, etc., while minimizing the drain of usage of power from card 100m, extending the useful operating time of card 100m.

While the present disclosure provides two embodiments of RFID receivers, i.e., RFID receiver 1360 and RFID receiver module 1350, the position of RFID receivers can be adapted to any available location in the card form. For example, in another exemplary embodiment, the RFID receiver may be positioned among the other layers of the card, for example, between light detecting layer 186a and magnetic-out layer 190a. Similarly, the position of RFID antenna 1354 or RFID antenna 1364 may be in other locations than those shown in FIGS. 24-27, limited only by the needs of the various layers in the card.

Including RFID capability in card 100 provides a variety of advantages to the user of card 100. For example, card 100 can become an RFID interface with a legacy card reader or other non-RFID receiving devices. In view of the ability of a card to be able to emulate swiping without movement, described hereinabove, placing a card equipped with an RFID receiver enables communication with, for example, legacy card reader 1200 (see FIG. 13). After inserting card 100m into legacy card reader 1200, any RFID tag equipped item may be positioned within reading distance of card 100m, and card 100m can convert the RFID information to magnetic information readable by legacy card reader 1200. In another example, card 100m can be positioned on POS card reader 1300 (FIG. 14). As with the previous example, an item equipped with an RFID tag can be positioned proximate to card 100m, and card 100m will convert information received from the RFID tag into a form that is readable by POS card reader 1300. Thus, card 100m, or any version of card 100 equipped with an RFID receiver, is capable of being a low-cost data translator between two or more types of data storage devices, including RFID, bar code, Qr code, magnetic read heads, aural or audio, and visual. Furthermore, since card 100 includes Wi Fi capability, card 100m also becomes a low-cost interface with Wi Fi equipped devices, such as cell phones, tablets, computers, netbooks, and potentially smart displays, smart televisions, etc.

Figure 28:
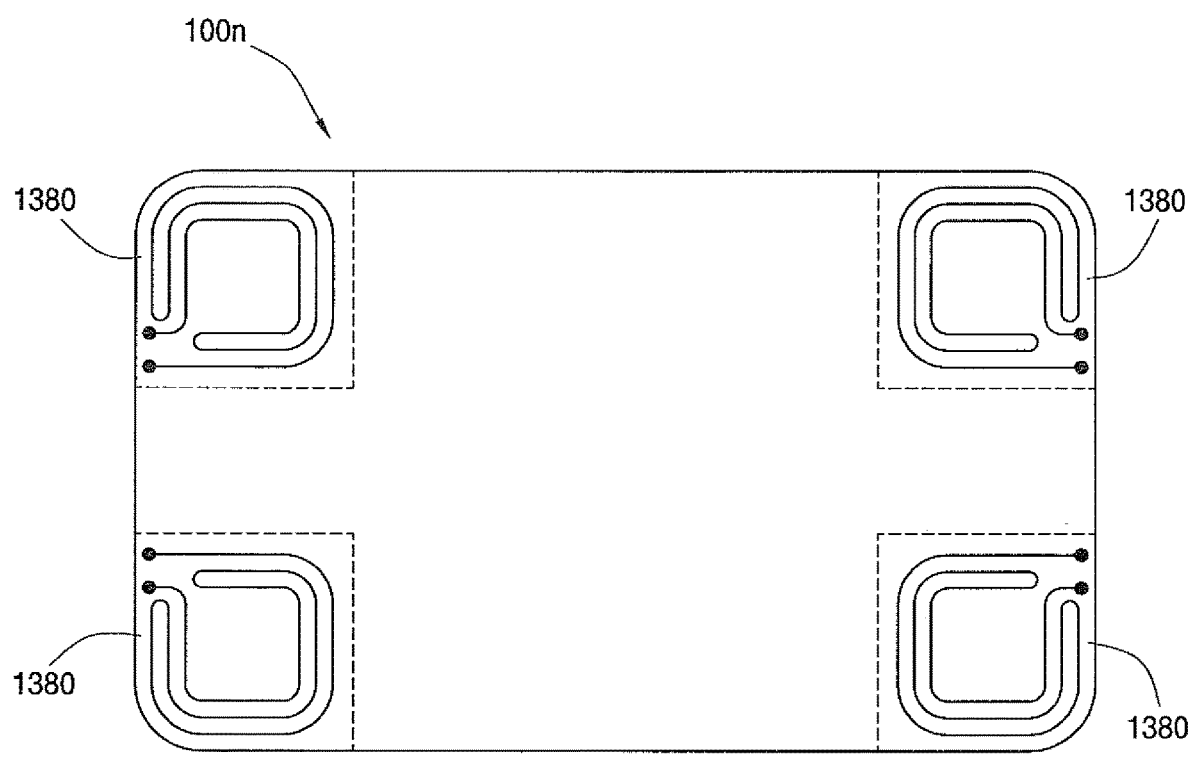
FIG. 28 is a plan view of a card in accordance with an exemplary embodiment of the present disclosure having a plurality of RFID receivers.

FIG. 28 show a card 100n in accordance with an exemplary embodiment of the present disclosure including a plurality of RFID receivers 1380, shown with phantom lines. The benefit to a plurality of RFID receivers 1380 is that card 100n can use the plurality of RFID receivers 1380 to track objects having an RFID tag, including determining more precisely the position of such an object, the speed of the object, if moving, and the acceleration of the object, if any. Furthermore, like card 100, card 100n includes the capability of tracking by visual analysis and also has tracking capability using sound emission and reception. In order to avoid causing aural distress to the user of card 100n and variations of card 100, or to persons around the user of card 100n, such sound emission can be in an ultrasonic frequency. Just as card 100 is capable of performing image analysis, card 100n is also capable of analyzing reflected sound and, depending on the need, card 100n can have sufficient resolution to track and analyze objects in the field of view of card 100n and with sufficient resolution, card 100n can even have the capability to perform shallow depth sonograms. Thus, card 100 and card 100n provide a relatively simple and effective sensor that is readily adaptable to a Wi Fi network for ad hoc or permanent security systems. In addition, given the capability of card 100n and other versions of card 100 to identify speed, acceleration, and position using various sensors, card 100n also has a capability to be used as a test instrument. Given the capability of card 100n and other versions of card 100 to correlate inputs of various sensors to each other, card 100n has the capability to cross-check results and improve the accuracy of calculation of speed, acceleration, and position by correlation of optical, sound, and RFID information.

Figure 29:
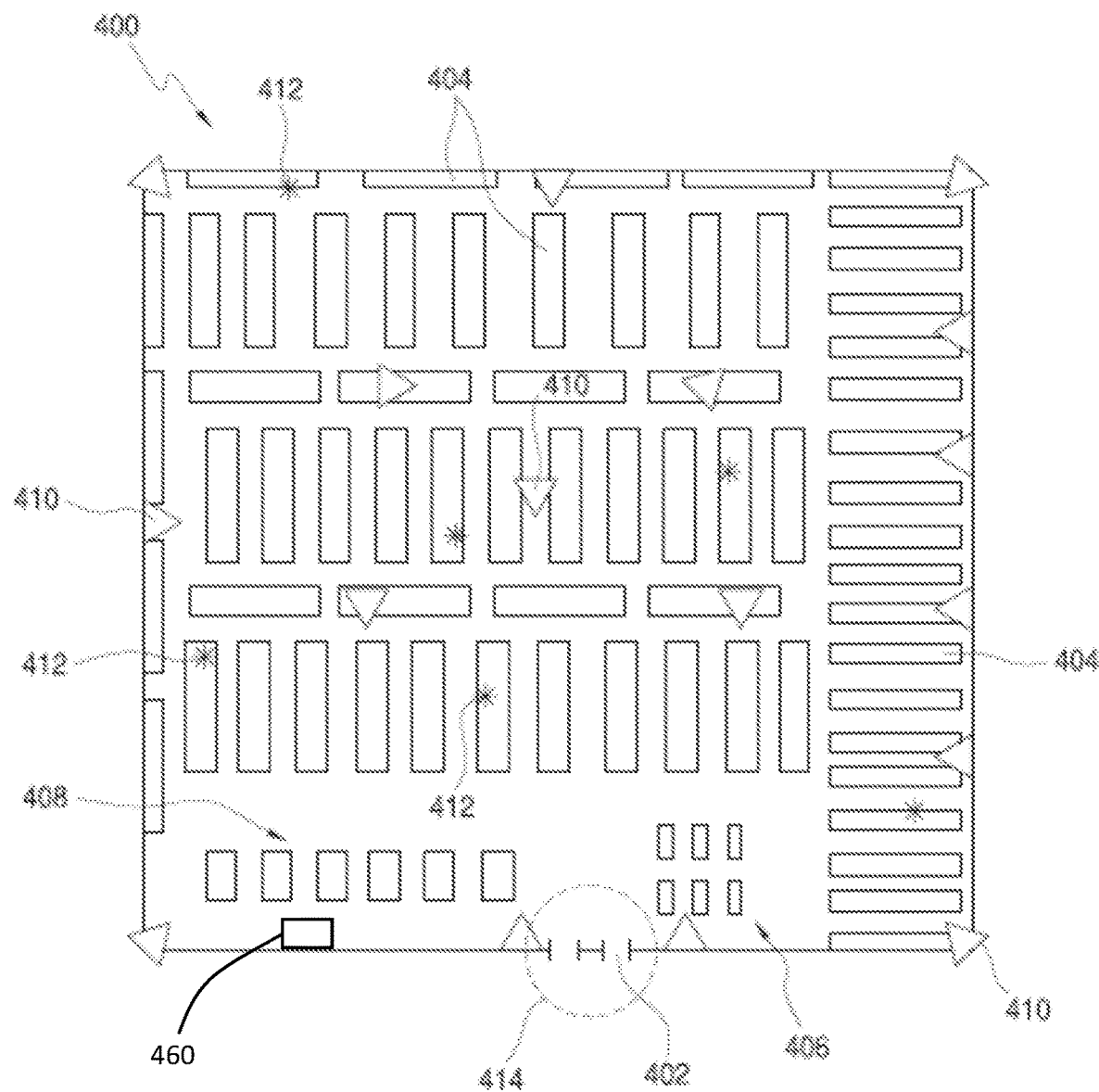
FIG. 29 is a plan view of a venue including a local RFID transmitter and receiver network proffering RFID localization capability.
Figure 30:
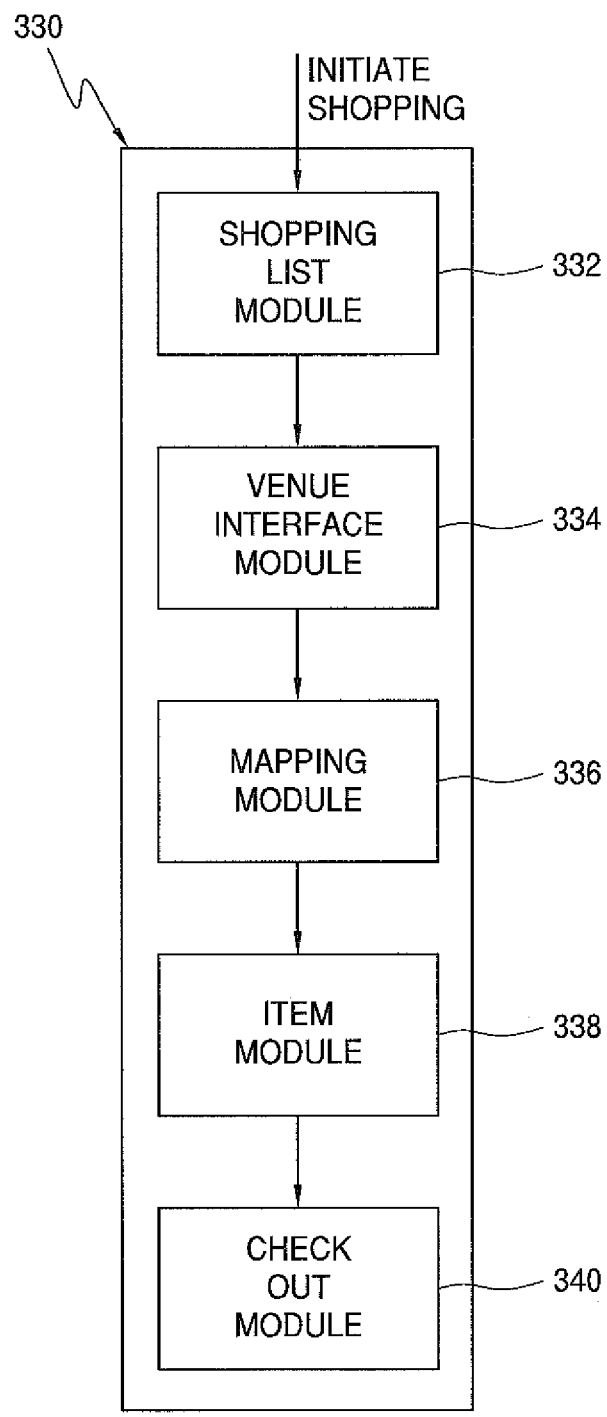
FIG. 30 is venue interface module for implementing the card in a venue in accordance with an exemplary embodiment of the present disclosure.
Figure 31:
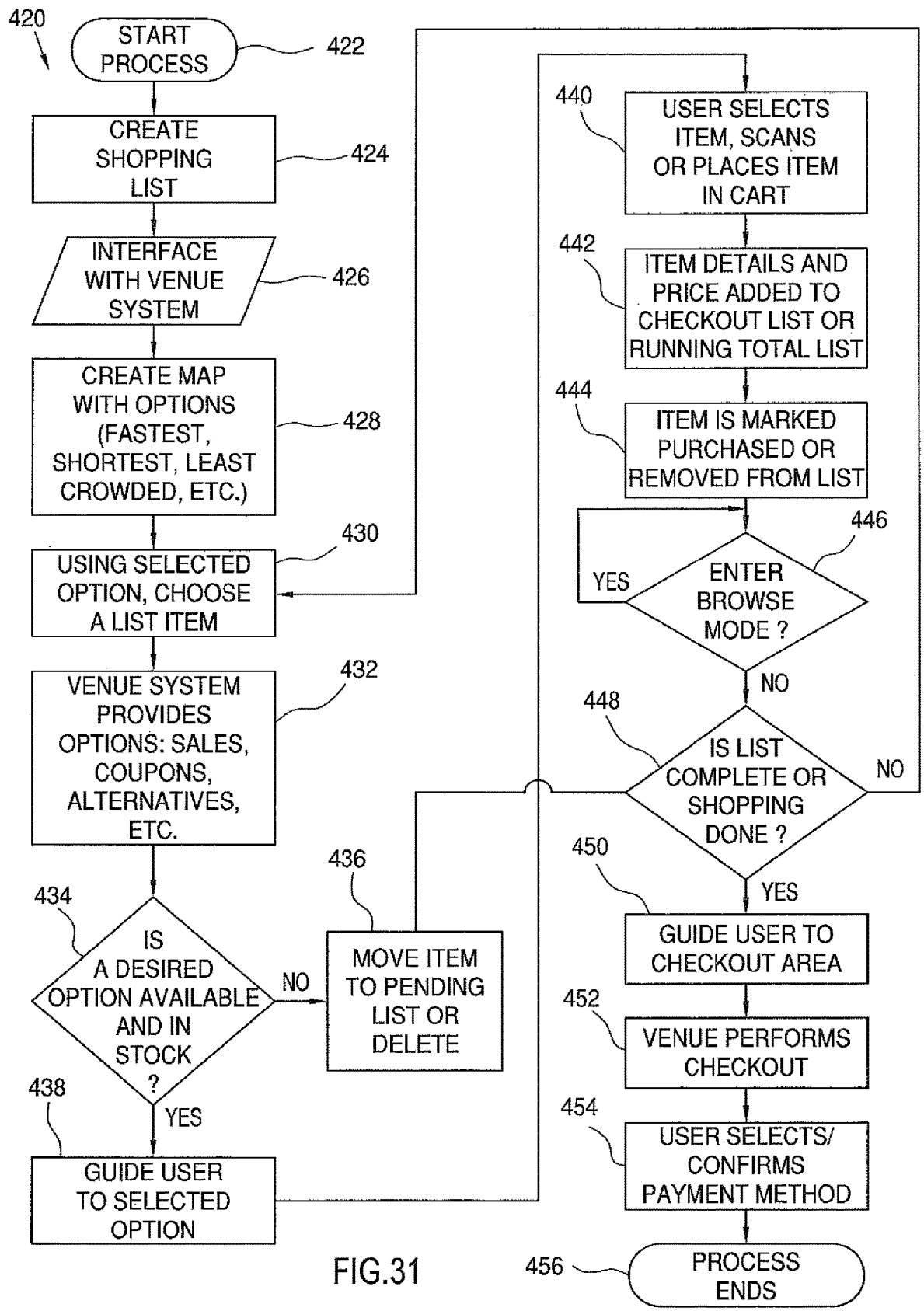
FIG. 31 is a process of the venue interface module of FIG. 30 in accordance with an exemplary embodiment of the present disclosure.

The ability to read RFID information presents many benefits to card 100. Referring to FIGS. 29-31, an implementation of card 100 having RFID capability is described using an RFID localization system of a venue 400. Venue 400 includes at least one entrance 402, a plurality of shelves, racks, end unit displays, coolers, freezers, aisle displays, etc. 404, a plurality of smart store stations 406, a plurality of checkout stations 408, and a plurality of Wi Fi/RFID transmitters-receivers 410 that proffer RFID localization capability. Venue 400 includes a controller 460 connected, either by wire or wirelessly, to at least smart store stations 406, checkout stations 408, and Wi Fi/RFID transmitters-receivers 410. Wi Fi/RFID transmitters-receivers 410 are positioned throughout venue 400 and provide sufficient energy to activate RFID tags (not shown) positioned on shelves, racks, etc. 404 in all locations within venue 400. At least some Wi Fi/RFID transmitters-receivers 410 include a Wi Fi transceiver, though all Wi Fi/RFID transmitters-receivers 410 may include a Wi-Fi transceiver, or Wi-Fi transceivers may be located separately from the RFID transmitters-receivers. Venue 400 further includes a plurality of items 412 positioned on one or more shelves, racks, etc., 404.

The venue system includes a location of all items 412, which may be entered manually in the store system, but which is preferably defined by a plurality of RFID tags positioned either on or adjacent to items 412. Wi Fi/RFID transmitters-receivers 410 continuously receive data from RFID tags associated with each item 412, and thus the venue system "knows" the location of all items 412 in venue 400. In some cases, the RFID tag may be placed on each individual item 412, but in other embodiments, the RFID tag may be placed on or under a shelf to indicate either a product brand and type or a general category of product, such as peanut butter, a specific brand cereal, and a particular type of the brand, since there are numerous types and varieties of many brands, or other categories deemed appropriate by the management of venue 400. The system of venue 400 acquires the locations of each RFID tag by way of signals received by Wi Fi/RFID transmitters-receivers 410, which are positioned in locations throughout venue 400 in sufficient density to assure that all RFID tags provided in venue 400 receive sufficient power from Wi Fi/RFID transmitters-receivers 410 to operate. And be received by at least three RFID transmitters-receivers to be able to map the locations of each RFID tag.

In order to find items in venue 400, a user of card 100 engages a venue interface module, shown in FIG. 30 and generally indicated at 330. Venue interface module 330 uses features and capabilities of venue 400 in combination with the capabilities of card 100 to create an efficient interface with venue 400. Venue interface module 330 includes a shopping list module 332, a venue interface module 334, a mapping module 336, an item module 338, and a check out module 340. The functions and processes of venue interface module 330 may include portions of venue 400 and card 100, such as processor 110 and one or more sensor or pixel layers of card 100.

Venue interface module 330 is initiated by a need to go shopping. In shopping list module 332, a shopping list is created in card 100. The shopping list may be entered into memory 114 of card 100 by the user, or may be downloaded into memory 114 of card 100 from another device, such as a cell phone, laptop, or other device. Once the shopping list is created, the shopping list is provided to venue interface module 334. In venue interface module 334, processor 110 of card 100 combines shopping list information with information provided by venue 400, which can include location information, pricing, coupons, special deals, rebates, etc. The shopping list and venue information is provided to mapping module 336 by venue interface module 334. In mapping module 336, a route to each item 412 on the list is determined. Such determination may take place in processor 110, or may be determined in a venue 400 processor 460 and then transmitted to card 100. Once a route to each item 412 is determined, venue interface module 330 continues with an item module 338, where each item 412 is located and added to the user's physical cart or container.

Once all items 412 from the user's shopping list have been located, control passes from item module 338 to check out module 340. In check out module 340, the items selected by the user are verified, payment for items 412 is made, and the user exits venue 400.

Referring to FIG. 31, in order to find items in venue 400, a user of card 100 engages a venue interface process 420, which uses features and capabilities of venue 400 in combination with the capabilities of card 100, including processor 110, memory 114, and one or more pixel layers, to create an efficient interface with venue 400. Such an interface may be acquiring items 412, i.e., shopping, or it may be merely browsing items 412. Venue interface process 420 is adaptable to include other functions at venue 400, such as returning an item 412, visiting a service function of venue 400, such as a vending machine or a food court, finding a restroom, and other functions available to the user or the public at venue 400. Venue interface process 420 may include functions and features of portions of venue 400 and card 100, and may be distributed over one or more portions of venue interface module 330.

Venue interface process 420 begins with a start process 422. Start process 422 may be recognition that an item is needed. Process 420 moves control from start process 422 to a create list process 424, which is conducted in shopping list module 332. In create list process 424, the user creates a list of needed and/or wanted items. Such a list may be created by scanning items in the user's home, or may be entered manually, by voice, selecting from a list of suggestions, etc.

After creation of a list of needs and/or wants, process 420 moves control from create list process 424 to an interface with venue system process 426, as a part of venue interface module 334. In interface with venue system process 426, the user travels to venue 400, entering by entrance 402. Once in venue 400, features of the user's card 100, such as Wi FI, communicates with a local area net provided by venue 400. Such communication may be wirelessly or may be by way of smart store stations 406. Smart store stations 406 provide a docking station, which may have features similar to card reader 1300 that enable smart store stations 406 to communicate with card 100 by way of, for example, light detecting layer 186a or 186b, magnetic-in layer 192a or 192b, or piezoelectric-in layer 194a or 194b.

Once interfaced with smart store stations 406, process 420 moves control from interface with venue system process 426 to an item mapping process 428, performed by mapping module 336.

The system of venue 400 includes the location of each item 412, or each category of item that includes 412, which is determined by RFID tags associated with each item 412, described hereinabove. These locations are used in conjunction with the list of needed or wanted items 412 located in card 100 to map a route, considering the location of shelves, racks, etc. 404. Such mapping is preferably performed in the system of venue 400, since the detailed information exists in the system of venue 400. However, a processor of card 100, such as processor 110, is capable of generating such maps as well. Furthermore, since card 100 includes features capable of communicating with the venue's Wi Fi/RFID transmitters-receivers 410, processor 110 of card 100 is also capable of acquiring new map information as needed, though data transfer from smart store stations 406 to one or more sensor or pixel layers of card 100 is typically faster for reasons explained hereinabove. The route used to traverse from smart store stations 406 to each item 412 may be modified by user-selected options. For example, the user may select the fastest route, the shortest route, the least congested route, which may be defined by store experience, optical analysis, and other route modifications. If the user does not select any route modifications, the system of venue 400 is configured to provide deviations to the user's route that causes the user to travel by featured products, potentially providing the user with awareness and the venue with expanded product exposure and sales. Once the map is generated by the system of venue 400, the map information is downloaded into memory 114 or processor 110 of card 100.

Once the map or other directions are provided to memory 114 or processor 110 of card 100, process 420 moves control from item mapping process 428 to a list item selection process 430, which is part of item module 338. In list item selection process 430, in view of the information provided by item mapping process 428, the "first" item on the user's list as represented by the map generated by item mapping process 428 is selected. It should be apparent that the "first" item 412 may be the furthest item 412 from the user's present location, it may be the closest item 412, or it may be between the closest and furthest items 412, because item mapping process 428 identifies a route based on multiple factors, including the user's preferences and modifications provided by venue 400.

After selection of an item 412 from the list, process 420 moves control from list item selection process 430 to a venue system process 432. Venue 400 may provide sales, coupons, generic products, discounts, alternatives, featured products, etc., for any specific item 412. This information may be provided to processor 110 of card 100 during item mapping process 428 and accessed during venue system process 432, or processor 110 of card 100 may communicate with Wi Fi/RFID transmitters-receivers 410 and receive information from the venue system via Wi Fi/RFID transmitters-receivers 410 as each item 412 is chosen. The user determines from the information provided by venue 400 whether to choose one of the presented options.

Once venue 400 has communicated available options for a specific item 412 and the user determines whether any of the presented options is acceptable, process 420 moves control from venue system process 432 to an item option decision process 434. In item option decision process 434, process 420 determines whether the user has selected any of the options presented in venue system process 432. If the user was unable to find a desirable option, or the user decides not to purchase the item from the list, control passes from item decision process 434 to a remove item process 436. In remove item process 436, the present item from the list may be deleted, or may be moved to a pending or future list, depending on options chosen by the user, which may be selected either during remove item process 436 or prior to remove item process 436. From remove item process 436, control passes to a list completion decision process 448, discussed in more detail hereinbelow. If the user was able to find a desirable option, control passes from item option decision 434 to a guide user process 438.

In guide user process 438, processor 110 of card 100 provides outputs, such as display outputs from light emitting pixel layer 198 or aural signals from piezoelectric-out layer 196a or 196b, to guide the user to the current item from the user's list, stored in memory 114 of card 100. Such directions may be enhanced by communication between RF receivers in card 100 and Wi Fi/RFID transmitters-receivers 410, which uses such communication in location unit 144 to determine the position of card 100 with respect to the item 412 being sought. Location unit 144 may use multiple sensors to determine the location or position of card 100 with respect to a specific item 412, depending on the ability of such sensors to function in venue 400. For example, a GPS function of location unit 144 of card 100 may be operative in venue 400, and can provide relatively precise directions to a specific item 412. Because venue 400 has a plurality of Wi Fi/RFID transmitters-receivers 410 placed to assure coverage throughout the entirety of venue 400, the position of card 100 can be determined with sufficient accuracy with respect to a specific item 412 to provide accurate directions. Directions or instructions to the user may be presented as a visual two dimensional or three dimensional map on light emitting pixel layer 198a or 198b of card 100, as direction arrows displayed on light emitting pixel layer 198a or 198b of card 100, as directions such as left, right, forward, back, up and down (to provide a location on one or more vertically-extending shelves), as directions and distances, or other systems for displaying directions. Directions may also be provided audibly, via voice or tones. Once the user reaches the proximity of a specific item 412, card 100 is able to use its RFID capability, such as that provided by RFID receiver 1360, RFID receiver module 1350, or other RFID device, to further refine the location of the RFID tag, which provides the closest location to a specific item 412 that the system of venue 400 is able to provide.

Once the user reaches the location of a specific item 412, control passes from guide user process 438 to a collect item process 440. In collect item process 440, the user physically moves a specific item 412 from a venue location, such as shelves, racks, etc. 404, to the user's physical cart, basket, arms, hands, or other carrying device or location. As the user moves specific item 412 from the venue location to the user's carrying device or location, the user can scan the bar code or Qr code on the item with card 100, which moves control from collect item process 440 to an item details process 442, which automatically adds various details of specific item 412, such as a brief description and potential coupons, specials, availability of extended warranty, etc., to a running checkout list located in memory 114 or processor 110 of card 100, along with the total amount of items selected and added taxes so that the user can maintain awareness of the total amount expected at checkout. Once item details process 442 is complete, control passes from item details process 442 to a check item off process 444.

In check item off process 444, specific item 412 that was selected is marked as purchased, or removed from the list of items to purchase, stored in memory 114 or processor 110 of card 100. Control then moves from check item off process 444 to an enter browse mode decision process 446. As the user selects each item from the list stored in card 100, the user may decide to seek an item not on the list, and thus desires to enter a browse mode. In the browse mode, the user can enter a new item 412 to seek, holding the list stored in card 100 in abeyance. Venue interface process 420 continues to remain in browse mode until the user selects to exit browse mode, or until the user stops venue interface process 420, which the user may do at any time.

Once the user decides to exit the browse mode, control passes from enter browse mode decision process 446 to list complete decision process 448. In list complete decision process 448, venue interface process 420 determines whether the last item on the list has been reached by referring to the list stored in memory 114 or processor 110 of card 100. If the last item on the list has not been reached, control passes from list complete decision process 448 to list item selection process 430, and venue interface process 420 continues as described hereinabove. If the last item on the list stored in card 100 has been reached, control passes from list compete decision process 448 to a guide user to exit process 450.

In guide user to exit process 450, located in check out module 340, venue interface process 420 uses information provided by the system of venue interface process 420 to guide the user to checkout stations 408 of venue 400. Typically, such directions will be the shortest route from the user's present location to checkout stations 408, though the directions may select another route depending on conditions in venue 400 or user preferences.

Once at the area of checkout stations 408, control passes from guide to exit process 450 to a checkout process 452. In checkout process 452, personnel or systems of venue 400 verify that the items collected or gathered by the user match the list stored by card 100. Such verification may be by scanning of RFID tags of items carried by the user, scanning of bar codes or Qr codes, or by other verification methods. If the items gathered or collected by the user and presented at checkout stations 408 match the list provided by outputs of card 100, which may be an RF or Wi Fi output, an optical output from light emitting pixel layer 198a or 198b, or other data communication output from the pixel layers of card 100, then checkout process 452 is complete and control passes from checkout process 452 to a payment process 454, where the user of card 100 selects a payment method, which may include one or more credit cards or other payment channels stored in memory 114 of card 100 and described hereinabove. After payment is provided to venue 400, control passes from payment process 454 to an end process 456.

Though not specifically shown, venue 400 may include a security system that includes a security zone 414 that detects the position of RFID tags as they pass from an interior of venue 400 to an exterior of venue 400. Because such security systems typically only detect the presence of the RFID tag, such tags either need to be removed, or the data needs to be scrambled or removed to prevent setting off a security system. System 1 of the present disclosure provides a configuration that eliminates the need to either remove or deactivate an RFID tag. Because card 100 has already provided a list and payment for all the items in proximity to the user of card 100, transmissions by card 100 provides an exit pass for all authorized items in proximity to the user of card 100. For example, if the user has a first item 412, a second item 412, a third item 412, and a fourth item 412, and the user passes into range of security zone 414, the plurality of Wi Fi/RFID transmitters-receivers 410 detect the presence of first item 412, second item 412, third item 412, and fourth item 412. The system of venue 400 communicates with card 100 through the plurality of Wi Fi/RFID transmitters-receivers 410 and learns that the user's card 100 has already paid for the four items, and the system of venue 400 ignores the presence of RFID tags on any authorized item 412, which decreases labor for venue 400. In addition to verifying that a specific card 100 has paid for the items, the system of venue 400 also verifies a time and date of a transaction, so that a user attempting to return to the store after leaving is unable to load the same four items into the cart and then leave, attempting to use the previous transaction as an opportunity for shoplifting. If such an attempt is made, such as an exit from venue 400, and then a return to gather four additional, identical products, the security system of venue 400 will immediately know that the user has been in the store twice, that the user returned to venue 400 with or without authorized or user-purchased items 412, and that additional checking of the user/customer is required to verify the user has only authorized products. While video evidence may be required to verify the two entries of a user attempting to scam the system of venue 400, it is easier to know when such checks of entries and exits are needed with the presence of card 100 and time stamped exits from venue 400.

Once at end process 456, the user departs venue 400, secure in the knowledge that the features of card 100, venue interface module 330, and venue interface process 420 have provided the user with the lowest cost options, available coupons, deals, rebates, etc., extended warranties, etc. Furthermore, venue 400 and card 100 have detailed information regarding the transaction that can be used to assist in returning items, using warranty, and for other purposes. Because of the information that may be gathered by venue 400, any information regarding recalls can also be transmitted to the user, even when the user does not complete warranty card information to the manufacturer, supplier, or venue 400.

Figure 32:
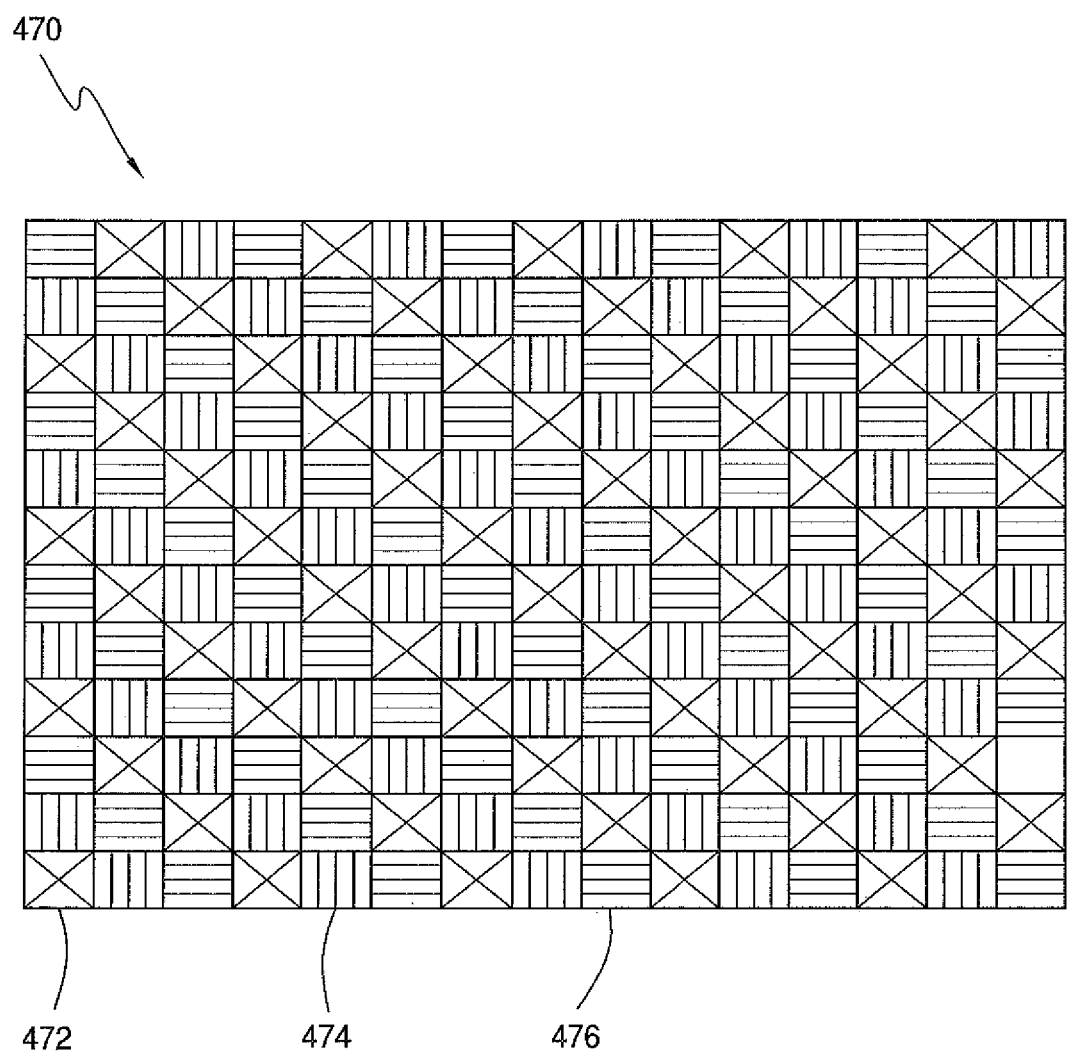
FIG. 32 is an RFID antenna layer positioned on a card in accordance with an exemplary embodiment of the present disclosure.
Figure 33:
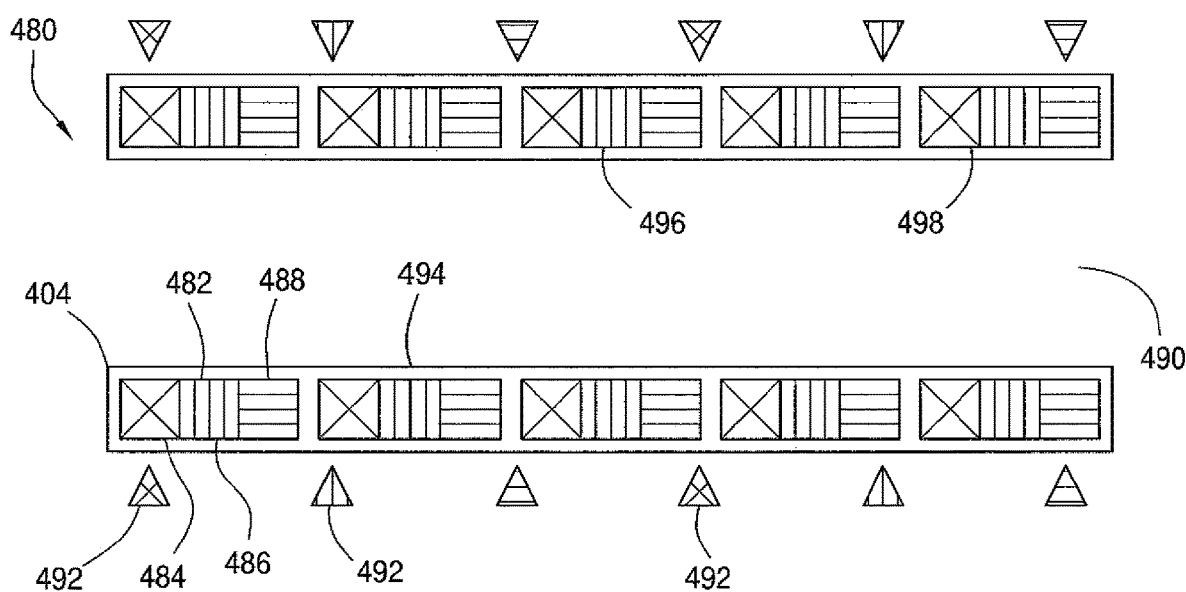
FIG. 33 is a portion of a venue incorporating RFID technology in accordance with an exemplary embodiment of the present disclosure.

FIG. 32 shows an RFID layer 470 in accordance with an exemplary embodiment of the present disclosure. RFID layer 470 may be positioned adjacent to a substrate of card 100, such as substrate 170 or 370, as shown in FIG. 8B. RFID layer 470 includes a two-dimensional array of RFID antennas, which may all be identical in an exemplary embodiment, or in another exemplary embodiment may be optimized for a plurality of frequencies. RFID layer 470 in FIG. 32 includes a plurality of RFID antennas 472, 474, and 476. The advantage to having a plurality of RFID antennas is that the RFID antenna array becomes very small while providing the advantage of being able to gather more RF energy. Furthermore, card 100 becomes capable of relatively accurate tracking of an RFID tag in three-dimensional space, including tracking of speed, acceleration, and direction of travel of an RFID tag. Additionally, by including a plurality of tuning circuits in card 100, and connecting RFID antennas 472 to a first tuning circuit (not shown), RFID antennas 474 to a second tuning circuit (not shown), and RFID antennas 476 to a third tuning circuit (not shown), and optimizing each combination of RFID antennas and tuning circuits to a specific, and different RFID frequency from the other combinations of RFID antennas and tuning circuits, card 100 achieves or provides an improved locating capability in an environment with a high density of RFID tags. As an alternative to a plurality of tuning circuits, card 100 may include a tuning circuit that has the ability to modify tuning to a plurality of RF frequencies associated with RFID tags. A card 100 including an RFID layer 470 may be used in a venue that includes RFID tags configured to provide a plurality of RF frequencies, such as venue 480, a portion of which is shown in FIG. 33.

One challenge with trying to find a specific item 412 in a venue having hundreds or thousands of RFID tags is identifying a specific RFID tag. In order to reduce the amount of data being received by card 100 to try to find a specific RFID tag, a system can use a plurality of RFID wavelengths to assist in finding a specific item. Furthermore, if a smart RFID tag is used, only the specific item sought may provide a transmission signal. In an exemplary embodiment of the present disclosure shown in FIG. 33, venue 480 includes a plurality of items 412 positioned in various locations in venue 480, such as shelves, racks, etc. 404. Each item 412 is associated with an RFID tag 482 that includes the ability to transmit in two or more frequencies. In the exemplary embodiment of FIG. 33, RFID tag 482 is configured to transmit three frequencies. RFID tag 482 includes a first transmission circuit 484 configured to generate a first frequency, a second transmission circuit 486 configured to generate a second frequency, and third transmission circuit configured to generate a third frequency, and each frequency is matched to one of the frequencies of the first tuning circuit, the second tuning circuit, and the third tuning circuit.

When a user of card 100 enters an aisle 490 of venue 480, the system of venue 480 is assisting the user of card 100 by transmitting an RF frequency that matches the first frequency transmitted by first transmission circuit 484, the second frequency transmitted by second transmission circuit 486, or the third frequency transmitted by third transmission circuit 488. However, other users are in aisle 490 also trying to find a specific item with an RFID tag 482, so multiple RFID tags 482 are transmitting simultaneously, making it difficult for card 100 to rapidly find the signal associated with a specific item 412. In order to speed the process of finding a specific item 412, the system of venue 480 can transmit at a specific frequency for a specific customer in a limited area, helping to localize a search for a card 100 user. Venue 480 includes a plurality of RF transmitters 492, which may have either the ability to transmit at a plurality of frequencies, or may each be optimized for first frequency 484, second frequency 486, or third frequency 488. When a card 100 enters aisle 490 seeking a specific item, for example an item 494, which has an RFID tag 482, the closest RF transmitter 492 may transmit at the first frequency. If a second card 100 user enters aisle 490 seeking an item 496, the closest available RF transmitter 492 may transmit at the second frequency. Similarly, when a third card 100 user enters aisle 490 seeking an item 498, the closest available RF transmitter 492 transmits at third frequency. In each case, card 100 has been advised by the system of venue 480 of the specific frequency at which the user's item is transmitting, which minimizes the amount of data that card 100 needs to review before localizing a specific item.

Venue 480 may also use smart RFID tags, such that only a specific tag transmits RF energy, as directed by a local Wi Fi network, which may have transmitters co-located with RF transmitters 492 or separate from RF transmitters 492. The challenge of finding a specific item becomes relatively fast when card 100 receives only limited information from only those RFID tags that are actively sought rather than being inundated by the signals from all RFID tags in reception range of card 100.

RFID has gained acceptance in part due to the idea that very low cost RFID tags can be fabricated that have no local power source and very few components. As such, they are non-transmitting until an RFID sending device tuned to the same frequency is sufficiently close to the RFID tag to provide enough charging power to "boot" or charge the RFID tag or device, with enough residual power remaining to allow for an initial handshake communication much like a conventional modem connection. If the RF energy continues to be received by the RFID tag or device because the RFID transmitter remains in proximity, further communications between the RFID tag and the RFID transmitter are possible. Using more than one RFID frequency, raising the frequency of each successive RFID circuit in a tag, can be strategically used to cause the RFID transmitter or sending device to use the lowest frequency first, get the handshake, begin to "talk," and then ascertain the identity of the tag in question, which could include several layers of information. The RFID transmitter or sending device could be talking to more than one unique tag at one time. Tag class narrows the choice to tell the RFIDs in the sought after class to move to the next frequency layer and establish another connection and then communicate on that channel. The purpose for this layering is actually dual purpose. One purpose is to quickly eliminate other tags in proximity and another is the physical fact that for the tag to activate each different higher frequency RFID channel, the RFID transmitter has to move closer and closer to the object to fire the next higher frequency RFID frequency in the RFID tag. The need to be closer for higher frequencies is because of the property of higher frequency transmission lines and the natural loss associated with radio frequency transmissions. The higher the frequency the greater the loss. So, to fire higher and higher frequency RFID tag layers, you have to move physically closer if your RFID transmitter or sending device stays at a fixed transmission output power level. The first lower frequency RFID tag channel reaches further in terms of range, and the RFID antenna array of card 100 provides solid directional information, but not enough to direct you to touch the card to the individual item. Since the first connection can get you to within about six feet, then the next RFID layer fires and directs a user to within two feet, and finally the next layer can get you close enough to allow card 100 to indicate when you are actually touching the sought after item 412 with card 100. This domino effect strategically uses the well understood phenomena of loss of transmission power associated with higher and higher frequencies. It also strategically limits the number of RFID tags in a given zone that fire, to provide initial direction and get a user closer to the unique object or item 412 being sought by getting the user closer to the unique RFID tag associated with the unique object you are seeking. The key to this process is to let card 100 sort through what RFID tags can and do fire, based on proximity, to then get directional information that gets the sought after item 412 closer to the user, which limits the total number of communicating tags because the energy from card 100 fires the successively higher frequency channels and the sync process and communications allowing sorting, does not overwhelm the processing capacity of card 100, making it sluggish or useless. In fact, if a software filter knows the precise identity of the object you are seeking by way of the information stored in each RFID tag, it can sort out all the unwanted objects and make the decision to fire the next channel, providing yet another sort of successively less objects, in under a second for each layer. This allows card 100 or other device capable of this multi-channel RFID communications scheme to literally walk a user to an object, right up to touching the desired object without the user having to hesitate at any point, preserving the user's time and energy and making the process a rewarding experience.

Having an RFID capability enables other features of card 100. For example, extremely small RFID tags, which are available in sizes that verge on microscopic, can be attached to a finger, fingernail, apparel, tangible personal item such as glasses, a pen, etc., or a hand of a user of card 100. In order for card 100 to function properly, a user having an RFID tag needs to be in proximity to card 100. Card 100 may also combine its other biometric capabilities, for example, image recognition, sound reception, etc., to cross-check an RFID tag against other characteristics of a user to verify that the user is alive and to confirm that the user has authorized access to card 100. In an exemplary embodiment, a user may have an extremely small RFID tag positioned on each finger, and each finger may be recognized individually as it access the functions and features of card 100, providing tracking of card 100 use and enhancing the ability to assure that only the authorized user has access to card 100. Furthermore, card 100 can track each individual RFID tag on each finger and use the proximity of such an RFID tag either separately or in combination with other information, such as visual analysis, to determine when a function of card 100 or other related embodiments of card 100 should be operated.

Figure 34:
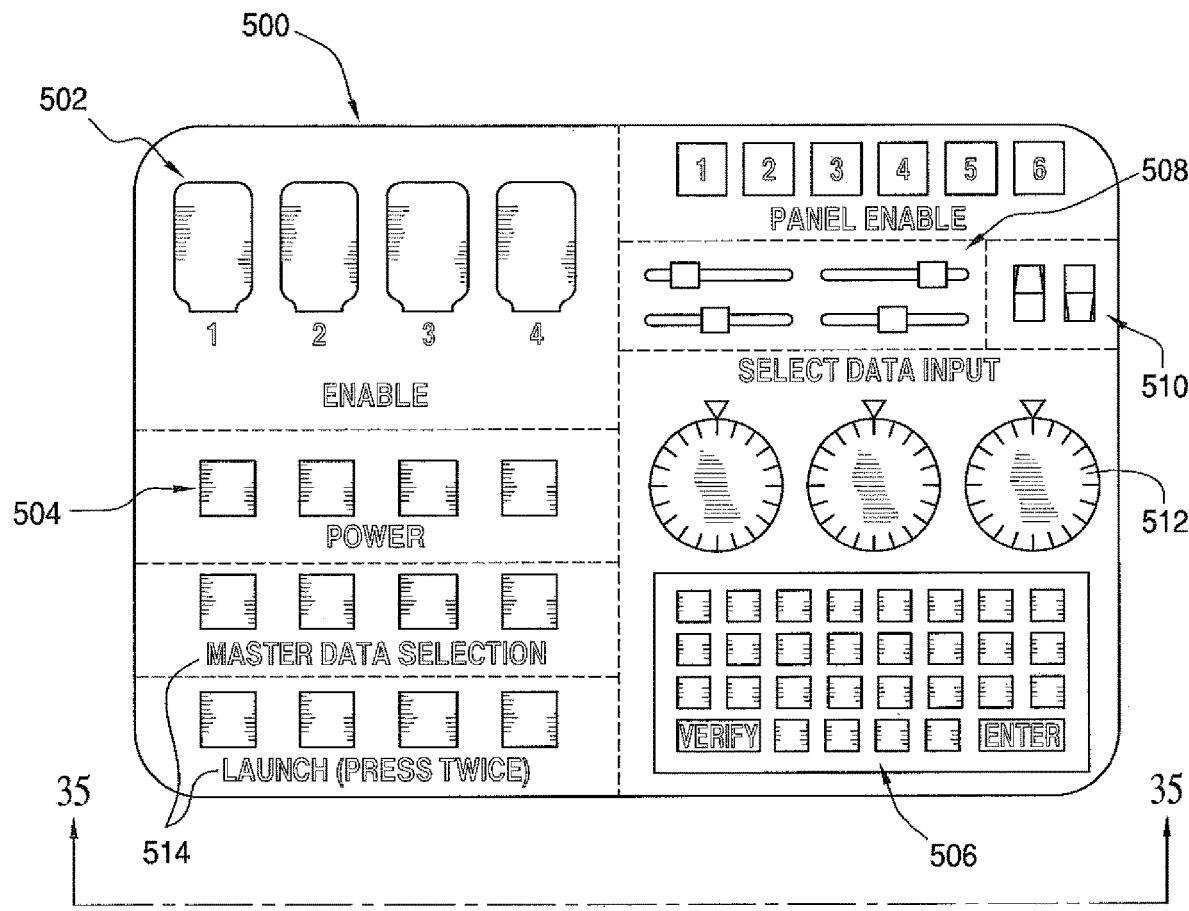
FIG. 34 is a plan view of a mat in accordance with an exemplary embodiment of the present disclosure.
Figure 35:
FIG. 35 is a side view of the mat of FIG. 34 along lines 35-35.

The previous embodiments of the present disclosure focus on a credit card form factor. However, the pixelated nature of card 100 is beneficially extendable to other form factors and devices. For example, FIGS. 34 and 35 show a mat 500 including the layer and pixel features described hereinabove. Mat 500 provides a unique capability in that mat 500 can be of a size that enables emulating virtually any control panel or configuration, or by using and combining multiple mats 500. Mat 500 may be preprogrammed with a variety of control configurations or panels, or control panels and configurations may be uploaded via wireless connection or Wi Fi. Control panel configurations, which are represented entirely visually, may include one or more guarded toggle switches 502, push button switches 504, keyboard(s) 506, slide controls 508, rocker switches 510, dials 512, labels 514, and the like.

Once a particular control panel configuration is displayed on mat 500, fingers or other body parts, such as a hand, can be used to actuate the virtual or displayed controls. Because mat 500 includes visual recognition capability, which may be housed in a process similar to processor 110, contact with mat 500 may be completely non-contact. A finger movement toward a guarded toggle switch 502 and then a transverse motion is interpreted as moving guarded toggle switch 502 to an open position. The toggle (not shown) under the guard portion of guarded toggle switch 502 may then be actuated with a similar movement. Other switches may also be actuated by placing a finger or hand in proximity to the switch of interest and moving fingers or hand in a way that would cause actuation of a physical switch. Because mat 500 includes audio output capability, each switch movement can be accompanied by a sound indicative of the motion of the associated switch. Furthermore, false positives may be reduced and even eliminated by using smart analysis that requires a gesture by a finger or hand to have a specific position or amount of overlap with a switch or control to reduce activation of an adjacent switch. In addition, because the image recognition software recognizes gestures, an orientation of fingers appropriate to move a specific switch or control type, such as dial 512, can be recognized as being for movement of dial controls only, and thus virtual dial 512 may only be moved by a recognized finger position or gesture appropriate for movement of dial 512.

Figure 36:
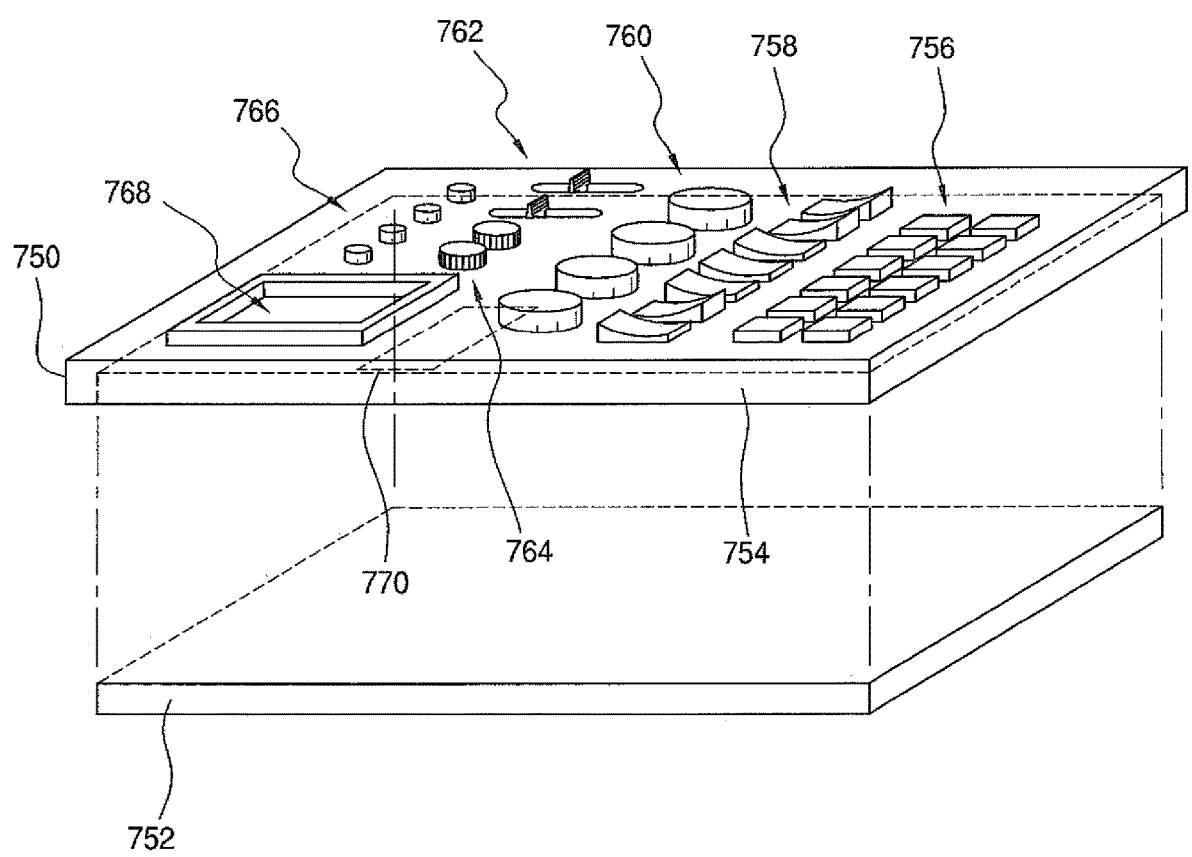
FIG. 36 is a perspective view of an overlay and a mat in accordance with an exemplary embodiment of the present disclosure.

While mat 500 can display a plurality of virtual controls, in some cases there may be value in having actual or physical controls, powered by a mat similar to mat 500. Referring to FIG. 36, an overlay 750 and a smart mat 752 are shown. Smart mat 750, which includes a plurality of sensor layers, such as the layers described for card 100 and for mat 500, can mate with overlay 750 by way of a recess 754 formed in overlay 750. Overlay 750 may include features that permit mat 752 to be retained in recess 754, such as permanent magnets or retention features (not shown). Overlay 750 includes a plurality of physical features, such as a plurality of push buttons 756, rocker switches 758, rotary dials 760, slide controls 762, rotary switches 764, push buttons 766, and a display 768. Overlay 750 may also include a tag 770 having a unique identifier, such as a bar code, Qr tag, or some other identifier. Tag 770 may be positioned in recess 754 so that mat 752 is able to "see" or read tag 770 when overlay 750 is placed on mat 752.

Overlay 750 is designed to be completely unpowered or electrically inert. A user or operator mates overlay 750 with mat 752. Mat 752 visually "reads" tag 770, which tells mat 752 the type of overlay 750, which may be programmed separately into mat 752, or which mat 752 is able to download when prompted by the proximity of tag 770.

When an operator or user moves any control or switch on overlay 750, it is mat 752 that detects movement of the button, switch, dial, etc., through one or more of the plurality of sensor pixels available to mat 752 and described herein. Mat 752 also does not include any operating lights or displays. A display such as display 768 is actually a transparent portion of overlay 750 that allows a display on mat 752 to be viewed in a direction that is perpendicular to overlay 750. Because mat 752 is programmed to function as would an actual device having the controls of overlay 750, such as an oscilloscope, radio, or other piece of equipment, each movement of a control, for example dials 760, cause mat 752 to modify its display output so that a user or operator of overlay 750 is able to see the effect of modifying dials 760. In an exemplary embodiment, one dial 760 might control synchronization of a signal that is presented by mat 752 through "display" 768, and a user or operator is able to see the effect of moving dial 760 on display 768, if any would be present in real life. Additionally, various controls on overlay 750 may be backlit or backlighted by the display functions of mat 752, permitting the various controls to be lighted as they might be in an actual application. In addition to backlighting, light effects from mat 752 can indicate movement of controls, such as levels with knobs changing color dynamically from say dark red through to very light red, for a volume setting 0 through 10 inclusive. With a simple touch it is possible to get a light flash feedback so you know the system registered your touch for that key aside from other feedback. Sound feedback is also possible from mat 752.

Because mat 752 is capable of being mated to a plurality of overlays, such as overlay 750, training equipment becomes less expensive because a plurality of such overlays may be "powered" or driven by a single mat 752. In some situations, mat 752 may be larger than an overlay. In this circumstance, the portions of mat 752 not under the overlay may be powered off, display black, or display a design or border. In an exemplary embodiment, an exposed border of mat 752 may function as a calculator, note-taking device, or permit controlling training scenarios of mat 752 in an interface with an overlay. Mat 752 may also be smaller than an overlay, in which case, two or more mats 752 may be used to interface with an overlay 750 through the adaptive ability of mat 752 to match portions of an output display to a specific need, similar to the configuration described hereinbelow with respect to the embodiment of FIGS. 42-44. In other words, two mats 752 will share outputs that are sized and positioned in a manner appropriate to interface with an overlay 750. Any areas not required to interface with overlay 750 may either be darkened or inactivated, may provide a space for notes, other functions, or may have decorative or entertaining graphics.

The underside of overlay 750, which is in recess 754, can be completely covered with a non-repeating pattern outside of the area of tag 770, so mat 752 can tell movement, even slight movement, of any control on the mat. When overlay 750 is removed, the software of mat 752 can hold a virtual image of overlay 750 and ask you if you want to keep that workable image up and its associated program. If you keep mat 752 running, you still have the same controls displayed on mat 752 without overlay 750. The display of the controls may be shrunk and tiled. Additionally, if an overlay 750 is much smaller than a mat 752, the portion of mat 752 that is associated with overlay 750 automatically sizes itself to the boundaries of overlay 750, and portions of mat 752 outside the boundaries of overlay 750 remain unlighted, or provide a decorative border or display. In some cases, a single mat 752 can hold two or more overlays 750, if space permits. A user can also place a plurality of overlays, one at a time, on mat 752. The functions of each overlay 750 may be retained in mat 752 to keep the image and functions alive, and to tile them.

Additionally, because the cost of an overlay 750 may be relatively inexpensive, if an overlay is used frequently, mat 752 may be left in place permanently, and if overlay 750 wears out, become obsolete, or for other reasons, a new replacement is relatively easy to replace, allowing a user to "instantly replace" overlays from time to time without technical assistance since the process of mating the application with the overlay 750 and mat 752 is fully automatic.

It should be apparent that the sensor capabilities of mat 752 provide an enhanced capability for overlays 750, that being the ability to measure or read the speed of actuation of controls. For some situations, if overlay 750 is for a musical instrument or for a game control, the speed of movement may translate to an intensity of actuation.

Because of the visual capabilities of card 100, and more specifically, the visual capabilities of the pixel configuration described hereinabove, other functions and features are enabled. One of these functions and features is the ability to recognize various types of gestures, both dynamic and static. In addition to expanding the capabilities of a credit card form, as embodied in various cards 100 described hereinabove, the ability to recognize static and dynamic gestures leads to a new and unique mechanism. In one exemplary embodiment, card 100 or mat 500 can require RFID tags to be positioned on a hand or on each individual finger to enable, for example, actuation of a virtual switch, such as rocker switches 510, slide controls 508, etc. Card 100 or mat 500 can also track the identity of someone using card 100 or mat 500 and accessing individual features through RFID, fingerprint, Kirlian, or other types of recognition, and document such usage for security purposes, for training purposes, for documenting access, etc.

Referring to FIGS. 37-41, an exemplary embodiment of card 100 incorporating static gestures in accordance with the present disclosure is described. When the user holds card 100 in a hand 530, which includes fingers 532 (note that a thumb is considered a finger for this description), the user may be intending to perform a specific function with card 100, such as using card 100 as a telephone, a camera, or an RFID locater. The user of card 100 can associate specific grasps of card 100, which can be described as the static gesture, with particular functions or configurations of card 100 and per unique user via biometrics and identification of the unique user. Alternatively, the user of card 100 may use default gestures that are the best or ideal gestures for a particular function, which may be shared by various users of card 100 or may be shared by user groups and downloaded to card 100.

Note that card 100 has other functions and capabilities, and the examples presented are but representative samples of the association between the way card 100 is held and associated functions of card 100. Because card 100 includes the capability to "see" by way of light detecting pixel elements 148, and because card 100 is configured to analyze images, card 100 is configured to recognize when card 100 is being held by an arrangement of a hand 530 and fingers 532 that is associated with a specific function of card 100. In an exemplary embodiment, edge or side 105 of card 100 may include pixel layers to improve the ability to recognize grasps or static gestures. As with previous embodiments, arrangements, grasps, or static gestures may be combined with biometrics captured by one or more layers of card 100 to either assist in recognizing the arrangements, grasps, or static gestures and/or to recognize the user of card 100. Furthermore, card 100 is better able to understand various grasps or static gestures because of the sensors positioned under first major surface 101 and second major surface 102.

Figure 37:
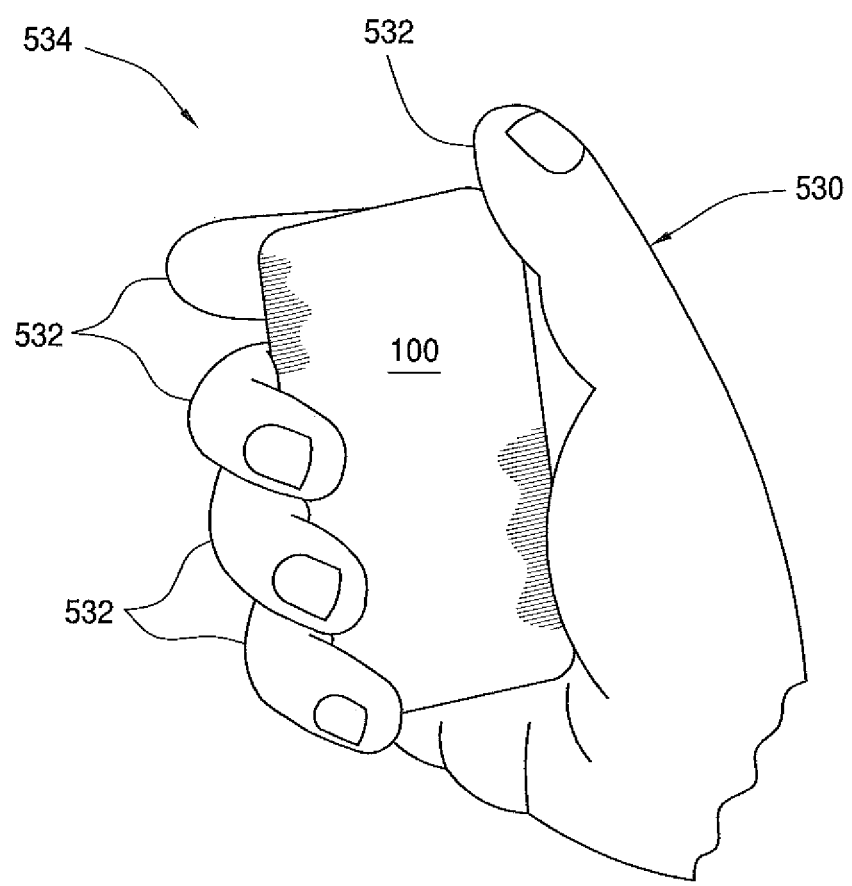
FIG. 37 is a view of a user's hand holding a card in a static gesture in accordance with an exemplary embodiment of the present disclosure.

In an exemplary embodiment shown in FIG. 37, hand 530 and fingers 532 are holding card 100 in an arrangement, grasp, or static gesture 534 that may be associated with the use of card 100 as a telephone. Once card 100 recognizes grasp or static gesture 534, card 100 configures itself to function as a telephone. In order to reduce false recognition, card 100 may include a time delay so that the user needs to hold card 100 for a predetermined period before card 100 recognizes grasp or static gesture 534.

Figure 38:
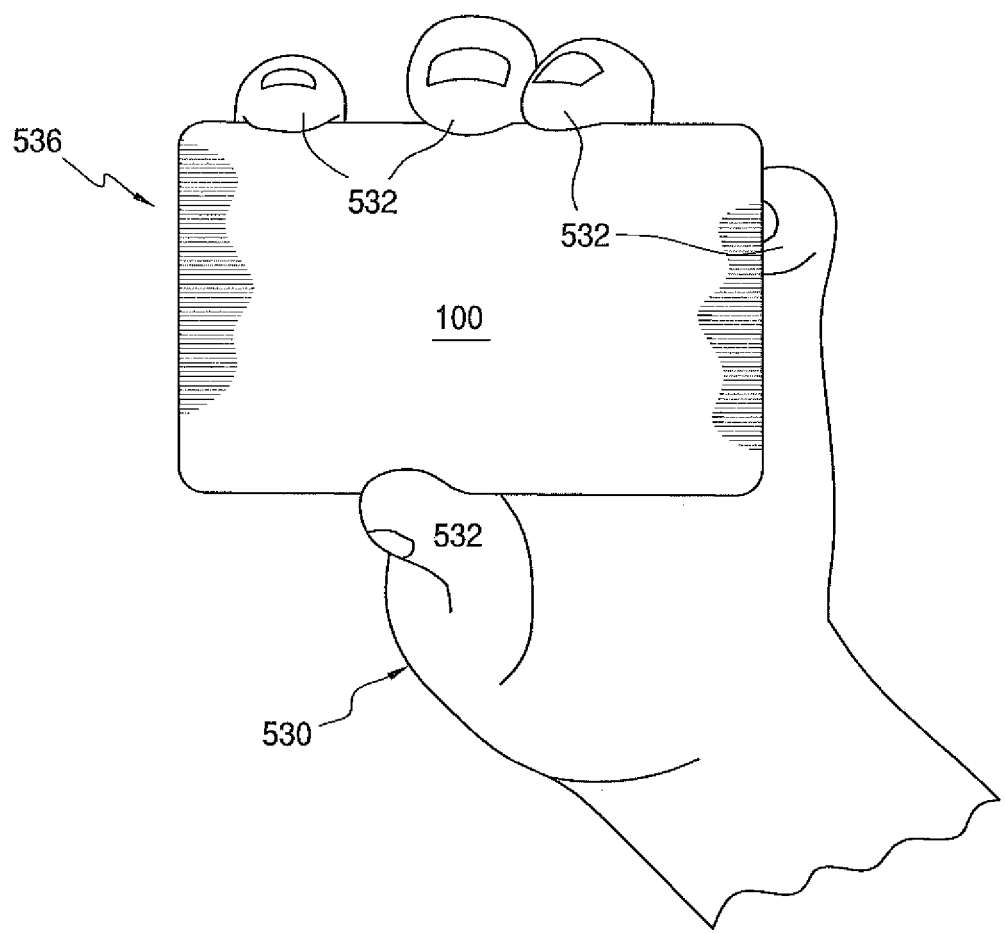
FIG. 38 is a view of a user's hand holding a card in a static gesture in accordance with an exemplary embodiment of the present disclosure.

In an exemplary embodiment shown in FIG. 38, hand 530 and fingers 532 are holding card 100 in an arrangement, grasp, or static gesture 536 that may be associated with the use of card 100 as a camera. Once card 100 recognizes arrangement, grasp, or static gesture 536, card 100 configures itself to be a telephone.

Figure 39:
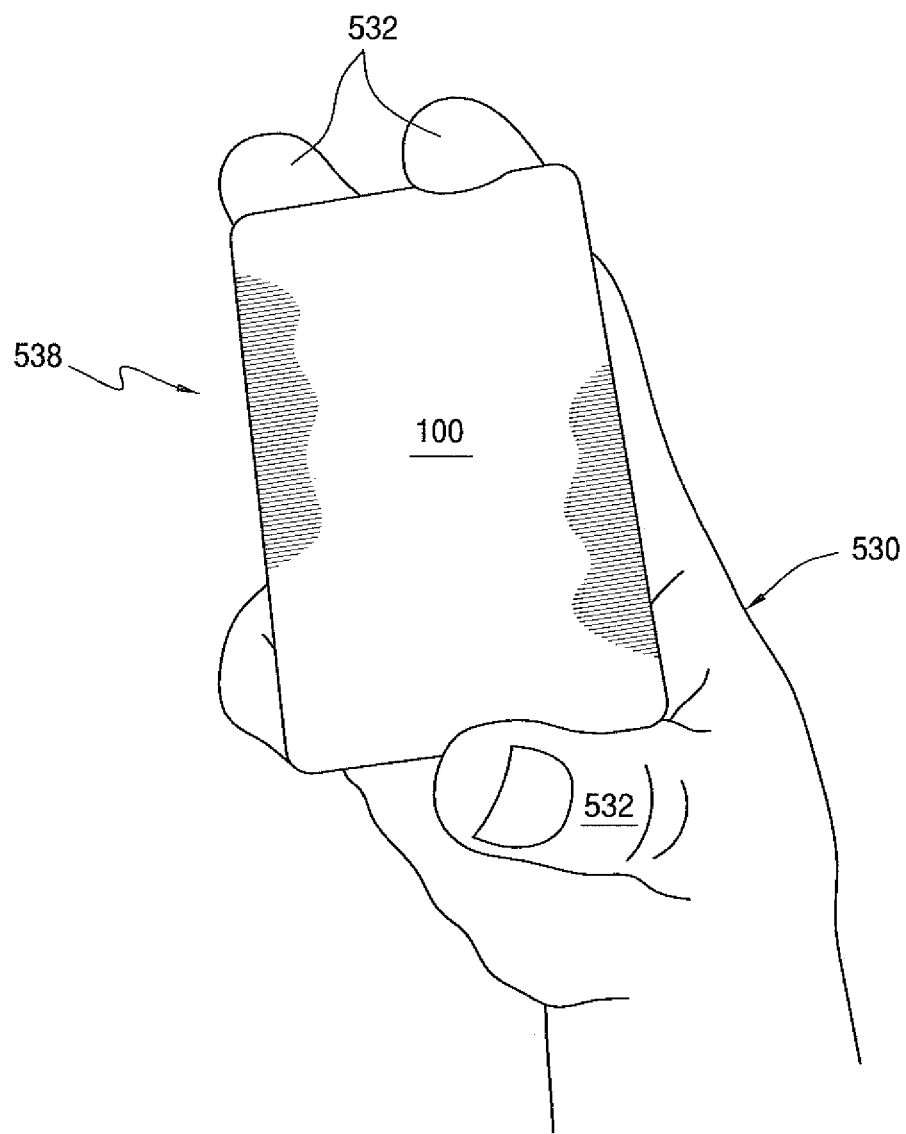
FIG. 39 is a view of a user's hand holding a card in a static gesture in accordance with an exemplary embodiment of the present disclosure.

In an exemplary embodiment shown in FIG. 39, hand 530 and fingers 532 are holding card 100 in an arrangement, grasp, or static gesture 538 that may be associated with the use of card 100 as an RFID scanner. Once card 100 recognizes arrangement, grasp, or static gesture 538, card 100 configures itself to function as an RFID scanner.

Of course, the embodiments of FIGS. 37-39 are but a small portion of the possible functions that may be accessed by a specific grasp or static gesture. For example, positioning card 100 in a first direction at a specific angle in conjunction with a specific grasp may indicate a texting function. Positioning card 100 in a second direction perpendicular to the first direction at a specific angle with a specific grasp may indicate an email function. Holding card 100 in a specific orientation such as static gesture 536 and pointing with a finger on the opposite hand or speaking a voice command can designate taking a photograph. Card 100 will provide the option to save or delete an acquired image, or a video clip, if a video option has been selected. The user of card 100 always has the option of selecting whether card 100 automatically recognizes gestures. Card 100 includes an array of discriminators or filters to decrease the chance of automatic selection of an undesirable mode, but mistakes can still happen, so having the ability to select the static gesture mode or to deselect the mode is an advantageous feature.

While various arrangements, grasps, or static gestures can be pre-defined, allowing the user of card 100 to define these arrangements provides benefits to the user. For example, persons having limited or no use of certain fingers or portions of a hand may need to define alternative grasp or static gesture configurations. Further, individuals using prosthetics may need to define unique static gestures appropriate to the configuration of the prosthesis. Additionally, some individuals use alternative body portions as hand substitutes, including the crook of an arm, feet and toes, the mouth, and more. Providing card 100 with the capability of adapting its functions to any definable or recognizable configuration or arrangement of body parts, mechanical aids, or biological aids, which may include service animals, provides a capability that is unique.

Figure 40:
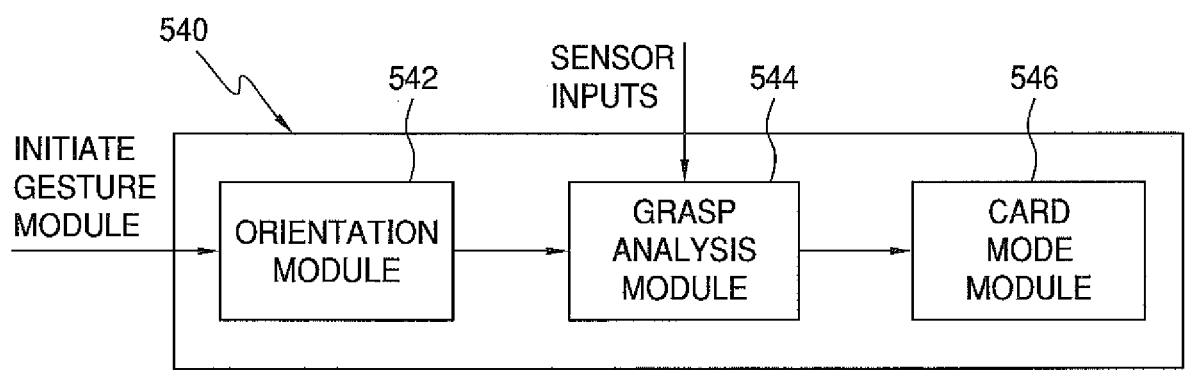
FIG. 40 is a gesture module for implementing the static gestures of FIGS. 37-39 in accordance with an exemplary embodiment of the present disclosure.

Referring to FIG. 40, a gesture module is shown and generally indicated at 540. Gesture module 540 uses an orientation of card 100 in combination with recognition of one or more objects, such as fingers or other body parts, a mechanical actuator, a biological actuator, or any combination of these. At least a portion of gesture module 540 is located in, for example, a processor 110 and one or more pixel layers of card 100. Gesture module includes an orientation module 542, a grasp analysis module 544, and a card mode module 546.

Gesture module 540 may be initiated within processor 110 of card 100 as part of a series of standard operating modules. Once initiated, orientation module 542 determines whether card 100 is being held in an orientation that conforms to a predetermined orientation that may be associated with a predefined card mode or function. If card 100 is being held in an orientation that may be associated with a predefined function or mode of card 100, information regarding the orientation is provided to grasp analysis module 544. In grasp analysis module 544, one or more sensor inputs are analyzed to determine whether an arrangement, grasp, or static gesture corresponds to a predetermined arrangement, grasp, or static gesture, and whether the combination of the arrangement, grasp, or static gesture and the orientation of card 100 corresponds to a mode or function stored in memory 114 and/processor 110 of card 100. Sensor inputs that are detected by grasp analysis module 544 include light detecting pixel elements 148 of light detecting layers 186a and 186b of FIG. 7B, and can include piezoelectric-in pixel elements 111 of piezoelectric-in layer 194a and 194b of FIG. 7B which are sensitive to touch. Grasp analysis module 544 analyzes the inputs from light detecting layers 186a and 186b as well as other inputs to determine if specific orientations of fingers 532 and hand 530 conform to a predetermined configuration. Such orientation can include where fingers 532 contact card 100, or a position of one or more fingers 532, such as a pointing finger 532 or a finger 532 raised at a specific angle to other fingers or to hand 530. For example, grasp analysis module 544 may receive inputs showing that at least three fingers are arrayed alongside first major side 101 or second major side 102 of card 100 and slightly overlap major surface or side 101 or 102, and a single finger is positioned longitudinally alongside an opposite side of card 100, but also overlapping the same major surface or side 101 or 102, as shown in FIG. 37. Grasp analysis module 544, located in one or more processors in card 100, such as processor 110, recognizes from optical inputs to light detecting layers 186a and/or 186b that the orientation of fingers 532 along either side of card 100 as shown in FIG. 37, is indicative of a grasp that grasp analysis module 544 equates to a telephone mode. If the combination of card orientation and grasp matches a predefined combination of card orientation and grasp, then the information is provided to card mode module 546, which changes the mode or function of card 100 to match the predetermined mode or function, such as a camera function, an RFID tag reading function, a telephone function, etc.

Figure 41:
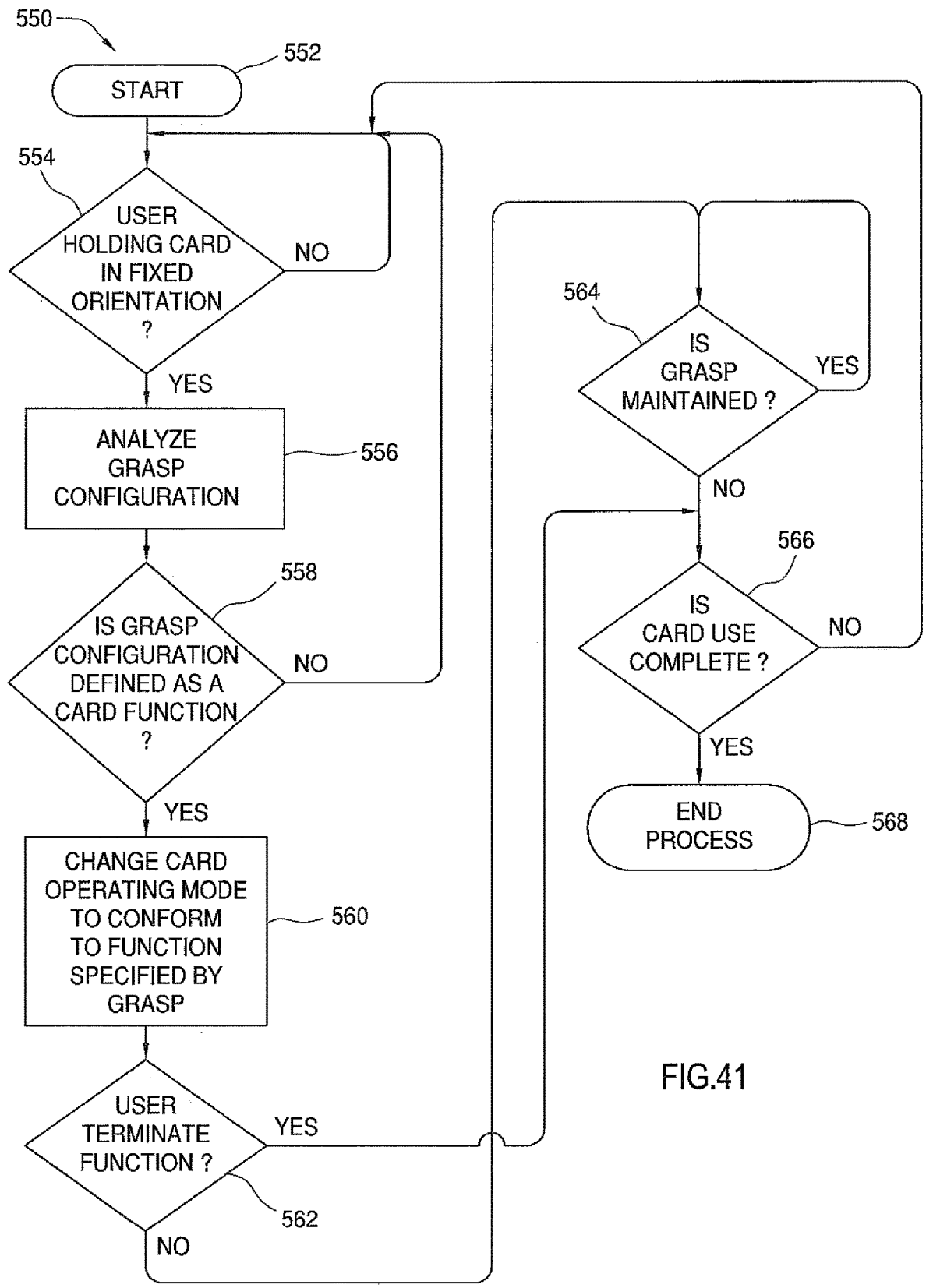
FIG. 41 is a process of the gesture module of FIG. 40 in accordance with an exemplary embodiment of the present disclosure.

Referring to FIG. 41, a gesture process in accordance with an exemplary embodiment of the present disclosure that may be in one or more modules of gesture module 540, and may be included in a processor of card 100, for example processor 110, is shown and generally indicated at 550. It should be noted that gesture process 550 may be a subroutine of a larger process, which may also be true of other processes described in this disclosure. As such, gesture process 550 may be regularly "polled" or checked to see if process 550 needs to be performed. Once gesture process 550 is completed or finished, control may then be returned to the calling or original process that handed control to gesture process 550.

Gesture process 550 begins with a start process 552. Start process 552 may include initializing variables, clearing registers, and other functions related to preparation for performing the various processes of gesture process 550, which may be performed in processor 110 or in other portions of card 100. Once start process 552 is completed, control passes from start process 552 to a fixed orientation decision process 554.

In fixed orientation decision process 554, which is part of orientation module 542, gesture process 550 determines whether card 100 is in a fixed orientation by analyzing inputs from one or more pixel layers. In the context of this embodiment of the disclosure, fixed orientation is defined as a grasp, static gesture, or configuration of body parts, prosthetics, biological aids, etc. that remains in substantially the same arrangement for a predetermined minimum interval of time. If the condition of fixed orientation decision process 554 is not met, gesture process 550 may loop through fixed orientation decision process 554 until such a condition is met. However, it is more likely that if the condition of fixed orientation decision process 554 is not met that control will be returned to a calling program or subroutine (not shown), which will effectively terminate gesture process 550 until gesture process 550 is called at some later time.

If processor 110 determines that the user of card 100 is holding card 100 in a fixed orientation by the analysis of sensor data, control passes from fixed orientation decision process 554 to a grasp analysis process 556, positioned at least partially in grasp analysis module 544. In grasp analysis process 556, the configuration of elements holding card 100, for example hand 530 and fingers 532, are analyzed in processor 110. For example, one or more pixel layers, such as light detecting pixel elements 148 of light detecting layers 186a and 186b, receive information regarding the position and orientation of fingers 532 and hand 530. While the data used to analyze the configuration of elements holding card 100 may be data from light detecting pixel elements 148, other pixels may be used to detect the elements holding card 100, such as magnetic-out pixels 109 and magnetic-in pixels 150, piezoelectric-out pixels 113, and/or piezoelectric-in pixels 111. The benefit to use a plurality of pixels is to expand the definition of static gesture or grasp to include that capability of detecting an arrangement of elements other than hands 530 and fingers 532. For example, card 100 may be held by a kinematic arrangement of ferromagnetic rods that can be detectable through non-visual pixels, such as magnetic-in pixel elements 150, or such a kinematic arrangement may be positioned inside a covering that is permeable to magnetic energy while being opaque visually. As previously noted, the plurality of sensing pixels positioned as a part of card 100 expands the ability to detect non-biological static gestures or grasps.

The analysis of elements holding card 100, for example hand 530 and fingers 532, can include positions of fingertips and an amount of overlap of card 100. Additionally, grasp analysis process 556 may try to match a range of features, such as hand 530 positioned along a portion of an edge of card 100 and a finger 530 positioned along the same edge, but a spaced distance away, and three fingers partially overlapping card 100, with a predetermined or user-defined set of features that are stored in, for example, processor 110 of card 100 or memory 114. Grasp analysis process 556 will attempt to match as many sensor inputs as possible to grasp configurations stored in memory 114, processor or controller 110, or elsewhere.

Once grasp analysis process 556 is completed, control passes from grasp analysis process 556 to a grasp configuration decision process 558. In grasp configuration decision process 558, processor 110 determines whether an arrangement, grasp, or static gesture has been associated with or defined as a card 100 function. Processor 110, as part of grasp analysis process 556, may have concluded that an arrangement of fingers, or a grasp or static gesture, is sufficiently close to the parameters of grasp analysis module 556 that conform to a grasp that equates to a telephone mode of card 100. If an arrangement, grasp, or static gesture detected by card 100 is not associated with a card 100 function or not defined as a card 100 function, control returns to fixed orientation decision process 554, described hereinabove. Control may also pass from grasp configuration decision process 558 to a calling or controlling program or subroutine in another embodiment. If an arrangement, grasp, or static gesture is associated with a card 100 function, control passes from grasp configuration decision process 558 to a mode change process 560.

In mode change process 560, located at least partially in card mode module 546, an operating configuration of card 100 is changed to conform to the function identified in grasp analysis process 556. As described hereinabove, such modes or functions can include a camera mode or function, a telephone mode or function, an RFID scanning mode or function, a sound scanning or sonogram mode or function, or other modes programmed into processor 110 of card 100. Once card 100 is functioning in the mode defined by grasp analysis process 556, control passes from mode change process 560 to a user termination process 562.

In user termination process 562, processor 110 determines whether a user desires to either end or terminate the present mode or function, or whether the user desires to change to a different mode or function. Such desires may be expressed by the user by changing grasp or static gesture on card 100, or by accessing virtual controls on card 100 directly. If the user desires to terminate the present mode or function, control passes from user termination process 562 to a card use complete decision process 566, described in more detail hereinbelow. If the user desires to continue using card 100, control passes from user termination process 562 to a grasp maintained decision process 564.

In grasp maintained decision process 564, processor 110 determines whether the arrangement for holding card 100, the grasp on card 100, or the static gesture used to hold card 100 is being maintained. If the arrangement, grasp, or static gesture is being maintained by the user, control loops through grasp maintained decision process 564 until the user disengages or changes the arrangement, grasp, or static gesture, at which time control passes from grasp maintained decision process 564 to card use complete process 566.

In card use complete process 566, processor 110 determines whether the user is finished using card 100. Such determination may be made by a change in arrangement, grasp, or static gesture, or may be made when the user accesses virtual controls on card 100. If the user is continuing to use card 100, control passes from card use complete process 566 to fixed orientation decision process 554. As with other processes previously described, in another embodiment control may pass from card use complete process 566 to a calling program or subroutine, returning to gesture process 550 at a later time. If the user of card 100 is finished using card 100, control passes from card use complete process 566 to an end process 568, where card 100 can go into a dormant, sleep, or shutdown mode to conserve power, which thus terminates gesture process 550.

While the discussion of static gestures has focused on card 100, mat 500 also operates based on a visual recognition or analysis. When a finger moves to actuate a feature displayed on mat 500, mat 500 actuates based on visual analysis of the finger from inputs received from light detecting pixel elements 148 by a processor similar to processor 110, which is effectively a gesture, and depending on a time on station or the amount of time the finger remains in a particular location prior to recognition by mat 500, such a gesture may be a static gesture. While this description describes fingers, mat 500 may also be trained to recognize other objects as an actuating device, such as stylus, a pencil or pen, a piece of wood, a metal rod, etc. The kinds or types of objects that mat 500 can be trained to recognize is, for all practical purposes, limitless. Conversely, if mat 500 is trained to recognize, using sensing capabilities to detect shape, distance, etc., for example, a pencil as an actuating object, any object that does not meet the form and color of a pencil will not be recognized, and mat 500 will be unresponsive. By training mat 500 to recognize a specific object as an actuating object provides significant security for operation of mat 500, making it difficult for a third party to know that the specific object is, for example, a bamboo chopstick typically stored in a drawer of tools.

Figure 42:
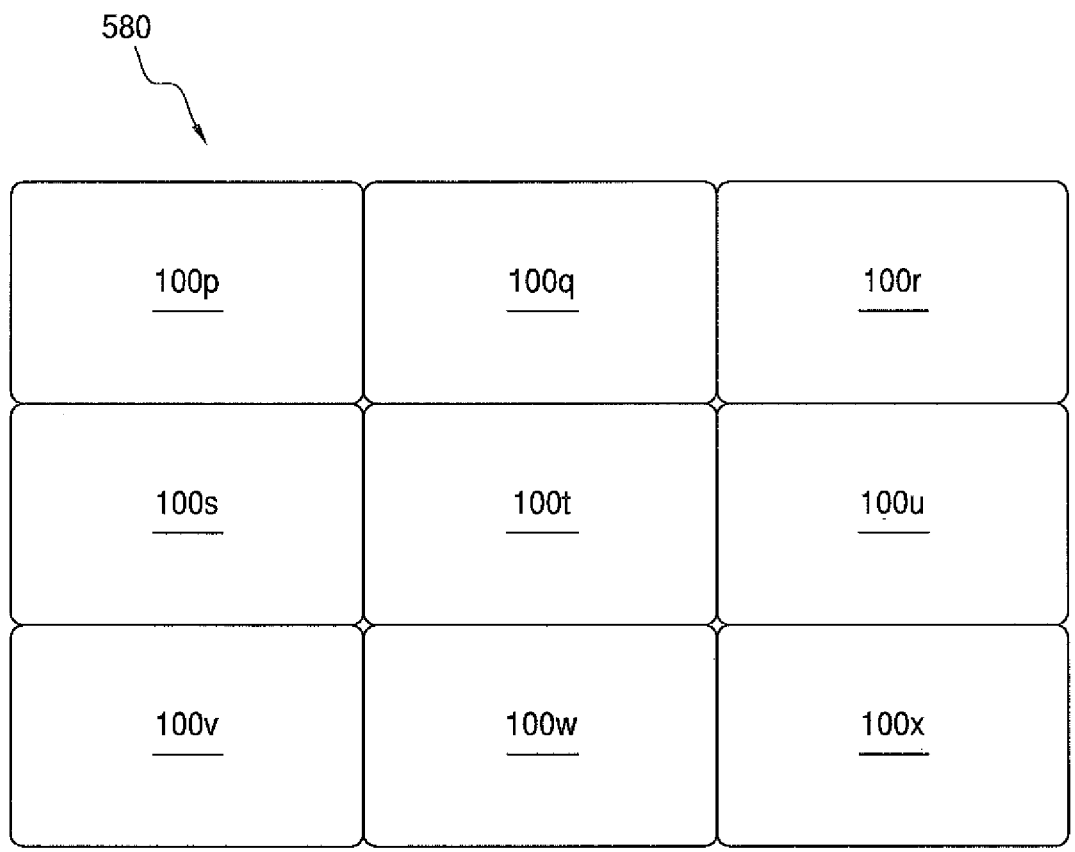
FIG. 42 is a plan view of a plurality of cards in a side-by-side arrangement.
Figure 43:
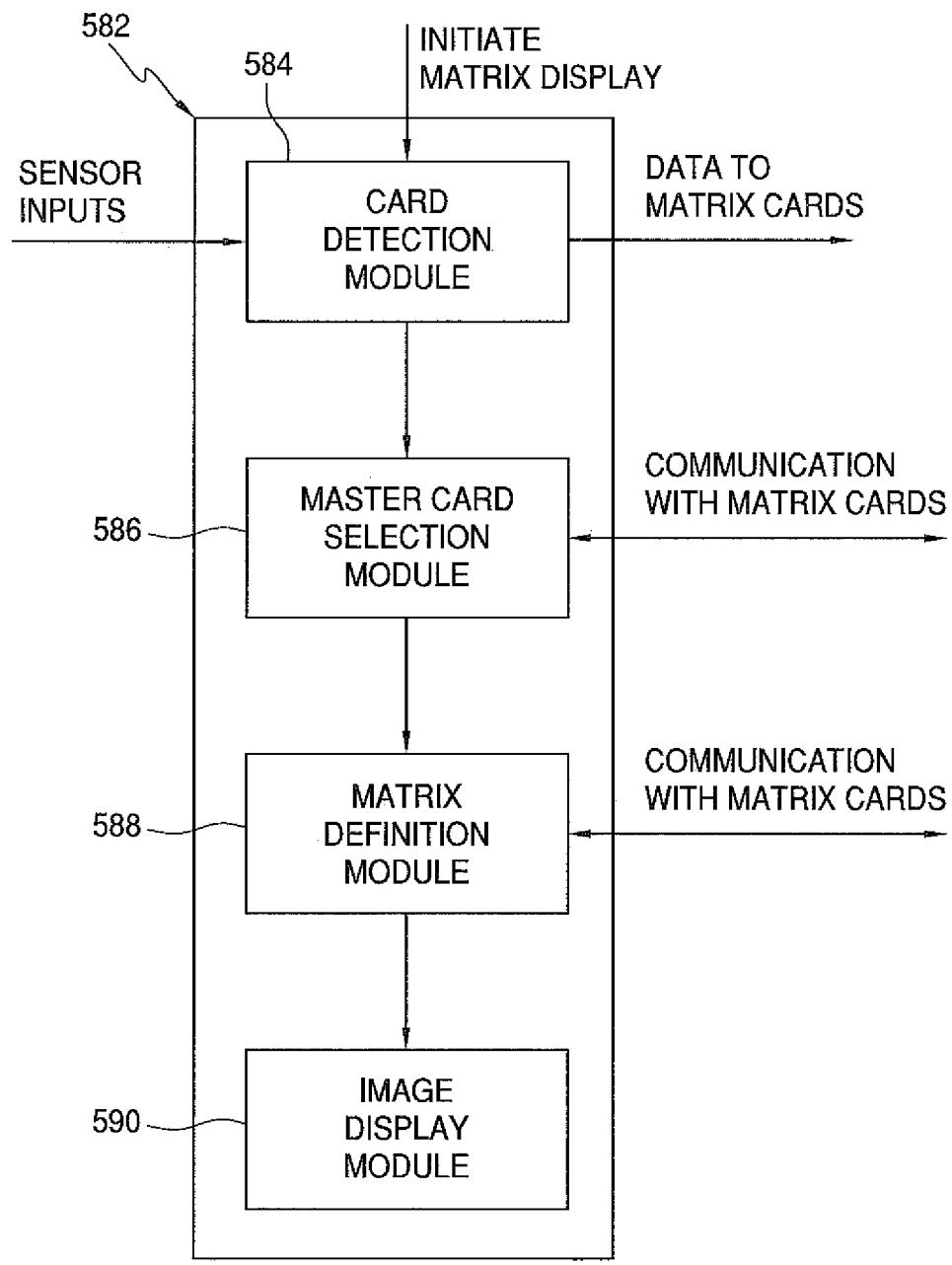
FIG. 43 is a matrix display module for creation of an ad hoc display using a plurality of cards in accordance with an exemplary embodiment of the present disclosure.
Figure 44:
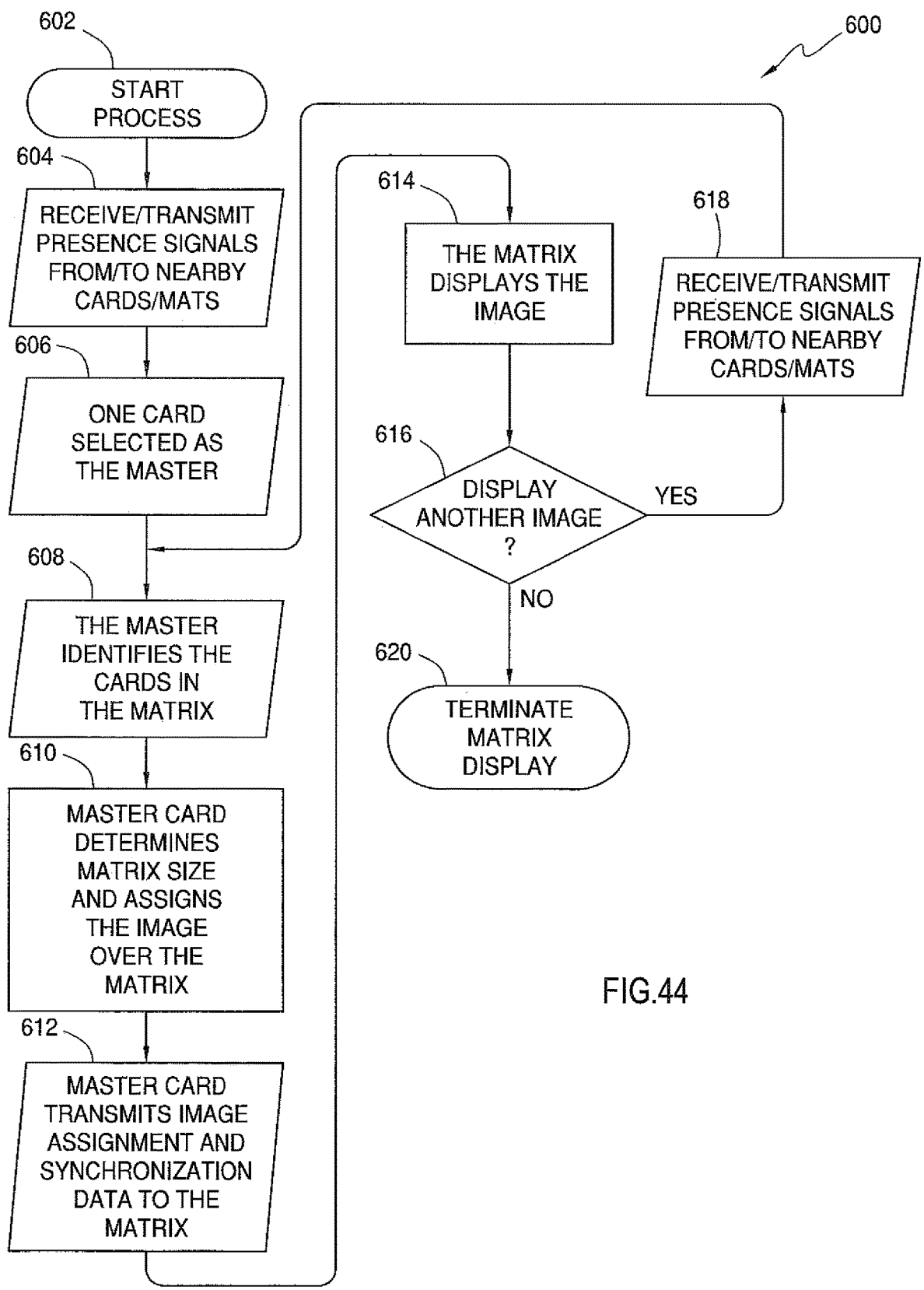
FIG. 44 is a matrix display process of the matrix display module of FIG. 43 in accordance with an exemplary embodiment of the present disclosure.

The sensor and display capabilities of card 100 provide the capability of transforming a plurality of cards 100 into a high-resolution ad hoc display. Referring to FIGS. 42-44, an ad hoc matrix display in accordance with an exemplary embodiment of the present disclosure is shown and generally indicated at 580. In the exemplary embodiment, matrix display 580 includes a plurality of cards 100, identified as 100$p$, 100$q$, 100$r$, 100$s$, 100$t$, 100$u$, 100$v$, 100$w$, and 100$x$. It should be apparent from the present disclosure that an ad hoc matrix display of nearly any size is possible, limited only by memory and processing power of cards 100.

In order to create matrix display 580, a matrix display module in accordance with an exemplary embodiment of the present disclosure is provided and shown generally at 582 in FIG. 43. Matrix display module 582 is located at least partially in processor 110 and light emitting pixel layer 198$a$ and/or 198$b$ of one card 100 and typically includes the processor and light emitting pixel layer of at least two cards 100. Matrix display module 582 includes a card detection module 584, a master card selection module 586, a matrix definition module 588, and an image display module 590. Card detection module 584 receives an initiate matrix display signal or control input, which initiates matrix display module 582. Initiate matrix display signal or control input may be provided by a card user who desires to create an ad hoc matrix display. However, card 100 may also continuously receive sensor inputs, such as Wi Fi or other RF signals such as RFID, and when one or more sensor inputs of card 100 are analyzed by processor 110 to thus identify the proximity of other cards in a side-by-side relationship, cards 100 may automatically change into an ad hoc display. Once the presence of adjacent cards 100 has been identified, the list of matrix cards is provided by card detection module 584 to master card selection module 586. Master card selection module 586 determines which of the cards 100 is the master or controlling card for matrix display 580. In an exemplary embodiment, the user or users of card 100 may specifically identify a particular card 100 as the master or controlling card, and this data or information is provided to the other cards in the matrix in card detection module 584. In another embodiment, processors 110 of cards 100 may negotiate with each other to determine which card 100 is best positioned to be the master or controlling card. In yet another embodiment, card 100 having time priority in matrix 580, i.e., the first card in matrix 580, may be accepted by all other cards 100 as the master or controlling card.

Once the master or controlling card 100 has been identified, control passes to matrix definition module 588, where processor 110 of master card 100 verifies the arrangement of cards 100 in ad hoc matrix display 580. Processor 110 of master card 100 also determines the approximate size of ad hoc matrix display 580 to determine the optimal display configuration for an image, which may be a document, a picture, a video, a live image, or any other item capable of being displayed. Once processor 110 of master card 100 has determined the number of cards 100 and the distribution of cards 100, processor 110 of master card 100 assigns specific portions of the image to be displayed to processor 110 of each individual card 100 in matrix display 580. Once processor 110 of master card 100 determines the optimal configuration of all available cards in matrix display 580 and transmits that information to processors 110 of other cards 100 in matrix display 580 along with synchronization information, control passes from matrix definition module 588 to image display module 590, where the image is displayed or emitted from light emitting layer 198*a* and/or 198*b* as assigned by processor 110 of master card 100 on each card 100 of matrix display 580, which includes master card 100.

Referring to FIG. 44, a matrix display process in accordance with an exemplary embodiment of the present disclosure that may be in one or more modules of module 582, and may be at least partially included in a processor of card 100, for example processor 110, is shown and generally indicated at 600. It should be noted that matrix display process 600 may be a subroutine of a larger process, which may also be true of other processes described in this disclosure. As such, matrix display process 600 may be regularly "polled" or checked to see if process 600 needs to be performed. Once matrix display process 600 is completed or finished, control may then be returned to the calling or original process that handed control to matrix display process 600. It should also be noted that while reference is made to card 100 throughout the description of FIGS. 42-44, the description is also applicable to mat 500 and any other device having capabilities similar to card 100 and mat 500.

Matrix display process 600 begins with a start process 602. In start process 602 aspects of the function of card 100 and any systems relating to matrix display process 600 may be prepared for operation, such as clearing registers, establishing predetermined values, etc. Once start process 602 is complete, control is passed from start process 602 to a first card presence signals process 604.

In first card presence signals process 604, all cards 100 in proximity to each other transmit and receive signals to each other to establish proximity appropriate to establishment of an ad hoc display. For example, nine cards may be positioned as shown in FIG. 42, which shows a plurality of cards 100 (100*p*-100*x*) in a side-by-side relationship when seen in a plan view or in a direction that is orthogonal or perpendicular to the direction of cards 100. Each card 100 may either periodically send out a near field communication signal seeking other cards 100, which can occur about once every few seconds to minimize power usage, or a user of card 100 can activate a near field communication search function in deliberate or intentional preparation for creating an ad hoc matrix display. Once all cards 100 in proximity to each other communicate and establish their presence, control moves from card presence signals process 602 to a master card selection process 606.

Master card selection process 606, performed at least partially in master card selection module 586, uses one or more techniques to determine the controlling or master card 100 of matrix display 580. In an exemplary embodiment, the user(s) of cards 100 may preselect a particular card 100 to be the master, in which case all cards 100 recognize a specific card, for example card 100*t* of FIG. 42, as the master or controlling card. In another embodiment, processors 110 of cards 100 may determine that a particular card 100 is in an optimal position to communicate with all other cards 100 in matrix display 580. In yet another embodiment, the first processor 110 of a particular card 100 to recognize the presence of other cards 100 in matrix display 580, i.e., the first card 100 of matrix display 580 from a time perspective, may be selected by the processors 110 of all cards 100 as the master or controlling card. Once master card 100 is selected or determined, control passes from master card selection process 606 to a matrix identification process 608.

In matrix identification process 608, processor 110 of master card 100, which will be referred to as master card 100*t* for clarity for the remainder of the description of matrix display process 600, determines cards 100 belonging to the ad hoc matrix as a part of matrix definition module 588. This process or step is important because cards 100 that are in close, in proximity, nearly adjacent, adjacent, or side-by-side to each other are assumed by master card 100*t* to be part of ad hoc matrix display 580, by cards that are further way, for example, at least four to six inches away, though some ad hoc matrix displays, such as might exist in a stadium, arena, or other large area with large numbers of people holding their own card 100, might permit cards 100 to be even further away and still be part of an ad hoc matrix display. Once all cards 100 sufficiently close to each other and to master card 100*t* have been identified by processor 110 of master card 100*t*, control moves from matrix identification process 608 to an image adaptation process 610.

An image to be displayed on matrix display 580 needs adapted to the size of matrix display, which is dependent on the number of cards 100 available, and the arrangement or configuration of cards 100; i.e., are there gaps in the display or irregularities that need to be accommodated. In image adaptation process 610, processor 110 of master card 100*t* evaluates the image to be displayed and the availability of display space, and provides a best fit for the image. As described hereinabove, the term image may describe a document, a picture, a video, or any other item that may be visually presented. Once cards 100, or mats 500, have been analyzed and defined as matrix display 580 by processor 110, and a best fit of the image with respect to matrix display 580 has been determined by processor 110, then each card 100 in matrix display 580 is assigned a portion of the image. Control then passes from image adaptation process 610 to a data transfer process 612.

In data transfer process 612, processor 110 of master card 100*t* transfers data to each card 100 in matrix display 580 by way of RF output or optical output through edge or side 105. The data received by each card 100 is prepared by processor 110 for display of a specific, non-overlapping portion of the image. Master card 100*t* may also transmit synchronization information to each card 100 in matrix display 580 to maintain a temporal continuity to images displayed on matrix display 580; i.e., the timing of the display of the image on each card 100 in matrix display 580 is synchronized to assure that each card 100 is displaying a portion of the same image at the same time. It should be apparent from the description hereinabove that all communication between cards 100 in matrix display 580 is typically wireless, though wired connections are also possible and may be desirable in some situations. Once assignment and synchronization data have been transmitted to all cards 100 in matrix display 580, control passes from data transfer process 612 to an image display process 614.

In image display process 614, each card 100 in matrix display 580 displays a portion of an image by actuating first light emitting unit 122 and/or second light emitting unit 124, causing light emitting pixel elements to operate. Control then passes to an image decision process 616, where processor 110 of card 100t determines whether the current image displayed needs to be maintained, or whether a new image is desirable. If either the current image needs displayed, or a new image needs displayed, control passes to a second card presence signals process 618. If display of images on matrix display 580, or if matrix display 580 is being dismantled, then control passes to a termination process 620, where all cards 100 are disconnected from each other and matrix display process 600 ends.

Returning to second card presence signals process 618, though it may be desirable to maintain a static configuration of matrix display 580, in a dynamic environment, such as might occur in a gathering of individual card 100 holders, the number of cards 100 that are part of matrix display 580 may increase or decrease over time. Thus, in second card presence signals process 618, processor 110 determines whether cards 100 that form part of matrix display 580 have remained constant since the previous determination. If cards 100 have been added or removed from matrix display 580, the information provided by all cards 100 to card 100t in second card presence signals process 618 will be used by processor 110 to adapt matrix display 580 to the availability of cards 100. Once second card presence signals process 618 is complete, control passes from process 618 to matrix identification process 608, and matrix display process 600 continues as described hereinabove.

Though the previous exemplary embodiment described placing a plurality of cards 100 adjacent or next to each other on a relatively flat surface, a holder having a material to which magnets are attracted, such as a ferromagnetic material, or a substrate including permanent magnets or electromagnets, may be used as a mounting surface for a plurality of cards 100. Such a holder permits the creation of vertically extending surfaces that will return a plurality of cards 100 for a temporary or permanent ad hoc display. By incorporating software into each processor 110 of card 100 for creation of ad hoc displays, the capability of arranging a plurality of cards 100 into such a vertical display makes the creation of displays easy and inexpensive, with relatively little sacrifice of appearance along adjacent edges of cards 100.

Figure 45:
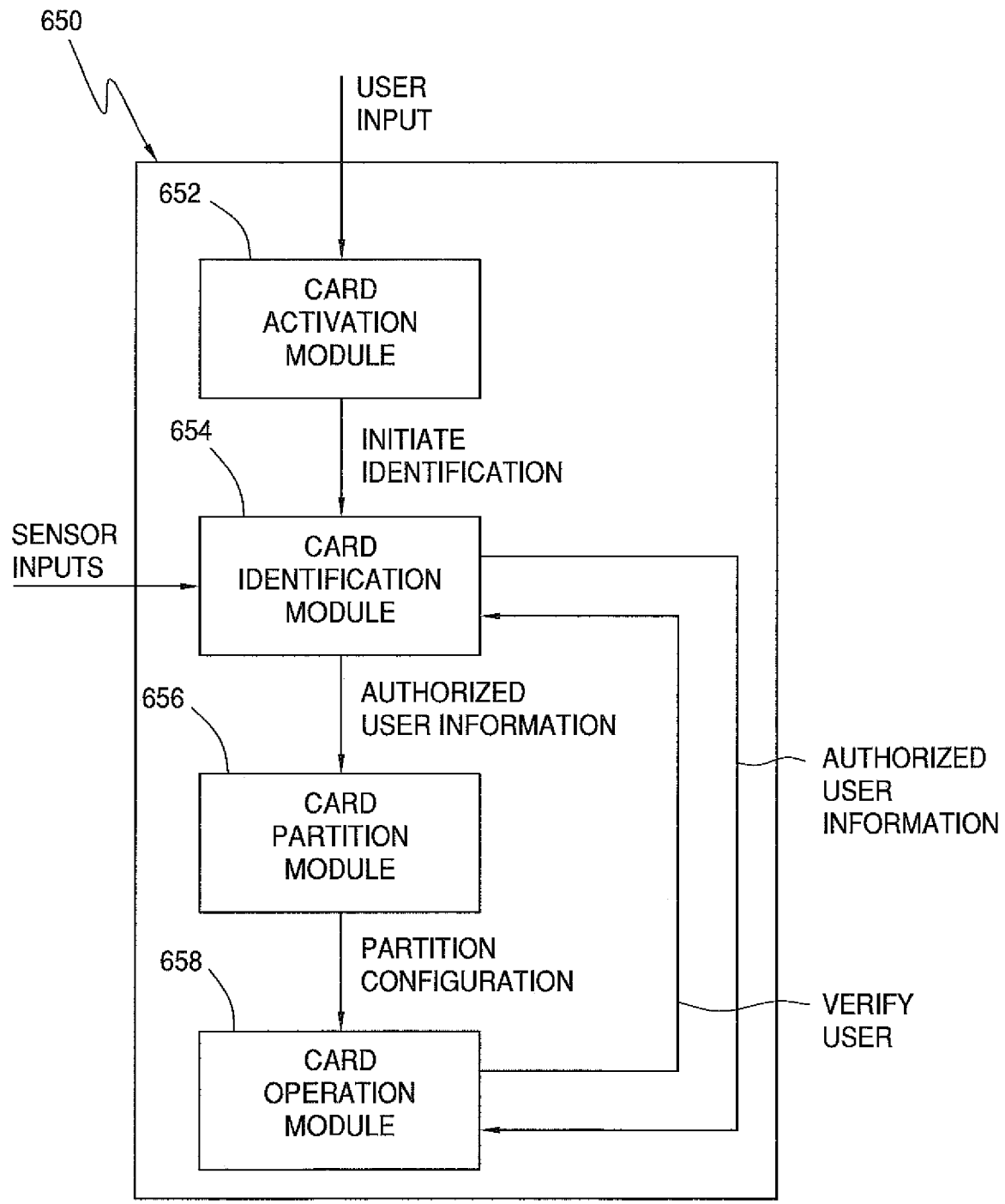
FIG. 45 is a user identification and control module in accordance with an exemplary embodiment of the present disclosure.
Figure 46:
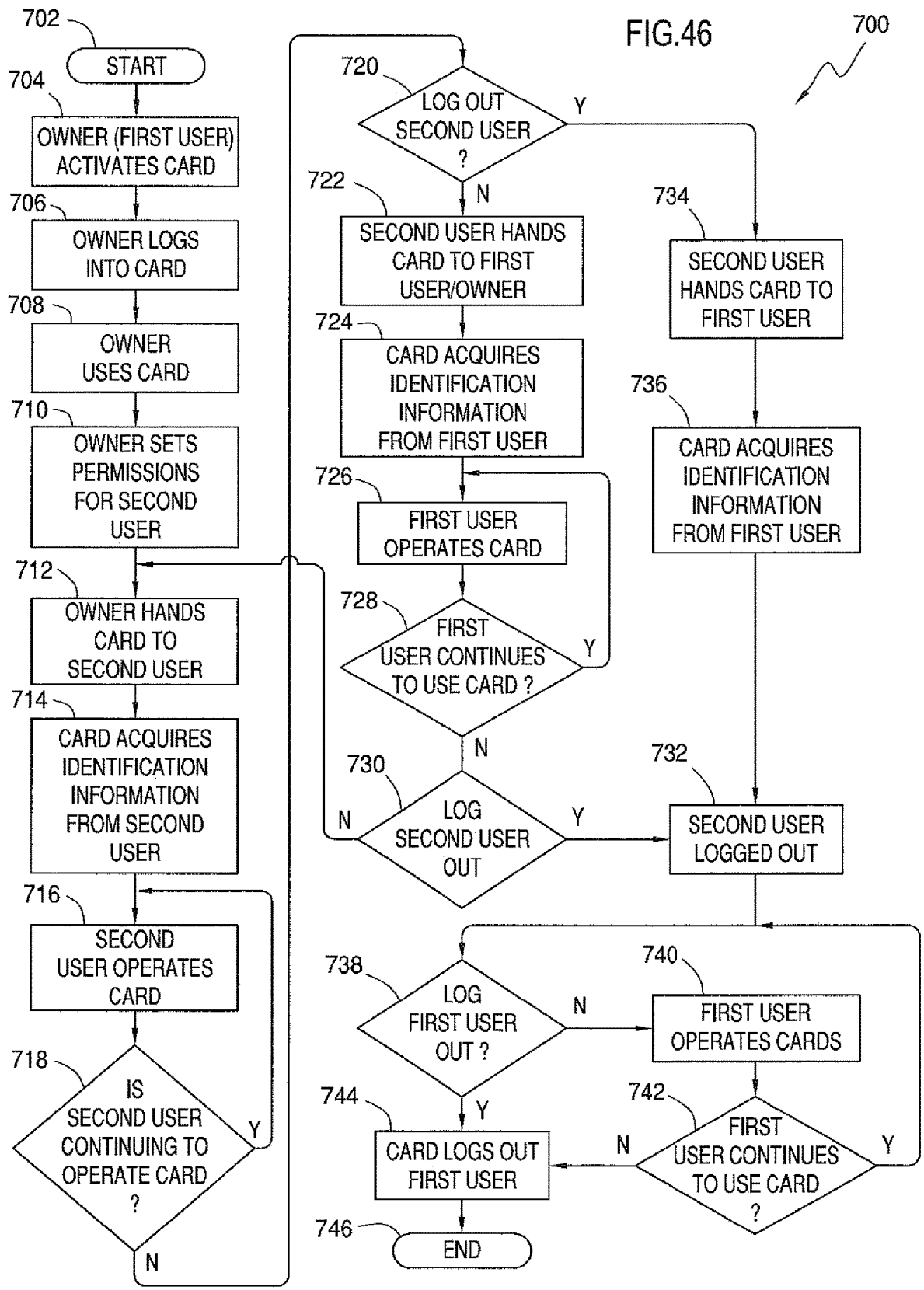
FIG. 46 is a user identification process of the user identification and control module of FIG. 45 in accordance with an exemplary embodiment of the present disclosure.

Because card 100 includes components and functions that can identify each user uniquely by biometric data, processor 110 of card 100 is capable of permitting more than one user to be logged in to processor 110 of card 100 at the same time, with each user capable of accessing the capabilities and files of card 100 to the extent permitted by the primary card owner. For example, a card 100 owner may permit a second user access to the owner's card 100. The owner of card 100 is uniquely identified by at least one biometric input, such as fingerprint, micro-pulse patters, voice identification, etc., and may be identified by one or more other inputs, such as passwords, pattern recognition, etc. The owner of card 100 sets permissions in processor 110 of card 100 to allow the second user access to processor 110 of card 100. When the owner sets permissions in processor 110 of card 100, the owner can partition a directory in memory 114 and/or processor 110 and limit access to information stored in card 100 for the second user. Once processor 110 of card 100 recognizes the second user by way of one or more inputs from pixel layers described herein, for example FIG. 7B, processor 110 of card 100 will recognize the user of card 100 via biometrics received from one or more pixel layers, and each user may be logged in to processor 110 of card 100 simultaneously. In an actual use situation, the owner of card 100 may be using card 100 for a first purpose, and processor 110 of card 100 recognizes the use. When the owner of card 100 hands card 100 to the second user, processor 110 of card 100 obtains one or more biometric inputs from one or more pixel layers, and permits the second user access to the portion of card 100, e.g., memory 114 and processor 110, to which the second user is authorized. The second user may then hand card 100 back to the card 100 owner, and processor 110 of card 100 restores the session for the card 100 owner where it left off when the owner of card 100 handed card 100 to the second user. In the case where two users are in range of card 100 at the same time, processor 110 of card 100 may ask, via transmission from a pixel layer, the card 100 owner which user should be in control. FIGS. 45 and 46 illustrate modules and processes that may be performed to permit at least two users to log into an exemplary embodiment of card 100. It should be apparent that the modules and process of FIGS. 45 and 46 can be expanded to permit operation by more than two users, limited only by memory 114 and the ability of processor 110 to handle operations from multiple users.

Referring to FIG. 45, a user identification and control module is shown and generally indicated at 650. User identification and control module 650 includes a card activation module 652, a card identification module 654, a card partition module 656, and a card operation module 658. User identification and control module 650 may be housed at least partially in processor 110, or in other portions of card 100 associated with control of the processes and functions of card 100. User identification and control module 650 operates when a card owner actuates, "powers up," operates, or performs the action necessary to cause card 100 to be functional, which causes a user input to card activation module 652. Card activation module 652 sends an initiate identification signal to card identification module 654, which receives sensor inputs in at least one of the plurality of sensor pixels described hereinabove, e.g., light detecting pixel elements 148.

Card identification module 654 transmits authorized user information to other modules of user identification and control module 650 when requested by the other modules of user identification and control module 650. An owner of card 100 is fully authorized to permit or authorize others to be user some or all features of card 100, though always being subservient to the authorization of the owner or primary user of card 100. Such authorization is performed in card identification module 654. Once an identified user has been identified from sensor inputs and other inputs, such as passwords, graphic passwords, voice prints, retinal printer, etc., authorized user information is transmitted to card partition module 656.

Card partition module 656 generally provides partitions only when multiple users are operating card 100. Thus, if only the owner of card 100 is operating card 100, partitions are unnecessary, and card 100 effectively bypasses card partition module 656. If multiple users are operating card 100, card partition module 656 provides a location in memory, such as memory 114, for subservient or non-owner users of card 100 to operate without compromising the data of other users. Thus, processor 110 of card 100 segregates the data or information of each user from each other through partitioning, which may be physical partitioning or virtual partitioning. If multiple users are operating card 100, the partitions are formed and information regarding the partitions is provided to card operation module 658.

In card operation module 658, each operation is associated with biometric and possibly other inputs, such as passwords, and the operation requested is delegate to the appropriate partition established by card partition module 656. In order to provide the association with each user, each time an operation is performed in card operation module 658, card operation module 658 sends a verify user request to card identification module 654, which operates as described hereinabove and provides authorized user information back to card operation module 658. While verifying the identification of each user for each operating step can be time consuming, multiple processors may be positioned in card 100 to handle biometric inputs and to perform the identification functions described hereinabove. Though card 100 may operate more slowly with multiple users than with a single user, the advantage of allowing multiple users to operate card 100 is significant in some environments, such as in a business meeting or conference.

User identification & control module 650 may include processes to perform the functions of module 650, such as a user identification process shown in FIG. 46 and generally indicated at 700. User identification process 700 begins with a start process 702, which may include processor 110 of card 100 sensing that card 100 has been picked up by someone, though start process 702 may also include no specific actions by card 100. From start process 702, control moves from start process 702 to a card activation process 704.

In card activation process 704, the first user switches card 100 from standby or off to on, at which time processor 110 of card 100 may clear registers, set initial processor 110 values, boot programs, and perform other functions necessary for the initial operation of card 100. Once card activation process 704 is complete, control passes from process 704 to a login process 706.

In login process 706, processor 110 of card 100 accepts login information from a first user by way of at least one input pixel layer, such as light detecting layer 186*a* or 186*b*, which in the exemplary example is assumed to be the card "owner," using the term "owner" in the sense that the "owner" is the person who typically uses card 100 and has responsibility for card 100. In an exemplary embodiment, card 100 may be owned by an organization and loaded with one or more features, such as a corporate credit card, site or room access codes, and other information related to the organization. Card 100 may then be assigned to an officer or employee of the organization who then becomes the card holder or "owner," though card 100 in this example belongs to the organization. Card 100 login information may include one or more of a password, graphic input, voice print, retinal scan, and other manual or biometric inputs. Once the first user is logged in, control passes from login process 706 to a first user or owner operation process 708.

Under circumstances where the first user of card 100 is the only user, first user operation process 708 continues until the first user is finished using card 100. If the first user stops using card 100 for an extended period, processor 110 of card 100 may go into a standby mode or a power off mode, depending on the time interval since the first user has operated card 100. However, in the context of user identification process 700, at least one other person will be using card 100, so control passes from first user operation process 78 to a permissions process 710.

In permissions process 710, the first user sets permissions for at least one additional user, which is a second user in this example. In another exemplary embodiment of the present disclosure, the first user may set permissions for a practically unlimited number of additional users. For each person authorized for simultaneous login and use of card 100, the first user may set a password or set a mode of card 100 to processor 110 of enable card 100 to acquire biometric information from the second (and third, fourth, etc.) user. Once processor 110 of card 100 has biometric information from the second user, obtained from at least one input pixel layer of card 100, the first user can either maintain the biometric information in memory 114 or in other locations readily accessible to card 100. During the permissions process, processor 110 of card 100 automatically partitions a portion of memory 114 for the second user, and populates the partition with information provided by the first user with respect to access of memory 114. The first user may provide permission for the second user to the extent permitted by either the first user, which may include full access to processor 110 and memory 114 of card 100 to minimal access of processor 110 and memory 114 of card 100, such as photographs, videos, a specific file, etc., or by limits set by a corporation policy, which may limit what a card holder may set as permissions. Once permissions have been set for the second user, which may have occurred in a previous session with card 100, control is passed from permissions process 710 to a first handoff process 712.

In first handoff process 712, the first user physically provides card 100 to the second user. Processor 110 of card 100 periodically queries one or more sensor layers, described hereinabove, and when processor 110 of card 100 recognizes that card 100 is no longer in possession of the first user, processor 110 of card 100 attempts to acquire identification information from the second user in a second user identification process 714. Such identification information may be one or more kinds of information available to processor 110 of card 100, such as visual or optical, micropulse information, Kirlian, etc. If processor 110 of card 100 is able to match the biometric information it receives in various sensors, then processor 110 of card 100 recognizes that the second user is an authorized user and is permitted access to the partitioned portion of memory 114. Though not shown in FIG. 46, if processor 110 of card 100 is unable to recognize the second user, processor 110 of card 100 may be programmed to contact legal authorities, a bank, or other entities via its Wi Fi or other transmission capabilities, alerting one or more entities that the possessor of card 100 is not an authorized user of card 100. Once processor 110 of card 100 identifies the second user of card 100, control passes from second user identification process 714 to a second user operation process 716.

In second user operation process 716, the second user operates card 100 to the extent permitted by the partition established by the first user. Control periodically passes to a second user operation decision process 718, where processor 110 of card 100 determines whether card 100 is continuing to use card 100. Such use may be active use, through gestures, using card 100 as a display, or other active uses of card 100 permitted by partitioning of memory 114 and processor 110 of card 100. If the second user is continuing to use card 100, control passes to second user operation process 716. If the second user is no longer using card 100, control passes from second user operation decision process 718 to a log out second user decision process 720.

In log out second user decision process 720, processor 110 determines whether the second user needs to be logged out. Such decision may be based on the lack of input or continued use of card 100, or may be as simple as the second user preparing to return card 100 to the first user. If the second user is not going to be logged out, control moves from second user decision process 720 to a second handoff process 722, where the second user hands card 100 to the first user. Control then passes from second handoff process 722 to a first user identification process 724.

In first user identification process 724, processor 110 of card 100 uses the various identification processes described herein to determine the identification of the first user. Once the identification of the first user has been established, control passes to a first user operation process 726, where the first user operates card 100. Periodically, control passes from first user operation process 726 to a first user operation decision process 728, where processor 110 of card 100 determines whether the first user is continuing to operate card 100. If the first user is continuing to operate card 100, control passes from first user operation decision process 728 to first user operation process 726. If the first user does not appear to be using card 100, control passes from first user operation decision process 728 to a log out second user decision process 730.

In log out second user decision process 730, processor 110 determines whether the second user is going to operate card 100. If the second user is going to operate card 100, control moves to first handoff process 712, and operation of user identification process 700 continues as described hereinabove. If the second user is no longer going to operate card 100, control passes from log out second user decision process 730 to a second user logout process 732, where the second user is logged out of processor 110 of card 100.

Returning to log out second user decision process 720, if the second user is going to be logged out, control passes to a third handoff process 734, where card 100 is restored to the first user. Control then passes from third handoff process 734 to a first user identification process 736, where processor 110 of card 100 functions to acquire biometric information from the first user to attempt to identify the first user as an authorized user, using the various techniques described herein. Once the first user has been identified, control passes to second user logout process 732, described hereinabove.

From second user logout process 732, control passes to a log out first user decision process 738. In process 738, a decision is made as to whether the first user needs logged out. Such a decision may be automatic and made by card 100, based on the interval since the first user operated card 100, or such a decision may be made by the first user and logout may be performed manually. If the first user is not going to be logged out, then control passes to a first user operation process 740, where the first user continues to operate card 100. Control then passes from first user operation process 740 to a first user operation decision process 742.

In first user operation decision process 742, processor 110 determines whether the first user is continuing to operate card 100. If the first user is continuing to operate card 100, control passes to log out first user decision process 738, described hereinabove. If the first user is no longer continuing to operate card 100, control passes to a first user logout process 744. Returning to log out first user decision process 738, if the first user is going to log out from card 100, control passes from first user decision process 738 to first user logout process 744. In first user logout process 744, the first user is logged off from card 100 by processor 110. Card 100 may then go into a standby or shutdown mode, and user identification process 700 terminates with an end process 746.

Figure 47:
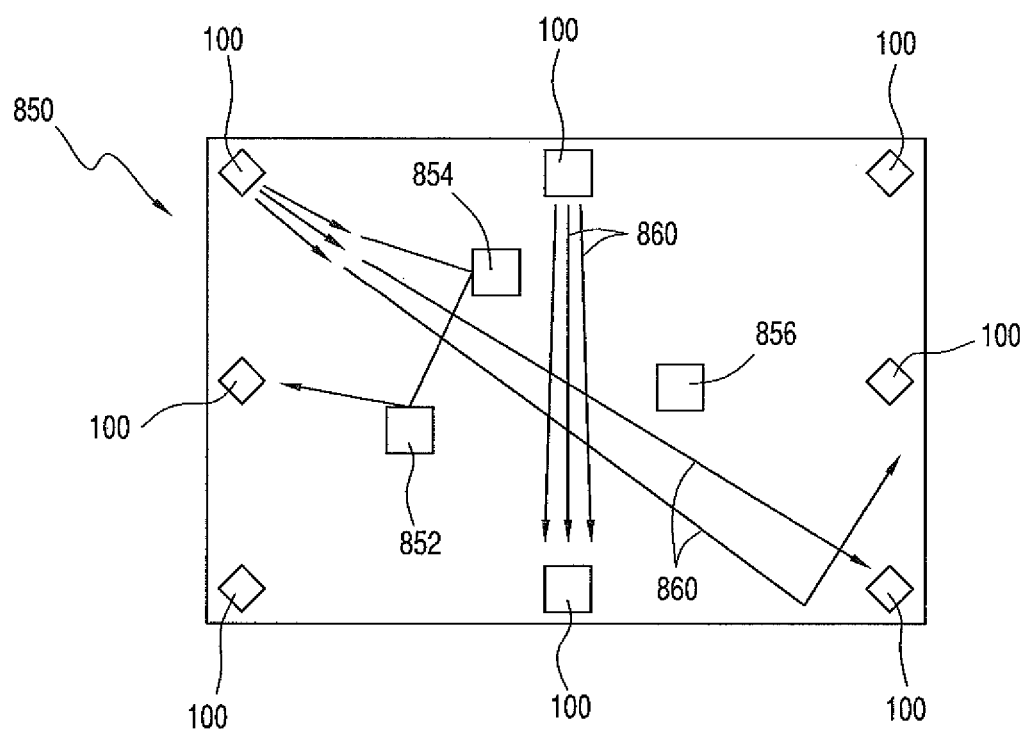
FIG. 47 is a venue including a security system in accordance with an exemplary embodiment of the present disclosure.

The capabilities of card 100 provide applications to the security of a facility. Because card 100, particular an embodiment of card 100 that includes pixel stack 800 of FIG. 9, is able to gather images and transmit light on multiple wavelengths and with specific coding, card 100 is adaptable to an environment where an ad hoc security system is required. Referring to FIG. 47, a venue 850 is shown. Venue 850 includes at least one secure container, such as a safe, a locked display case, a locked cabinet, etc., which may be a first secure container 852, a second secure container 854, and a third secure container 856. Venue 850 also includes one or more entrances 858.

A plurality of cards 100 that include pixel stack 800 may be positioned in various locations in venue 850. Each card 100 includes the capability of emitting highly coherent monochromatic light with a specific coding or output pulses. Once cards 100 are positioned in venue 850, each card 100 is set to transmit specific coded light signals, which are monochromatic signals in an exemplary embodiment. All other cards 100 are "trained" or set to recognize the transmission of all other cards 100 in venue 850, and cards 100 may then be set to record information detected by the sensors of cards 100, such as audio and visual information. Each card 100 is anticipating seeing specific coding emitted by each card 100 in venue 850. Such coded transmission is provided by any one card 100 at predetermined intervals, or the end of a coded transmission by one card 100 may elicit a subsequent transmission by another card 100, either in a predetermined arrangement or in a random arrangement. If any one card 100 fails to receive the correct coding from another card 100, or if the signal received by one card 100 varies more than a specific percentage from the level previously detected, the receiving card 100 can send an alert that something may be wrong, such as a possible attempt to "spoof" or overcome one card 100. This configuration works because of the sensitivity of the sensor layers of card 100. Even though card 100's field of view may be insufficient to "see" an entire room, light from any one card 100 will be reflected and dispersed around venue 850, as shown by various arrows 860 in FIG. 47. Furthermore, someone entering venue 850 via entrance 858 or other location in venue 850 will disrupt the intensity of light emitted by any one card 100 by an amount that is sufficient to decrease the intensity of light received by other cards 100 in venue 850, causing each card 100 thus affected by variations in light intensity to sound an alarm because light intensities are unexpectedly varying. Thus, card 100 may be used as part of a low-cost ad hoc security network requiring minimal infrastructure and virtually no wires, except possibly for providing external power to card 100 to increase the length of operation.

The functions of the system disclosed in FIG. 47 may be coupled with the presence of cards 100 or other devices on authorized personnel, such as guards. Since cards 100 positioned in venue 850 detect the presence of these devices, any person entering venue 850 must provide recognition via their device or cards 100 provides an alert regarding the presence of movement without a properly authorized recognition device. As described herein, part of the recognition can include biometric recognition of the individual carrying the device.

Card 100 provides numerous benefits to users in a plurality of capacities and environments. Card 100 provides a capability to create identity and security feedback loops when coupled with communication to network 210 and one or more remote servers 200. For example, the feedback may involve a number of integrations, encryption, security, forensics, and the fingerprint or other biometrics of the authorized user may be checked against State and other records for each transaction. Server 200, which may represent a State database or a corporate database containing encrypted information regarding the user, compares the information collected by card 100 at the time of transaction. The term "state" may include a physical state, such as Virginia, but is more broadly any government entity that contains such records, such as any state, federal, or international governmental body. The display, perhaps looking like today's holographic driver's license (e.g., the state of Virginia uses a holographic image), is able to include a fingerprint or other identifying image. In general, any part of the body could be "imprinted" as a biometric and the whole surface of the finger may be included for a higher form of security. A holographic identification image could include objects the user will have on their person, such as using a scan of their watch as a step in logging into card 100 or otherwise accessing card 100. Alternatively, or in addition, the holographic identification image could include the user's lip print or ear print. By comparing the information stored in one or more databases, with information transmitted by card 100, such as information contained on card 100, and information received from the user at the point of sale or transaction, such as biometric information or other information, server 200 is able to send information back to the venue that enables the venue to determine whether card 100 is legitimate rather than counterfeit, and whether the person presenting card 100 is the authorized user. Thus, card 100 can be an integral part of a feedback loop that begins with the user and data acquired from the user by card 100, data stored on card 100, such as fingerprints, images, security codes, etc., and information maintained in an offsite processor.

Further security may be provided by software methods. For example, as each card has at least three different elements on two sides, for a total of six total base elements: two displays, two magnetic stripe surfaces, and two CCD or other imaging surfaces. Each element gets a unique identification so when a user does any form of transaction, those unique identifications are passed. A counterfeiter will find it difficult to circumvent multiple, simultaneous layers of data transmission and reception present in the sensors and processor(s) of card 100. Card 100 can refuse to transmit data that identify the pixels that are being used to transmit Trojan data, versus the pixels that are transmitting valid data. This refusal occurs because mandatory biometrics or other security information is unknown to the counterfeiter. The same application of unique identifiers assigned permanently to each element, applies to each side equipped with piezoelectric elements, for the piezoelectric-in and the piezoelectric-out function.

In a modern, adapted POS system, card 100 has this security capability since card 100 uses the bidirectional display to interface, and card 100 could take or acquire a snapshot of the print of the user to complete the transaction. Indeed, card 100 may require a valid fingerprint or other unique biometric identifier to permit a transaction to proceed, in addition to other authorization, such as voice, password, facial recognition, etc. Later, for auditing or security verification, card 100 passes the snapshot to a server, while the POS also has the same snapshot. The server or a server operator can audit and reconcile the event, proving it was an authorized user and no record has been falsified. Store owners and credit card companies can be powerless to fight when a card holder says their card was stolen and a given purchase was "not them," and card 100 improves the chance that store owners and credit card companies will be protected.

The display may serve as a form of ID. A POS operator can check ID as card 100 is scanned. Any time a transaction is contemplated, the user can show electronic ID. As the platform becomes more commonplace with increasing users, ID with proper encryption and perhaps state authorization may replace older forms of ID. The display is designed to emulate a driver's license, along with other forms of identification since the credit card form factor is an accepted standard. The ability or configuration to emulate a driver's license underscores the flexibility and desirability of the credit card shape (form factor) even further.

In today's high speed and complex world, it is easy to appreciate how a blurring may develop between security and commerce. Thus, a credit card may be required for a transaction, but a driver's license or other document may be additionally required under certain circumstances: age-sensitive purposes, medical transactions, travel, and so on. Furthermore, in a world of increasing security concerns and also the increasing technological capabilities to replace POS personnel with machines, it is easy to see that the need for security in transactions is likely to increase.

Previous efforts to convert personal wireless devices, such as the cell phone, have produced a myriad of interfaces, some built into a cell phone, some as dongles or apparatus attached to the cell. In all cases, card 100 disclosed herein is instantly backwards compatible by way of its programmable magnetic layer, as described further herein.

As described in more detail herein, joint transactions involving multiple cards may occur. Furthermore, such transactions could entail the passing of optical data (since certain operations, as described in the same place, may involve multiple cards 100 according to the present disclosure without a magnetic POS reader), which becomes complicated for other reasons, such as cards with secure optical data encoded in areas which normally correspond to the location of a magnetic stripe. Coordinating the juggling of display data between cards, such as moving the display on one card to get around the obstruction of an opaque magnetic stripe on another, would add latency time and multiple steps to processing which would encumber the transaction. Thus, a need exists for smart cards capable of optical dialogues in which the magnetic stripe is rendered transparent or concealed and embedded so as not to obstruct data. In the case where transactions as described herein, or parts thereof, have access to a magnetic stripe reader, the smart card may augment the functionality (such as security and so on) through the use of specific, modulated, handshaking or other variations in magnetic data to accompany the optical data.

As Applicant has verified, a thin film display which may serve the display purposes as described herein, provides no substantial impediment to magnetic fields. Since the thin film display may act to create whatever display it is directed to create, the micro-coil or other generator of the magnetic field may be behind, or beneath it, and if necessary an opaque layer may lie between the two simply to prevent hardware details from "showing through" and becoming confused with the image. In the interest of providing the display with a uniform background, the opaque layer may cover a greater extent, possibly including the entire area of card 100 under the display, e.g., substantially the entire first major surface 101 and/or the entire second major surface 102. Thus, these same attributes may apply to both sides of card 100.

Furthermore, in a preferred embodiment the display covers the magnetic stripes to marry mechanical form factor with prior appearance. Thus, the device appears as pure pixel fabric, corner to corner on both sides. But the magnetic stripes or their positional equivalent are, nonetheless, there, and if the stripes exist, they are symmetric directionally.

Returning to security features, the last known or used fingerprint acquired by card 100 can be taken by a security system, which may be contained in server 200 or elsewhere associated with network 210, and the security system and card 100 can both report to their respective networks. Card 100 can report to its dock when next docked. The two different data events (from the perspective of card 100 and from the perspective of the security lock) can record all these details for forensic analysis if ever needed. Security and transaction protection are hallmarks of card 100 and system 1, providing ecommerce with proof of identity per transaction (with recording of all data).

Each transaction between a POS and card 100 represents two different loops. The "transaction," which is utterly secure, such as at a POS transaction, is a first loop that can be shared with other services, but only the minimum, mandatory necessary data and none of the encryption method, key, or images used to communicate with card 100, which represent a second, "security" loop. Each loop is a different, logically complete closed loop, with the two different loops extending in two directions.

In an exemplary embodiment, there are plural layers associated with essentially the whole of the face or first major surface 101 of card 100 and alternatively, the faces of both sides of card 100, i.e., first major surface 101 and second major surface 102. Card 100 may have a way, in addition to cell-dock software as shown, to create handshake routines etc. Among the plurality of layers may be, and in the order shown, an LED (Surface mount) layer, a CCD layer (Just below or offset from the LED layer), and a MAG OUT/IN layer (again, just below/under the CCD layer, and no need to offset from either CCD or LED, but, may act on tiny crystals with dopant causing the crystals to change opaqueness in presence of a magnetic field; e.g., see FIG. 4D, more complex array and FIGS. 7A to 8B).

In an exemplary embodiment, the light emitting portion of card 100 has an opportunity by way of its design. The light emitting portion, e.g., light emitting pixel elements 107, can emit colors not in the human visual range. While the human eye cannot detect certain frequencies or modulations, the light receiving/detection units 126 and 128 (e.g., CCD) can detect them. The patterns transmitted from light emitting pixel elements 107 of a card 100 or other device that are received by light detecting pixel elements 148, or the patterns sent across from one card 100 to a second card 100, allow for a highly complex handshake event, sync up or synchronization event, and encrypted login. This handshake event, synchronization event, and encrypted login can include, for example, colors not visible to the human eye and patterns which change as a function of time.

The magnetic-out and magnetic-in layers could be formed as two layers in some embodiments. The same piezoelectric or micro-coil that sends magnetic data can also receive it, so card 100 can be designed and configured to perform or salvage dual functions from one layer or each pixel of a layer. The density of magnetic "pixels" is not needed in concentration so much as it is for DISPLAY technology. Only enough magnetics in a given unit area to make a field of strength X (where X is a sufficient value to write to legacy readers), matters in terms of density and placement. The density only has to trick a stripe reader or existing magnetic reader into "seeing" the magnetic data pass by.

While the discussion hereinabove has focused on magnetic-out pixels 109 and magnetic-in pixels 150 having sufficient energy to emulate a legacy magnetic strip or stripe 104, in another exemplary embodiment, magnetic-out pixels 109 are capable of generating sufficient magnetic energy and magnetic-in pixels 150 are sufficiently sensitive that near-field magnetic resonance imaging may be performed. While the power of magnetic resonance imaging in the credit card form factor is relatively low, such imaging is capable of penetrating a surface, such as skin, to image shallow defects. Such capability may be useful for seeing splinters, hang nails, and other shallow defects, which can be beneficial for first aid treatment and for determining whether medical attention is necessary. Furthermore, magnetic resonance imaging can assist in determining the identify of a person and whether a finger attempting to access card 100 is alive rather than a fingerprint copy or other fingerprint source rather than the finger of a living, breathing human. Because the speed of scanning by card 100 is high, partially due to the shallow depth of scanning, and partially due to the capability of processor 110, card 100 is able to capture magnetic resonance imaging video, which provides the ability to measure pulse rate, and to assist in blood pressure measurements. Thus, magnetic resonance imaging has the capability of expanding the usefulness of card 100 as well as being part of the security features of card 100.

In an exemplary embodiment, some elements in the light emitting units 122 and 124 and/or light detection units 126 and 128 can be configured, for example, utilizing MEMS and NEMS technology, to move predictively or in a predetermined manner according to a voltage or field generated external or internal to card 100, for example, according to a magnetic field generated. As such, light going out or in card 100 can be modified slightly by the magnetic field generated by card 100 or from an external source. The magnetic component can thus modulate the light signal. The light signal can also act as a carrier in the classic sense, carrying data at higher frequencies. Also, array elements of other the intermixed arrays present on card 100, for example, elements of an array of the magnetic-out units 134 and 135 can be similarly configured to move according to a voltage, current or field etc. from an applied source. Such modulators, for example, can perform low frequency modulation of emitted light, which can allow for a sophisticated way of performing a handshake negotiation. For example, light emitted from first light emitting unit 122 and second light emitting unit 124 may provide specific identification information required as part of a handshake negotiation. However, low frequency light modulation, which may be provided by initial handshake information, can form a second portion of the handshake identification, which may either be predetermined and known to server 200 or other device, or may be determined on the basis of an on-the-spot generated algorithm, determines whether card 100 is authorized to perform the required transaction. In an exemplary embodiment, the authorized user may know a separate PIN or other number of identifying characteristics that determine the frequency of the low frequency light modulation, and improper modulation identifies the user as being non-authorized, potentially requiring additional identification or a call to the authorities for apprehension.

Card 100 may further use an embedded sound element and communicate with a jingle with the purpose of getting the POS operator to scan a user's coupons first (or codes present on physical or virtual coupons, such as barcode and Qr), then process the transaction. The Bar Code or Qr code merely encrypts all of the coupons applicable to a user's purchase.

Deals for goods or services can be based on a user agreement to share market data (e.g., while preserving their personal sensitive data) or through purchasing and presenting a "Groupon" (or any coupon requiring money up front in exchange for the coupon) just as a purchase is made to get the better deal overall, or card 100 can generate an alert that there is a better deal within X proximity for a specific product or service for a given user, where X is a distance or time element selectable by the user. Interfacing and transmitting this type of information to older legacy POS systems can be accomplished in a number of ways, for example, card 100 can present bar codes for scanning that are readable by legacy POS systems. Further, retrofitting legacy POS systems to accommodate card 100 is shown in figures identified elsewhere in this specification.

Alternatively, one may bypass a legacy POS system, generate an entry into the vendor (store owner) database and present an independent receipt that certifies the vendor has been paid, such that the items are now the user's property and the user can remove the items from the store premises. In this way, card 100 can operate as a portable POS system. Also, venues can stop investing in their own POS systems and use system 1 described herein. The vendor needs only determine that the person trying to remove "X" from the store paid for "X" by transaction "Y" (proof of purchase). In view of the ability to "pay" for products dynamically as they are placed in a physical or virtual cart, the ability to identify each individual object uniquely can improve the POS system and automate inventory maintenance function for venues and stores to every party's benefit. For example, system 1 and its server 200 could integrate to the venue's inventory management system to decrement for purchased items and increment for returns. If all items are uniquely identified with their own NFC tags, returns to a shelf can be done by a purchaser, assuming the purchaser did not open the packaging and included all portions of the item in the package. Of course, a venue can limit the types of returns performed automatically so that, for example, food and certain high-value items are checked at customer service for return authorization.

Store security is greatly enhanced by this system since a store system can scan the contents of a cart as the cart approaches an exit point, and can then match the cart contents to the holder of card 100. If the contents match the list associated with and paid for by a specific card 100, the user of card 100 and the user's cart can exit without hindrance. If the contents of the cart do not match the list generated by card 100, or if other issues or malfunctions occur, either with the vendor's system or with card 100, alarms sound and the issue can be resolved prior to the user departing the premises. Card 100 may also provide alerts at specified intervals in the event an item is returned or other credit is issued, but the credit is not posted to the appropriate account within a predetermined period, for example, within thirty days.

In an exemplary embodiment, card 100 can log a user into a public transportation system. For example, logging can be performed at any time before a next stop (e.g., using a wireless communication between card 100 and a transportation system reader). This provides the user more time and less grouping of people at transportation system bottlenecks, such as at a reader when entering the train station. Government, municipalities and businesses also want more security, and the biometrics of card 100 will provide this enhanced level of security. For example, these biometrics may be synchronized and sent with the wireless communications described herein.

In an exemplary embodiment, a door or lock (not shown) can include, or otherwise be associated with a display system using a configuration similar to card 100 (e.g., including intermixed array surface technology of card 100 generally depicted in FIGS. 3-5, 7A-7B and 8A-8B) such that the door or lock includes technology that is compatible with card 100. In an exemplary embodiment, a user can provide card 100 in a holder such that it faces the display of the door or lock, does a handshake with the display system of the door or lock along the lines of the previously described handshake, and the door or lock determines that it knows card 100 using an identifier, such as card XXXYYYZZZ that is unique to a user. Next, the holder with card 100 has to pass a second security measure before allowing entry through the door or unlocking the lock. In the second measure, card 100 can pass a code, fingerprint, or other data including biometric data, which the door or lock can recognize.

For the biometric data, card 100 can take more biometrics as described herein, including two or more biometrics from a single target. For example, a fingerprint, a capillary map of the same finger, etc. Additionally, biometric readings can be taken from a target object (e.g., a finger or thumb) on or near the surface at any position on the surface, from different target objects (e.g., both a forefinger and a thumb) from both sides of card 100 when dual sided, and multiple biometrics for each object on each side. In an exemplary embodiment, a first biometric, e.g., a fingerprint, may be acquired from a first target object on one side of card 100 while a second biometric, e.g., capillary patterns, may be acquired from a second target object on a second side of card 100. In an exemplary embodiment and in order to prevent the scenarios often posited in fiction for this type of device, where an eye, finger, or other body part is acquired from a victim as an entry device, card 100 has the capability of verifying temperature through first light detection unit 126 and second light detection unit 128, which are able to determine approximate body temperature due to the ability of light detection units 126 and 128 to receive infrared or heat wavelengths. In another embodiment, card 100 can also include one or more temperature sensors for determining the temperature of nearby objects. Furthermore, card 100 is also able to verify blood flow patterns and other indicators that are unique to each individual and function only with a live body by the sensitivity of the sensor layers in card 100. This type of multipart authentication/verification of a portion of a body can be used for any other application of a user card 100 described herein. Further, card 100 can be associated with controls for uses such that a biometric is associated with that use (that moment). In this way, a command issued by a user, the user's identity, or failure to issue a command can be tracked and card 100 locked when a predetermined condition is not met. For example, card 100 can generate a display: "TOUCH HERE WITHIN 5 SECONDS TO CONTINUE," and if the user does not, or the biometric does not match that associated with card 100, card 100 locks and the last known biometric to touch or command card 100 is noted and stored. In an exemplary embodiment, card 100 may include a buffer or storage unit to store biometrically authenticated information for each action taken on or with card 100. Such information may be compressed to save storage space, or overwritten with newer data, or may be downloaded to another location when card 100 interfaces with a server or network.

In an embodiment, a door can have the same display technology as card 100 so placing card 100 in the holder, which can be an insert into a slot, if allowed to stop moving for say ¹⁄₁₀th of a second, the handshake and command passes with encryption. An embodiment can require plural cards 100 to gain access, such that cards 100 are presented together in a holder (not shown), or, presented in a predetermined order. The card holder in the lock, door, or other portal, container etc. in such an embodiment can hold two or more cards to allow cards 100 to pass data most efficiently. For higher security to gain access, one user can pass a card to a second user, who puts the card passed in the holder and transfers personal info to the first user and vice versa. Such transfer of personal information may be through channels that are encrypted to the opposite users, but which can be read in combination by the door, lock, portal, container, etc. The holder can be bypassed for small transfers, but for bigger ones it can result in higher speed (better alignment).

Governments, institutions, business etc. may want card 100 to send some kind of indication for any data transfer between two people to a master file that keeps track of the data exchange, which would thus track combinations of individuals with the ability to access certain doors, locks, etc., with national security access. Such indications would not include the actual data used to open or access doors, locks, etc., or the type of data transferred if not directly involved in opening or accessing doors, locks, etc., to maintain privacy, but such data transfer tracking may protect citizens from nefarious activities, track bad people (criminal) etc.

Card 100 can come with alignment features, such as holes, pegs, or corner delimiters (not shown), which could be present on a cell phone or other device intended to dock with card 100 to dock two or more cards 100, face to face, where each card 100 straddles the pegs (or is held between delimiters). These alignment features can allow for aligning pixels to thousandths of an inch of tolerance or greater. Perfect alignment (i.e., where a maximal amount of transmitting and receiving pixels are aligned) implies maximum data transfer rates. In an exemplary embodiment, alignment mechanisms can be presented as peripheral grooves (not shown) on edge 105 of card 100, which do not interfere with the function of card 100 and are too small to matter to human observers, for alignment needed between a plurality of cards 100 and to assure pixel-to-pixel alignment is as near perfect as needed to provide a solid connection and handshake, and then enable stable and fast data communication. Magnetic levitation between cards can be utilized to achieve highly sensitive alignment, as described herein.

For less formal data transfer between two users, an embodiment can include two users simply holding their cards 100 together face-to-face by hand or providing one card 100 over another card 100 placed on a surface, and then request for a short passage of data (e.g., by navigating a screen displayed on one or both of the facing cards). In the case of a small block, for example, no particular alignment is needed because a slower mode of communication is acceptable. For example, pixels can be combined to make a single transmitting beam from one card 100, which is received by a group of light detecting pixel elements 148 associated with first major surface 101 or second major surface 102 of the other card 100. While this technique may be slower than a pixel to pixel data stream, it could be operated in a faster mode if single light emitting pixel elements 107 send modulated data by way of frequency (color) modulation, and the light receiving/detection device (e.g., CCD) can detect the frequency differential fast enough. In this manner, each connection between a light emitting pixel element 107 and an associated light detecting pixel element 148, i.e., a pixel connection across the gap between two cards 100, compares to a single data stream. This "connection" could potentially be millions of times faster than a standard fiber optic connection, which this configuration is emulating (per pixel). Also, each card display inherently knows the distance to the other by parallax estimation. Additionally, when face-to-face, card(s) 100 can bi-directionally transfer data. As can be understood from the present disclosure, there are many benefits to a combined output and input pixel design from two bidirectional displays of comparable dimensions that contain both light emitting units 122 and 124 and light receivers or detection units 126 and 128 placed in proximity to one another. This configuration takes on more significance when a device such as card 100 is able to interface with another device, such as a laptop, cell phone, tablet, etc., that has the same display technology. Now data can be transmitted and received at high speeds and the combination of technologies enables features previously unavailable, such as high speed communication in the compact form of card 100.

Card-to-card data transfer, card-to-system, or network data transfer (and system or network to card data transfer) can take advantage of the optical and magnetic communications aspects of card 100, while also leveraging biometric aspects of card 100. In a manner of speaking, card 100 acts as a portable memory with biometric verification at each stage of use, and provides a much more secure method of data transfer not found on legacy portable memories, for example, memory sticks.

In an exemplary embodiment, light emitting units 122 and 124 and light detection units 126 and 128 can use shared semiconductor circuitry for efficiency. For example, light emission and light collection could be performed by a single integrated junction. With this configuration, card 100 can pass data in both directions at the same time in the same action in a single pixel position. For example, two users may hold cards facing each other. The process can be designed and software can be written so that neither user nor card 100 gets a transfer acknowledge unless the "card-to-card" swap of data concludes successfully. Thus, transferring data, such as business info or personal info, becomes a simple process without the need for network connections to email or text, and is further enhanced in the manner described above to include emission and collection of data from the same pixel.

The density of pixels on card 100 is sufficiently high to provide high definition display and to acquire high definition images. One advantage to such high densities is the ability to "cutout" or bypass bad pixels with little or no effect on what an operator sees or detects. Such capability provides a level of redundancy that provides a high level of reliability for card 100. Additionally, each pixel may be connected through a redundant bus, control lines, etc., so that a connectivity issue can also be bypassed or resolved without loss of card 100. Because of the ability to "print" or form various pixels relatively inexpensively, the various elements of card 100 may be duplicated with minimal additional cost, providing nearly 100% redundancy for the individual elements and portions of card 100.

In an embodiment, a bidirectional emission and scan of OCR, bar code, Qr code or another readable format can facilitate simultaneous emission and detection between two card(s) 100 or other similarly equipped devices. The unique structure of first intermixed array 106a and second intermixed array 106b allows scanning and emitting light at the same time in the same area. For reading and writing, for a small amount of data, such as the items the user is buying and the credit card the user is going to use, this information can pass with the user's card 100 emitting a coherent beam of information from light emitting unit 122 or 124, in one bandwidth of light, and the receiving POS system can pick up the beam on any group of pixels and gather in this small amount of data.

In an exemplary embodiment, the display on card 100 can be usable as a remote display for another device, such as a cell phone (or other device, such as an electronic tablet). For example, the display of the other device and the display of card 100 can run in parallel, to show, for example, videos to friends with easier, better viewing angles or to have a second display that is independent, for info a user may want to be able to see, such as while eating. The display of one or more cards 100 can be combined to form one larger display. Card 100 can be configured to communicate with all cards 100 nearby so that if cards 100 determine that the proximity of other cards 100 is adjacent, and if permission is given by the user of card 100, card 100 is capable of sharing an image across all adjacent cards 100, with the image automatically sized for the number of cards 100 available in the "X" and "Y" directions. Thus, a plurality of cards 100 can form an adaptive display that enables formation of ad hoc displays, automatically. Of course, the user(s) of card 100 can also establish user-defined display configurations using the settings of card 100, manually overriding automatic functions of card 100. Card 100 can be placed in a slot on a mobile device, while the mobile device lays flat. Card 100 has its tether or a connection in the slot or physical port 103*a* or 103*b* on the side of card 100, thus card 100 may have 2 or even 3 external displays, along with the back or opposite side of card 100. The capability to drive multiple displays allows multi-person viewing, for example, at a table with guests. In an exemplary embodiment, card 100 can have remote control over any host device, to provide convenient operation of the device, such as if it were an iPhone and the iPhone incurs a damaged internal display.

The synthetic crystal used on watch crystals, which are relatively hard and scratch resistant, can be modified for use as a final outer layer of card 100 for durability. As another alternative, a user could also apply simple peel off covers. A protective coating for card 100 can be peeled off to apply new ones, which stick well to an exterior of first major surface 101 or second major surface 102. The protective coating is thin, optically transparent, and magnetically transparent, so as to not obstruct operation of any layer described hereinabove. In the core of card 100, electronic VVLSI can be provided or deposited on Mylar, similarly for durability. Other core components can include carbon fiber, silica and silica compounds, titanium and titanium alloy.

Card 100, with its unique biometric assurance and network juxtaposition (can sit between two networks, such as a public network and a point of sale system, which is network based but private and encrypted), can report certain data of the user's personal data to a unique engine forming a service to which the user subscribes. This service, which may be housed in server 200 or is otherwise connected to network 210, can tell other users the best deals based on outcome of any transaction, which may then be captured in database 250 and compared to other, similar transactions in processor 228. The user may be able to put together a personalized best deal, using some network available discounts and coupons, but also, other deals such as the user may creatively find. Data from user-defined or provided deals may be compared to actual transactions or deals, forming a "best way to purchase" method used at the point of sale, is broadcast from card 100 via one or more wired or wireless connections 213, 217, 223, and/or 224, archived in database 250, and made "searchable" only through this unique method.

A user may define a point in a network or PC where the user wants to let data pass. Normally, data cannot pass from card 100 to any other device or system. Card 100 docks and creates a bidirectional connection to complete the communication path. The dock for this is made of two displays, in parallel, programmed to ignore one another. When card 100 is inserted, each side of card 100 can negotiate a connection to its corresponding surface and then, if other conditions are met, such as the user authorizing the communication, data can flow to and from card 100. Card 100 can maintain a record of the data flow event and if the user wishes, the actual data which was allowed to flow. All events get unique identifiers assigned by card 100, and may also get unique identifiers assigned by network 210 and/or server 200. Later, when card 100 is eventually docked at its home base station, card 100 can report all of its transactions along with the unique identifiers. Server 200 (and service), which monitors card event reporting, performs an audit. This system is a very tight security card to card exchange that translates to a social net connection.

Card 100 can have its own wireless transmitter, receiver or transceiver and use it accordingly, as described hereinabove. Card 100 is also a device and runs dependently or independently as it is programed. While card 100 may be attached to the "cloud," card 100 is also able to emulate the cloud. Card 100 is also able to mesh network, which is similar to the application described hereinabove where card 100 is able to communicate with adjacent cards 100 to form larger ad hoc displays. The dock for card 100 could evolve into a transceiver and battery so card 100 may function as a server in order to perform mesh networking. By being part of a localized mesh network, card 100 forms an ad hoc network that requires lower power for networking functions due to the proximity of other, similar devices. Thus, each card 100 recycles and boosts the communications of nearby card(s) 100.

Magnetic stripes could just be internal, embedded underneath light emitting pixel elements 107 that provide the display. Magnetic lines of flux passing through the display from behind need not bother the display at all. The magnetic lines of flux provide no interference with light emitting pixel elements 107 because LED and transistor junction technologies are not affected by magnetic flux. Also, because it is possible for card 100 to know when it is being swiped, it can conserve power by powering up the magnetic strips or stripes only during swipe. Also, the magnetic energy could be boosted during swipe because card 100 knows it is in motion by way of CCD data, so a single swipe is typically sufficient, even in a reader with a weakened magnetic head reader.

Card 100 may generate its power with an embedded coil, as in the RFID key ring fob (electronic). However, the display in card 100 requires relatively massive power, and a coil approach that relies on reception of power when card 100 is close to a flatbed that a user scans to pass data between card 100 and the receiver may transmit inadequate power to card 100. A key fob including sufficiently power batteries may provide sufficient power for card 100, or spinning magnets concealed in proximity to card 100, which allow power transmission in a wireless context. In an exemplary embodiment, power may be connected to card 100 or provided to card 100 when card 100 is close to or in proximity to the POS dock. Generally, card 100 is extremely conservative of power except when absolutely required for effective operation of card 100. For example, card 100 may further boost a signal along the magnetic strip, stripe, or rail which will be communicating data, as card 100 is swiped, which may be identified, for example, by using a machine vision-type wide-ranging image processing capability. Furthermore, card 100 also provides touch screen emulation as well as bar-code or biometric scanning, which, along with image processing capability, can also be used to recognize or measure and to anticipate significant events for efficient power management. If the magnetic stripe extends longitudinally the length of card 100, to coordinate the direction of magnetic-out data, card 100 needs to sense it is going into a stripe reader or ATM (automated teller machine) slot, which it can do with the CCD and imaging processing capability, to then set the data on the delimited magnetic layer and determine its direction. Logically, when swiping card 100 in one of the 4 possible directions, the direction can be preset and the user need not detect the direction of swipe. However, as an additional feature software may detect the swipe motion with the CCD and image processing software, and set the magnetic write to orient magnetic-out data in magnetic-out pixels 109 in the direction of the swipe.

The genome of an individual can be used interchangeably as one would use their name, social security number, driver's license, other ID's, fingerprint, or retinal scan. The parallel data transfer capability makes it possible for the user's whole genome to be transmitted for identification purposes. Part of the image transferred is the user's base genome; the rest of the image will be the portion of the genome that makes the user unique among the population base. The base genome image (1 of a million) and the user's differences (about 1 billion) will still take under 1 tenth of one second, if there are a 100 million pixels involved all working in parallel, sending serial data.

Card 100 is programmed in non-transient memory, but dormant, so as not to interfere with other cards 100 or memory storage in proximity to card 100. The combination of CCD and LCD on card 100 allows card 100 to time when it is swiped, so as to cause electromagnetic elements or magnetic-out pixels 109 in magnetic stripe area 104 to energize more strongly in sync with the swipe. The ability to energize magnetic-out pixels 109 as a swipe occurs keeps EM noise down when card 100 is not being swiped. Another use of the combination of light receiving/detection (e.g. CCD) and light emission (e.g., LEDs) aspect of card 100 is to allow for a man-machine interface to be built into card 100, e.g., touchless touch screen emulation with distance, trajectory, and velocity detection capability as well as identification of unique objects. Card 100 also would be able to "see" when it is docked in its own docking station. It could "see" the user operating or using card 100 to make a record of the operation. First light detection unit 126 and second light detection unit 128 could be used to scan a bar code, or first light emitting unit 122 and second light emitting unit 124 can display a bar code (Qr codes etc.). Many "apps" can be generated because card 100 would have these receiving and emission abilities. For example, one application is the development of a language for signing, which could be the universal sign language, with which a user could communicate with card 100 silently, using hands or fingers. The sign language could also be a combination of proprietary gestures. The more streamlined and efficient, the more transactional information the user can pass (instructions, inputs) to card 100.

Card 100 is configured to store address books for procurements intended to be shipped to others. The user can pass address data reliably as to whom he or she wishes to select as a receiver of one or items, or the user can select multiple addressees for multiple items in an all-in-one procurement, with each item going to a different destination. So, during POS, one swipe completes the procurement, the addresses for each item are passed to the venue, and the venue mails them out (e.g., remote to AMAZON).

Another exemplary application is the office lunch, where people get together for a meal, each with their own credit card arrangements and perks. At the end of the meal, all cards 100 go in a stack to split the meal evenly. The users need not carry cash to take advantage of this method. In order to be used with existing restaurant systems, card 100 designated the master may have, by agreement with credit card companies and possibly other intermediaries, the ability to represent itself after all the dividing has been accomplished, as the sole card to be used in the transaction.

Then it simply goes in the restaurant wallet and gets run through the legacy POS. All cards will be charged thereby as agreed in the dock or with the financial entities in separate sessions. In the case where such a transaction might require biometric ID as described hereinabove to be used with the credit card stored in card 100, the biometric scan is performed to authorize credit card charging for each card 100 prior to placing them in the stack. Card 100 designated as the master card 100 will collect data from all other cards 100 in the stack, but prior to authorizing charge, master card 100 may be removed from the stack, and will then list the cards in the stack to enable the user to verify that all cards 100 have been entered. Once the list of cards 100 has been verified, the master card 100 can authorize all charges, after which all information passed to the master card 100 is cleared from memory and overwritten to prevent unauthorized access to the information provided by the other cards 100 from the stack. Furthermore, the information provided by the other cards 100 in the stack is volatile from the perspective that the charging operation needs accomplished in a short time, after which all data is cleared from memory and the stack would need performed again. In an exemplary embodiment, the user of the master card 100 has five minutes to execute the charge, after which all data provided by the other cards 100 is irrevocably erased.

Card 100 is relatively resistant to radiation caused by solar flares, electromagnetic pulses (EMP's), and other effects, such as the radiation caused by a dirty bomb. Embodiments of cords (tethers) are typically fiber, converting to copper internal to the cord, and are thus resistant to such effects as radiation and EMP. The elements of card 100 are in the substrate, so by shielding the substrate appropriately, card 100 becomes robust in radiation, magnetic and other environments, and there is no vulnerable point other than legacy equipment and unshielded equipment external to card 100.

An embodiment of card 100 can incorporate all material necessary to encompass net positive buoyancy so card 100 will float in water, reliably. One method for assuring positive buoyancy is by trapping inert, non-flammable, and/or non-toxic gas, such as nitrogen, carbon dioxide, or the like, in sealed pockets 176a & 176b, or elsewhere in the design of card 100, to offset the mass or weight of card 100, acting as a distributed swim bladder. In an exemplary embodiment, card 100 has no physical ports anywhere on its surface, assuring water tight function and operation without degradation of metallic connector surfaces and without allowing any ingress opportunity into the plurality of layers for moisture or dirt. As disclosed herein, embodiments can include ports that are accessed with optics or magnetics, such as first light emitting unit 122, second light emitting unit 124, first light detection unit 126, and second light detection unit 28, first magnetic-out unit 134, second magnetic-out unit 135, first magnetic-in unit 132, and second magnetic-in unit 133. Various magnetic features of card 100, described in more detail hereinabove, may be used or leveraged as an anchor for a magnetic-attach tether.

The bidirectional display of the card 100 with optionally full PC functionality and having an invisible magnetic layer, which can be instantly programmed to function as stripes in a plurality of orientations, allows for the greatest resolution display, for example, to view an otherwise unseen water mark or hologram, while at the same time providing versatile credit-card form factor functionality either in legacy magnetic stripe readers or in an equally secure optical financial transaction.

The display has many uses. Because the display is an output device, it may be used to augment the magnetic swipe. For ID purposes, but also, to alert the user to other opportunities pertinent to the transaction at hand or, a transaction the user has indicated as being one in which he/she is about to undertake, to get the full details of any deals he or she is entitled to.

As is the case with current VVLSI, pixel, or CCD related technology, technology is driving toward increased density and lower power consumption and waste. HD TV is but one example of this trend, but there is merit in densities beyond what is useful to the human eye. These super high densities yield card-to-card, and card-to-device (equipped with technology similar to card 100) communications pathways that are difficult to clandestinely intercept and to jam or otherwise cause a difficulty in communication. The combinations of higher density of any pixel type, sound, light, magnetic or other, and the intermixing of these types to handshake, encrypting within each protocol, thereafter, the use of the pathways to send and receive data, and the use of many pathways to output Trojan signals, tightens the card-to-card and card-to-device security to so high a level, not only would a public enemy need to have the same technology or better, they have to physically get between the two cards or card to device, they then have to discover which signals are real and which are Trojan, and they would then need to break encryption across multiple protocols, such as light, sound and/or magnetic. Further, the present disclosure is not to be limited to two cards or card to device communication, but is applicable to any device with this technology fully integrated, communicating with another device with this technology, fully integrated. Always, with a supercomputer, there are odds and calculation which provides for how long it takes to interpret and decrypt a signal. However, in this case, the public enemy must crack billions of possible pathways to then know what to process. At this time, Applicant believes it would be practically impossible to crack the communications pathway and clandestinely access the data.

Further, use of dark processing and dark memory in the card can add yet another level of protection. In this disclosure, the concepts of dark processing and dark memory mean VVLSI circuitry from which query functions have been removed. Thus, the circuitry can take in data, process data, run software, and output data, but has had its troubleshooting and inquiry functions removed at the factory and will not allow new programs to be entered into the circuitry, or, new programs can be entered but only through a complete re-burn cycle, which can be detected. By incorporating the elements of dark processing and dark memory (and all other supportive components or circuits which could be otherwise queried), the public enemy gains nothing through dissection of a given one of a card according to this disclosure.

A user interface and apparatus that determines other features of objects for identification of the object can be used with system 1, along with image processing to recognize or measure features of objects. The capability of analyzing, recognizing, and measuring features works with virtual touchscreen and fingerprinting with a general machine vision approach.

The capability of substantially the entire first major surface 101 and the entire second major surface 102 being a light receiving/detection device takes away from the complexity of "scanning a finger print" and brings in the new complexity of "scanning more of the finger, perhaps the whole finger in 3-D (meaning, all sides). When an exemplary embodiment of the card of the present disclosure scans a finger, (or thumb, which throughout this specification is included in the word "finger") it may scan the whole finger for more certain ID, by requiring the finger to be rotated during scanning. In an exemplary embodiment, card 100 may supplant a driver's license and States, which may broadly be described as government, may adopt the ability to securely transmit driving privileges to privately owned cards 100 to reduce costs and to save money. The State continues to charge the same price at the DMV or its equivalent, and takes the user's picture, but after that the user receives an issued license via electronic communications. The State could even have similar technology at their POS terminals requiring in-person capture of the user's license.

The present disclosure provides a device that, while keeping all the POS and internet marketing capabilities, gives the user an incentive to adopt this specific form factor with maximal two-way display in place of other solutions. In some embodiments card 100 may emulate a touch screen without actual touch, by being able to detect an object through imaging pixels, e.g., light detecting pixel elements 148, and processing the received data internally, using advanced image processing techniques (e.g., DSP (Digital Signal Processing)). Thus, the card user can navigate through screens and make selections of display icons and files as though using a touch screen without actually touching a surface, by using positions of fingers, finger gestures, a stylus, etc. Some embodiments may provide a lens, or micro-lens arrangement along first major surface 101 or first major surface 102, or both, gathering light to a patch of CCD or CMOS pixels to form a net sum image based on the (possibly multiple and/or non-visible) frequencies of light being detected. Card 100 encompasses a surface area the size of a credit card capable of detailed up close images, such as retinal scan, fingerprint, or a plastic credit card pressed up against the card. Images captured in this manner may aid in emulating the old card, thereby acquiring the look of the old card and its magnetic data. A user may then store the old card in a safe place and the user never needs to carry it again. Further, card 100 can store the location of the old legacy card so that the user can find the legacy card later.

Furthermore, as with the driver's license example, a "credit card" may be downloaded virtually to card 100 by way of a computer display or a secure file transmitted by wired or wireless connection. To download a "credit card," in one embodiment the user places card 100 on a conventional computer display that contains a display of the "credit card" information, such as an LED or LCD type display, in a location established for that specific download, and the "credit card" is securely transmitted to card 100 without the possibility of interception by anyone around the computer display.

This smarter card, as envisioned by the present disclosure, provides many new uses as a tool for vendors. For example, in the case that a vendor or vendor's representative may wish to display an image of merchandise not readily available for viewing, a corresponding bar code can be provided or displayed on the representative's smart card, enabling a sale to take place without further arrangement or presentation. In such a case, both POS and buyer cards must dialog securely using optical media since availability of a card-swipe reader is not guaranteed.

Card 100 is bidirectional. It can send and receive data simultaneously. In the face-to-face mode, with almost no air gap, the card could routinely use its infra-red, ultraviolet, and visible outputs and inputs to detect any membrane put between card 100 and an adjacent surface transmitting or receiving data. Thus, data can pass from card to POS, for example, and POS to card. When card 100 is docked, or, if it has a wireless adaptor, card 100 can also send and receive data through the docking connection or the wireless connection. By combining handshake and data transfer across optical, magnetic and aural pathways, such a connection is impregnable to any third party interference, since data is transmitted between two adjacent or side-by-side screens in close proximity, which may be within millimeters of each other, so that data is passed between numerous pixels or banks of pixels. Much of the output and input emitted by most of the pixels could be Trojans, further intended to throw off the public enemy.

Some embodiments may include forcing data passage and decryption to go in stages, so there is time for card 100 to gather in the perks and apply them.

Card 100 can take on the "personality" intended, corresponding to a saved card that has been chosen as "active" and card 100 can indicate the "active" card by the display of card 100. The display of card 100 can also serve as a communications tool. As POS systems become more feature rich, card 100 can, for example, pass a facial image and ID info to the POS operator.

So, rather than having to ask for an ID, card 100 is the ID, doubling as the credit card, debit card, or other type of payment card. The picture is encrypted in memory and can carry the state logo and driver's license info, which certifies that card 100, the VISA account (or any other type of account), and the image of the user, are all one in the same, i.e., card 100 cannot be stolen if the image on it of the user is very clearly identifiable, and carries the state encrypted water mark assuring that the user's identity is passed with the transaction in order to minimize the opportunity for fraud, and thus minimizing the impact to the economy from payment card fraud. The POS system, if improved, could enlarge or blow up the picture of the user with high resolution, thus enforcing the idea that the person presenting card 100 needs to match the information carried by card 100. Further, the POS system could incorporate its own CCTV camera and compare the person's real, face-to-face or in-person image with that passed from card 100. Therein, automatic alerts could be tripped to protect the venue and the real user and owner of card 100.

It could be said, as a side bar note, card 100, being endowed by emission and collection capabilities on both sides of card 100, and with a possibility of a plurality of emission and collection technologies, uses at least one of magnetic and optical technologies for an embodiment now, which reaches back to or enables communication with legacy readers, and may add more read and write technologic functions to evolve to the future point of sale systems. An example would be to use the mag, light or optical, and aural aspects in a flatbed type POS system, handshaking, passing data and emitting many Trojan signals, to absolutely lock out the public enemy.

A business such as a restaurant, building material store, or courier can employ or subcontract to mobile employees to interface with customers. Card 100 can assist in this regard, in that it is a portable POS in its own right. For example, food table-service personnel, floor-walkers, or delivery workers can be equipped with wire-free devices to provide help information from the store database, accept payment from customers, or to simply communicate on a casual basis. The restaurant may provide a mobile platform, such as that proposed in the present disclosure, for employee use. Further, savings to the employer can result if employees use their own device if care is taken to create a barrier such as a login account between personal and work-related software running on the same platform. If an employee has card 100 already, that employee's card 100 can become automatically known to the restaurant network as an authorized employee card as a function of card 100 and its supportive services.

Furthermore, a buyer may wish to inquire about related artwork not on display. Seller may show, for example, a slide show of related art held in inventory, with barcodes demonstrably associated with each slide show item to assure the buyer of accuracy of the transaction. Thus, the present disclosure provides for an improved decentralization of the POS, especially in that temporary staff may contribute to the smooth functioning of the business without requiring a large investment. Decentralizing the POS provides at least these benefits. System 1 can distribute and decentralize the POS station, such that this mobile device may act in this capacity Card 100 can read more than bar codes. It actually can look at the item and scan any other markings to help identify the item or to find close matches. This capability works with virtual touchscreen and fingerprinting with a general machine vision approach. A user interface and apparatus that determines other features of the object (like color, texture) for identification of the object can be used with card 100 and system 1. This description implies by its nature, a two or three dimensional search function which further implies, libraries of images which are more pixelated than current data structures. More pixels matter, because software can detect them and compare images in a search and as such, the idea that there can be more uniquely identifiable images is supported by the ever increasing pixel densities. Arguably, two watches, side by side, made by the same manufacturer, scanned in 3 dimensions, cannot be identified one from the other at say 1 million by 1 million by 1 million pixels per square inch. However at 100 billion by 100 billion by 100 billion pixels per square inch, in a completely accurate scan of the items in question, there will be visible, vast differences between the "like" objects, so much so that 1 million of these objects will be immediately uniquely identifiable one from the next, due to manufacturing processes leaving unique markings on each item, as that level of magnification 100 billion pixels per planar image, reveals.

As part of POS system improvements, data can be passed in two groups. Group 1 is the items being purchased, if pre-scanned, or the POS operator has to scan them all in and card 100 picks up the list in its first receipt of data. Card 100 then asks the supportive service for any and all perks based on the list, and they are applied. Now, the payment is rendered. The data burst needed to pass the coupons and payment method(s) constitutes Group 2. These data bursts need only be tenths of a second in duration and tenths of a second apart.

When the items are already coded uniquely, nothing needs to be added, just loaded in the user's cart and the user can immediately continue shopping or proceed to checkout. The user's card 100 POS function could, if the item codes (e.g., bar, OCR, or Qr code) are not unique, add his or her own suffix or appended codes to the packaging or box containing the item, or have the device display one master OCR (bar code) or Qr code and that one code points to a server file with all the items in it already. The packaging can have either an optically sensitive or magnetically sensitive material placed in a location that is proximate or adjacent to the bar, OCR, or Qr code, and card 100 includes the ability to activate the optically or magnetically sensitive material to indicate that particular package of product being purchased by the user of card 100, along with the date, time, and other information deemed important either by a venue's server, server 200, card 100, or the user. A portion of the information may be pre-defined or defined at the time of purchase by the user. The actual surface area encoded with user-supplied information is relatively small, so the optically or magnetically sensitive material can, if needed, document multiple purchase and return events. Card 100 automatically seeks an available area on the optically or magnetically sensitive material for printing, avoiding dirt, damage, stains, and any previous marking. Such markings by the user are advantageous to the user in that the product is tied to that user and if anyone else attempts to remove the item from the cart, the purchase will no longer match, and the item will be deemed stolen. The intent is to give the venue's POS system all the data, either face to face, or through the internet or another network, before a user arrives at the front or nominal checkout location. Thus it is only necessary for the user's device to correlate a single Qr or OCR bar with the POS system, which would point the store's system to a single record already in store's server that contains the user's personal/portable point of sale system.

Card 100 can further be able to shut card 100 down upon loss or biometric login failure and go into a mode where card 100 can only be queried as to how to contact the true owner of card 100, or, card 100 can provide minimal data, such as a low power, low resolution display to allow the individual who finds it to return it to its rightful owner using the US Mail or another carrier. The display might further operate by means of a motion-sensitive screen-saver or the like to maximize length of time the owner information is available. In an exemplary embodiment, card 100 can carry prepaid postage or some arrangement with USPS for this purpose.

In other exemplary embodiments, a network or website allowing users who have used or surplus items for sale can get together with people who need these items. If a convenient match is found, either because of proximity or because of convenient scheduling in common, a meeting may be arranged, and secure transaction takes place at a public location. A "vending" user may wish to display merchandise using the display of card 100 and cards 100 may transact secure personal information positively identifying each party to the other. In the absence of any dock hardware or POS equipment, an embodiment of card 100 can supply the necessary support to conduct such a transaction optically. The same consumer who wants these restaurant and shoe deals can be the consumer who wants to sell things. A secure exchange of ID might further take place in similar manner because the same consumer might work as night watchman, hardware store employee, waiter etc. An employer in such businesses may agree to let the employee use his or her own smart card 100 for such work purposes, thus providing an incentive for the employer to allow the employee to remain connected while working, an arrangement which may benefit both.

Several dynamic issues surround the success of the services offered and the form factor of card 100. At the same time, more technology can be incorporated as the ability to increase pixel density on a supportive surface improves. The sensitivity of a read function will increase with time, improving the power consumption attributes of embodiments of card 100. Wireless mechanisms to communicate with card 100 and power it also will improve over time. It is the success of the "card" form factor, its minimum hardware features that differ from the prior art, its immediate cross compatibility with legacy POS systems and devices requiring magnetic swipe or read, and the services possible to deliver to card 100, which sets card 100 and system 1 disclosed herein apart and preserves their future. Because this card communicates bi-directionally and has a backing service, the transaction complexity can change and adapt with changing circumstances, as described herein. As described in this disclosure, the incorporation of like technology into all machines and networks, software, and services to be accessed by a given user allows the user's effort required to make themselves known and logged to card 100 to be repeatable with less effort during the course of a given period, such as a day. Systems, software, services, transactions, networks, machines and vehicles, locks, other users, etc., need to know the identity of the user requesting access or use. Card 100 and system 1 disclosed herein can radically change the dynamics involved in assuring that the user is identified with absolute certainty while providing dynamic advantages to the user, thus preserving precious commodities and protecting our planet from negligent waste.

The present disclosure taken with all that its teachings provides further direction to other embodiments not explicitly disclosed herein. Accordingly, the present disclosure is not intended to be limiting in any manner or form. With reference to FIGS. 7A to 8B in particular, the VVLSI and flexible construction techniques (i.e., the ability to flex card 100 without damage to any component or element) take into consideration all prior art on this subject. Accordingly, the layouts for the form factor, in a most preferred embodiment being a credit card sized form factor, become seemingly limitless. It is to be understood that any of the features and technology described herein in association with card 100 can migrate into other electronic devices to improve integrated command and control over those electronic devices. The more devices which utilize card 100 and system 1 disclosed herein, the more card 100 can integrate to the like technology in a given device, improving security and trust.

Additionally, given the massive development of networks, services, electronic devices, personalization, protection of identity and ecommerce, as well as social networks, card 100 and system 1 of this disclosure will be very well positioned to gain a massive following in a very short time. The widespread following through the use of card 100 drives the final benefit, centering upon the developer universe, which will seize upon any and all opportunity to further develop card 100 and system 1. Support by developers will take card 100 and system 1 to many places. However, Applicant feels in scope, breadth and complexity, the reader can now envision where card 100 and any subsequent use of the same technology in differing conformations (cell phone, PAD, tablet, PC, laptop, TV, flat panel screen, etc.) will lead. For example, the layers and pixels arrangements and configurations described herein, e.g., FIGS. 7B and 8B, may be included as a portion of a device, such as a cell phone, laptop, TV, tablet, etc. The keys remain, certainty as to who is using card 100, certainty as to which card stored within card 100 is being accessed and which elements of card 100 were involved in a transaction, certainty as to the events which transpire, trust in the transaction process and payment methods and the belief that the user, above all else, is served in the best manner possible while conserving time, fuel, and not causing detrimental harm to the environment. Card 100 and system 1 disclosed herein can provide a mechanism to access solutions to the needs of a user needs in a given day in an efficient and effective manner possible, while preserving the environment to the greatest extent possible.

The user device, i.e., card 100, and system 1 disclosed herein supplants the prior art with a new design, in part, because the design lends itself to the development of seemingly infinite applications for the user to enjoy, much like the evolution of the cell phone. Accordingly, this new design provides platform development opportunities, much like that which has been seen and experienced in the personal computing, portable computing and cellular telephone arena. The opportunity to foster the development of endless "apps" for card 100 and system 1 is made available through the specific and highly advanced hardware and network connection provided by card 100 and system 1. As will become apparent from the present disclosure, user device 100 and system 1 according to the present disclosure also offers many different directions in which the concept can pioneer new methods of communicating with security and certainty, protecting the investment from obsolescence.

User device 100 and system 1 disclosed herein take advantage of the full range of possibilities available with advancing technology, to create a credit card form factor-based usable smart system that substantially eliminates the need for the user to continue to carry at all times, a wide range of hard-copy items and portable devices. The portability of card 100 allows a user to perform a wide range of activities normally limited to non-portable devices, in connection with the user's mobile activities. For example, a user can carry, easily pocket, or otherwise secure a card 100 according to the present disclosure while performing any of numerous physical activities (e.g., jogging/running/walking, biking, touring etc.), and thus have at the ready all the functionality of card 100 without having to carry more bulky and damage-prone devices.

Further, user device 100 and system 1 disclosed herein use the concept of personalizing and automating the purchase process to include up-to-the-minute information that may be available on a network, such as the internet or cell network, to indicate special offers that may be available to the user, which may depend on the user's GPS-determined (or network determined) location with respect to a wide range of retail outlets including restaurants and grocers, who have a greater need to distribute their wares in real time, while they are still fresh and acceptable to their clientele, which in this instance, arrives to the user through card 100.

As some examples of real time retail venues who must find users in need in a critical and limited time, grocers carry fresh produce which may be discarded and represent a total loss, while restaurants have capacity and perishables which may also go to waste if the venue cannot book customers in sync with their capacity and consumables availability, again representing a total loss to the venue. These are only two venue classifications and examples, there will be countless others which may be venues, individuals, institutions, governments, who have critical need to eliminate waste and make their distribution of product and service, highly efficient to those users within reasonable time and may also require reasonable distance/proximity.

Thus, an aspect of this specification is that card 100 and system 1 are not necessarily limited to any use or function disclosed herein because the development of a smart card, which presides between users and their social and ecommerce activities, as well as personal, business, job and securities related activities and computing activities (such as secure storage, secure access and remote activities) is something believed new and untapped.

Furthermore, since more and more online services are available to sellers as well as buyers, future use or function of card 100 according to this present disclosure and its applications, may well entail agreements between retailers, credit-card companies and users or groups of users, to make commerce and other activities flow more freely. Legacy cards and systems primarily focus on the form factor of the standard swipe card, to also provide mobile benefits and automation from within card 100 or sourced from a service and network supporting card 100.

Further, card 100 and system 1 disclosed herein can integrate the preemptive decision to buy, or the actual decision to buy, with all of the user's data, so as to automatically access the best possible deal(s) at point of sale, or preempting to ask through a network-based service for a better deal, per item to be purchased.

Basically, card 100 and system 1 disclosed herein can evolve to incorporate and maintain compatibility with legacy systems of ecommerce based on bank cards, credit cards and the like, evolve into a POS system, or integrate with more preferred methods of POS integration and interface.

An embodiment of card 100 and system 1 can combine some or all of the user's available payment methods, all discounts, coupons and other perks that the user's supporting network service can provide, shopping methods the user can access from the history of other users who take advantage of the services supporting card 100 and system 1, allowing the user to take on massively complex payment methodologies acceptable to the seller, apply the best coupons and discounts (and other perks like double coupon, triple coupon, frequent flyer miles, rebates, free extended warranties or low cost extended warranties, free gift cards, gasoline or fuel purchase credits and so forth), and conduct all aspects of transactions with a single action (e.g., swipe). A user could purchase 20 items, 20 different ways using 20 different payment methods and 60 different discounts and perks, with one action and with no wasted time. Of course, the methodology for such purchases is pre-established by the user. Indeed, the user can pre-establish a plurality of payment strategies prior to performing any transactions. Such strategies can include, for example, uniform distribution over a plurality of accounts or credit cards, categorical distribution that divides purchases among cards based on the type of card, ratio strategies that apportion purchases based on specific ratios, and other strategies. Card 100 can establish an infinite number of payment strategies, limited only by the imagination of the user, the number of accounts available, and memory available either directly to card 100 or indirectly from server 200 or elsewhere in the cloud. The user can benefit by being told what order to collect the items to be purchased, to save time and get through the venue in question as efficiently as possible. This suggests there can be professional shoppers who lead the way and record their steps, geographically, providing selection by selection specificity, to help other users (potential shoppers) not only save time, but also, save money and get the very best discounts.

Accordingly, the service which supports user device 100 according to the present disclosure can automatically reward the professional shopper, who could work out schemes to save the most money by working hard locally on shopping "primers" and recording all the pertinent details to conditionally or unconditionally share with other users, which includes micro-instructions to the users on precisely where to go, what to do and then, how to check out to receive the maximum amount of discount while saving the maximum amount of time. Time is a very big element for all shoppers because time can have monetary or other value to the user, and also can translate to miles on the road (wasting fuel), which are at present very costly and taxing to the planet. For example, if shoppers were to become just 20% more efficient, money can be saved, energy conserved, pollution reduced, and user time increased at home or at work. The benefits in becoming more proficient in shopping and procurement patterns, and payment methodology become significant when the maximum amount of automation is applied, as provided by card 100 and system 1 according to the present disclosure.

Professional shoppers can keep all these elements in mind and develop, as well as share their schemes and primers, and be automatically rewarded for their leadership, through system 1 and more so, through its supportive services and networks, reaching out to and touching the subscriber base. To further leverage the disclosed card 100 and system 1, communications between all users and professionals could be funneled through a social network, causing success stories to go viral and benefit even more individuals.

In an embodiment, applications developers can be granted access to user's data, to the depth the user allows, in return for more discounts, better overall deals, easier to use solutions to the user's requirements and so, unlike any other user device and system known to Applicant, system 1 disclosed herein can finally pay the user for the user's willingness to pass their demographic data to a service provider, acting through the services which support card 100. It is to be understood, however, that nothing herein is intended to limit the services to exclusively supporting the user through card 100.

More and more, the reader can see, there is clearly a need for a compact form-factor, reliable and secure consumer device with improved versatility and expanded functionality to host these applications. Card 100 can be considered as "one card that does it all." The extent of functionality of card 100, however, will correspond to services side of the equation, i.e., the services that can be delivered in a network connection to card 100.

The present disclosure provides a user device 100 having a card form factor and surface hardware features that take advantage of magnetic, optical and aural energy output and input, so user device 100 can interact with a wide variety of real world situations and the information found on a real or virtual object, or interact with information deliberately deposited on real world items. The disclosed processes are secure and complete so as to be highly specific when the software identifies and acts upon a user action, while the use of card 100 to conduct legacy type transactions (inspect, buy, return, share, post etc.) becomes increasingly less complex for the user. This expansion of methodologies allows each and every item with which the user interacts to become uniquely identified. Such unique identification can come through markings indicating the same, or, transactional "history" recorded during a live transaction event.

Embodiments of card 100 allow for development of tracking methodologies using unique identifiers embedded in card 100, representing the major components found on each side of card 100 and card 100 itself, to be combined with any unique identifier that can be associated with an object or line item in a transaction, or any unique identifier which can be associated with any other tangible or intangible item, including but not limited to a unit of currency, such that the use of said object, tangible item, or intangible item is tracked and thus related to the user's specific transaction or action which first identified the unique identifier. As an example, a transaction involving any form of virtual currency could track the use of each unit of currency or unit groupings (a 1 unit, 2 unit, 5 unit, or 20 unit transaction being fundamentally equal to a us $1, $2, $5, or $20 note), wherein, a law enforcement agency could track the use of such units from transaction to transaction, with utter reliability. Another use is to track, for warranty purposes and fraud avoidance, the unique instance of an object by way of its unique identifier. In this disclosure, the term unique identifier means an identification method, such as a number, text, or even a unique image or sound, or combination thereof, which in being unique, and in being associated with an object, such as appearing on the object, or, appearing in a data base as a unique entry which can be solely related to the object in question, allows a processing system and thus also a user to identify a unique object with certainty. Any of these identifiers can be combined with the system's ability to track the history of an object, a tangible good, an intangible good, a unit of currency, or any other tangible or intangible object to which a unique identifier can be assigned to build upon the confidence of a system. The provenance of the item in question is established through the history development and unique identifiers, allowing for a forensic examination of the object's true history, providing trust and certainty to any user who will become involved in any manner with the object. The ability to better track the history of items also builds a more universal trust for many users. One way of building trust in a system, such as a monetary system, is to be assured there is no cheating and no counterfeiting without reasonable means to audit and control such public enemy actions as counterfeiting. The same can be said for any system, such as equities transactions, purchase of anything of value from small to big ticket, and any item which will require proof of ownership for any purpose, with great certainty. Clearly, a bar code or Qr code, which is limited in its capacity, can lead to a correlated entry in a data base, providing the user and the tracking systems, with more information than the code provided initially.

Exemplary embodiments provide for data synchronization of all devices a user owns and operates, through card 100 or the service supporting card 100. In this manner, data sync, re-sync, restoration and conversation of data for all the devices the user operates, is made available through card 100 and the services supporting card 100 (or other iterations of disclosed card 100 and system 1), such as PC screen, cell phone screen, POS screen, other devices with the same technology, fully integrated. With card 100 as a light, low-cost, remote display with enhanced features in communication with the heavier cell phone, but located in a handbag, pocket, etc., the cell phone could take on a reduced role, permitting the cell phone to be reduced in size and complexity while the quality of sound from a cell phone could be enhanced due to the reduced role and streamlined design of the cell phone.

Embodiments of card 100 according to the present disclosure incorporate new technologies for the emission, detection, recording, and external writing to media. These technologies can enhance the developmental aspects of the system and include any form of positioning systems (such as GPS), networking including wireless, automatic display adjustment including orientation based on user preferences and orientation detection components, rumble generator that does not draw from power as much as current generating device necessary to give tactile or haptic feedback, a regional rumble generation on the surface that users will be more able to detect with their fingertip (e.g. blind users), or a braille generating mechanism providing a complete language interface based upon tactile and also synchronized vocal driven information (e.g., the piezoelectric portion speaks and the braille system provides tactile characters such that the blind individual can touch read from card 100 with ease, presuming the individual is trained in braille). A tether attached to card 100 can convert data to sound, such as a card interface that generates a headset interface that card 100 can detect and drive automatically, for example, for a blind individual, or any individual who wants to have voice driven feedback from card 100. Similarly, card 100 provides a two-way voice driven pathway, in which a microphone can associate with the headset and two-way voice, where card 100 converts voice to text.

In an exemplary embodiment, system 1 and card 100 can store and relate information about the card owner, the owner's immediate family, and/or others who may be with the card owner on a given outing, to the available local facilities and goods available. In one example, the medical condition and infirmities, allergies and the like for a card user are known to card 100 and the system can continuously or intermittently track mapping and information to the closest resources relating to the medical condition, infirmity or allergy. Equally, card 100 can include a mechanism through which law enforcement, paramedics and other professionals may access this information to speed the diagnosis of a given individual who merely has their card on their person, but is incapacitated. This aspect of the disclosure will, without any doubt, save lives.

Embodiments of card 100 and system 1 make it possible for professional shoppers to forge ahead of the users and record their shopping steps, both geographically and transactionally, to allow other users to "follow in their footsteps" and gain the same benefits and rewards while saving the maximum amount of time and money. In so doing, the professional shopper could be rewarded for their participation through subscribership and direct payment associated with the services and network support of card 100.

Embodiments of card 100 and system 1 can organize a user's opportunities in commerce, which includes rain checks, items sought, discounts, coupons or rebates with time limits, any gift cards the user owns or, gift card associated discounts, so as to keep the user informed of these expirations. As a calendar is needed, this same system can keep track of reservations and cancellation of reservations for the user. A user may be queued for a reservation at a restaurant and card 100, as well as its supporting network and services, can alert the user if the reservation has been confirmed. Wait times to venues could also be displayed, which can take the form of wait time to arrive for a confirmed reservation or, wait time before a reservation can be either confirmed or denied by a user to a goods or services provider.

An embodiment of card 100 and system 1 can allow for a card user to associate his/her card with one or more cards of other card users, such as in a group membership relationship. For example, card 100 can allow for presenting data as is part of a social net, but not viewable by any participants within the social net, except on their card and only in the presence of the user, such as, during a face to face discussion. This "I will show you mine if you show me yours" concept allows users access to data that is not shared under any circumstance other than face-to-face or within some spatial range, and with the proper software function, not maintained in the receiving card as a permanent memory. Proximity related and conditional display of data is implied by this design feature.

Embodiments of card 100 and system 1 can include artificially intelligent (AI) and/or fuzzy logic software that programs and/or operates the hardware of card 100, as needed, just in time. The user of card 100 may turn the AI and/or fuzzy logic functions on and off, and may also establish a "level" of the AI and/or fuzzy logic function. For example, AI and/or fuzzy logic functions may be relatively simple and permit limited action, for example, automatic on and off functions, or automatically communicating with a venue network. AI and/or fuzzy logic functions may also be more advanced, such as automatic identification of nearby smart devices and automatically permitting establishment of an ad hoc network, if card 100 deems such a network to be beneficial to the user at that moment. In an exemplary embodiment, the magnetic layer of card 100 can be programmed to function as a magnetic stripe output in synchronization with the user's motion and intent. In this manner, card 100 can be swiped in a slot type reader in any logical position whatsoever, even with card 100 at an angle or using a corner of card 100. The "AI" or "fuzzy logic" can adjust because card 100 provides essentially a light receiving/detection device across a whole surface, inbound light analysis, digital signal processing (DSP) and object identification and tracking) which can be image processed and from this inbound data, the software can process the imaging and anticipate the user's intended function of card 100, based on a given motion and the environment immediately surrounding card 100, programming the necessary elements "just in time" and conserving energy in so doing.

An embodiment of card 100 and system 1 of the present disclosure further leverage the presence of AI and/or fuzzy logic to shut card 100 down upon loss of card 100 or biometric logging failure and go into a mode where card 100 can only be queried as to how to contact the true owner of card 100, or, card 100 can provide minimal data to allow the individual who finds it to return it to its rightful owner using the US Mail or another carrier. Card 100 can carry prepaid postage for this purpose. In an embodiment, while a card is shut down into a secure mode, may also allow a new finder of card 100 to hold card 100 up to their own, or to a display which is equipped as card 100 is equipped, which will contact the true owner of card 100 using such communications methods as a text, or tweet, email or other text type connection which then allows the new surrogate of card 100 to either meet up with the true owner, each providing identity information if they like (identities are guarded initially, as card 100 could just be dropped in the mail and arrive back to its true owner) or, providing proximity and timing data, manually, or automatically, so the two different users can locate one another. Card 100 and system 1 can include provision of automatic bounty for the finder of a lost card 100, charged to the user, to encourage all users to protect their cards from accidental loss and to increase chance of return if card 100 is lost. In an exemplary embodiment, for assistance to the finder of a lost card 100, a bar code or Qr code is displayed on card 100 that provides information associated with the original card owner, such as a telephone number. In a further exemplary embodiment, the bar or Qr code links to a data entry in server 200, such that legacy devices can scan the code (bar or Qr) and be provided with ability to contact the owner of card 100 without divulging identity of the user/owner who lost card 100.

An exemplary embodiment of card 100 and system 1 of the present disclosure can include a write function for magnetic-out pixels 109 of magnetic-out layers 190*a* and 190*b* and/or the light emitting pixel elements 107 of light emitting portion of card 100, e.g., first light emitting unit 122 and second light emitting unit 124, to alter a magnetically sensitive or optically sensitive material outside of card 100, respectively. Thereafter, card 100 is able to magnetically and optically read the altered surface reliably. An example would be to imprint a magnetic OCR or Qr code, or a proprietary code to a magnetically programmable surface. Another example would be to imprint a photo sensitive material using the light emitting portion of card 100. The light emitting portion of card 100 is intended to use light above, within and below the visible spectrum, as will the light receiving/detection (e.g., CCD) portion to detect light from above, within and below the visible spectrum. When the two writing techniques are combined, for writing to another card, or to a machine with the same technology equipped and integrated to the machine, or just a paper label or surface on an object, the object can be permanently or temporarily marked with both an optical image and a magnetic image, where the image is in actuality a set of recoverable (readable) data.

The level of encryption can be left to the amount of "pixels" that can be printed and then recovered, either magnetically or optically. An erase function may either return the written data to original stasis, or if the target is not able to be returned to original stasis, the target could then be written over and altered enough to be illegible. This function has many uses, one of which is to pre-label items purchased inclusive of a unique identifier written on the item, where upon query by any third party, the user can present a bill of sale, purchase order, receipt, or any other needed document, proving ownership of the item in question. The writing function can deliberately overlap elements of the written construct, or write with no relationship between the magnetic imprint and the optical imprint. Both may be invisible to the naked eye. Since all the imprinting contains unique identifiers, the unique identifiers associated with the optical write, versus the different unique identifier assigned to the magnetic write, are retained in a data base, or shared with a remote data base, such that upon any new read of the written magnetic and optical data, the unique identifiers, once recovered, must match with the previously stored data. The ability to perform such marking can serve as a very unique and powerful method of managing items to be purchased, or inventoried, with reliability and trust. For surfaces, such as those of a box, housing new inventory (or used inventory) based on the dynamics of the material, space can be provided for multiple write and overwrite functions, if, for example, the material cannot be returned to stasis and must be permanently marked out so as not to be recordable any longer.

Card 100 and system 1 of the present disclosure allow for development of card 100 hardware to take advantage of the two sides, i.e., first major surface 101 and second major surface 102, and the hardware design of card 101, so as to allow information on one side or surface of card 100 to be immediately displayed or converted and displayed on the other side or surface. As such, any application from simple magnification of a target (e.g., an image taken by a CCD on one side of card 100 is displayed in magnified form on the other side), conversion of a bar code to useful information, translation of a language, conversion of a monetary value in one currency to a different currency, and identification of units of money, such as a paper note or coin and its value (with conversion or other useful information) is made possible by the dual sided hardware of card 100. In such areas as stamp collecting, coin collecting, rare collectibles, jewelry and other small objects having high values, card 100 could serve as an invaluable tool in identifying the object and immediately providing condition and value data, or, store the object the user has scanned for future use or evaluation. Items marked with magnetic ink can also be read, scanned, and authenticated by card 100 and its connection through server 200. Data on magnetic ink can be in the form of text characters, bar codes, images, etc. Card 100 also has the capability of writing on magnetic ink, and by communicating with a server, a venue owner can program such codes with unique identifiers maintained in the venue's server 200 on a specific item with proper authorization to gain access to these codes. Thus, a venue has the capability of creating its own unique identifiers known only to its server, and by adding unique non-magnetic identifiers, such as invisible optical images, e.g., a specific wavelength that is reflected, the ability to counterfeit such codes becomes extremely difficult since a counterfeiter is unaware of the layered coding required to duplicate a particular identification tag.

Card 100 and system 1 of the present disclosure allow, per terms of service (TOS) between a user and a main service provider, and per TOS of any agreement between the user and applications developers who are approved by the main service provider, different application developers to have different access to the user's data based on filters and limitations the user sets, or is permitted to set based on the TOS. Additionally, applications developers can be given controlled access to the display of card 100 and other elements of card 100, and the data stored on the main service provider's servers. The main service which supports card 100 is going to typically have the least restricted or non-restricted access to the user's data. However, sharing any information or data with any entity must follow the law, the terms of service with applications developers, and the user's TOS agreement with the service provider. User's data is not limited to card 100 and its internal transactions, but extends to all services to which the user subscribes which can be accessed by card 100. For example, user data can mean at a minimum and without limitation, credit card, airline, bank, insurance, brokerage, and other accounts, again, with limitations set by the user. As can be seen, applications developers can gain increased access to otherwise private user data because users would be more willing to agree to share their otherwise private data if they can see what they receive for that level of sharing.

User device 100 and system 1 according to the present disclosure can allow massive expansion of what a transaction may be, such as, opening of an electronic lock, locking an electronic lock, starting a piece of machinery, shutting down a piece of machinery, checking the status and diagnosing a piece of machinery, accessing video or snap shot information about a subject, meeting a person and exchanging identity data for later viewing, updating a social network as to a user's activities, and editing and deleting a user's social network activities.

This disclosure recognizes the need for segmenting social ecommerce as its own field of endeavor, focusing on localized, regional and national (as well as international) aspects of commerce as it applies to card owners, and developing applications which leverage this new technology and the industry required to support this new technology. For purpose of this disclosure, although not limited to small ticket purchases, most social activities in a given length or interval of time, such as a day, involve much procurement of small ticket items such as food, energy, fuel, transportation, and groceries. Allowing users to gain access to better methods of accessing frequently needed tangible and intangible goods and services, will help the user save money and be more efficient with their time and more "green" with their consumption habits.

Card 100 and system 1 disclosed herein can foster the creation and expansion of the social network's ecommerce share experience, wherein, as patterns emerge which appear to be of interest to users who are present on a social net, the information is shared according to algorithms developed by developers with the positive feedback of users guiding the development.

An embodiment of card 100 and system 1 allows by preference the suppression of all query of the user at moment of final checkout to protect the user's rights and preserve the user's time. Examples include no cash back, no donations, and no help needed versus, cash back, donations, and help needed to load the user's items into their vehicle (or other help). In all these cases, the provision of preferences serves to pre-process these requests so the venue can better serve the user before and as they arrive at the final checkout station. Even such minor elements as having enough cash for the user can be covered by way of preprocessing and passing the data indicating that the user is now approaching checkout or is the next patron to be serviced. In this way, the teller is preemptively alerted so as to have enough cash, forms, rebate certificates, offers, someone to assist the user, and any equipment needed to assist the user, just to name a few examples, all serving to make the shopping experience and venue's servicing efforts more efficient and thus, more enjoyable for employee of the venue and the user, alike. Further automation allows for pre-processing or rapid automated real time processing at the POS to include automated redemption of coupons, or automated purchase of applicable (purchasable) coupons with automatic application and just-in-time for the transaction, automated processing of rebates, requests for rain checks, extended warranties, automated selection of payment means per item, to capture maximum discount, perk, frequent flier miles or any other benefit. The timely preparation and presentation of these various features to each user on their arrival at the checkout location also benefits all the other patrons at the venue and reduces the costs for the venue by keeping the line moving and the checkout process efficient. Everyone, i.e., all parties involved in a transaction and all those who must wait for the transaction to be completed before they are able to reach the checkout location, benefits.

It is to be understood that the disclosed concepts are not limited to a card, and that the disclosed design of the surface of card 100 can migrate to the surface of tablet, laptop and desktop computers, as well as any other computer based systems that may include control systems for vehicles, factories, military applications, and other applicability. The novelty of a dual sided display in a credit card form factor, which is inherent in the design of card 100, changes how people interact with a computer and invites interaction from both sides of the display, used in card 100 as both an output and input device. The design of card 100 should not be confused with touch screen technology as it incorporates a different method of detection for objects approaching the screen, and although the design can emulate touch screens, the user need not touch the screen to select and use a virtual object, tool or other virtual control.

An embodiment of card 100 in accordance with the present disclosure can be made to be net sum positive buoyant, so card 100 will float if dropped in liquids, such as water. In providing a waterproof conformation, card 100 can be taken reliably into difficult conditions while still reliably allowing the user to use it without hesitation or risk to their connected device or transaction. A user, for example, would refrain from taking their computer or cell phone in the rain, but embodiments of a water-proof card breaks from this convention.

Card 100 and system 1 provide a platform that, aside from its myriad of features and support from a digital network and the users of that network, provides demographic data for the owner of a given unique card 100 to enjoy. Card 100 and its supportive platform represent a fertile opportunity for applications developers to focus on the hardware functions of card 100 to develop more and more applications through the software and the network-based functions card 100 can easily and readily access. The data from all users can be maintained as fully secure, while patterns users exhibit, which can be shared without affecting the security or identity of a particular user through automated redaction or secure processing, may benefit all users and may be incorporated into primers (schemes) and applications provided to the user with a high degree of automation for the user to enjoy. It must be remembered at all times, the high degree of automation provided through the services, networks and the hardware of card 100, is considered to be a key set of factors which will relate to the user's acceptance, frequency of use, and enjoyment of card 100.

Card 100 and system 1 of the present disclosure makes it possible for other hardware and software functions to migrate into the convenient form factor provided herein, with its capabilities and common presence before users provides a platform opportunity for further functions and integrations to the fullest extent the hardware and software can host. Examples range from remote control of PCs and data bases to wireless control over appliances in the home or office, emulation of a compass with positioning and mapping, proximity related search functions, hazard warning capability and more.

Card 100 and system 1 of the present disclosure is anticipated to cause further changes in such systems as POS systems, as card 100 makes its way into the market and forces change in these legacy embedded systems. For example, the POS can track when a user buys, or leaves any object which requires a return. Card 100 could then alert the user when the return is warranted and provide guidance, such as when and how to travel to the venue to save the most time and fuel costs.

Card 100 and system 1 disclosed herein allows for incorporation of emerging technologies that serve to miniaturize the components of card 100 and increase density, such as a given CCD pixel density, which in an exemplary embodiment are represented by light detecting pixel elements 148, and/or LED pixel density, which in an exemplary embodiment are represented by light emitting pixel elements 107, for example, to increase the memory storage capacity or processing power, to decrease the power consumption, to yield certain specific expectations for the evolution of card 100. In one such critical evolutionary factor, card 100 can host pixel densities which are far beyond the norm because users will no longer be seeking better photos, better videos, or service to high definition media players and devices. Rather, such a high density of pixels allows for better and better encryption methods and more secure transfers of data as all pixels need not be involved in a data transfer and many, if not all, could send Trojan signals to further enhance security. Only one aligned pixel is needed to transfer most data and in very short time (under one second). Card to card communication, or, card to a device equipped with a similar surface as card 100, will allow the use of these higher and higher densities of magnetic pixels 109 and 150, light emitting pixels 107, and light collecting pixels 148, even aural pixels 111 and 113, to increase the complexity of handshake, encryption and data transfer between these devices.

Exemplary embodiments described herein provide an optical interface, pixels to pixels, e.g., LED to CCD, and vice versa, when cards 100 are brought into close proximity, or card 100 and another device likewise equipped with features disclosed herein. This interface provides a high degree of security from card-to-card or between a card and a POS, or other receptacle such as an ID card reader, or for restriction of personnel access to a secure facility or controlled entry to an event, such as a football game.

Card-to-card data transfer, or card-to-system or network data transfer (and system or network to card) can take advantage of the optical and magnetic communications aspects of card 100, while also leveraging the biometric aspects of card 100. In a manner of speaking, card 100 becomes a portable memory stick with biometric verification at each stage of use, and a much more secure method of data transfer not found on traditional memory sticks. Since card 100 can be held between thumb and forefinger as well as index finger, and since scanning can be performed from any of the major surfaces of card 100, card 100 can image biometric data, which may be described as optical biometric recognition, from more than one object, for example, from three fingers and a somewhat oblique view of the fingers, which is a very difficult view to falsify in terms of biometric falsification or emulation. A retinal scan can be added, which requires the user to hold card 100 in the same manner, but up to their eye for a brief second to gain the retinal scan, thus incorporating three fingers and the eye features, and in going further, require a scan of the both of the user's eyes, representing a super-high level of biometric logging, used if and when needed. Requiring a plurality of biometric inputs to access the capabilities of card 100 or, in a multi-level security environment, requiring a greater combination of biometric inputs to access network 210, can discourage even the most arcane method of biometric falsification, reducing any likely fraud attempt to the extortion of the user. Should a user be coerced in the use of card 100, using a slightly different combination of biometric inputs can set in sequence a series of actions, including an internal algorithm to simulate network access difficulties, system access difficulties, and other issues that would be expected to be out of the control of the user of card 100 to form a delaying tactic, while silently sending an automated distress signal to the authorities along with location information.

If card 100 is able to detect its surroundings happen to be liquid, such as beneath card 100, as it is floating in a lake, it may emit a finder signal which is electronic, and a visible light signal, to the extent possible while preserving internal power. The light frequency emitted can be determined by an internal analysis of the light, selecting light frequencies which are more able to be seen by humans. Card 100 could also wait until night fall and use a frequency of light most likely to be seen by humans, such as in the yellow color spectrum. With a proximity beacon and light, card 100 can draw in a search team or individual searching so they may recover card 100 with ease. The proximity wireless electronic signal may be weak and limited in its range, but the light emission, being controlled, could be so band restricted that a searcher can use a device tuned to the frequency to "see" card 100, even when human eyes cannot.

Card 100 can also encompass the incorporation of power distribution, a battery, magnetic components specific to the induction of wireless power, RFID, network adaptors, Wi-Fi, Bluetooth™, one or more processors, memories, extreme angle LED and CCD pixels, tactile or rumble elements, and other magnetics. Card 100 can also provide wireless power output to nearby devices, such as another card 100, a tether, etc. Additional magnetics which do not interfere with the function of card 100 are intended for use as immobilizing means for stacking cards 100 in preparation for very high level, encrypted, and hyper-secure data transfer. In the realm of VVLSI and flexible (meaning flexure without harm to the circuitry of card 100) electronic surface production, these novelties will fit within the form factor and will improve as various improvements are incorporated into VVLSI production techniques and equally with improvements in miniaturization and manufacturing techniques used throughout the world. Applicant also anticipates possibilities such as repeaters for networks, mesh networking, and the device housing a server, rather than just a processor. As a server, card 100 can host ad hoc local networks. Mesh networking brings forth the possibility of each card 100 or any dock that is present to support card 100, passing regional groups of user's data from one card 100 to the next, acting as repeaters, so as to reach a reliable source of network connection in a given venue. In this manner, although all data is continually maintained under encryption so as to segregate it and only allow a user to see his/her own data, the ability to extend the reach of a wireless network is enhanced through this incorporation of a mesh network architecture and distribution strategy. While such mesh networking requires the cooperation of most users having card 100, the benefit to the user of card 100 is access to the mesh network, because in an exemplary embodiment, participation in the mesh network is an all or nothing proposition; i.e., only those who join the mesh network as a potential repeating site are permitted to use the mesh network. Mesh networks have significant potential to eliminate dead spots that can occur near structures and geographic formations if sufficient users of card 100 are available to mesh a signal to a location where a sufficiently strong wireless signal is available.

In an exemplary embodiment, card 100, server 200, and value analyzing unit 232 work together to enable aspects of social commerce and ecommerce. Social commerce includes the sharing and using of information between users to make venue-based (brick and mortar) commerce more efficient and less costly. Social ecommerce is the same as social commerce, applicable to virtual transactions or transactions conducted exclusively over a network by a user. In an example, while professional and semi-professional commerce experts may make a living by developing or finding and connecting users to coupons, discounts, Groupons, and other forms of remuneration, sharing with users of card 100, these same individuals can further develop schemes for obtaining the items related to the coupons etc., with the most efficient possible action, based on a given user's location. The process of finding and connecting users to opportunities and remuneration may include providing maps to local venues, but may also include maps and locations within the local venue. Thus, server 200 and value analyzing unit 232 can further develop intelligent algorithms allowing for a user to preemptively scan in all the coupons, etc. that the user finds of interest so that the server can develop a shopping plan for the user. The user can also scan in actual items, or obtain bar codes to scan from a network, such as the internet. Actual items, bar codes, Qr codes and the like can be scanned from a standard display by card 100. The user can then be instructed by card 100 as to how to obtain the items locally at the lowest possible cost in one trip, or, if several trips make the cost lower, that information can be provided to the user. This planning and mapping feature can include mapping instructions from one point to another and within the venue itself. When a user scans in a coupon, etc., the action of scanning can tell server 200 and value analyzing unit 232 that the item(s) covered by the coupon is (are) an item of interest for the user. System 1 can then look for the best deal(s) that include all coupons, etc., and the best way to pay for the transaction(s). Venues many times have policies which allow a user to redeem a coupon, etc. after the physical or other actual point of sale. Venues may also have policies which provide for price protection for a certain length of time, post point of sale. A venue may also make an agreement with the owner of system 1 and card 100, to provide these protections to the users of card 100 for better or longer periods of time because the use of card 100 is beneficial to the venue from a productivity perspective as well as from a security perspective. As such, for each item a user has scanned in a coupon or has scanned in a venue and placed in their cart, according to the terms of the aforementioned policy, server 200 and value analyzing unit 232 will continue to seek more coupons, etc. and methods of payment to the limit of the policy and agreement. Therein, if a user forgets to look for coupons, etc. and server 200 and value analyzing unit 232 continue to seek these coupons, etc. for a length of time permitted by the policy and agreement of the venue, these coupons, etc. may be redeemed automatically and applied as credits, post point of sale. When an actual sale occurs, all items involved in the sale trigger server 200 and value analyzing unit 232 to start the search for coupons etc. and payment means which can be post transaction applied to the sale to the limit of the given venue policy and agreement. If redeeming coupons etc. at point of sale and the point of sale system of a venue cannot accept the coupons etc. in one data upload, then card 100 may present each coupon, etc. by way of bar or Qr code for scanning by the point of sale system. If the venue cannot accept the coupons, etc. at actual moment of the sale, but the venue permits post transaction crediting, applying the coupons, etc. and other payment means in a batch process, or a one by one process, since this is fully automated and requires no human intervention, can all be done post point of sale. One benefit to card 100 and system 1 of the present disclosure is to streamline shopping, maximize benefit to users of card 100 and minimize work effort for the venue while also making the shopping experience better for other clients of the venue (those waiting in line behind the user in question here). Social commerce and ecommerce methods such as these, as applied to users of card 100 and other shoppers who do not have card 100, as well as the venue in question, will find viral support because everyone obtains a benefit and no one is losing anything in the process.

This disclosure provides but a portion of the capabilities of card 100. Because card 100 includes a plurality of sensors in a compact configuration, and because card 100 includes a plurality of outputs, which can include optical, aural or sound, and a plurality of radio frequencies, e.g., Wi Fi and RFID, card 100 becomes a compact interface to a plurality of systems. For example, smart rooms can sense the presence of card 100 and engage lights, heat, air conditioning, television, etc. by "learning" historical patterns of the user of card 100, by being preset or predetermined by the user of card 100, or by prompting the user of card 100. Furthermore, when the user of card 100 departs a room, or a house, the room or the house can respond to the departure by turning off lights, adjusting fans and environmental controls, turning on a security system, etc.

Card 100 may also provide a connection to larger databases at the option of the user of card 100, and provide a network of finite data that can improve weather forecasting, traffic conditions, and potentially even crimes given that plurality of sensors. Card 100 can be trained to recognize road patterns with its GPS function and processor 110, and when an anticipated speed is different from the actual speed, card 100 can report this information, helping others recognize and potentially avoid slow spots. By analyzing the input from hundreds of cards 100, a government entity may be able to find the location of accidents more precisely.

In an exemplary embodiment, card 100 also includes the flexibility of either incorporating additional sensors, or being attached to additional sensors. For example, card 100 may incorporate or be connected to a carbon monoxide sensor, oxygen sensors, ammonia sensors, chlorine sensors, etc., to determine the safety of a gaseous environment. Some sensors may permit the ability to determine whether a user's blood oxygen level is normal or in a potentially dangerous condition, and report this information automatically to emergency services. If multiple users of card 100 are connected to a network and transmit such information periodically, locations of pollution, toxic gases, etc., may be more finitely mapped by the presence of numerous users. In a further exemplary embodiment, card 100 may use its sensors to measure barometric pressure and humidity, which may be transmitted to an organization such as the National Weather service or a local weather aggregating organization. In yet another exemplary embodiment, card 100 may include radiation detectors, permitting the ability of mapping radiation leaks or contamination. In yet another embodiment, card 100 may include a particle measurement capability for measuring pollution, detecting smoke, etc. In a further embodiment, card 100 may include a semiconductor neutrino detector, further enhancing the capability of capturing this seemingly elusive subatomic particle. In each case, the ability of card 100 to connect to a local network yields vast amounts of data that can be used to analyze, for example, the location of pollution, fires, rainfall, and any other attribute detectable by the sensors of card 100.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

I claim:

1. A communication device configured to sense one or more biometric characteristics of a user, comprising:
    a cover structure including an exterior surface;
    a layer of display light emitting output pixel elements positioned below the exterior surface to display images through the exterior surface;
    a plurality of biometric output pixel elements configured to provide an output in a direction through the exterior surface toward the user, the plurality of biometric output pixel elements positioned below the exterior surface and overlapping with the display light emitting input pixel elements in a direction perpendicular to the exterior surface, the plurality of biometric output pixel elements being at least one of light emitting pixel elements and piezoelectric-out pixel elements;

a plurality of biometric input pixel elements positioned below the exterior surface and overlapping with the display light emitting input pixel elements and the plurality of biometric output pixel elements in a direction perpendicular to the exterior display surface, the plurality of biometric input pixel elements being at least one of light detecting pixel elements and piezoelectric-in pixel elements, and at least a portion of the plurality of the biometric input pixel elements positioned and configured to receive a reflected biometric input passing from the user through the exterior surface; and a processor connected to the biometric input pixel elements to process the reflected biometric input.

2. The device of claim 1, wherein the plurality of biometric output pixel elements and the plurality of biometric input pixel elements are independently controllable.

3. The device of claim 1, wherein each of the plurality of the biometric output pixel elements is positioned to transmit an output through at least one of the plurality of biometric input pixel elements and through the exterior surface to be reflected by the user.

4. The device of claim 1, wherein the plurality of biometric input pixel elements are positioned between the plurality of biometric output pixel elements and the exterior surface in a direction perpendicular to the exterior surface.

5. The device of claim 1, wherein the layer of display light emitting output pixel elements is positioned between the exterior surface and the plurality of biometric input pixel elements in a direction perpendicular to the exterior surface.

6. The device of claim 5, wherein the layer of display light emitting output pixel elements is positioned between the exterior surface and the plurality of biometric output pixel elements in a direction perpendicular to the exterior surface.

7. The device of claim 6, wherein the plurality of biometric input pixel elements is positioned between the layer of display light emitting output pixel elements and the plurality of biometric output pixel elements in a direction perpendicular to the exterior surface.

8. The device of claim 1, wherein the layer of display light emitting output pixel elements is positioned between the exterior surface and the plurality of biometric output pixel elements in a direction perpendicular to the exterior surface.

9. The device of claim 1, wherein the biometric characteristic of the user is one of a fingerprint, gesture, eye, and face.

10. The device of claim 1, further including a plurality of transmitting passages extending from the exterior surface to the plurality of biometric input pixel elements to direct the reflected biometric input to the biometric input pixel elements.

11. A communication device configured to sense one or more biometric characteristics of a user, comprising:

a cover structure including an exterior surface;

a layer of output pixel elements positioned below the exterior surface and configured to provide an output through the exterior surface toward the user, the output pixel elements being at least one of light emitting pixel elements and piezoelectric-out pixel elements;

a layer of biometric input pixel elements positioned below the exterior surface to receive a reflected biometric input passing from the user through the exterior surface, the biometric input pixel elements being at least one of light detecting pixel elements and piezoelectric-in pixel elements; and a processor connected to the layer of biometric input pixel elements to process the reflected biometric input.

12. The device of claim 11, wherein the layer of biometric input pixel elements is positioned between the exterior surface and the layer of biometric output pixel elements in a direction perpendicular to the exterior surface, the output being transmitted through the layer of biometric input pixel elements.

13. The device of claim 11, further including a layer of primary display light emitting output pixel elements positioned below the exterior surface to display images through the exterior surface.

14. The device of claim 13, wherein said layer of primary display light emitting output pixel elements is positioned between the exterior surface and the layer of biometric input pixel elements in a direction perpendicular to the exterior surface.

15. The device of claim 14, wherein said layer of biometric input pixel elements is positioned between the primary display light emitting output pixel elements and the layer of biometric output pixel elements in a direction perpendicular to the exterior surface.

16. The device of claim 11, wherein the biometric characteristic of the user is one of a fingerprint, gesture, eye, and face.

17. The device of claim 11, further including a plurality of transmitting passages extending from the exterior surface to the layer of biometric input pixel elements to direct the reflected biometric input to the biometric input pixel elements.

* * * * *

UNITED STATES PATENT AND TRADEMARK OFFICE
CERTIFICATE OF CORRECTION

PATENT NO. : 11,593,776 B2
APPLICATION NO. : 17/816672
DATED : February 28, 2023
INVENTOR(S) : Lawrence F. Glaser It is certified that error appears in the above-identified patent and that said Letters Patent is hereby corrected as shown below:

In the Claims

In Column 114, Lines 66 and 67:
overlapping with the display light emitting input pixel elements
Should be corrected to be:
overlapping with the display light emitting output pixel elements In Column 115, Lines 5 and 6:
overlapping with the display light emitting input pixel elements
Should be corrected to be:
overlapping with the display light emitting output pixel elements In Column 115, Lines 7 and 8:
in a direction perpendicular to the exterior display surface
Should be corrected to be:
in a direction perpendicular to the exterior surface In Column 115, Lines 11 and 12:
and at least a portion of the plurality of the biometric input pixel elements
Should be corrected to be:
and at least a portion of the plurality of biometric input pixel elements In Column 115, Lines 16 and 17:
a processor connected to the biometric input pixel elements to process the reflected biometric input.
Should be corrected to be:
a processor connected to the plurality of biometric input pixel elements to process the reflected biometric input.

In Column 115, Lines 21 and 22:
wherein each of the plurality of the biometric output pixel elements Signed and Sealed this
Twelfth Day of September, 2023

Katherine Kelly Vidal
*Director of the United States Patent and Trademark Office*

Should be corrected to be:
wherein each of the plurality of biometric output pixel elements In Column 115, Lines 47 and 48:
wherein the biometric characteristic of the user
Should be corrected to be:
wherein the one or more biometric characteristics of the user In Column 116, Line 24:
the layer of biometric output pixel elements
Should be corrected to be:
the layer of output pixel elements In Column 116, Lines 32 and 33:
wherein said layer of primary display light emitting output pixel elements
Should be corrected to be:
wherein the layer of primary display light emitting output pixel elements In Column 116, Lines 37 and 38:
wherein said layer of biometric input pixel elements
Should be corrected to be:
wherein the layer of biometric input pixel elements In Column 116, Lines 39 and 40:
the layer of biometric output pixel elements
Should be corrected to be:
the layer of output pixel elements In Column 116, Lines 42 and 43:
wherein the biometric characteristic of the user
Should be corrected to be:
wherein the one or more biometric characteristics of the user